United States Patent [19]
Fukui et al.

[11] Patent Number: 5,918,222
[45] Date of Patent: Jun. 29, 1999

[54] INFORMATION DISCLOSING APPARATUS AND MULTI-MODAL INFORMATION INPUT/OUTPUT SYSTEM

[75] Inventors: Mika Fukui, Tokyo; Kouichi Sasaki; Kazuyuki Gotoh, both of Kawasaki; Yasuyo Shibazaki; Akira Morishita, both of Tokyo; Yoichi Takebayashi, Kamakura; Yoshihisa Ohtake, Yokohama, all of Japan

[73] Assignee: Kabushiki Kaisha Toshiba, Kawasaki, Japan

[21] Appl. No.: 08/619,824

[22] Filed: Mar. 15, 1996

[30] Foreign Application Priority Data

Mar. 17, 1995 [JP] Japan ................................. 7-086266
Sep. 13, 1995 [JP] Japan ................................. 7-235805

[51] Int. Cl.$^6$ .................................................. G06F 17/30
[52] U.S. Cl. ............................ 707/1; 704/275; 704/251; 704/270
[58] Field of Search ............................... 395/601; 707/1; 704/275, 251, 270

[56] References Cited

U.S. PATENT DOCUMENTS

| | | | |
|---|---|---|---|
| 4,980,842 | 12/1990 | Kamada et al. | 364/518 |
| 5,261,087 | 11/1993 | Mukaino | 395/603 |
| 5,351,596 | 10/1994 | Takebayashi et al. | 395/284 |
| 5,357,596 | 10/1994 | Takebayashi et al. | 395/2.84 |
| 5,535,063 | 7/1996 | Lamming | 360/4 |

OTHER PUBLICATIONS

Lehnert et al. "The Role of Affect in Narrative Structure" Cognition and Emotion, vol. 1, No. 3, pp. 229–321, Jul. 1987.

Oren et al. "Guides: Characterizing the Interface", The art of human–Computer Interaction Design p., Jan. 1990.

Patti Maes "Agents That Reduce Work and Information Overload" ACM. vol. 37, No. 7 pp. 31–40, Jul. 1994.

*Primary Examiner*—Thomas G. Black
*Assistant Examiner*—Jean M. Corrielies
*Attorney, Agent, or Firm*—Oblon, Spivak, McClelland, Maier & Neustadt, P.C.

[57] ABSTRACT

A data storage means stores data in a predetermined information form. An information retrieval means retrieves the data stored in the data storage means. A reception means receives an information disclosure demand from a demander, a response rule storage means for storing general knowledge for generating a response responding to the demander and a personal relationship information associated with a unique personal relationship between a user having the data on an information provider side and a user on an information demander side. A response plan formation means, responsive to the demand received by the reception means, plans a response for exhibiting, to the information demander, data obtained by causing the retrieval means to retrieve the data stored in the data storage means on the basis of the knowledge and the personal relationship information stored in the response rule storage means. A response generation means generates the response to the information demander in accordance with the plan formed by the response plan formation means.

48 Claims, 172 Drawing Sheets

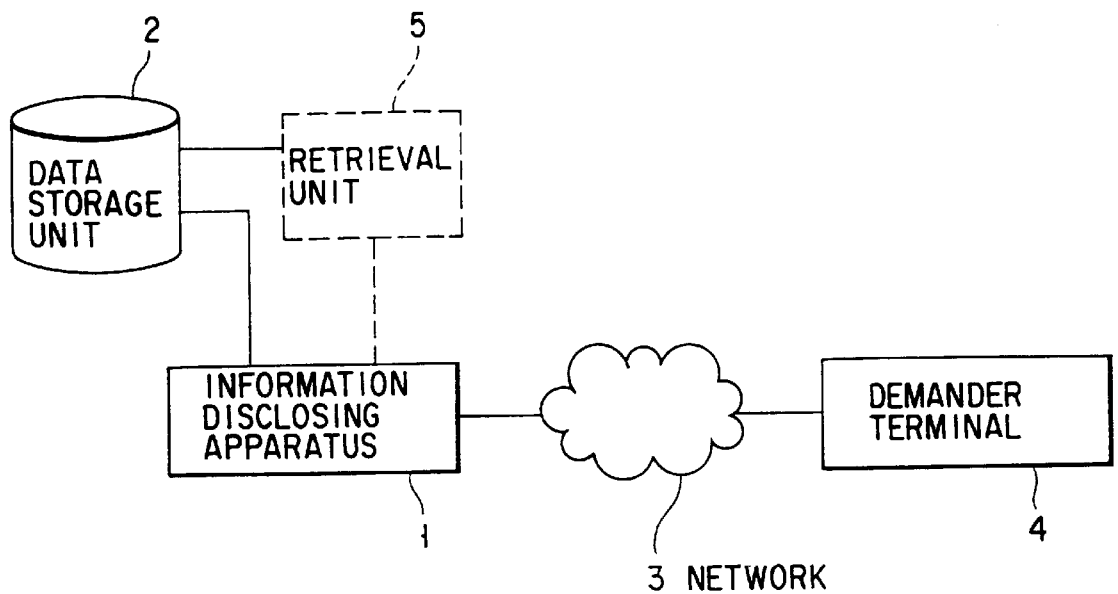
F I G. 1
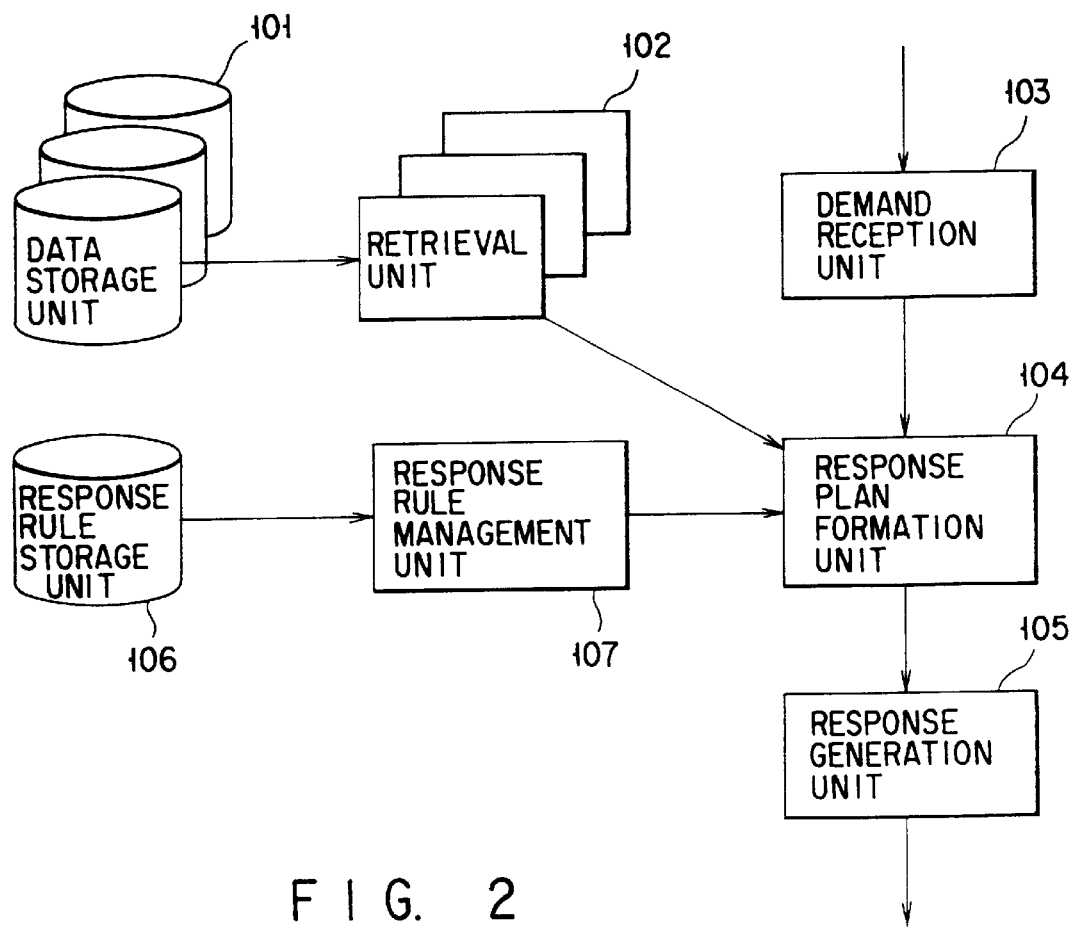
F I G. 2

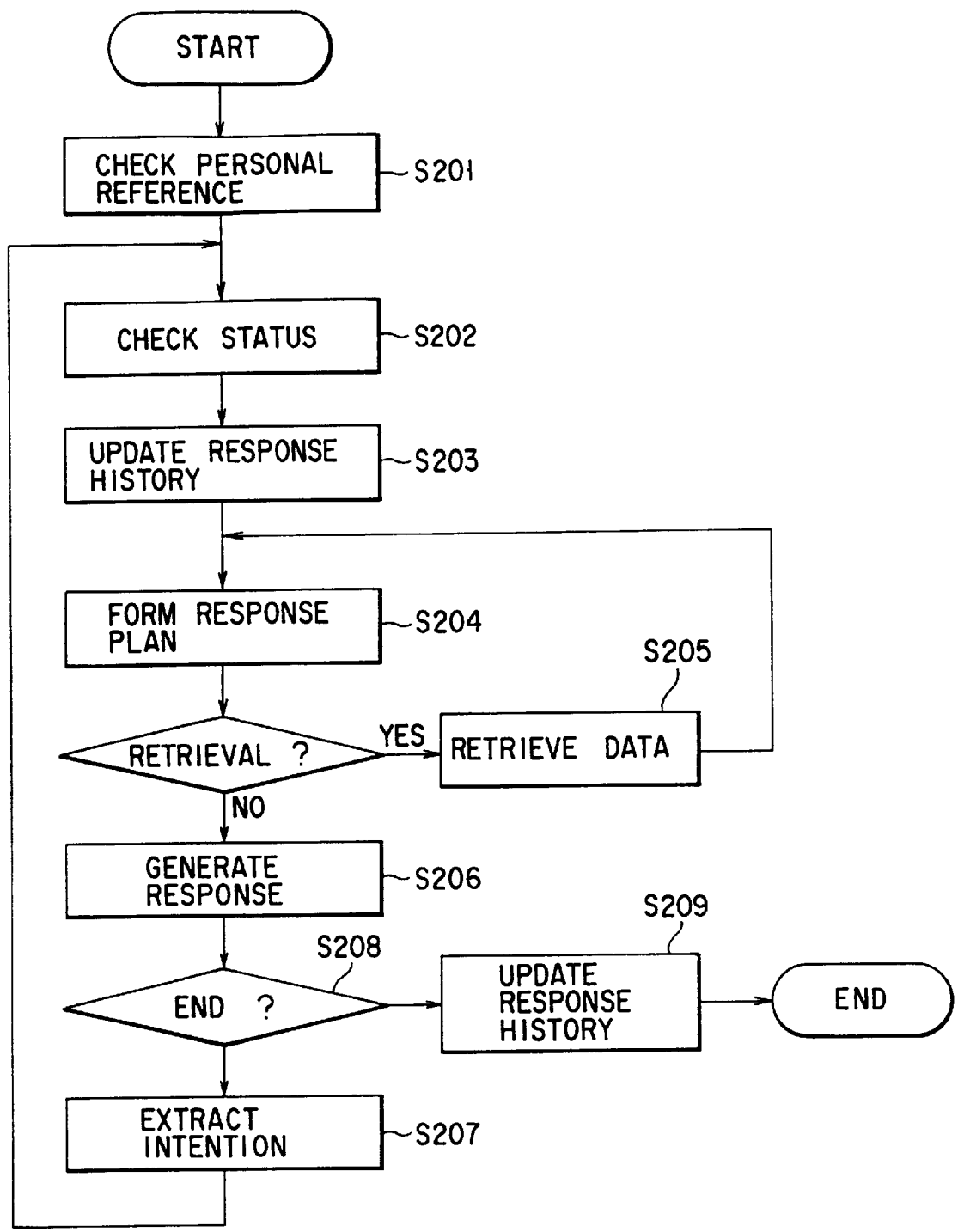
F I G. 3

```
% pip Jim yasuda       ---S0
J: HELLO ! MS. SAKURA. ---J0
J: WHAT CAN I DO FOR YOU ? ---J1
S: ■
```

Jim-yasuda

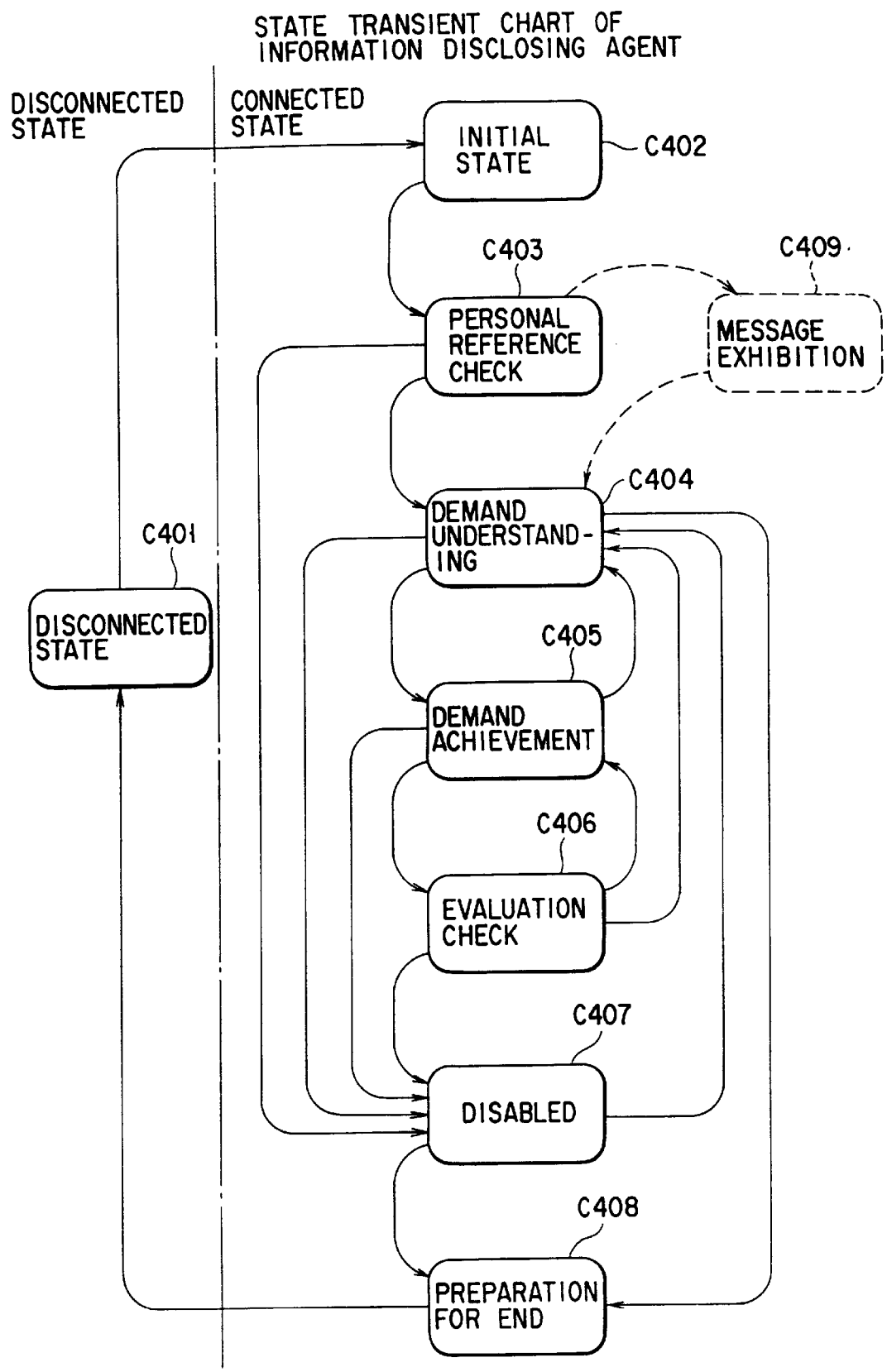
F I G. 5

USER HISTORY INFORMATION TABLE

| LOGIN NAME | SAKURA | |
|---|---|---|
| NAME | MS. SAKURA | |
| NO. OF ACCESSES | 10 | |
| ACCESS PERMISSION LEVEL | 5 | |
| ACCESS RECORD | DATE | 0 (MONTH) X (DAY), 13:50 |
| | ACCESS TIME | 10 MINUTES AND 25 SECONDS |
| | PROVIDED INFORMATION | S-3, 1-2, 1-3, 1-5 |
| | ⋮ | ⋮ |
| | DATE | 0 (MONTH) X (DAY), 14:20 |
| | ACCESS TIME | 3 MINUTES AND 10 SECONDS |
| | ⋮ | ⋮ |

FIG. 7

USER INFORMATION REGISTRATION TABLE

| LOGIN NAME | NAME | UPPER LIMIT OF ACCESS PERMISSION LEVEL | AGE | KEYWORD | RELATIONSHIP | SEX | HOBBY |
|---|---|---|---|---|---|---|---|
| ARAI | MR. ARAI | 0 | 38 | ? | SERVICE SUPERIOR | | ? |
| ISHII | — | 3 | 26 | IN CHARGE OF CAD | COLLEAGUE | | TRAVEL |
| UKOI | TOMO | 5 | 24 | ...... | FRIEND | | |
| SAKURA | — | 5 | 25 | MEMBER OF AI STUDY MEETING | FRIEND | | TRAVEL |

F I G. 8

ACCESS PERMISSION LEVEL DECISION RULES

```
if (USER NAME = REGISTERED) →

(if (UPPER LIMIT OF ACCESS      →   LEVEL = UPPER LIMIT OF
       PERMISSION LEVEL < 3)         ACCESS PERMISSION LEVEL else if (NO. OF ACCESS = 0)     →   LEVEL = 3 else                            →   LEVEL = UPPER LIMIT OF
                                    ACCESS PERMISSION LEVEL
            ⋮

)

else if (USER NAME = UNREGISTERED) →

(if (NO. OF ACCESSES = 0)       →

(if (ENTERPRISE TO WHICH USER BELONGS = NONE)  → LEVEL = 2 else if (ENTERPRISE TO WHICH USER BELONGS      → LEVEL = 3
         = COMPANY A)

else if (ENTERPRISE TO WHICH USER BELONGS      → LEVEL = 1
         = COMPANIES {B,C,D,E})

else                                           → LEVEL = 2

) → else if (
            ⋮

)

)
```

F I G. 9

DISCLOSURE PERMISSION RANGE TABLE

| TYPE OF INFORMATION | LEVEL | DISCLOSURE RANGE |
|---|---|---|
| A. SCHEDULE | 1 | ACCESS PERMISSION > 2, RELATIONSHIP LEVEL = 'SERVICE SUPERIOR |
|  | 2 | ACCESS PERMISSION > 3 LEVEL |
|  | 3 | RELATIONSHIP = FRIEND |
| B. DRAFT FOR INSTITUTE | 1 |  |
|  | 2 |  |
|  | 3 |  |
| C. REPORT | 1 |  |
|  | 2 |  |
|  | 3 |  |
| D. TRAVEL INFORMATION | 1 |  |
|  | 2 |  |
|  | 3 |  |

FIG. 10

RESPONSE FORM DECISION

◎···RECOMMENDED, ○···APPROPRIATE, △···FAIR, ×···INAPPROPRIATE

| RESPONSE FORM / RESPONSE FORM LIMITING RULE | TEXT | | ACOUSTIC | | CHART | IMAGE | MOVING PICTURE | ... |
|---|---|---|---|---|---|---|---|---|
| | JAPANESE | ENGLISH | SPEECH | MUSIC | | | | |
| ① PRIORITY OF INFORMATION PROVIDER | ◎ | × | ○ | △ | ○ | △ | ○ | |
| ② APPROPRIATENESS OF USER ENVIRONMENT | ○ | ○ | △ | △ | ○ | ○ | × | |
| ③ APPROPRIATENESS OF STATUS | ◎ | ◎ | × | × | ◎ | ○ | △ | |
| ④ USER'S FAVOR | ◎ | × | ○ | △ | ○ | △ | ○ | |
| | | | | | | | | |
| RESPONSE FORM TO BE USED | ◎ | — | — | — | ○ | ○ | — | |

F I G. 11

| RESPONSE PLAN | AGENT STATE | | |
|---|---|---|---|
| A0 GREETING | PERSONAL REFERENCE CHECK (C403) | | |
| A1 SELF-INTRODUCTION | DEMAND UNDERSTANDING (C404) | | |
| A2 CALL FOR ORDERS | DEMAND UNDERSTANDING (C404) | | |
| A3 QUESTION | DEMAND UNDERSTANDING (C404), | PERSONAL REFERENCE CHECK (C403), | EVALUATION CHECK (C406) |
| A4 CHECK | DEMAND UNDERSTANDING (C404), | PERSONAL REFERENCE CHECK (C403), | EVALUATION CHECK (C406) |
| A5 EXPLANATION | PERSONAL REFERENCE CHECK (C403), | DEMAND ACHIEVEMENT (C405), | DISABLED (C407) |
| A6 PROPOSAL | | DEMAND ACHIEVEMENT (C405), | PREPARATION FOR END (C408) |
| A7 OFFER | DEMAND UNDERSTANDING (C404), | DEMAND ACHIEVEMENT (C405), | PREPARATION FOR END (C408) |
| A8 APPROVAL | | DEMAND ACHIEVEMENT (C405) | |
| A9 REJECTION | | | DISABLED (C407) |
| A10 REPORT | | DEMAND ACHIEVEMENT (C405) | |
| A11 APOLOGY | | | DISABLED (C407) |
| A12 AFFIRMATION | | DEMAND ACHIEVEMENT (C405) | |
| A13 NEGATION | | DEMAND ACHIEVEMENT (C405) | |
| A14 TRANSMISSION | MESSAGE EXHIBITION (C409) | | |
| A15 DEMAND | PERSONAL REFERENCE CHECK (C403), | DEMAND UNDERSTANDING (C404) | |
| A16 PRELIMINARY ANNOUNCEMENT FOR END | PREPARATION FOR END (C408) | | |
| A17 CONCEALMENT OF PRESENCE | | | |

FIG. 12

[ ] ··· RESPONSE PLAN

[ ] ··· OPERATION PLAN

RESPONSE FORMATION RULES

```
(STATE OF AGENT = PERSONAL REFERENCE CHECK STATE) →

((USER STATE = INITIAL STATE) →

((PRESENCE OF MESSAGE) → [GREETING] [TRANSMISSION]

(ABSENCE OF MESSAGE) →

((ACCESS PERMISSION LEVEL ≥ 2) →

((NO. OF ACCESSES = 0) → [GREETING]
                                   [SELF-INTRODUCTION]

(NO. OF ACCESSES > 0) → [GREETING]

(ACCESS PERMISSION LEVEL = 1) → [EXPLANATION]
                                      [PRELIMINARY
                                       ANNOUNCEMENT
                                       FOR END]
                                      [END]

(ACCESS PERMISSION LEVEL = 0) → [CONCEALMENT OF
                                       PRESENCE]
                                      [END]
              )

(STATE OF AGENT = DEMAND UNDERSTANDING) →

(USER STATE = DEMAND TRANSMISSION) →
              )
              )
```

F I G. 13

[GREETING]

MODALITY : TEXT

TYPE 0 : SENTENCE (NAME, GREETING WORDS)

TYPE 1 : SENTENCE (GREETING WORDS)

TYPE 2 : SENTENCE (COMPLIMENTS OF SEASON)

MODALITY : IMAGE

TYPE 0 : DRAWING (TYPE="JIM", EXPRESSION="SMILE")

TYPE 1 : DRAWING (TYPE="SELF-PORTRAIT", DEGREE OF BUSYNESS)

TYPE 2 : DRAWING (TYPE="SCENE", SEASON)

MODALITY : MUSIC

TYPE 0 : PERFORMANCE (TYPE="THEME", AGENT NAME)

TYPE 1 : PERFORMANCE (TYPE="WORK", DEGREE OF BUSYNESS)

TYPE 2 : PERFORMANCE (TYPE="ENVIRONMENT", SEASON)

FIG. 14

| TERM | CLASSES | USE CONDITION |
|---|---|---|
| GOOD MORNING | GREETING WORDS | (TIME < 12:00) & (RELATIONSHIP=FRIEND) |
| GOOD MORNING, SIR (MA AM). | GREETING WORDS | TIME < 12:00 |
| HELLO ! | GREETING WORDS | RELATIONSHIP ≠ SERVICE SUPERIOR |
| HOW DO YOU DO ? | GREETING WORDS | NO. OF ACCESSES < 1 |
| HOW HAVE YOU BEEN ? | GREETING WORDS | (NO. OF ACCESSES ≥ 1) & (LATEST ACCESS YEAR < 94) |
| THANK YOU FOR YOUR COOPERATION | GREETING WORDS | RELATIONSHIP = CUSTOMER |
| ⋮ | ⋮ | ⋮ |
| IT'S HOT EVERY DAY. | COMPLIMENTS OF SEASON | (DATA→AUGUST) & (RELATIONSHIP ≠ CUSTOMER) |
| ⋮ | ⋮ | ⋮ |

FIG. 15

EXAMPLES OF USER DEMANDS

| | | | |
|---|---|---|---|
| SCHEDULE | LOOK-UP , CHANGE | , ADDITION, DELETION | ⎫ |
| IMAGE | LOOK-UP , | ADDITION, DELETION | |
| ADDRESS BOOK | LOOK-UP , CHANGE | , ADDITION, DELETION | MAIN PURPOSES |
| REFERENCE | LOOK-UP , | ADDITION, DELETION | |
| BUSINESS OPERATION KNOWLEDGE | LOOK-UP , CHANGE | , ADDITION, DELETION | |
| MESSAGE | CHANGE | , ADDITION, DELETION | ⎭ |
| | ANSWER , EXPLANATION , WAITING , EXEMPLIFICATION | | AUXILIARY PURPOSES |

F I G. 16

EXAMPLE OF USER UTTERANCE INTENTION

| 10 | GREETING |
| 11 | DESIRE |
| 12 | REQUEST |
| 13 | PROPOSAL |
| 14 | CHECK |
| 15 | APPROVAL |
| 16 | REJECTION |
| 17 | AFFIRMATION |
| 18 | NEGATION |
| 19 | PRELIMINARY ANNOUNCEMENT FOR END |

FIG. 18

DEMAND TABLE 1

| DEMAND ITEM | | CHANGE IN SCHEDULE |
|---|---|---|
| TARGET NAME | | CONFERENCE |
| BEFORE CHANGE | DATE | MARCH 10 |

FIG. 19

DEMAND TABLE 1

| DEMAND ITEM | | CHANGE IN SCHEDULE |
|---|---|---|
| TARGET NAME | | CONFERENCE SCHEDULE |
| BEFORE CHANGE | DATE | MARCH 10 (WEDNESDAY) |
| | START TIME | 13:30 |
| | END TIME | 15:00 |
| CHANGE PLAN | DATE | MARCH 11 (THURSDAY) |
| CHANGE PLAN | DATE | MARCH 12 (FRIDAY) |

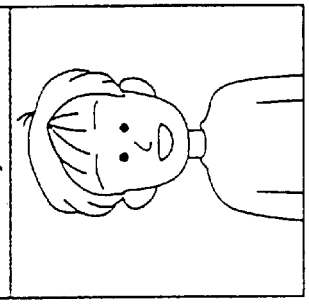

```
% pip Jim yasuda
J: HELLO! MS.SAKURA.
J: WHAT CAN I DO FOR YOU?
S: I WOULD LIKE TO CHANGE THE
   SCHEDULE OF THE CONFERENCE
   ON MARCH 10?
J: DO YOU WANT TO CHANGE THE
   SCHEDULE OF THE AI STUDY
   MEETING ON MARCH 10
   (WEDNESDAY) FROM 13:00 TO
   15:00?
S: YES, I DO. I WOULD LIKE TO
   CHANGE IT TO THURSDAY OR
   FRIDAY.
J: THE SCHEDULE OF YASUDA ON
   MARCH 11 (THURSDAY) AND
   MARCH 12 (FRIDAY) IS
   DISPLAYED. PLEASE SPECIFY
   THE CHANGE IN SCHEDULE OF
   THE CONFERENCE IN THE
   YASUDA'S SCHEDULE.
S: ■
```

FIG. 22

SAKURA
THURSDAY: 15-17 (PRELIMINARY ARRANGEMENT)
FRIDAY: 15-17 (PRELIMINARY ARRANGEMENT)

Jim-Schedule

| | 8 | 10 | 12 13 | 15 | 17 | 19 |
|---|---|---|---|---|---|---|
| 3/11 (THU) | | | CONFERENCE | | | |
| 3/12 (FRI) | | | CONFERENCE | | OUT: WILL NOT RETURN TO OFFICE | |

J: DO YOU WANT TO CHANGE THE SCHEDULE OF THE AI STUDY MEETING ON MARCH 10 (WEDNESDAY) FROM 13:00 TO 15:00 ? --- S4
S: YES, I DO. I WOULD LIKE TO CHANGE IT TO THURSDAY OR FRIDAY. --- J4
J: THE SCHEDULE OF YASUDA ON MARCH 11 (THURSDAY) AND MARCH 12 (FRIDAY) IS DISPLAYED. PLEASE SPECIFY THE CHANGE IN SCHEDULE OF THE CONFERENCE IN THE YASUDA'S SCHEDULE.
S: JUST A MOMENT.
J: YES.
S: HOW ABOUT THURSDAY MORNING ?  } S5

DEMAND TABLE 1

| DEMAND ITEM | | CHANGE IN SCHEDULE |
|---|---|---|
| TARGET NAME | | CONFERENCE SCHEDULE |
| BEFORE CHANGE | DATE | MARCH 10 (WEDNESDAY) |
| | START TIME | 13:30 |
| | END TIME | 15:00 |
| CHANGE PLAN | DATE | MARCH 11 (THURSDAY) |
| | TIME | IN THE MORNING |

F I G. 23

DEMAND TABLE 1

| DEMAND ITEM | | CHANGE IN SCHEDULE |
|---|---|---|
| TARGET NAME | | CONFERENCE SCHEDULE |
| BEFORE CHANGE | DATE | MARCH 10 (WEDNESDAY) |
| | START TIME | 13:30 |
| | END TIME | 15:00 |
| CHANGE PLAN | DATE | MARCH 11 (THURSDAY) |
| | START TIME | 10:30 |
| | END TIME | 12 NOON |

S: HOW ABOUT THURSDAY MORNING ?    } J5
J: YES. IS IT OK FOR YOU TO HAVE THE MEETING AFTER TEN THIRTY?    -- S6
S: SURE.
J: SORRY FOR SPECIFYING THE MEETING SCHEDULE TO MY FAVORITE TIME.    } J6
S: WE'RE GOING TO HAVE THE MEETING FROM 10:30 TO 12 NOON.    } S7

Jim-yasuda

SAKURA
THURSDAY : 15 – 17
(PRELIMINARY ARRANGEMENT)
FRIDAY : 15 – 17
(PRELIMINARY ARRANGEMENT)

Jim-Schedule

| | 8 | 10 | 1213 | 15 | 17 | 19 |
|---|---|---|---|---|---|---|
| 3/11 (THU) | | | CONFER-ENCE | | CONFER-ENCE | |
| 3/12 (FRI) | | | | | OUT : WILL NOT RETURN TO OFFICE | |

| | J7 |
| | J8 |
| | S8 |
| | J9 |
| | J10 |

```
S: HOW ABOUT THURSDAY MORNING?
J: YES. IS IT OK FOR YOU TO HAVE
   THE MEETING AFTER TEN THIRTY?
S: SURE.
J: SORRY FOR SPECIFYING THE MEETING
   TO MY FAVORITE TIME.
S: WE'RE GOING TO HAVE THE MEETING
   FROM 10:30 TO 12 NOON.
J: I SCHEDULE THE AI STUDY MEETING
   ON MARCH 11 (THURSDAY) FROM
   10:30 TO 12:00.
J: I UPDATED THE SCHEDULE TABLE.
S: SO DID I. SEE YOU LATER.
J: I'M GOING TO LEAVE A MESSAGE
   TO HER.
J: GOOD-BYE.
```

Jim-yasuda

SAKURA
THURSDAY: 10:30 - 12
(AI STUDY MEETING)
15 - 17 (MEETING)
FRIDAY: 15 - 17 (MEETING)

Jim-Schedule

| | 8 | 10 | 1213 | 15 | 17 | 19 |
|---|---|---|---|---|---|---|
| 3/11 (THU) | | AI STUDY MEETING | CONFERENCE | | | |
| 3/12 (FRI) | | | CONFERENCE | | OUT: WILL NOT RETURN TO OFFICE | |

F I G. 26

{ J1

% pip Jim yasuda
J:HOW DO YOU DO ? MS.SAKURA.
J:I'M JIM IN CHARGE OF BUSINESS OPERATION PROCESSING OF YASUDA.
J:I MANAGE YASUDA'S SCHEDULE, ADDRESS BOOK, AND DOCUMENTS ABOUT THE BUSINESS OPERATION PROCEEDINGS.

{ J2

J:WHAT CAN I DO FOR YOU ?
S:I WOULD LIKE TO CHANGE THE SCHEDULE OF THE CONFERENCE ON MARCH 10.
J:A PLURALITY OF CONFERENCES ARE SCHEDULED ON MARCH 10. MAY I HAVE MORE DETAILED INFORMATION ?
S:I MEANT THE CONFERENCE FROM 1:30.

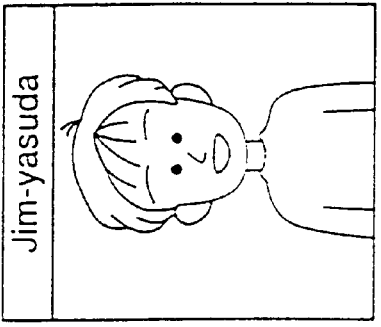
Jim-yasuda

FIG. 27

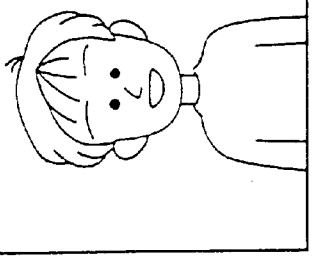

S: I MEANT THE CONFERENCE FROM 1:30.
J: YOU WANT TO CHANGE THE SCHEDULE OF THE AI STUDY MEETING ON MARCH 10 (WEDNESDAY) FROM 13:30 TO 15:00, DON'T YOU?
S: YES, I DO. I WOULD LIKE TO CHANGE IT TO THURSDAY OR FRIDAY.
J: HOW ABOUT MARCH 11 (THURSDAY) FROM 15:30 TO 17:00?
S: I'M NOT FREE FROM 15:00. HOW ABOUT THURSDAY MORNING?
J: YES. SHE'S FREE THURSDAY MORNING.
S: HOW ABOUT THURSDAY MORNING FROM 9:00 TO 10:30?
J: I SCHEDULE THE AI STUDY MEETING ON MARCH 11 (THURSDAY) FROM 9:30 TO 10:30. I'M GOING TO CONFIRM HER APPROVAL AND CONTACT YOU.

Jim-yasuda

SAKURA
THURSDAY: 15-17 (PRELIMINARY ARRANGEMENT)
FRIDAY: 15-17 (PRELIMINARY ARRANGEMENT)

% pip Jim yasuda
J: HELLO! MS. SUKURA.
J: WHAT CAN I DO FOR YOU?
S: MISS YASUDA WENT TO THE ASAHI HALL THE OTHER DAY, DIDN'T SHE?
J: SHALL I RETRIEVE THE SCHEDULE?
S: NO. I WANT THE MAP FOR THE WAY TO GET THE ASAHI HALL.
J: DO YOU KNOW THE NEAREST STATION TO THE ASAHI HALL?
S: IS IT KAYAMACHO STATION, SUBWAY LINE?
J: I HAVE A MAP AROUND THE KAYAMACHO STATION OF THE IKEDA LINE. CAN YOU SEE THE ASAHI HALL IN THAT MAP?
S: I FOUND IT. THANK YOU.

Jim-yasuda

TAKEDA HALL
ASAHI HALL
A1
A2
KAYAMACHO STATION
A3

WINDOW OF INFORMATION PROVIDER

J: I'M SORRY TO INTERRUPT YOUR WORK. MS. SAKURA WANTS THE MAP FOR THE WAY TO THE ASAHI HALL UNTIL 3 O'CLOCK. MAY I DIRECTLY CONNECT THE LINE TO MR. SAKURA ?
Y: YES.
J: COMMUNICATION WILL BE STARTED.
Y: SORRY FOR WAITING. I'M YASUDA. YOU NEED THE MAP FOR THE WAY TO THE ASAHI HALL, DON'T YOU?
S: OH! YES. I HAVE TO GO THERE SUDDENLY.
Y: IS THAT SO ?
Y: JIM. PLEASE DISPLAY THE MAP OF KAYAMACHO STATION.
J: IT IS THE MAP OF KAYAMACHO STATION OF THE IKEDA LINE, ISN'T IT ?

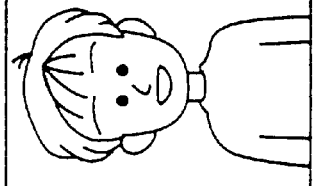

Jim-yasuda

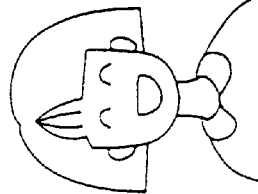

sakura

FIG. 32

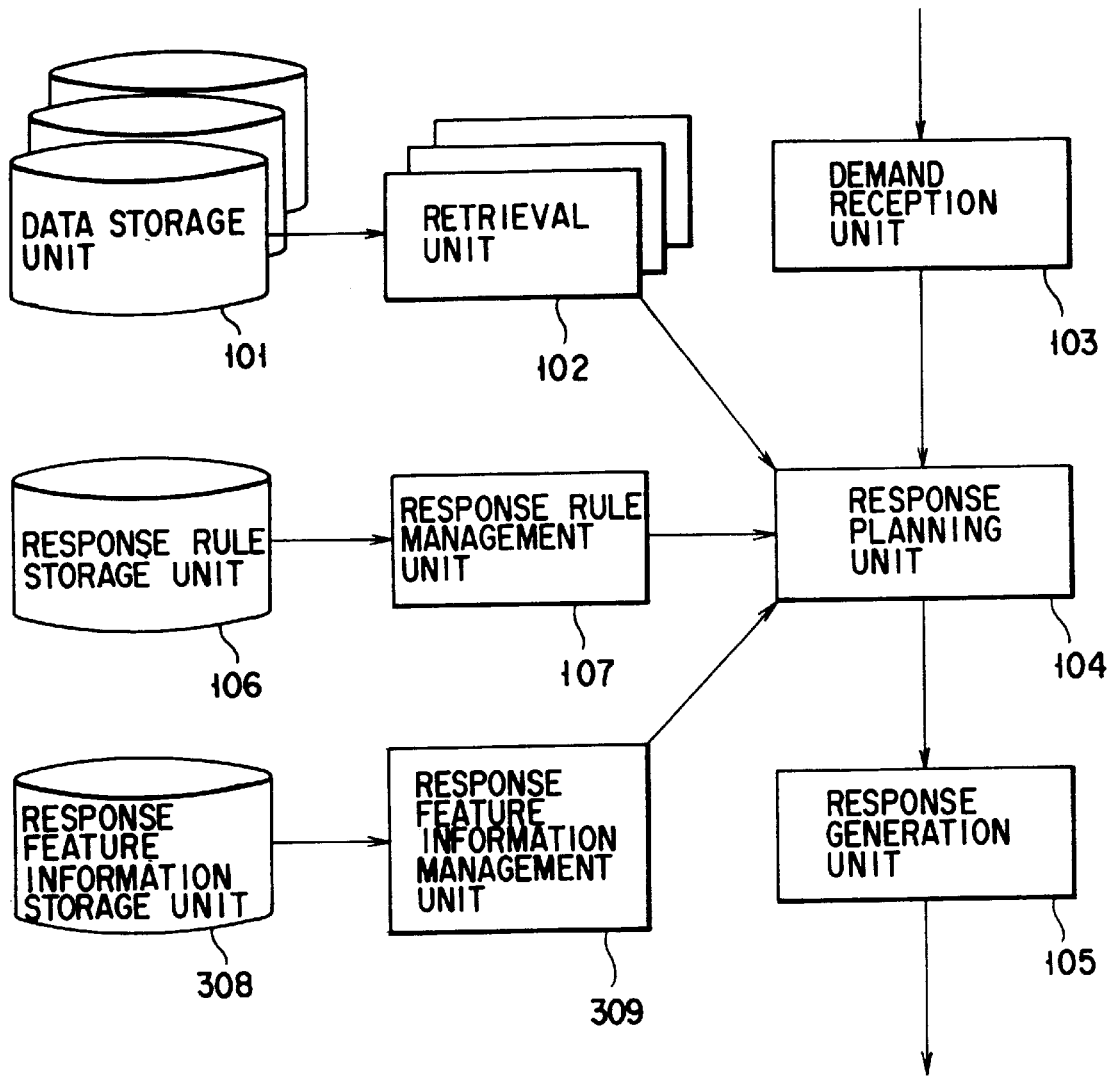
F I G. 33

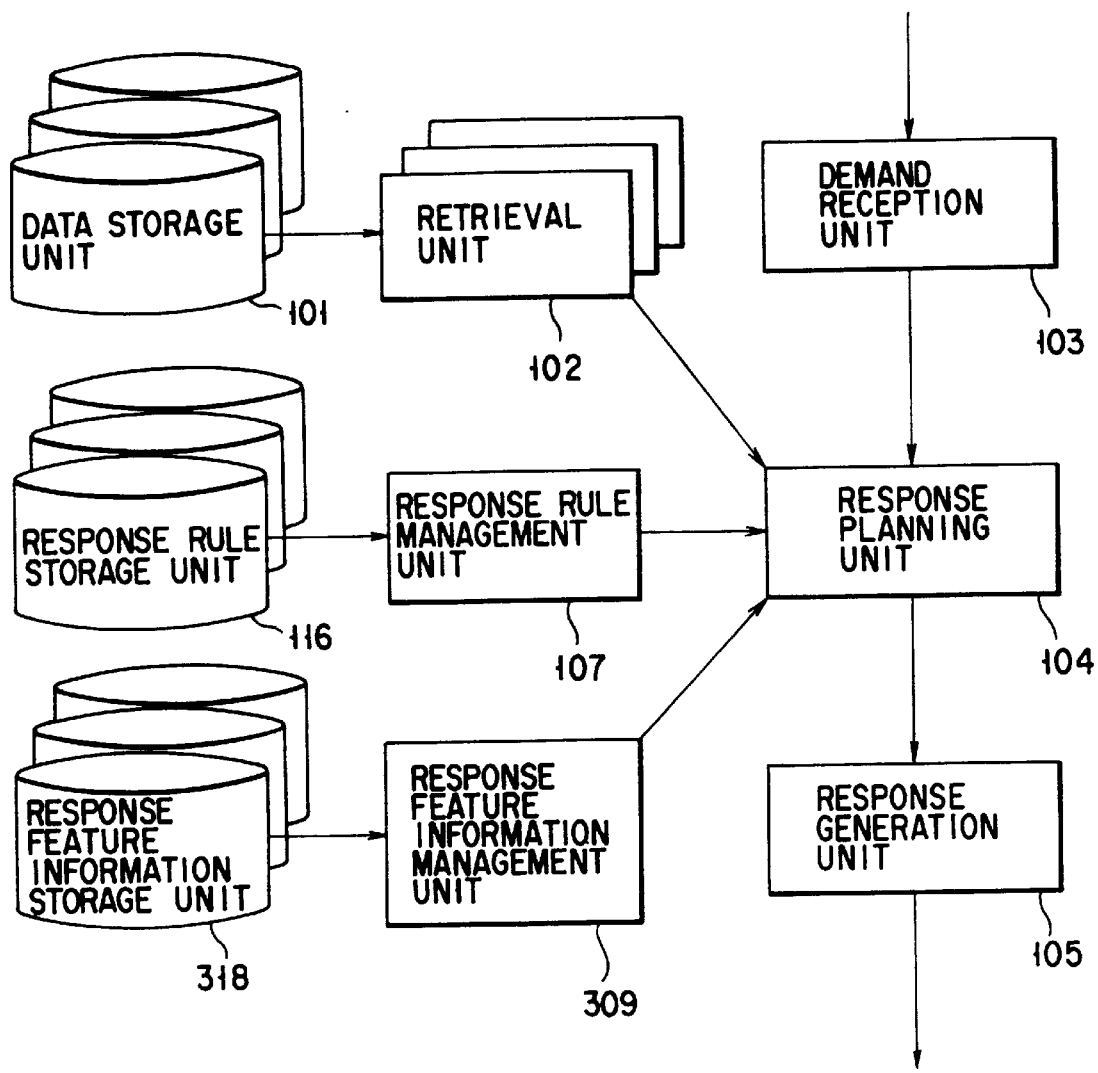
F I G. 37

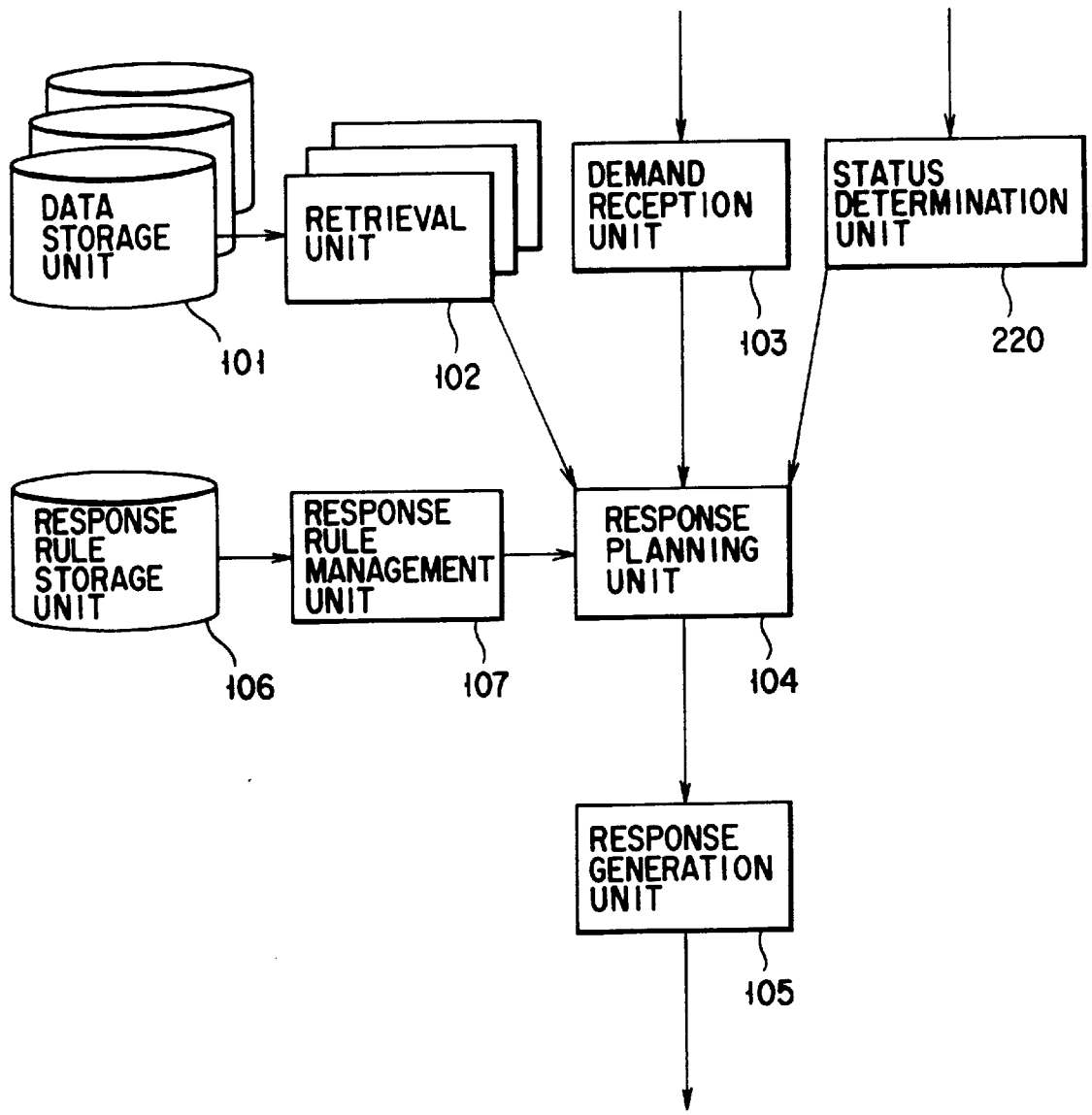
F I G. 38

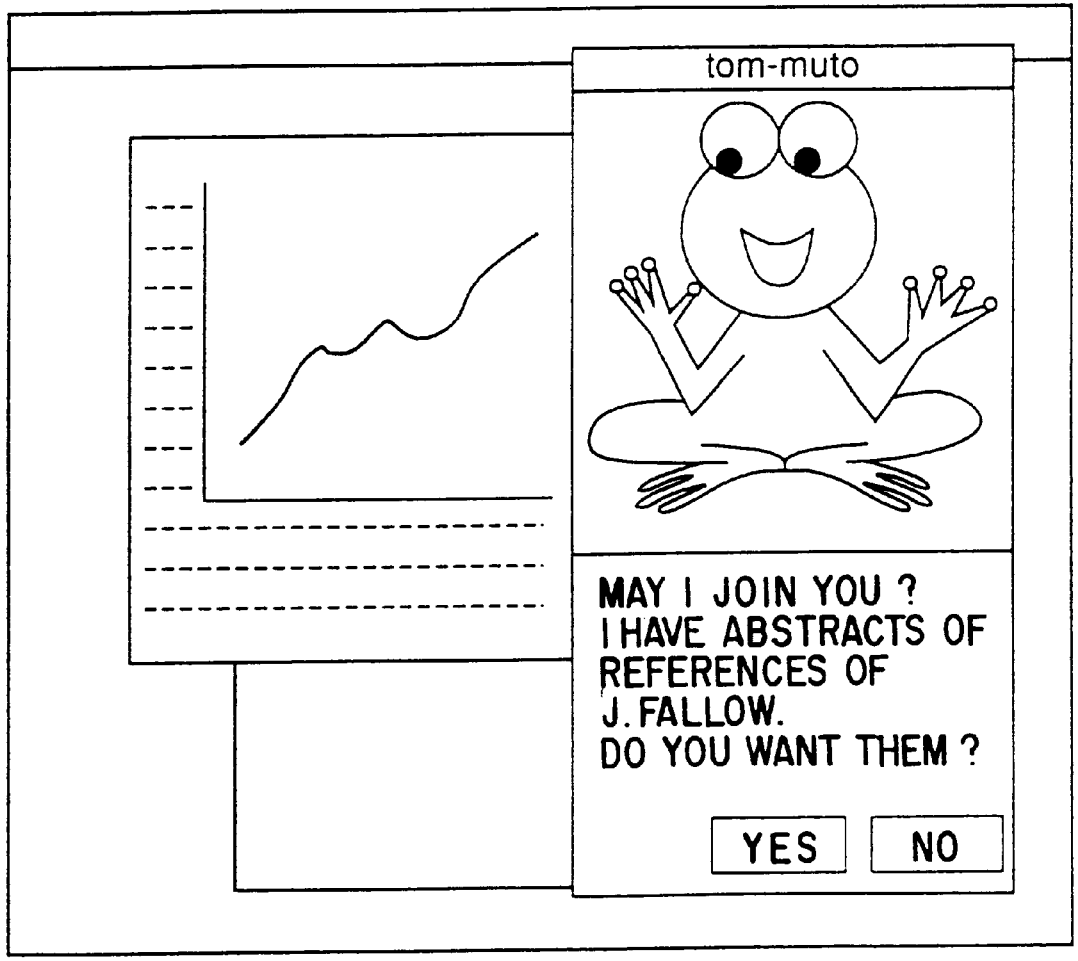
F I G. 39

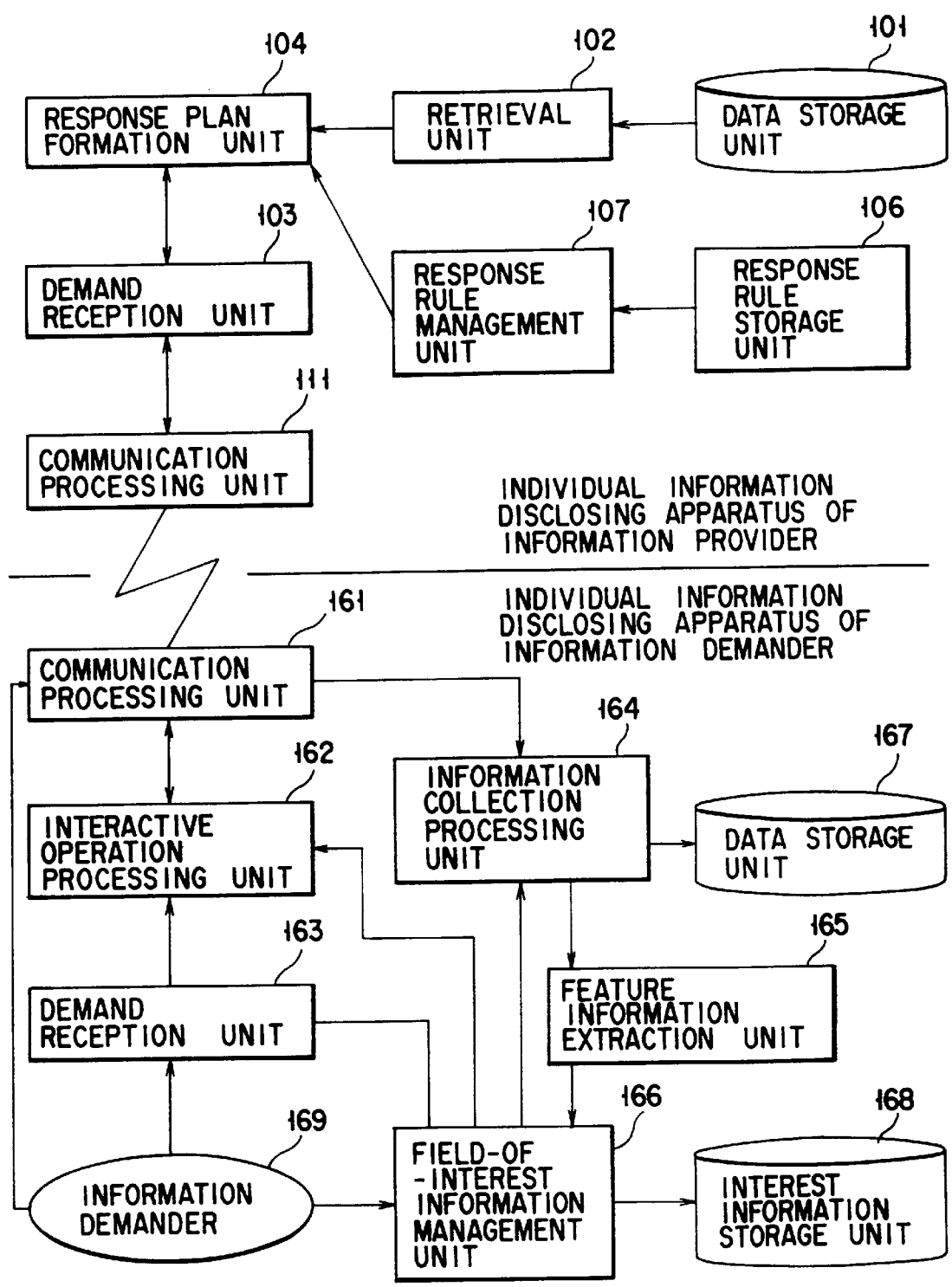
F I G. 41

```
┌─ INTEREST INFORMATION (NO CLASSIFICATION) ──────────┐
│                                                      │
│  EXPRESSION   FACE   FEELINGS   CG   ANIMATION  ···  │
│                                                      │
└──────────────────────────────────────────────────────┘
```

F I G. 42A

```
┌─ INTEREST INFORMATION (WITH CATEGORICAL CLASSIFICATION) ─┐
│  ┌─ INTERFACE ──────────────────────────────────────┐    │
│  │                                                   │    │
│  │  EXPRESSION   FACE   FEELINGS   CG   ANIMATION ···│    │
│  │                                                   │    │
│  └───────────────────────────────────────────────────┘    │
│  ┌─ AGENT ──────────────────────────────────────────┐    │
│  │                                                   │    │
│  │  WISDOM   KNOWLEDGE   KNOWLEDGE      INTELLIGENT ···│   │
│  │                       PROCESSING                  │    │
│  └───────────────────────────────────────────────────┘    │
│   ···                                                     │
└───────────────────────────────────────────────────────────┘
```

F I G. 42B

```
┌─ INTEREST INFORMATION (CLASSIFICATION WITH TIME) ────────┐
│  ┌─ 1994. 12 ───────────────────────────────────────┐   │
│  │                                                   │   │
│  │  AI   ARTIFICIAL      KNOWLEDGE    REASONING  AGENT ···│
│  │       INTELLIGENCE    PROCESSING                  │   │
│  └───────────────────────────────────────────────────┘   │
│  ┌─ 1994. 11 ───────────────────────────────────────┐   │
│  │                                         BOOKS    │   │
│  │  DOCUMENT  SCHEDULE  MANAGEMENT         AND    OA ···│
│  │                                         SLIPS    │   │
│  └───────────────────────────────────────────────────┘   │
└───────────────────────────────────────────────────────────┘
```

F I G. 42C

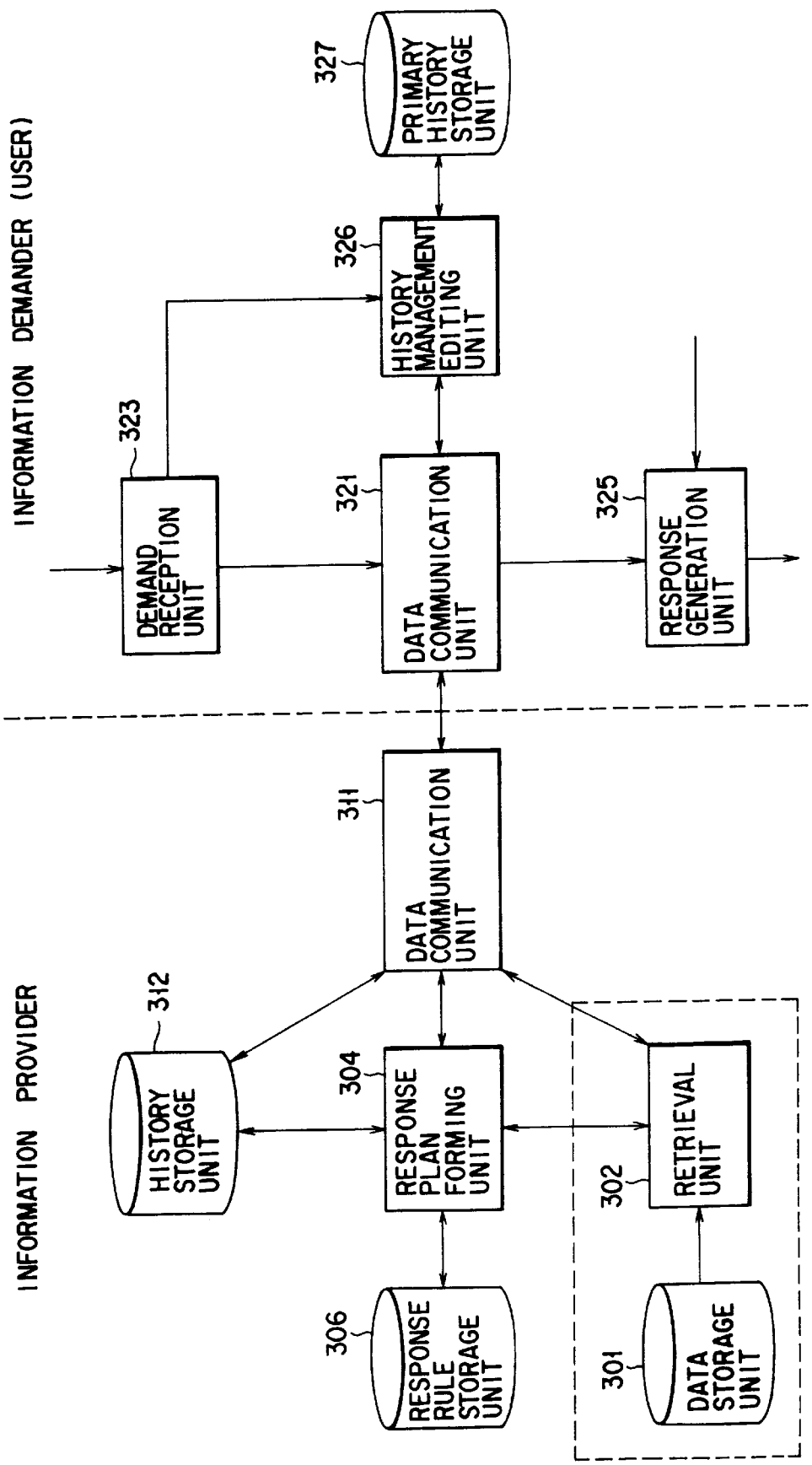
F I G. 43

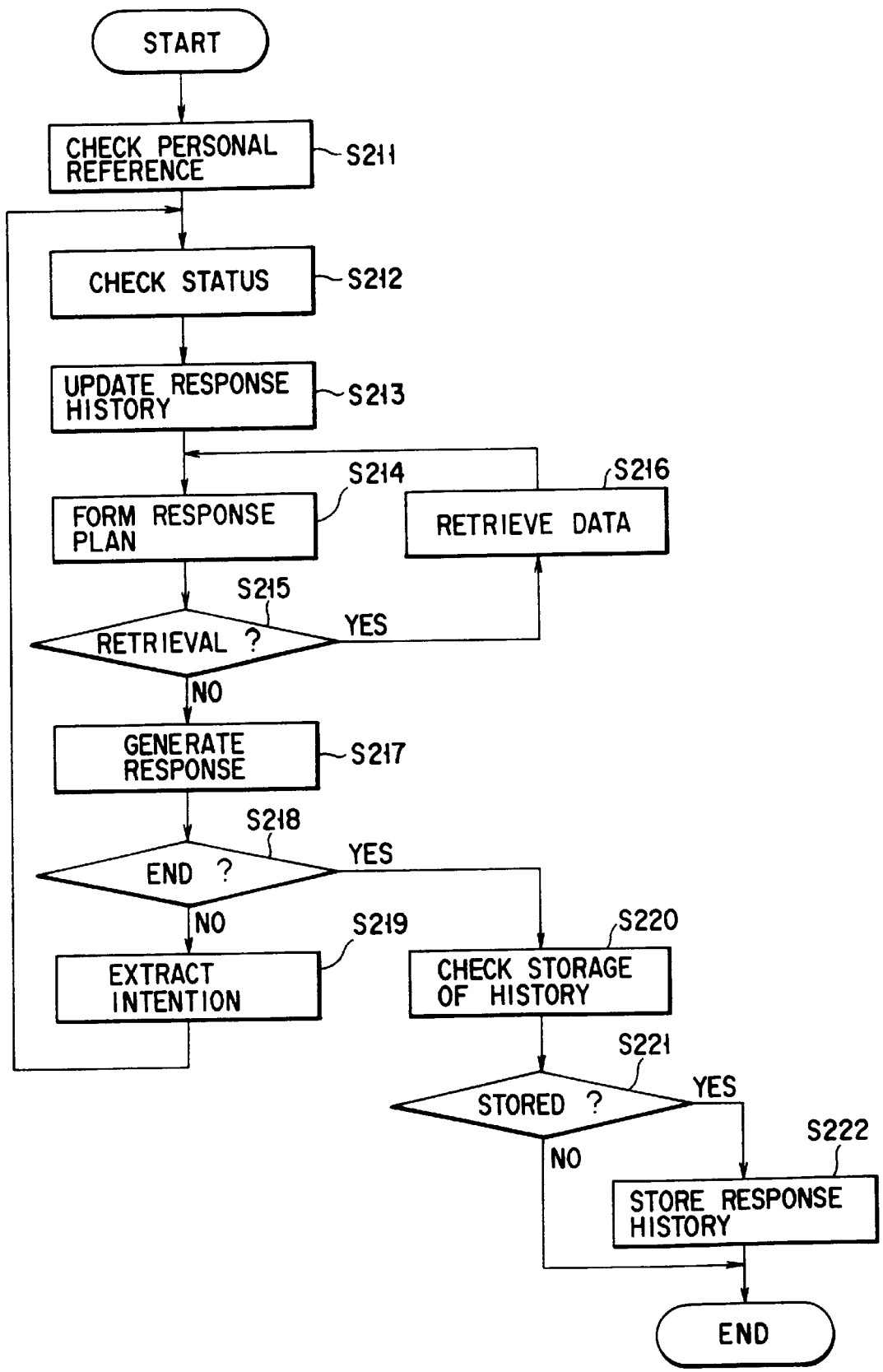
F I G. 44

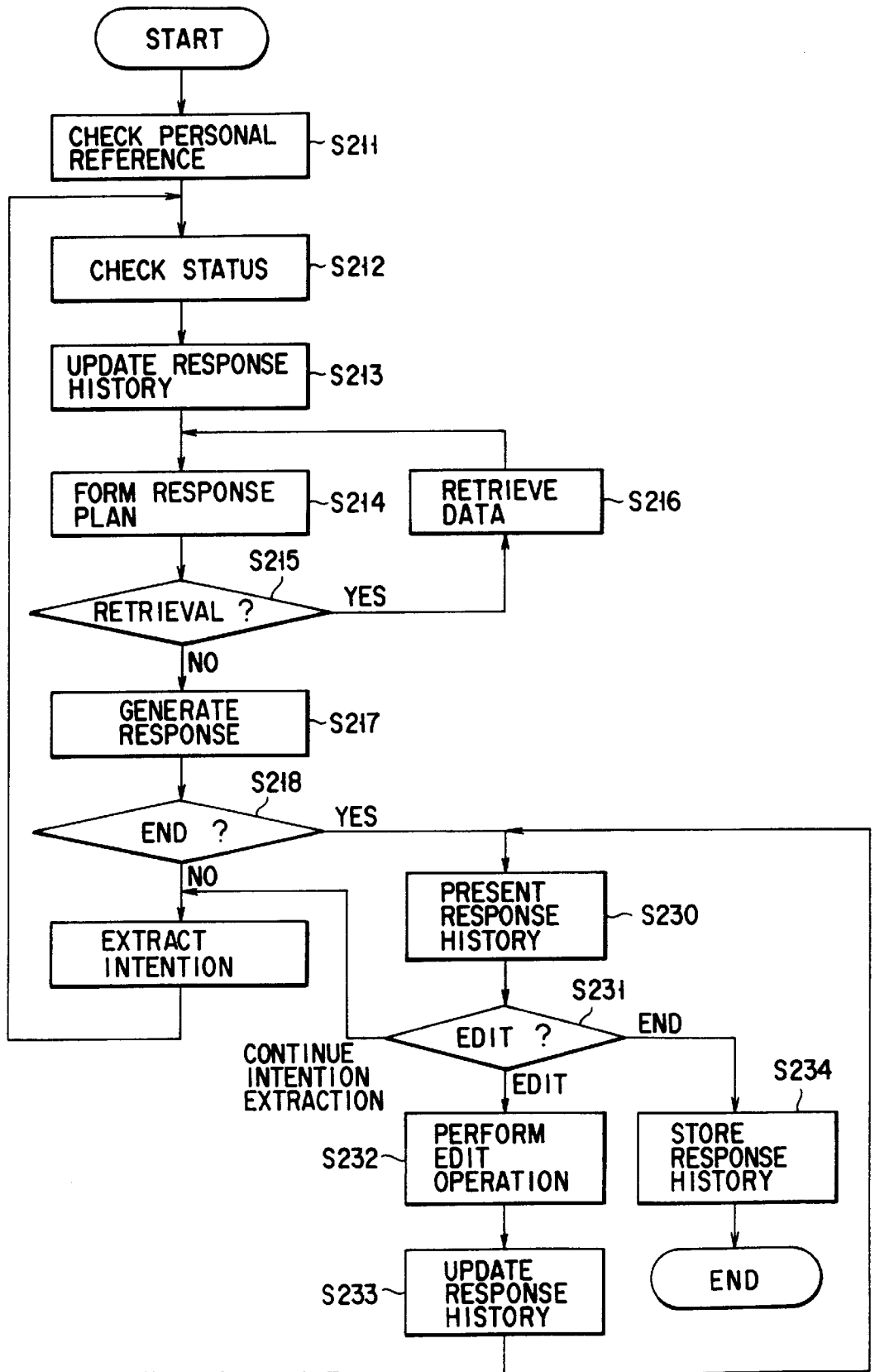
F I G. 45

FIG. 46
S5
ume ⟷ fumi ohno
>pip fumi ohno
F: HELLO! MISS UME. WHAT CAN I DO FOR YOU?
U: I THINK OHNO'S REPORT IS NOT SUBMITTED YET. PLEASE TELL ME WHERE IT IS. I'M IN A HURRY.
F: WHAT REPORT?
U: REPORT ON THE BUSINESS TRIP TO OSAKA LAST WEEK.
F: YOU MEAN THE BUSINESS TRIP TO THE HAA STANDARDIZATION COMMITTEE ON OCTOBER 24 TO 26. JUST A MOMENT.
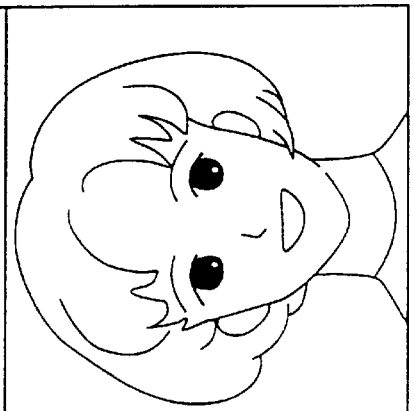
fumi ohno
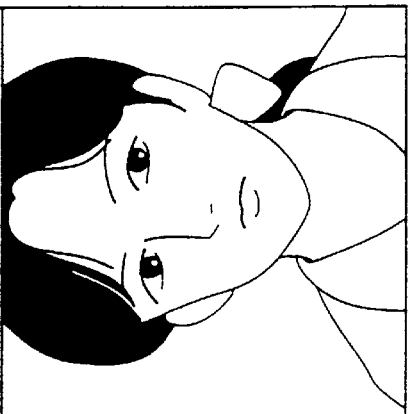
ume

EXAMPLE OF USER UTTERANCE INTENTION

| 10 | GREETING |
| 11 | DESIRE |
| 12 | REQUEST |
| 13 | PROPOSAL |
| 14 | CHECK |
| 15 | APPROVAL |
| 16 | REJECTION |
| 17 | AFFIRMATION |
| 18 | NEGATION |
| 19 | PRELIMINARY ANNOUNCEMENT FOR END |

F I G. 49

DEMAND TABLE (LEVEL 1)

| LEVEL | 1 |
| DEMAND | DOCUMENT AND LOOK-UP |
| TYPE OF DOCUMENT | REPORT |
| WRITER | OHNO |
| SUBJECT | — |
| DATE OF WRITING / DATE OF ACCESS | — |
| SENDING DESTINATION / SOURCE | — |

F I G. 51

USER DEMAND

| DEMAND TARGET | CONTENTS OF DEMAND | | | |
|---|---|---|---|---|
| SCHEDULE | LOOK-UP | CHANGE | ADDITION | DELETION |
| DOCUMENT | LOOK-UP | CHANGE | ADDITION | DELETION |
| INFORMATION | LOOK-UP | CHANGE | ADDITION | DELETION |
| MESSAGE | LOOK-UP | CHANGE | RECORD | DELETION |
| HISTORY | LOOK-UP | CHANGE | RECORD | DELETION |
| | ANSWER EXPLANATION WAITING EXEMPLIFICATION | | | |

DEMAND TABLE (LEVEL 2)

| LEVEL | 2 |
|---|---|
| DEMAND | ACQUISITION OF RETRIEVAL CONDITION |
| TYPE OF DOCUMENT | REPORT |
| WRITER | OHNO |
| SUBJECT | ? |
| DATE OF WRITING / DATE OF ACCESS | — |
| SENDING DESTINATION / SOURCE | — |

FIG. 54

DEMAND TABLE (LEVEL 2)

| LEVEL | 2 |
|---|---|
| DEMAND | ACQUISITION OF RETRIEVAL CONDITION |
| TYPE OF DOCUMENT | REPORT ON BUSINESS TRIP |
| WRITER | OHNO |
| SUBJECT | ? |
| DATE OF WRITING / DATE OF ACCESS | — |
| SENDING DESTINATION / SOURCE | — |

FIG. 55

DEMAND TABLE (LEVEL 3)

| LEVEL | 3 |
|---|---|
| DEMAND | LOOK-UP OF SCHEDULE |
| TYPE | BUSINESS TRIP |
| DOER | OHNO |
| SUBJECT | ? |
| DATE | LAST WEEK |
| PLACE | OSAKA |

FIG. 56

DEMAND TABLE (LEVEL 2)

| | |
|---|---|
| LEVEL | 2 |
| DEMAND | ACQUISITION OF RETRIEVAL CONDITION |
| TYPE OF DOCUMENT | REPORT ON BUSINESS TRIP |
| WRITER | OHNO |
| SUBJECT | HAA STANDARDIZATION COMMITTEE |
| DATE OF WRITING/ DATE OF ACCESS | — |
| SENDING DESTINATION / SOURCE | — |

FIG. 57

DEMAND TABLE (LEVEL 3)

| | |
|---|---|
| LEVEL | 3 |
| DEMAND | LOOK-UP OF SCHEDULE |
| TYPE | BUSINESS TRIP |
| DOER | OHNO |
| SUBJECT | HAA STANDARDIZATION COMMITTEE |
| DATE | OCTOBER 24 TO 26 |
| PLACE | OSAKA |

FIG. 58

DEMAND TABLE (LEVEL 1)

| | |
|---|---|
| LEVEL | 1 |
| DEMAND | LOOK-UP OF DOCUMENT |
| TYPE OF DOCUMENT | REPORT ON BUSINESS TRIP |
| WRITER | OHNO |
| SUBJECT | HAA STANDARDIZATION COMMITTEE |
| DATE OF WRITING / DATE OF ACCESS | — |
| SENDING DESTINATION / SOURCE | — |

| ume | fumi ohno | haa-9410.txt

REPORT ON BUSINESS TRIP

REPORTER: TADASHI OHNO, THE SECTION OF DESIGN OF THE DEPARTMENT OF DEVELOPMENT
DESTINATION: HAA STANDARDIZATION COMMITTEE
PERIOD: OCTOBER 24 TO 26, 1994
PLACE: OSAKA INTERNATIONAL CONFERENCE HALL
PURPOSE: RESEARCH REPORT ABOUT HAA STANDARDIZATION

U: HERE WE ARE! I DIDN'T NOTICE IT.
  I'M SORRY. FORGET ABOUT IT.
F: IS THERE ANYTHING ELSE I CAN DO ?
U: NO. THANK YOU.
F: MAY I RECORD THESE RESPONSES WITH YOU ?
U: EH....H. KEEP IT SECRET, WILL YOU?
F: I ONLY RECORD THAT I SHOWED YOU haa_9410.txt.
  DO YOU HAVE ANY MESSAGE ?
U: ■ ume-mail
From ume 1994.10.22 meeting
From ume 1994.10.31 haa houkoku
From sakura 1994.10.31

REPORT ON BUSINESS TRIP
REPORTER:
PERSON WHO MADE BUSINESS TRIP:
PERIOD:
PLACE:
PURPOSE:
SUMMARY:

DEMAND SYNONYM TABLE

| DEMAND TARGET | CONTENTS OF DEMAND | VOCABULARY | |
|---|---|---|---|
| HISTORY | DELETION | KEEPING SECRET<br>SECRET | OFF THE RECORD |
| HISTORY | — | HISTORY<br>NOW | RESPONSE RECORD UTTERANCE<br>A LITTLE WHILE AGO |
| — | DELETION | CANCEL | ERASE |
| — | DELETION | CORRECT | REWRITE<br>CHANGE |

F I G. 62

DEMAND TABLE (LEVEL 1)

| LEVEL | 1 |
|---|---|
| DEMAND | RECORDING OF HISTORY |
| TYPE OF HISTORY | TEXT, IMAGE |
| USER PERMISSION | ? |

F I G. 63

DEMAND TABLE (LEVEL 2)

| LEVEL | 2 |
|---|---|
| DEMAND | RECORDING OF HISTORY |
| TYPE OF HISTORY | TEXT, IMAGE |
| USER PERMISSION | YES |

| | Ume | U | CONVERSATION | F | Fumi | REFERENCE |
|---|---|---|---|---|---|---|
| | | | Communication record | | | |
| | | | F: HELLO! MISS UME WHAT CAN I DO FOR YOU? | | | |
| | | | U: I THINK OHNO'S REPORT IS NOT SUBMITTED YET. PLEASE TELL ME WHERE IT IS — I'M IN A HURRY. | | | |
| | | | F: WHAT REPORT? | | | |
| | | | U: REPORT ABOUT THE BUSINESS TRIP TO OSAKA LAST WEEK | | | |
| | | | F: REPORT ABOUT THE BUSINESS TRIP TO OSAKA LAST WEEK | | | haa_94 10.txt |
| | | | F: IS THIS WHAT YOU WANT? | | | |
| | | | U: YES, IT IS. HAS IT BEEN MADE ALREADY? | | | |
| 1 | | | F: I'M SURE THIS REPORT WAS SENT TO MISS UME AND THE KASTERA MEMBERS ON OCTOBER 31. | | | |
| | | | U: OH! REALLY? JUST A MOMENT. | | | |
| | | | F: YES | | | |
| | | | U: HERE WE ARE! I DIDN'T NOTICE IT. TIME I'M SORRY. FORGET ABOUT IT | | | |
| | | | F: IS THERE ANYTHING ELSE I CAN DO? | | | |
| | | | U: NO, THANK YOU. | | | |
| | | | F: MAY I RECORD THESE RESPONSES WITH YOU? | | | |

*FIG. 72A*

Communication record

| Ume | CONVERSATION | Fumi | REFERENCE |
|---|---|---|---|
| | F: HELLO! MISS UME WHAT CAN I DO FOR YOU? | | |
| | U: I THINK OHNO'S REPORT IS NOT SUBMITTED YET. PLEASE TELL ME WHERE IT IS — I'M IN A HURRY. | | |
| | F: WHAT REPORT? | | |
| | U: REPORT ABOUT THE BUSINESS TRIP TO OSAKA LAST WEEK | | |
| | F: YOU MEAN THE BUSINESS TRIP ABOUT THE HAA STANDARDIZATION COMMITTEE ON OCTOBER 24 TO 26, DON'T YOU? JUST A MOMENT. | | haa_94 10.txt |
| | F: IS THIS WHAT YOU WANT? | | |
| | U: YES, IT IS. HAS IT BEEN MADE ALREADY? | | |
| | F: I'M SURE THIS REPORT WAS SENT TO MISS UME AND THE KASTERA MEMBERS ON OCTOBER 31. | | |
| | U: OH! REALLY? JUST A MOMENT. | | |
| | F: YES | | |
| | U: HERE WE ARE! I DIDN'T NOTICE IT. I'M SORRY. FORGET ABOUT IT | | |
| | F: IS THERE ANYTHING ELSE I CAN DO? | | |
| | U: NO, THANK YOU. | | |
| | F: MAY I RECORD THESE RESPONSES WITH YOU? | | |

FIG. 73A

| Communication record | | | | | |
|---|---|---|---|---|---|
| | CONVERSATION | | EXPRESSION | | REFERENCE |
| U | | F | Ume | Fumi | Fumi |
| | F: HELLO! MISS UME WHAT CAN I DO FOR YOU? | | | | |
| | U: I THINK OHNO'S REPORT IS NOT SUBMITTED YET. PLEASE TELL ME WHERE IT IS – I'M IN A HURRY. | | | | |
| | F: WHAT REPORT? | | | | |
| | U: REPORT ABOUT THE BUSINESS TRIP TO OSAKA LAST WEEK | | | | |
| | F: YOU MEAN THE BUSINESS TRIP ABOUT THE HAA STANDARDIZATION COMMITTEE ON OCTOBER 24 TO 26, DON'T YOU? JUST A MOMENT. | | | | haa_94 10.txt |
| | F: IS THIS WHAT YOU WANT? | | | | |
| | U: YES, IT IS. HAS IT BEEN MADE ALREADY? | | | | |
| | F: I'M SURE THIS REPORT WAS SENT TO MISS UME AND THE KASTERA MEMBERS ON OCTOBER 31. | | | | |
| | U: OH! REALLY? JUST A MOMENT. | | | | |
| | F: YES | | | | |
| | U: HERE WE ARE! I DIDN'T NOTICE IT. I'M SORRY. FORGET ABOUT IT | | | | |
| | F: IS THERE ANYTHING ELSE I CAN DO? | | | | |
| | U: NO, THANK YOU. | | | | |
| | F: MAY I RECORD THESE RESPONSES WITH YOU? | | | | |

FIG. 77

| Communication record | | | | | |
|---|---|---|---|---|---|
| | CONVERSATION | F | EXPRESSION | | REFERENCE |
| ⏱ U | | | Ume | Fumi | Fumi |
| | F: HELLO! MISS UME WHAT CAN I DO FOR YOU? | | | | |
| | U: I THINK OHNO'S REPORT IS NOT SUBMITTED YET. PLEASE TELL ME WHERE IT IS – I'M IN A HURRY. | | | | |
| | UNDO REPORT? CUT UT THE BUSINESS TRIP COPY ST WEEK PASTE BUSINESS TRIP ABOUT THE HAA STANDARDIZATION COMMITTEE ON OCTOBER 24 TO 26, DON'T YOU? JUST A MOMENT. | | | | haa_94 10.txt |
| | F: IS THIS WHAT YOU WANT? | | | | |
| | U: YES, IT IS. HAS IT BEEN MADE ALREADY? | | | | |
| 1 | F: I'M SURE THIS REPORT WAS SENT TO MISS UME AND THE KASTERA MEMBERS ON OCTOBER 31. | | | | |
| | U: OH! REALLY? JUST A MOMENT. | | | | |
| | F: YES | | | | |
| | U: HERE WE ARE! I DIDN'T NOTICE IT. TIME I'M SORRY. FORGET ABOUT IT | | | | |
| | F: IS THERE ANYTHING ELSE I CAN DO? | | | | |
| | U: NO, THANK YOU. | | | | |
| | F: MAY I RECORD THESE RESPONSES WITH YOU? | | | | |

*FIG. 78*

| Communication record | | | | | |
|---|---|---|---|---|---|
| | CONVERSATION | | EXPRESSION | | REFERENCE |
| ⏱ U | | F | Ume | Fumi | Fumi |
| | F: HELLO! MISS UME WHAT CAN I DO FOR YOU? | | | | |
| | U: OHNO'S REPORT IS NOT FOUND YET. PLEASE TELL ME WHERE IT IS. I'M IN A HURRY. | | | | |
| | F: WHAT REPORT? | | | | |
| | U: REPORT ABOUT THE BUSINESS TRIP TO OSAKA LAST WEEK | | | | |
| | F: YOU MEAN THE BUSINESS TRIP ABOUT THE HAA STANDARDIZATION COMMITTEE ON OCTOBER 24 TO 26, DON'T YOU? JUST A MOMENT. | | | | hoa_94 10.txt |
| | F: IS THIS WHAT YOU WANT? | | | | |
| | U: YES, IT IS. HAS IT BEEN MADE ALREADY? | | | | |
| 1 | F: I'M SURE THIS REPORT WAS SENT TO MISS UME AND THE KASTERA MEMBERS ON OCTOBER 31. | | | | |
| | U: OH! REALLY? JUST A MOMENT. | | | | |
| | F: YES. | | | | |
| | U: HERE WE ARE! I DIDN'T NOTICE IT. TIME I'M SORRY. FORGET ABOUT IT | | | | |
| | F: IS THERE ANYTHING ELSE I CAN DO? | | | | |
| | U: NO, THANK YOU. | | | | |
| | F: MAY I RECORD THESE RESPONSES WITH YOU? | | | | |

*FIG. 80*

| Communication record | | | | | |
|---|---|---|---|---|---|
| | | CONVERSATION | F | \multicolumn{2}{c|}{EXPRESSION} |
| ⏱ | U | | | Ume | Fumi |
| | | F: HELLO! MISS UME. WHAT CAN I DO FOR YOU? | | | |
| | ▨ | U: PLEASE SHOW ME THE CONFERENCE REFERENCES OWNED BY MR. OHNO. | | | |
| | | F: WHAT REFERENCES? | | | |
| | ▨ | U: REFERENCES ABOUT THE AOG STANDARDS. | | | |
| | | F: I MEAN THE REFERENCES DISTRIBUTED IN THE OUTE CONFERENCE. I'M NOT SURE, BUT THE CONFERENCE WAS HELD IN AUGUST. | | | |
| | ▨ | U: I MEAN THE REFERENCES DISTRIBUTED IN THE OUTE CONFERENCE. I'M NOT SURE, BUT THE CONFERENCE WAS HELD IN AUGUST. | | | |
| | | F: I'M SORRY, BUT NO DOCUMENTS ABOUT THE OUTE CONFERENCE ARE FOUND, EITHER. WILL YOU PLEASE MAKE A MORE DETAILED EXPLANATION? | | | |
| 1 | ▨ | U: THAT'S STRANGE. ARE YOU SURE? I'VE READ THEM ON THE CIRCULAR NOTICE IN MY OFFICE. DON'T CONCEAL THEM. | | | |
| | | F: I REALLY CAN'T FIND THEM. DO YOU REMEMBER THE DATE OF THE CONFERENCE? | ▨ | | |
| | ▨ | U: SORRY. I'LL CHECK THE DATE. EH---H, I WANT TO CANCEL MY UTTERANCES. | | | |
| | | F: I'LL SHOW YOU THE RESPONSE HISTORY. PLEASE SPECIFY SENTENCES TO BE DELETED. | ▨ | | |

→ UNDO / CUT / COPY / PASTE

*FIG. 84*

| fumi ohno | akai<->fumi ohno |
|---|---|
| 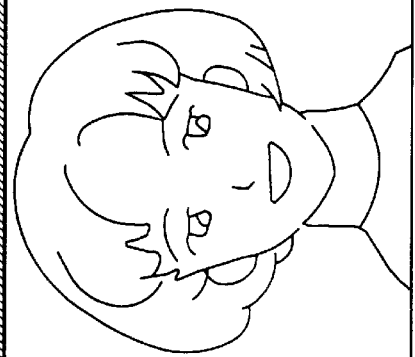 | F: HELLO! MR. AKAI. WHAT CAN I DO FOR YOU?<br>A: I THINK OHNO'S REPORT IS NOT SUBMITTED YET. WHAT HAPPENED?<br>F: WHAT REPORT?<br>A: REPORT ON THE BUSINESS TRIP TO OSAKA LAST WEEK.<br>F: YOU MEAN THE BUSINESS TRIP ABOUT THE HAA STANDARDIZATION COMMITTEE ON OCTOBER 24 TO 26, DON'T YOU? JUST A MOMENT.<br>F: THE REPORT ON THE BUSINESS TRIP, WHICH WAS FORMED AFTER OCTOBER 24, AND DOCUMENTS ON THE HAA STANDARDIZATION COMMITTEE WERE NOT FOUND.<br>A: NOT YET? OH! MY GOODNESS! I'D BETTER CHECK IT. OH! THIS IS OFF THE RECORD.<br>F: I UNDERSTAND. I'M GOING TO DELETE THE HATCHED SENTENCES.<br>A: I'LL ASK YOU TO SEND A MESSAGE TO MR. OHNO, "WOULD YOU MIND SUBMITTING THE REPORT ON THE BUSINESS TRIP TO THE MANAGER OF THE SECTION UNTIL TOMORROW NOON?"<br>F: I'M SURE TO SEND IT TO MR. OHNO. IS THERE ANYTHING ELSE I CAN DO?<br>A: NO, THANK YOU.<br>F: THANK YOU FOR YOUR ACCESS. |
| akai | |
| 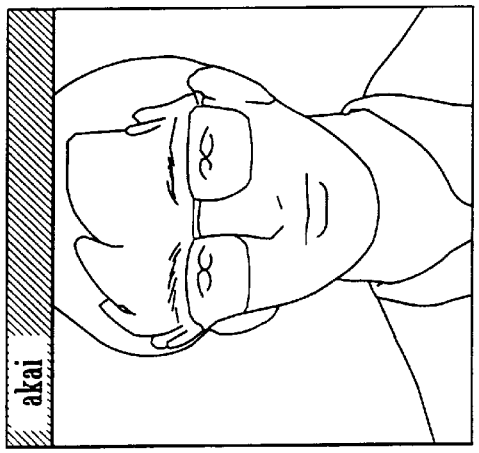 | |

FIG. 86

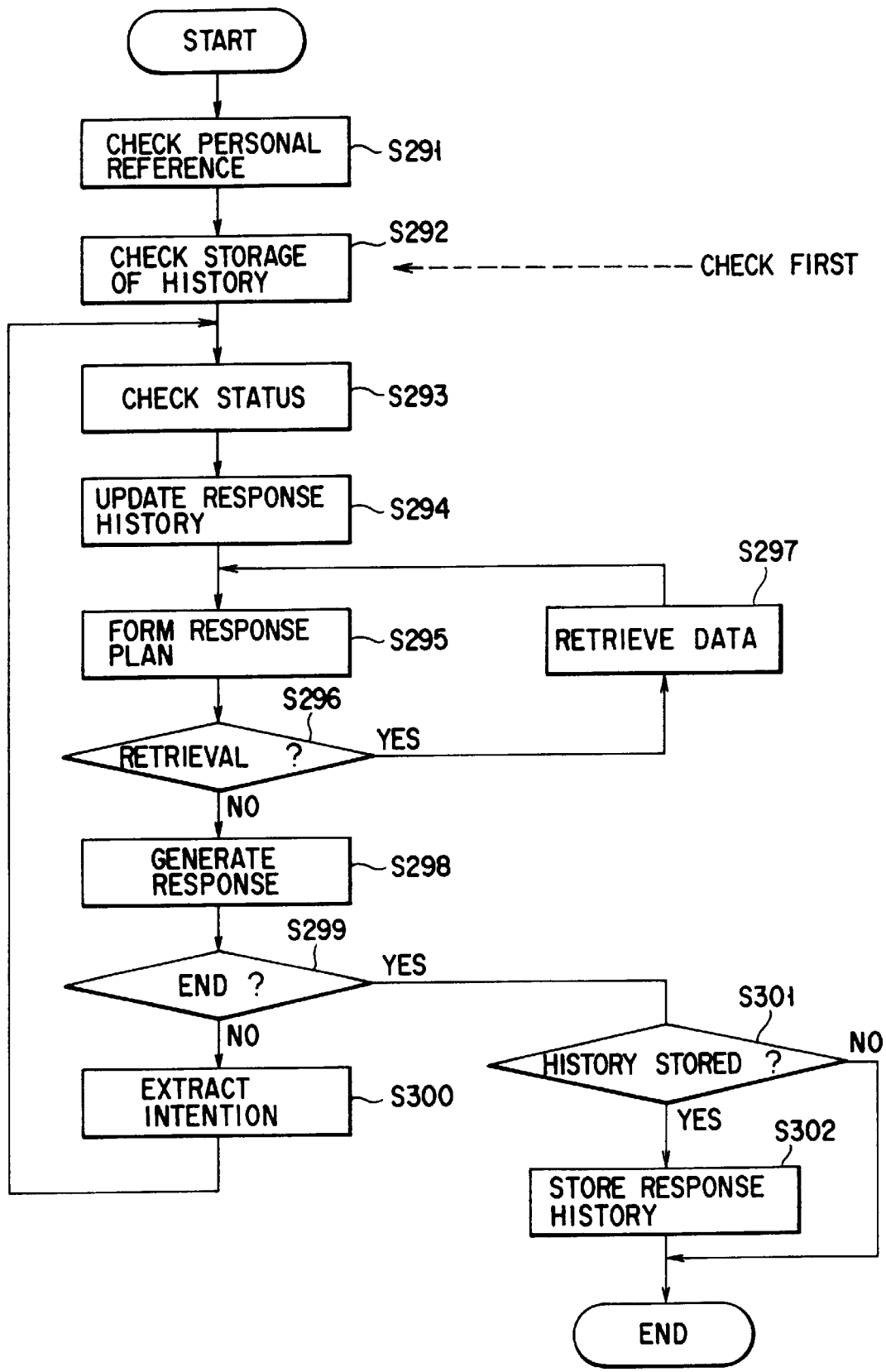
F I G. 87

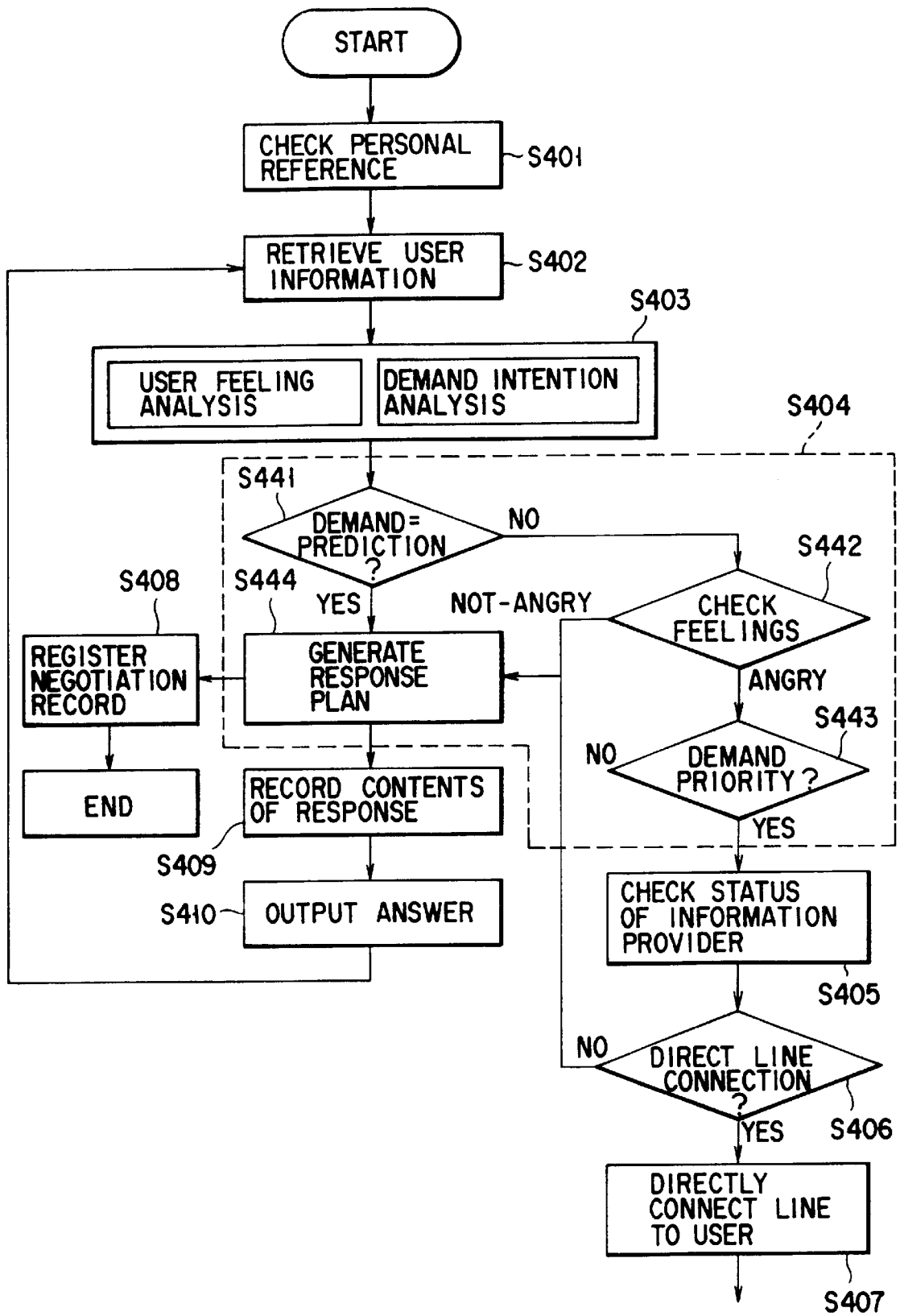
F I G. 90

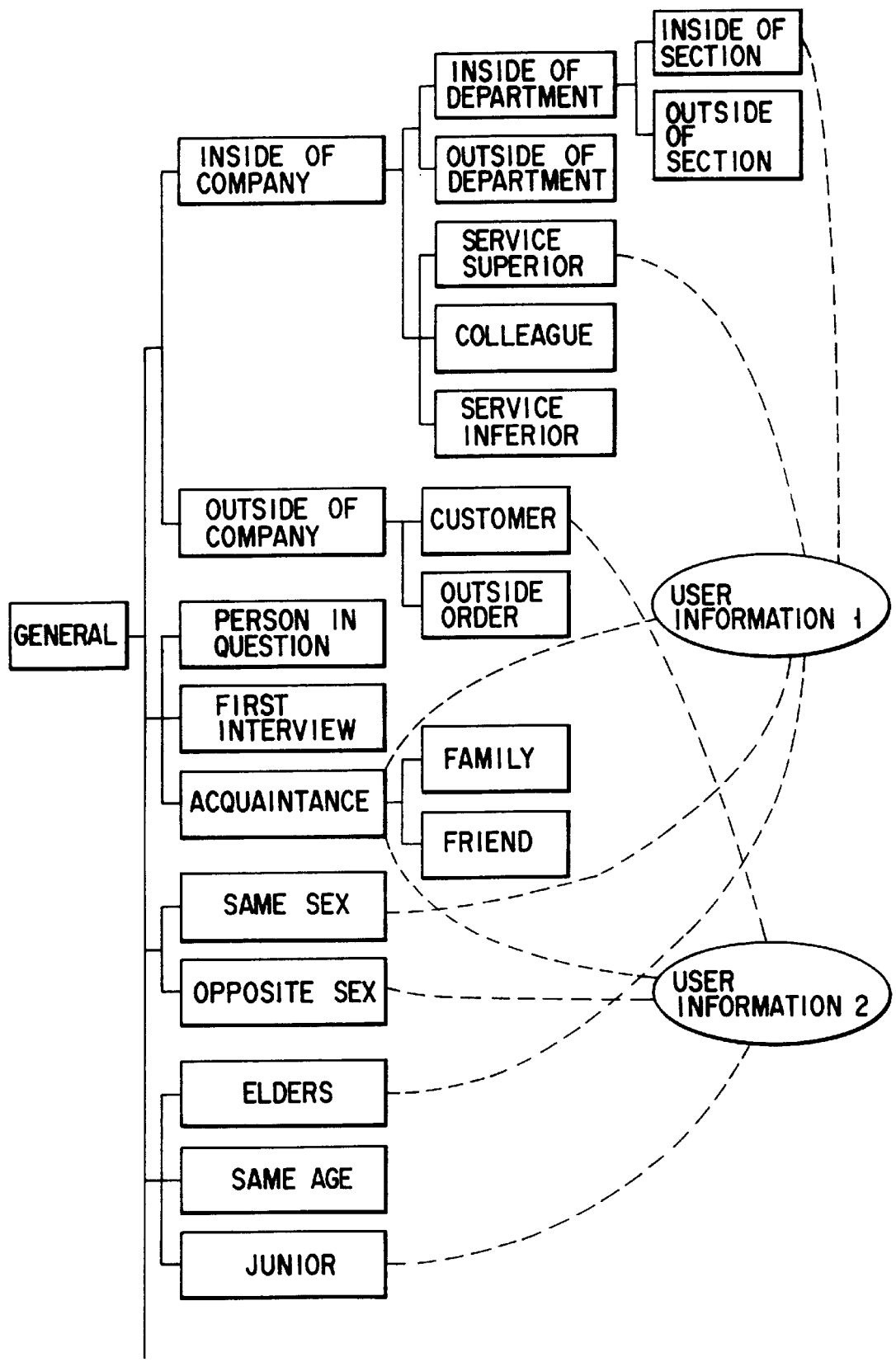
F I G. 92

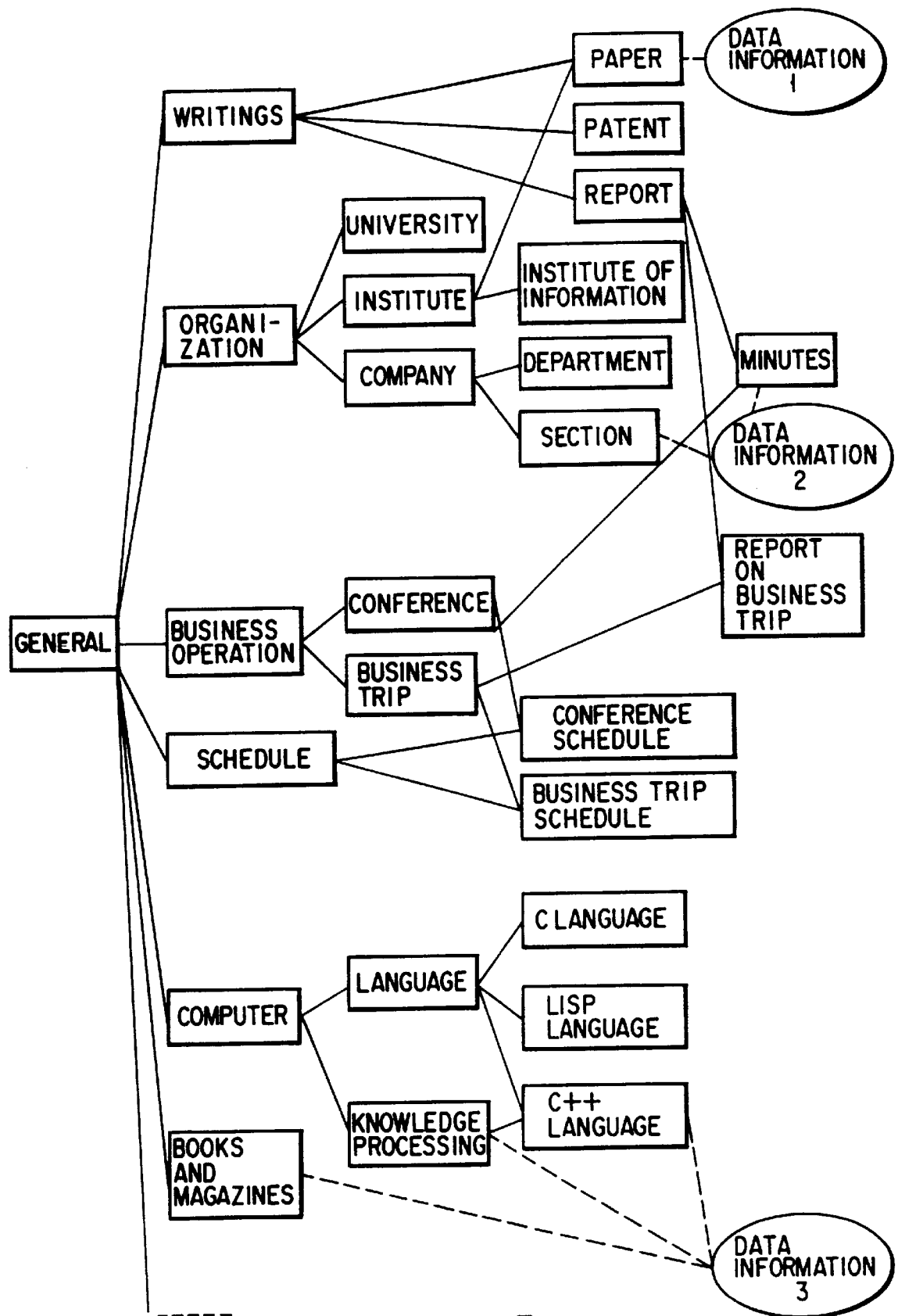
F I G. 93

PERSONAL RELATIONSHIP MODEL BETWEEN INFORMATION PROVIDER AND USER B

FIG. 99

| RECEPTION COUNT | USER MODEL | | | | | | |
|---|---|---|---|---|---|---|---|
| | POST | CONTENTS | EMERGENCY | NO. OF CLAUSES | INTERJECTION | DIFFERENCE TIME | EXPRESSION | SPEECH FREQUENCY | SPEECH PITCH |
| 0 | | | | | | | |
| 1 | | | | | | | |
| ... | | | | | | | |
| N | | | | | | | |

N: CURRENT RECEPTION COUNT    S: RECEPTION COUNT UPON OCCURRENCE OF DIFFERENCE

FIG. 100

| | USER MODEL | | | | | | | |
|---|---|---|---|---|---|---|---|---|
| | POST | CONTENTS | EMERGENCY | NO. OF CLAUSES | INTERJECTION | DIFFERENCE TIME | EXPRESSION | SPEECH FREQUENCY | SPEECH PITCH |
| U | | | | | | | | $\sum_{i=S}^{N} I(i)/(N-S)$ |

FIG. 101

WEIGHTING EXAMPLE

| ken | USER MODEL | | | | | | | |
|---|---|---|---|---|---|---|---|---|
| | POST | CONTENTS | EMERGENCY | NO. OF CLAUSES | INTERJECTION | DIFFERENCE TIME | EXPRESSION | SPEECH FREQUENCY | SPEECH PITCH |
| w | 1 | 2 | 5 | 1 | 5 | 2 | 2 | 2 | $\sum_{j=0}^{m}(u(j)*w(j))/m$ |

FIG. 102

EXAMPLE OF THRESHOLD REGISTERED BY INFORMATION PROVIDER

| | USER MODEL | | | | | | | |
|---|---|---|---|---|---|---|---|---|
| | POST | CONTENTS | EMERGENCY | NO. OF CLAUSES | INTERJECTION | DIFFERENCE TIME | EXPRESSION | SPEECH FREQUENCY | SPEECH PITCH |
| THRESHOLD | 1 | 0.5 | 0.3 | 0.8 | 0.5 | 0.3 | 0.8 | 0.5 | 1 |

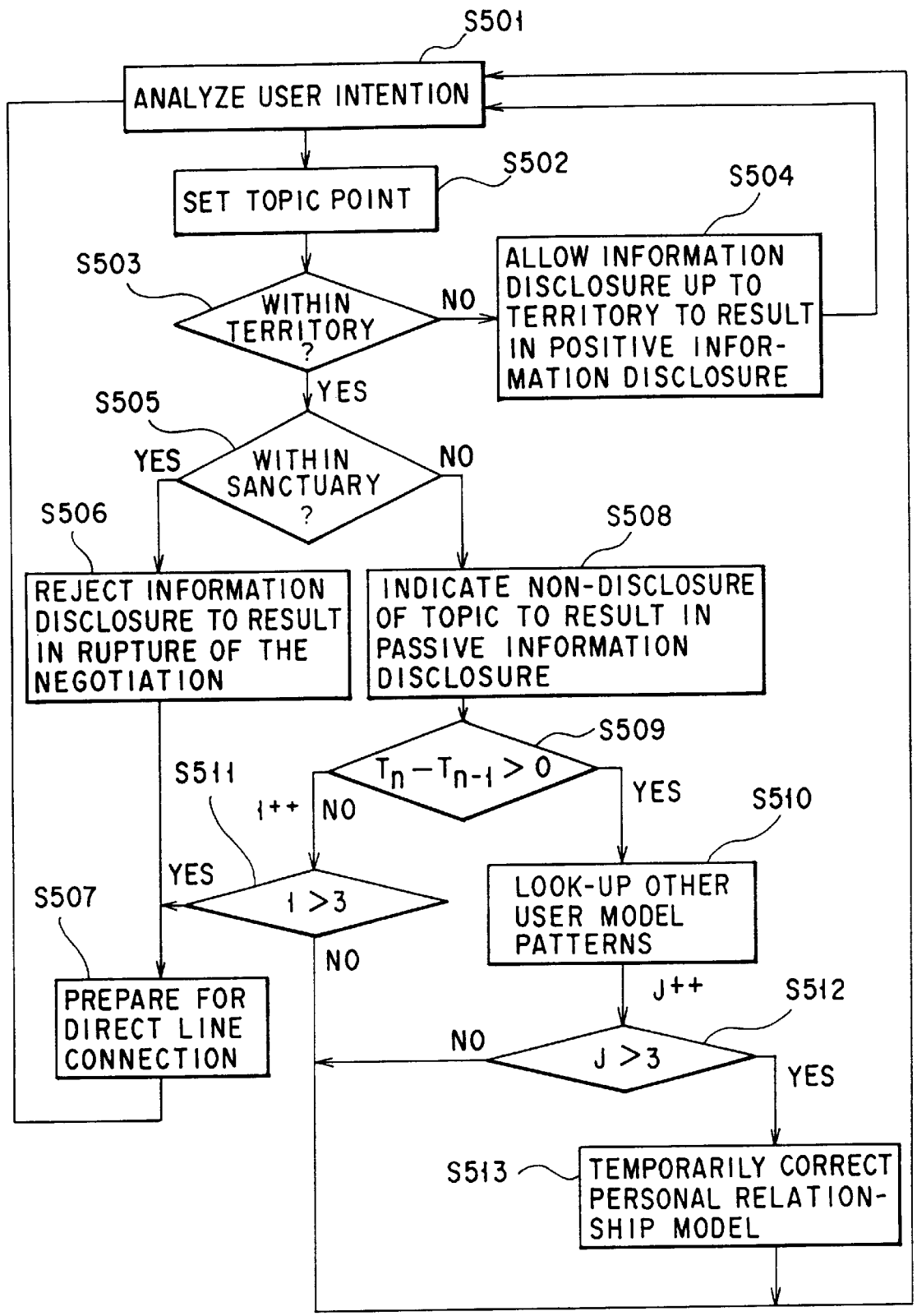
F I G. 103

EXAMPLE OF CURRENT STATUS ANALYSIS
OF INFORMATION

| HISTORY | FINGER | EXPRESSION | SCHEDULE |
|---------|--------|------------|----------|
| 0       | 0      | 1          | 0.5      |

WEIGHTING EXAMPLE

| HISTORY | FINGER | EXPRESSION | SCHEDULE |
|---------|--------|------------|----------|
| 1       | 0      | 1          | 3        |

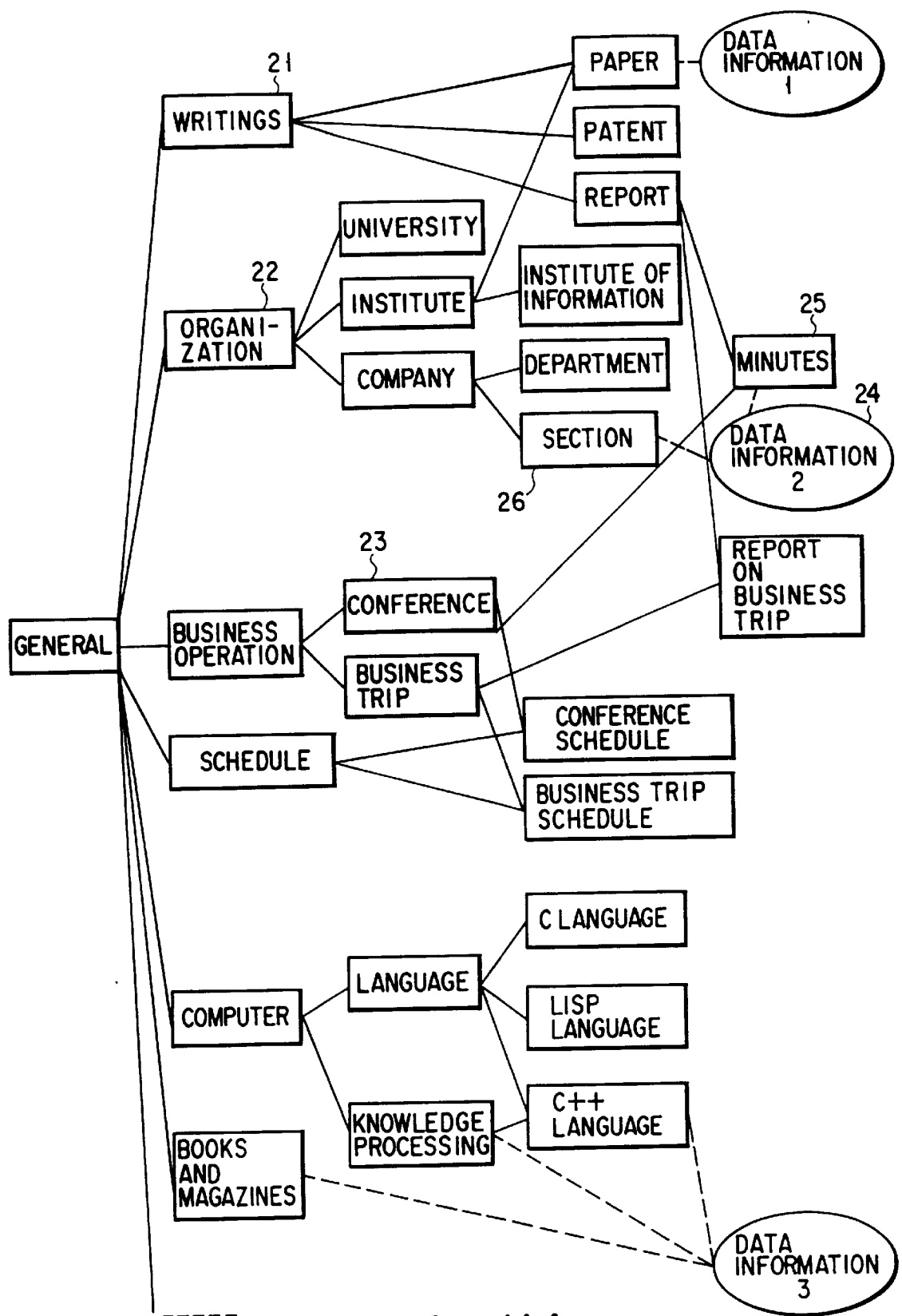
F I G. 114

```
SEMANTIC CATEGORY: WRITINGS
HIGHER CATEGORY: GENERAL
LOWER CATEGORY: PAPER, PATENT, REPORT
SYNONYM: WRITINGS, DOCUMENT, REFERENCE
         DOCUMENTS, REFERENCES
TITLE:
WRITER:
DATE OF WRITING:
```
~31

FIG. 115A

```
SEMANTIC CATEGORY: CONFERENCE
HIGHER CATEGORY: COMPANY
LOWER CATEGORY: CONFERENCE SCHEDULE, MINUTES
SYNONYM: CONFERENCE, MEETING, PRELIMINARY
         ARRANGEMENT
AGENDA:
PARTICIPANT:
DATE OF CONFERENCE:
```
~32

FIG. 115B

```
SEMANTIC CATEGORY: MINUTES
HIGHER CATEGORY: REPORT, CONFERENCE
LOWER CATEGORY: —
SYNONYM: MINUTES, CONFERENCE MEMO

TITLE:
DRAFTER:
DATE OF DRAFTING:
AGENDA:
PARTICIPANT:
DATE OF CONFERENCE:
```
~33

FIG. 115C

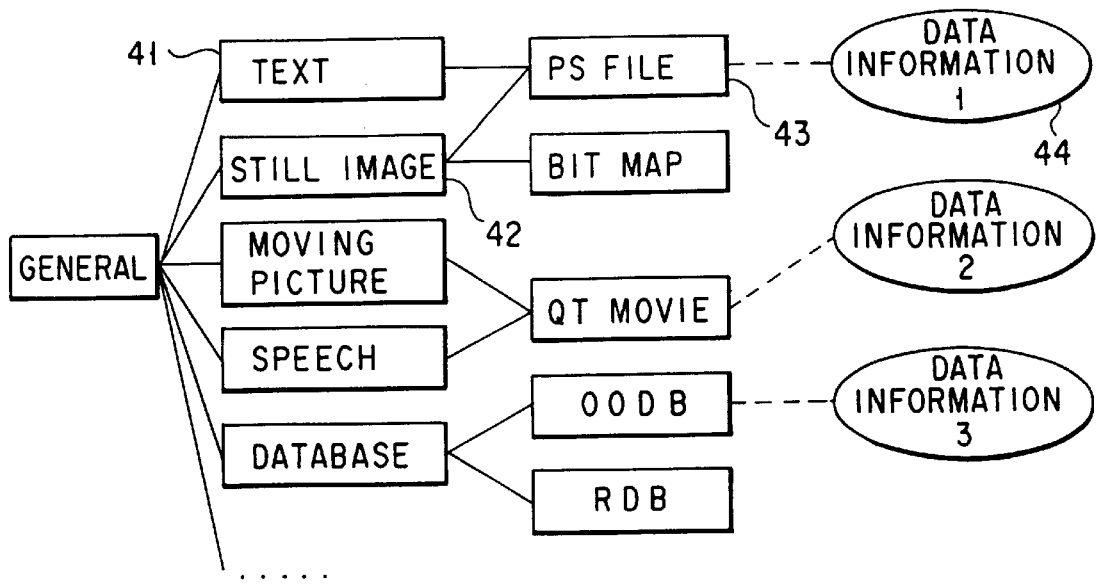

FORM CATEGORY: TEXT

HIGHER CATEGORY: GENERAL
LOWER CATEGORY: PS FILE
RETRIEVAL MEANS: FILE SYSTEM
PRESENTATION MEANS: more

FORM CATEGORY: PS FILE

HIGHER CATEGORY: TEXT, STILL IMAGE
LOWER CATEGORY: —
RETRIEVAL MEANS: FILE SYSTEM
PRESENTATION MEANS: gs

FORM CATEGORY: BIT MAP

HIGHER CATEGORY: STILL IMAGE
LOWER CATEGORY: —
RETRIEVAL MEANS: FILE SYSTEM
PRESENTATION MEANS: xv

PERSON'S CATEGORY FIRST INTERVIEW — 71

HIGHER CATEGORY: GENERAL
LOWER CATEGORY: —

NAME:
ADDRESS:
SEX:
DATE OF BIRTH:
SECTION OR DEPARTMENT TO WHICH USER BELONGS:
⋮

| SEMANTIC CATEGORY | RIGHT | DEGREE OF FAMILIARITY |
|---|---|---|
| INDIVIDUAL INFORMATION | 0 | 0 |
| COMPANY | 0 | 0 |
| SCHEDULE | 0 | 0 |
| ⋮ | ⋮ | ⋮ |

FIG. 119B

PERSON'S CATEGORY INSIDE OF COMPANY

HIGHER CATEGORY: GENERAL
LOWER CATEGORY: SERVICE SUPERIOR, COLLEAGUE, SERVICE INFERIOR, INSIDE OF DEPARTMENT, OUTSIDE OF DEPARTMENT

NAME:
ADDRESS: — 72
SEX:
DATE OF BIRTH:
SECTION OR DEPARTMENT TO WHICH USER BELONGS:

RANK:
EMPLOYEE NO.:
EXTENSION:

| SEMANTIC CATEGORY | RIGHT | DEGREE OF FAMILIARITY |
|---|---|---|
| INDIVIDUAL INFORMATION | 0.2 | 0.2 |
| COMPANY | 0.5 | 0.5 |
| SCHEDULE | 0.5 | 0.5 |
| ⋮ | ⋮ | ⋮ |

| PERSON'S CATEGORY SERVICE SUPERIOR |
|---|

HIGHER CATEGORY: INSIDE OF COMPANY
LOWER CATEGORY:

NAME:
ADDRESS:
SEX:
DATE OF BIRTH:
SECTION OR DEPARTMENT TO WHICH USER BELONGS:

RANK:
EMPLOYEE NO.:
EXTENSION:

| SEMANTIC CATEGORY | RIGHT | DEGREE OF FAMILIARITY |
|---|---|---|
| INDIVIDUAL INFORMATION | 0.2 | 0.2 |
| COMPANY | 0.6 | 0.6 |
| SCHEDULE | 0.6 | 0.6 |
| . . . . . . . . . . . . . | . . . | . . . |

```
┌─────────────────┐
│ DATA INFORMATION │
└─────────────────┘

NAME OF DATA: ~aoki/reports
              /meeting/mr_94_11_1.ps

SEMANTIC CATEGORY: MINUTES, SECTION, CAD
FORM CATEGORY: TEXT

CONFIDENTIALITY: 0.5
DEGREE OF DIFFICULTY: 0.1

SUBJECT: "SECTION OF SYSTEM DEVELOPMENT:
          REGULAR CONFERENCE MINUTES (1)"
DRAFTER: ICHIRO AOKI
DATE OF DRAFTING: 1994.11.2
AGENDA: DEVELOPMENT SCHEDULE OF ELECTRICAL
        SYSTEM CAD
PARTICIPANT: SHIGERU YAMAMOTO,
             KAZUO MORIMOTO, ICHIRO AOKI
DATE OF CONFERENCE: 1994.11.1
```

FIG. 120B

```
┌─────────────────┐
│ DATA INFORMATION │
└─────────────────┘

NAME OF DATA: ~aoki/reports
              /meeting/mr_94_11_8.ps

SEMANTIC CATEGORY: MINUTES, SECTION, CAD
FORM CATEGORY: TEXT

CONFIDENTIALITY: 0.5
DEGREE OF DIFFICULTY: 0.2

SUBJECT: "SECTION OF SYSTEM DEVELOPMENT:
          REGULAR CONFERENCE MINUTS (2)"
DRAFTER: ICHIRO AOKI
DATE OF DRAFTING: 1994.11.8
AGNDA: DEMAND SPECIFICATIONS OF ELECTRICAL
       SYSTEM CAD
PARTICIPANT: SHIGERU YAMAMOTO,
             KAZUO MORIMOTO, ICHIRO AOKI
DATE OF CONFERENCE: 1994.11.8
```

FIG. 121A

DATA INFORMATION

NAME OF DATA: ~aoki/reports
/meeting/mr_94_11_15.ps

SEMANTIC CATEGORY: MINUTES, SECTION, CAD
FORM CATEGORY: TEXT

CONFIDENTIALITY: 0.7
DEGREE OF DIFFICULTY: 0.3

SUBJECT: "SECTION OF SYSTEM DEVELOPMENT:
REGULAR CONFERENCE MINUTES (3)"
DRAFTER: ICHIRO AOKI
DATE OF DRAFTING: 1994.11.17
AGENDA: PATENT STRATEGY OF ELECTRICAL
SYSTEM CAD
PARTICIPANT: SHIGERU YAMAMOTO,
KAZUO MORIMOTO, ICHIRO AOKI
DATE OF CONFERENCE: 1994.11.15

FIG. 121B

DATA INFORMATION

NAME OF DATA: ~aoki/reports
/meeting/mr_94_11_22.ps

SEMANTIC CATEGORY: MINUTES, SECTION, CAD
FORM CATEGORY: TEXT

CONFIDENTIALITY: 0.5
DEGREE OF DIFFICULTY: 0.2

SUBJECT: "SECTION OF SYSTEM DEVELOPMENT:
REGULAR CONFERENCE MINUTS (2)"
DRAFTER: ICHIRO AOKI
DATE OF DRAFTING: 1994.11.23
AGNDA: DETAILED DESIGN OF ELECTRICAL
SYSTEM CAD
PARTICIPANT: SHIGERU YAMAMOTO,
KAZUO MORIMOTO, ICHIRO AOKI
DATE OF CONFERENCE: 1994.11.22

FIG. 122A

USER INFORMATION

PERSON'S CATEGORY: PERSON IN QUESTION

NAME: ICHIRO AOKI
ADDRESS: ...XX-CHO, △△-KU, OO-SHI
SEX: MALE
DATE OF BIRTH: OCTOBER 25, 1967
SECTION OR DEPARTMENT TO WHICH USER BELONGS:
XXSECTION, △△DEPARTMENT, OOCO., LTD.
RANK: PROGRAMMER
EMPLOYEE NO.: 9201XX95
EXTENSION: 45X6

| SEMANTIC CATEGORY | RIGHT | DEGREE OF FAMILIARITY |
|---|---|---|
| INDIVIDUAL INFORMATION | 1 | 1 |
| WRITING | 1 | 1 |
| COMPANY | 0.5 | 0.4 |
| SCHEDULE | 0.8 | 0.8 |
| ... | ... | ... |

FIG. 122B

USER INFORMATION

PERSON'S CATEGORY: FRIEND, SERVICE INFERIOR, JUNIOR, OPPOSITE SEX

NAME: KYOKO YAMADA
ADDRESS: ...XX-CHO, △△-KU, OO-SHI
SEX: FEMALE
DATA OF BIRTH: AUGUST 6, 1969
SECTION OR DEPARTMENT TO WHICH USER BELONGS:
XXSECTION, △△DEPARTMENT, OOCO., LTD.
RANK: DESIGNER
EMPLOYEE: 9401XX22
EXTENSION: 45X6

| SEMANTIC CATEGORY | RIGHT | DEGREE OF FAMILIARITY |
|---|---|---|
| INDIVIDUAL INFORMATION | 0.8 | 0.8 |
| WRITING | 0.7 | 0.7 |
| COMPANY | 0.4 | 0.5 |
| SCHEDULE | 0.7 | 0.6 |
| ... | ... | ... |

FIG. 123A

USER INFORMATION

PERSON'S CATEGORY: ACQUAINTANCE, SERVICE SUPERIOR, ELDERS, SAME SEX, OUTSIDE OF SECTION

NAME: NOBORU TAKENAKA
ADDRESS: □□-CHO, ○○-KU, ××-SHI
SEX: MALE
DATE OF BIRTH: AUGUST 6, 1957
SECTION OR DEPARTMENT TO WHICH USER BELONGS:
△△SECTION, □□DEPARTMENT, ○○CO., LTD.
RANK: SECTION MANAGER
EMPLOYEE NO.: 7201××34
EXTENSION: 45×6

| SEMANTIC CATEGORY | RIGHT | DEGREE OF FAMILIARITY |
|---|---|---|
| INDIVIDUAL INFORMATION | 0.5 | 0.5 |
| WRITING | 0.6 | 0.6 |
| COMPANY | 0.7 | 0.7 |
| SCHEDULE | 0.5 | 0.3 |
| ... | ... | ... |

USER INFORMATION

PERSON'S CATEGORY: ACQUAINTANCE, ANOTHER COMPANY, ELDERS, SAME SEX

NAME: ? GOTO
ADDRESS: ?
SEX: MALE
DATA OF BIRTH: ?
SECTION OR DEPARTMENT TO WHICH USER BELONGS:
○○○DEPARTMENT, ××MANUFACTURING CO., LTD.

| SEMANTIC CATEGORY | RIGHT | DEGREE OF FAMILIARITY |
|---|---|---|
| INDIVIDUAL INFORMATION | 0.1 | 0.1 |
| WRITING | 0.1 | 0.3 |
| COMPANY | 0.1 | 0.2 |
| SCHEDULE | 0.1 | 0.0 |
| ... | ... | ... |

94

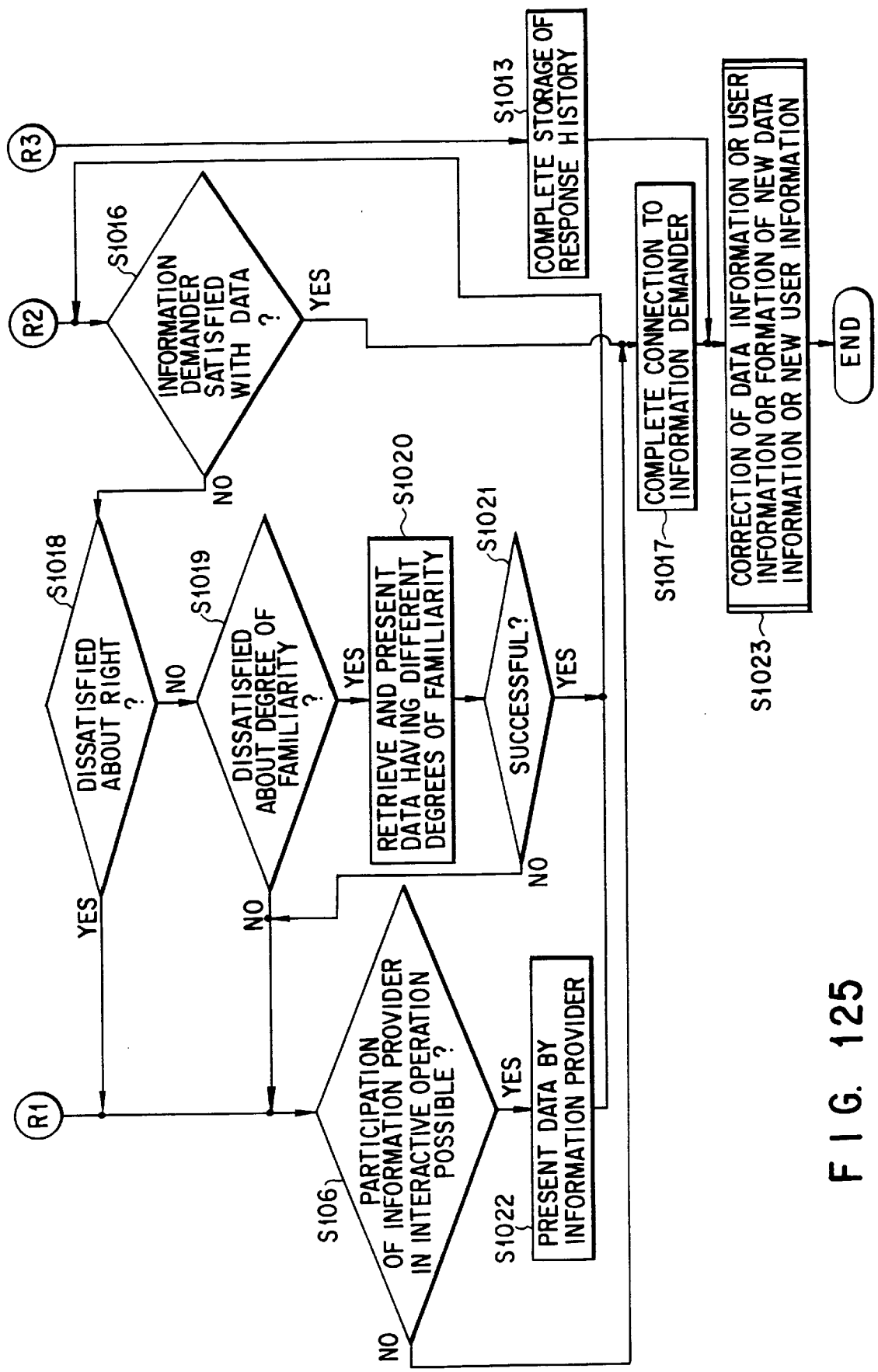
F I G. 125

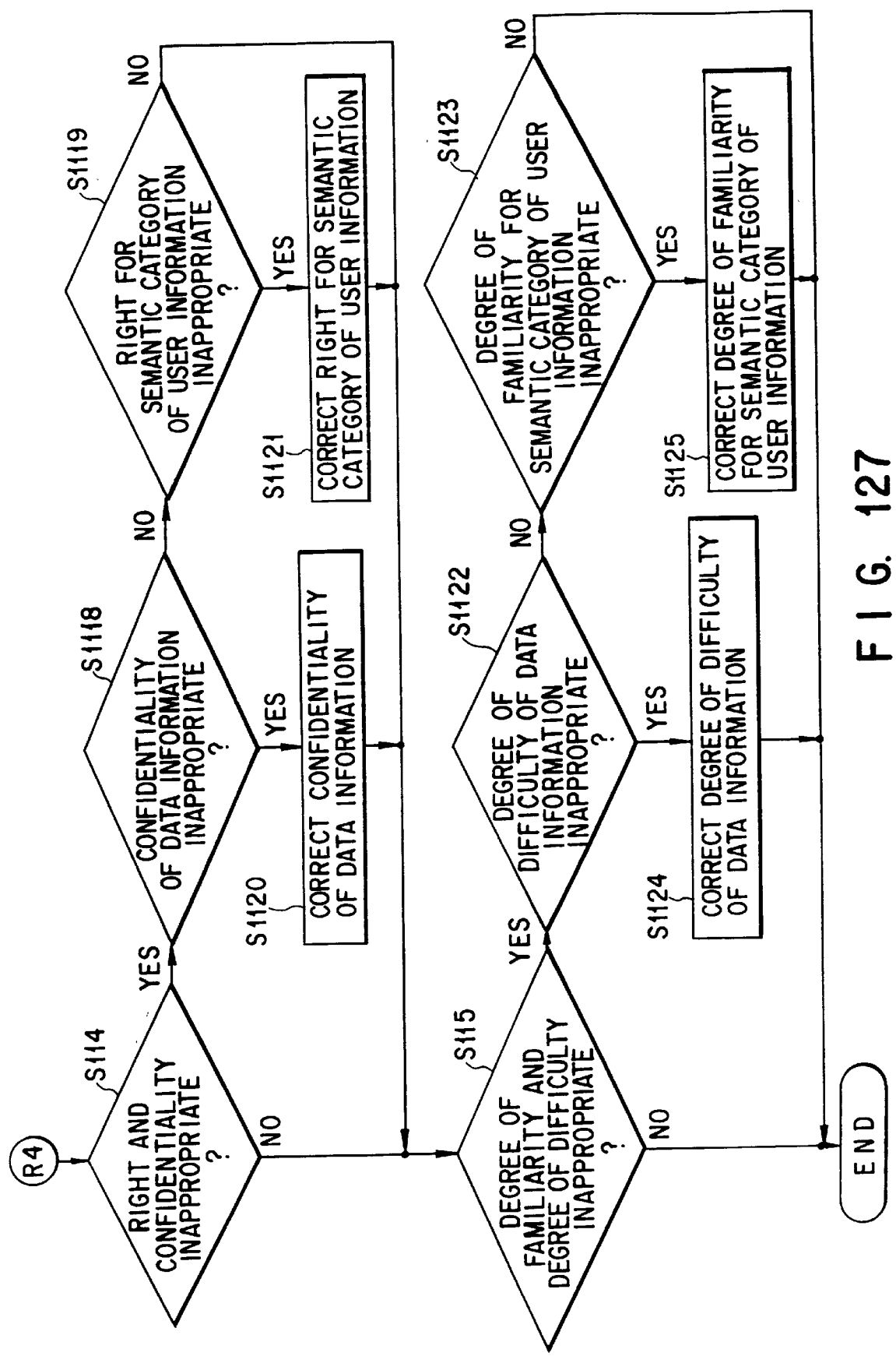
F I G. 127

| USER INFORMATION | |
|---|---|
| PERSON'S CATEGORY: ACQUAINTANCE, COLLEAGUE, SAME AGE, SAME SEX, OUTSIDE OF SECTION | |
| NAME: KAZUTO TAKAHASHI | |
| ADDRESS: ··· ××-CHO, O×-KU, △△-SHI | |
| SEX: MALE | |
| DATA OF BIRTH: NOVEMBER 30, 1967 | |
| SECTION OR DEPARTMENT TO WHICH USER BELONGS: □□SECTION, △△DEPARTMENT, OOCO., LTD. | |
| RANK: PROGRAMMER | |
| EMPLOYEE: 9251××95 | |
| EXTENSION: 4×63 | |

| SEMANTIC CATEGORY | RIGHT | DEGREE OF FAMILIARITY |
|---|---|---|
| INDIVIDUAL INFORMATION | 0.3 | 0.3 |
| WRITING | 0.5 | 0.6 |
| COMPANY | 0.5 | 0.4 |
| SCHEDULE | 0.8 | 0.8 |
| KNOWLEDGE PROCESSING | 0.5 | 0.5 |
| C++ LANGUAGE | 0.5 | 0.5 |
| . . . | . . . | . . . |

1201

F I G. 128

TAKAHASHI: "HELLO!" ~2001
DISCLOSURE: "HELLO! HOW ARE YOU?" ~2002
TAKAHASHI: "I WANT TO KNOW ABOUT REFERENCES USED IN THE PRELIMINARY ARRANGEMENT OF YOUR THEME LAST MONTH." ~2003
DISCLOSURE: "MINUTES?" ~2004
TAKAHASHI: "YAH." ~2005
DISCLOSURE: "WHICH CONFERENCE?" ~2006
TAKAHASHI: "I NEED THE FILE OF FIGURES USED IN THE PATENT CONFERENCE." ~2007
DISCLOSURE: "I CAN'T FIND THE MINUTES YOU WANT." ~2008
TAKAHASHI: "EH? THAT'S STRANGE. LET ME SEE ALL THE MINUTES." ~2009
DISCLOSURE: "JUST A MOMENT. HERE YOU ARE." ~2010
TAKAHASHI: "THAT'S STRANGE. ANYTHING ELSE?" ~2011

FIG. 129

THIS IS THE LIST OF MINUTES OF CONFERENCE THEMES OF THE LAST MONTH.

SUBJECT: "SECTION OF SYSTEM DEVELOPMENT: REGULAR CONFERENCE MINUTES(1)"
AGENDA: DEVELOPMENT SCHEDULE OF ELECTRONIC SYSTEM CAD
DATE: 1994.11.1

SUBJECT: "SECTION OF SYSTEM DEVELOPMENT: REGULAR CONFERENCE MINUTES(2)"
AGENDA: DESIGN SPECIFICATIONS OF ELECTRONIC SYSTEM CAD
DATE: 1994.11.8

SUBJECT: "SECTION OF SYSTEM DEVELOPMENT: REGULAR CONFERENCE MINUTES(4)"
AGENDA: DETAILED DESIGN OF ELECTRONIC SYSTEM CAD
DATE: 1994.11.22

FIG. 130

I HAVE A TROUBLE IN INTERACTIVE OPERATION WITH USER TAKAHASHI.

DEMAND: MINUTES OF AUGUST PATENT CONFERENCE

RETRIEVAL RESULT: NONE

LAST MESSAGE: "ANYTHING ELSE?"

DO YOU WANT TO PARTICIPATE IN THE INTERACTIVE OPERATION?

(YES) (NO) (DETAILED HISTORY)

FIG. 131A

DETAILED HISTORY (PARTICIPATE) (NOT PARTICIPATE)

| INPUT | CATEGORY | RETRIEVAL RESULT | ANSWER |
|---|---|---|---|
| I WANT TO KNOW ABOUT REFERENCES USED IN THE PRELIMINARY ARRANGEMENT OF YOUR THEME LAST MONTH. | CONFERENCE WRITINGS | | |
| | | REQUIRED FOR SUB-CLASSIFI-CATION | |
| YAH | MINUTES | | MINUTES? |
| | | REQUIRED FOR SUB-CLASSIFI-CATION | WHICH CONFER-ENCE? |
| | | | |

FIG. 131B

| | |
|---|---|
| DISCLOSURE: | "JUST A MOMENT. IS IT WHAT YOU WANT?" |
| TAKAHASHI: | "OH! YES. THANK YOU. |
| DISCLOSURE: | "YOU'RE WELCOME." |

FIG. 132

| | |
|---|---|
| DISCLOSURE: | "JUST A MOMENT··· I CAN'T YET FIND WHAT YOU WANT." |
| TAKAHASHI: | "IS MR. AOKI IN?" |
| DISCLOSURE: | "I'M SORRY HE IS OUT." |
| TAKAHASHI: | "OK. I'LL CONTACT YOU AGAIN." |
| DISCLOSURE: | "I'M SORRY." |

FIG. 133

| | |
|---|---|
| DISCLOSURE: | "JUST A MOMENT." |
| AOKI: | "HI! WHAT CAN I DO FOR YOU?" |
| TAKAHASHI: | "HI! DO YOU REMEMBER WE HAD THE PATENT CONFERENCE OF YOUR THEME LAST MONTH. I WANT THE FILE OF FIGURES USED IN THE MINUTES OF THIS CONFERENCE." |
| AOKI: | "OK···· HERE YOU ARE." |
| TAKAHASH: | "OH! HERE WE ARE. THANK YOU." |
| AOKI: | "YOU'RE WELCOME." |

FIG. 134

| | |
|---|---|
| TAKAHASHI: | "HI!" ~2100 |
| DISCLOSURE: | "HI!" ~2101 |
| TAKAHASHI: | "I'M LOOKING FOR BOOKS ON KNOWLEDGE PROCESSING PROGRAMS." ~2102 |
| DISCLOSURE: | "DO YOU WANT BOOKS ON Lisp?" ~2103 |
| TAKAHASHI: | "NO. I'M LOOKING FOR BOOKS ON C++." ~2104 |
| DISCLOSURE: | "OK. HOW ABOUT THIS?" ~2105 |
| TAKAHASHI: | "AH!" I'VE READ IT. I WONDER YOU HAVE AN ADVANCED ONE." ~2106 |
| DISCLOSURE: | "THEN, HOW ABOUT THIS?" ~2107 |
| TAKHASHI: | "I'VE READ IT, TOO. ANYTHING ELSE?" ~2108 |

FIG. 136

| | |
|---|---|
| DISCLOSURE: | "I'M SORRY. THESE ARE ALL DATA I HAVE." ~2109 |
| TAKAHASHI: | "WELL, DO YOU KNOW ANYBODY WHO MAY KNOW ABUT IT?" ~2110 |
| DISCLOSURE: | "JUST A MOMENT. DO YOU KNOW MR. TANAKA?" ~2111 |
| TAKAHASHI: | "YAH." ~2112 |
| DISCLOSURE: | "MR. TANAKA MAY KNOW ABOUT IT." ~2113 |
| TAKAHASHI: | "THEN, I'M GOING TO ASK MR. TANAKA. THANK YOU." ~2114 |
| DISCLOSURE: | "YOU'RE WELCOME. |

FIG. 141

| | |
|---|---|
| DISCLOSURE: | "JUST A MOMENT." ~2116 |
| AOKI: | "HI! YOU ARE LOOKING FOR BOOKS ON C++ KNOWLEDGE PROCESSING, AREN'T YOU?" ~2117 |
| TAKAHASHI: | "YAH." ~2118 |
| AOKI: | "I THINK "C++ AI PROGRAMMING" OF DR. OYAMA THAT I'VE READ RECENTLY IS A WELL-ARRANGED BOOK." ~2119 |
| TAKAHASHI: | "REALLY THANK YOU." ~2120 |
| AOKI: | "SURE." ~2121 |

FIG. 142

| DATA INFORMATION | |
|---|---|
| NAME OF DATA: ~aoki/books/db/data1133 | |

SEMANTIC CATEGORY: BOOKS AND MAGAZINES, KNOWLEDGE PROCESSING, C++ LANGUAGE
FORM CATEGORY: DATA

CONFIDENTIALITY: 0.3
DEGREE OF DIFFICULTY: 0.1

TITLE: INTRODUCTION TO C++
WRITER: TORAO OKAWARA
FIRST EDITION: 1990.11.2
POSSESSION: LIBRARY

PUBLISHING COMPANY: O×COMPANY
REMARKS:

FIG. 137A

| DATA INFORMATION | |
|---|---|
| NAME OF DATA: ~aoki/books/db/data0054 | |

SEMANTIC CATEGORY: BOOKS AND MAGAZINES, KNOWLEDGE PROCESSING, C++ LANGUAGE
FORM CATEGORY: DATA

CONFIDENTIALITY: 0.1
DEGREE OF DIFFICULTY: 0.2

TITLE: KNOWLEDGE PROGRAM WRITTEN WITH C++
WRITER: EKITATSU OHYAMA
FIRST EDITION: 1991.7.8
POSSESSION: PERSONAL

PUBLISHING COMPANY: △△COMPANY
REMARKS: WITH PROGRAM EXERCISES

DATA INFORMATION — 231

NAME OF DATA: ~aoki/books/db/data2133

SEMANTIC CATEGORY: BOOKS AND MAGAZINES, KNOWLEDGE PROCESSING, C++ LANGUAGE
FORM CATEGORY: DATA

CONFIDENTIALITY: 0.2
DEGREE OF DIFFICULTY: 0.5

TITLE: CREATION AND APPLICATIONS OF KNOWLEDGE BASE
WRITER: HIROSHI HASE
FIRST EDITION: 1993.4.1
POSSESSION: THEME
PUBLISHING COMPANY: ○○COMPANY
REMARKS:

FIG. 138B

DATA INFORMATION — 232

NAME OF DATA: ~aoki/books/db/data1102

SEMANTIC CATEGORY: BOOKS AND MAGAZINES, KNOWLEDGE PROCESSING, C++ LANGUAGE
FORM CATEGORY: DATA

CONFIDENTIALITY: 0.1
DEGREE OF DIFFICULTY: 0.2

TITLE:
WRITER: B.J.
TRANSLATOR: YOSHIHARU YUKI
FIRST EDITION: 1993.11.20
POSSESSION: LIBRARY
PUBLISHING COMPANY: △△COMPANY

FIG. 139A

USER INFORMATION

PERSON'S CATEGORY: ACQUAINTANCE, SERVICE SUPERIOR, ELDERS, SAME SEX

NAME: YUJI SHIMIZU
ADDRESS: ...○△-KU, □△-SHI
SEX: MALE
DATE OF BIRTH: MAY 15, 1963
SECTION OR DEPARTMENT TO WHICH USER BELONGS:
××SECTION, △△DEPARTMENT, ○○ CO., LTD.
RANK: DEPUTY MANAGER
EMPLOYEE NO.: 8801××93
EXTENSION: 45×6

| SEMANTIC CATEGORY | RIGHT | DEGREE OF FAMILIARITY |
|---|---|---|
| INDIVIDUAL INFORMATION | 1 | 1 |
| WRITING | 1 | 1 |
| KNOWLEDGE PROCESSING | 0.6 | 0.6 |
| C++ LANGUAGE | 0.7 | 0.7 |
| . | . | . |

FIG. 139B

USER INFORMATION

PERSON'S CATEGORY: ACQUAINTANCE, COLLEAGUE, ELDERS, SAME SEX, OUTSIDE OF SECTION

NAME: YOSHIYUKI TANAKA
ADDRESS: ...○○-CHO, □□-KU, △△-SHI
SEX: MALE
DATE OF BIRTH: SEPTEMBER 6, 1966
SECTION OR DEPARTMENT TO WHICH USER BELONGS:
××SECTION, △△DEPARTMENT, ○○CO., LTD.
RANK: PROGRAMMER
EMPLOYEE: 9101×22
EXTENSION: 45×6

| SEMANTIC CATEGORY | RIGHT | DEGREE OF FAMILIARITY |
|---|---|---|
| INDIVIDUAL INFORMATION | 0.8 | 0.8 |
| WRITING | 0.7 | 0.7 |
| KNOWLEDGE PROCESSING | 0.6 | 0.6 |
| C++ LANGUAGE | 0.7 | 0.7 |
| . | . | . |

USER INFORMATION

PERSON'S CATEGORY: ACQUAINTANCE, OUTSIDE OF COMPANY, JUNIOR, SAME SEX

NAME: KOJI SAITO
ADDRESS: ···□□-CHO, ○○-KU, △△-SHI
SEX: MALE
DATA OF BIRTH: JULY 16, 1968

SECTION OR DEPARTMENT TO WHICH USER BELONGS.
  △△SECTION, □□ DEPARTMENT, ○○ LABORATORY
RANK: ?
EMPLOYEE: ?
EXTENSION: ?

| SEMANTIC CATEGORY | RIGHT | DEGREE OF FAMILIARITY |
|---|---|---|
| INDIVIDUAL INFORMATION | 0.4 | 0.3 |
| WRITING | 0 | 0 |
| KNOWLEDGE PROCESSING | 0.8 | 0.8 |
| C++ LANGUGE | 0.8 | 0.8 |

FIG. 140

THE DEGREE OF FAMILIARITY OF USER
INFORMATION OF DEMANDER TAKAHASHI
CONTRADICTS THE DEGREE OF DIFFICULTY
OF THE DISCLOSED DATA INFORMATION.

DEGREE OF FAMILIARITY: 0.5

DEGREE OF DIFFICULTY: 0.7

[CORRECTION FOR USER INFORMATION]   [CORRECTION FOR DATA INFORMATION]

[NO CORRECTION]

FIG. 143A

CORRECTION FOR USER INFORMATION

NAME: KAZUTO TAKAHASHI

| INFORMATION CATEGORY | DEGREE OF FAMILIARITY |
|---|---|
| SCHEDULE | 0.5 |
| KNOWLEDGE PROCESSING | ■— |
| C++ LANGUAGE | 0.5 |
| Unix | 0.8 |
| . . . . . | . . . |

[DISPLAY FOR DETAILS]   [CORRECTION FOR OTHER DATA]

[CANCEL]   [END]

FIG. 143B

```
ADDITION OF DATA INFORMATION

NAME OF DATA: ■_
SEMANTIC CATEGORY: BOOKS AND MAGAZINES,
KNOWLEDGE PROCESSING, C++ LANGUAGE
FORM CATEGORY:

CONFIDENTIALITY:
DEGREE OF DIFFICULTY: 0.7

TITLE: C++ AI PROGRAMMING
WRITER: OHYAMA
FIRST EDITION:
POSSESSION:
PUBLISHING COMPANY

[LOOK-UP OF OTHER DATA]  [CORRECTION FOR OTHER DATA]
[CANCEL]       [END]         [CATEGORY LIST]
```

| | |
|---|---|
| TAKAHASHI: | "HI!" |
| DISCLOSURE: | "HI!" |
| TAKAHASHI: | "I WANT A COPY OF THE PAPER CONTRIBUTED TO THE INSTITUTE OF INFORMATION LAST YEAR." ~2202 |
| DISCLOSURE: | "THE PAPER CONTRIBUTED TO THE INSTITUTE OF INFORMATION? I CAN'T FIND IT."~2203 |
| TAKAHASHI: | "EH THAT'S STRANGE. I WONDER IF IT IS THE REPORT ON THE BUSINESS TRIP." ~2204 |
| DISCLOSURE: | "AH! I HAVE THAT REPORT. HERE YOU ARE." ~2205 |
| TAKAHASHI: | "EH...H. IT ISN T. ANYTHING ELSE?"~2206 |
| DISCLOSURE: | "JUST A MOMENT." ~2207 |
| AOKI: | "HI! WHAT HAPPENED?" ~2208 |
| TAKAHASHI: | "HI! I WANT A COPY OF YOUR PAPER CONTRIBUTED TO THE INSTITUTE OF INFORMATION LAST YEAR." ~2209 |
| AOKI: | "JUST A MOMENT. HERE YOU ARE." ~2210 |
| TAKAHASHI: | "OH! YES. THANK YOU." ~2211 |
| AOKI: | "SURE." ~2212 |

DATA INFORMATION

NAME OF DATA: ~aoki/reports/gakkai
　　　　　　　/joho940805.ps

SEMANTIC CATEGORY: REPORT ON BUSINESS TRIP
　　　　　　　　　INSTITUTE OF INFORMATION
FORM CATEGORY: TEXT

CONFIDENTIALITY: 0.5
DEGREE OF DIFFICULTY: 0.4

TITLE: PARTICIPATION REPORT ON STUDY
　　　 MEETING OF THE INSTITUTE OF
　　　 INFORMATION
DRAFTER: ICHIRO AOKI
DATE OF DRAFTING: 1994.8.6
CONTENTS: CASE STUDY REPORT ON LEARNING
　　　　　THEORY UPON ATTENDANCE AT
　　　　　THE LECTURE
PLACE OF LECTURE: OO GAKUIN UNIVERSITY
DATE OF LECTURE: 1994.8.5

FIG. 146B

DATA INFORMATION

NAME OF DATA: ~aoki/paper/gakkai
　　　　　　　/joho940522.ps

SEMANTIC CATEGORY: PAPER
FORM CATEGORY: TEXT

CONFIDENTIALITY: 0.5
DEGREE OF DIFFICULTY: 0.5

TITLE: DEVELOPMENT OF INTELLIGENCE SUPPORT
　　　 SYSTEM OF ELECTRICAL SYSTEM CAD
DRAFTER: ICHIRO AOKI
DATE OF DRAFTING: 1994.2.8
CONTENTS: PAPER CONTRIBUTED TO THE
　　　　　NATIONAL MEETING OF THE
　　　　　INSTITUTE OF INFORMATION
PLACE OF LECTURE: THE DEPARTMENT OF
　　　　　　　　　TECHNOLOGY,
　　　　　　　　　XX UNIVERSITY
DATE OF LECTURE: 1994.5.22

```
                    CORRECTION FOR DATA INFORMATION

NAME OF DATA:    ~aoki/paper/gakkai/joho940522.ps
    SEMANTIC CATEGORY: ■_         ┌──────────┐
                                  │ CATEGORY │
    FORM CATEGORY: TEXT           │ SELECTION│
                                  └──────────┘

CONFIDENTIALITY:      0.5
    DEGREE OF DIFFICULTY: 0.5
    TITLE:   DEVELOPMENT OF INTELLIGENCE SUPPORT SYSTEM OF
             ELECTRICAL SYSTEM CAD
    DRAFTER: ICHIRO AOKI
    DATE OF DRAFTING: 1994.2.8
                         PAPER CONTRIBUTED TO THE NATIONAL
    CONTENTS :           MEETING OF THE INSTITUTE OF INFORMATION
    PLACE OF LECTURE:    THE DEPARTMENT OF TECHNOLOGY,
                         XX UNIVERSITY
    DATE OF LECTURE:  1994.5.22

┌──────────┐ ┌──────────────┐
    │LOOK-UP OF│ │CORRECTION FOR│
    │OTHER DATA│ │OTHER DATA    │
    └──────────┘ └──────────────┘
    ┌──────────┐ ┌──────────────┐ ┌──────────────┐
    │  CANCEL  │ │      END     │ │ CATEGORY LIST│
    └──────────┘ └──────────────┘ └──────────────┘
```

FIG. 147A

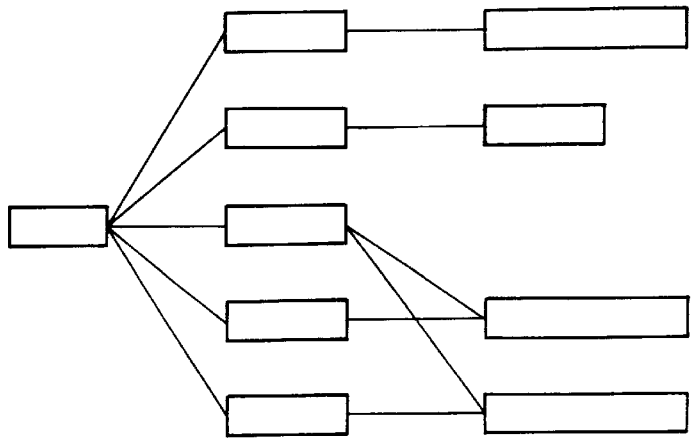

FIG. 147B

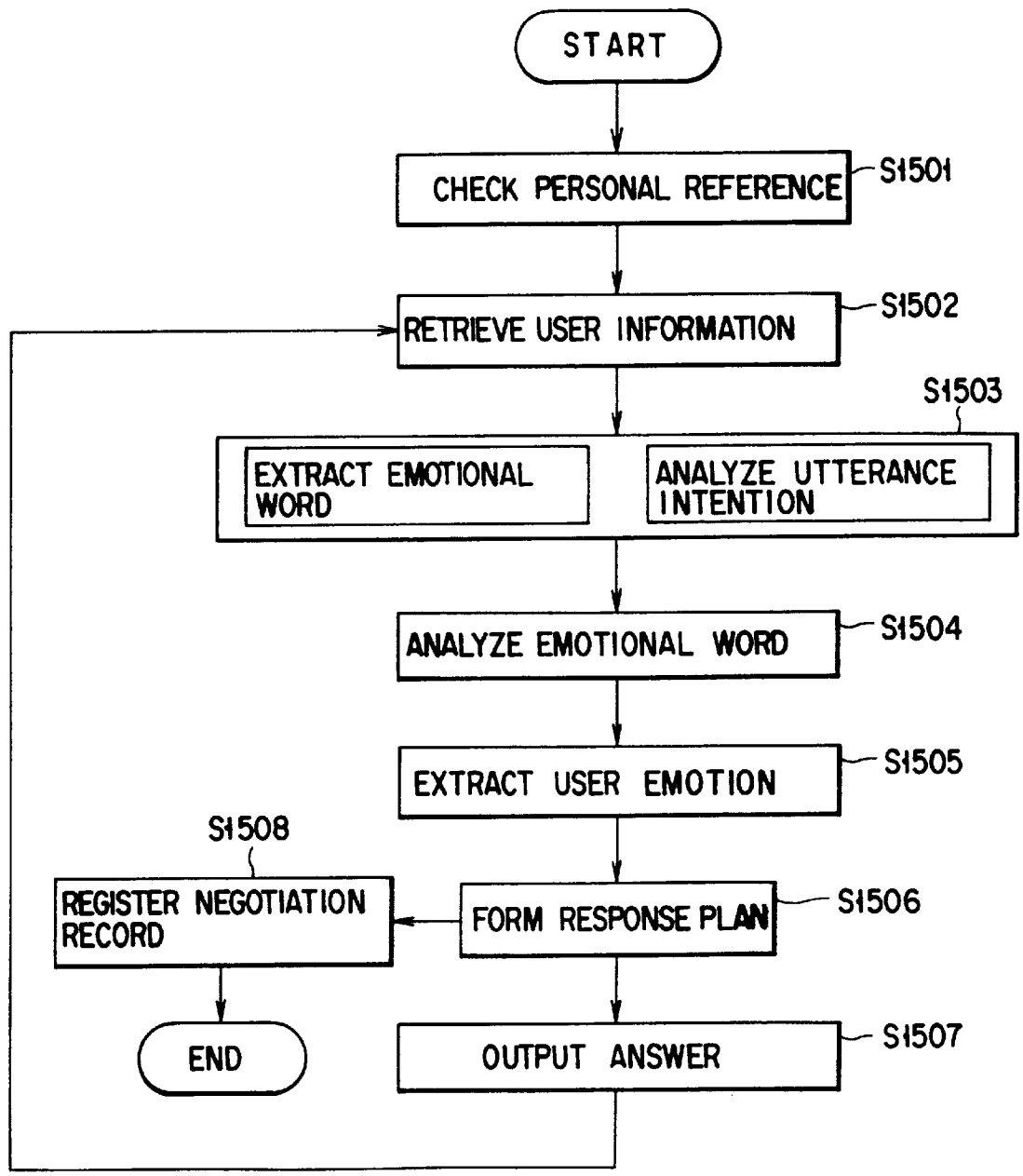
F I G. 150

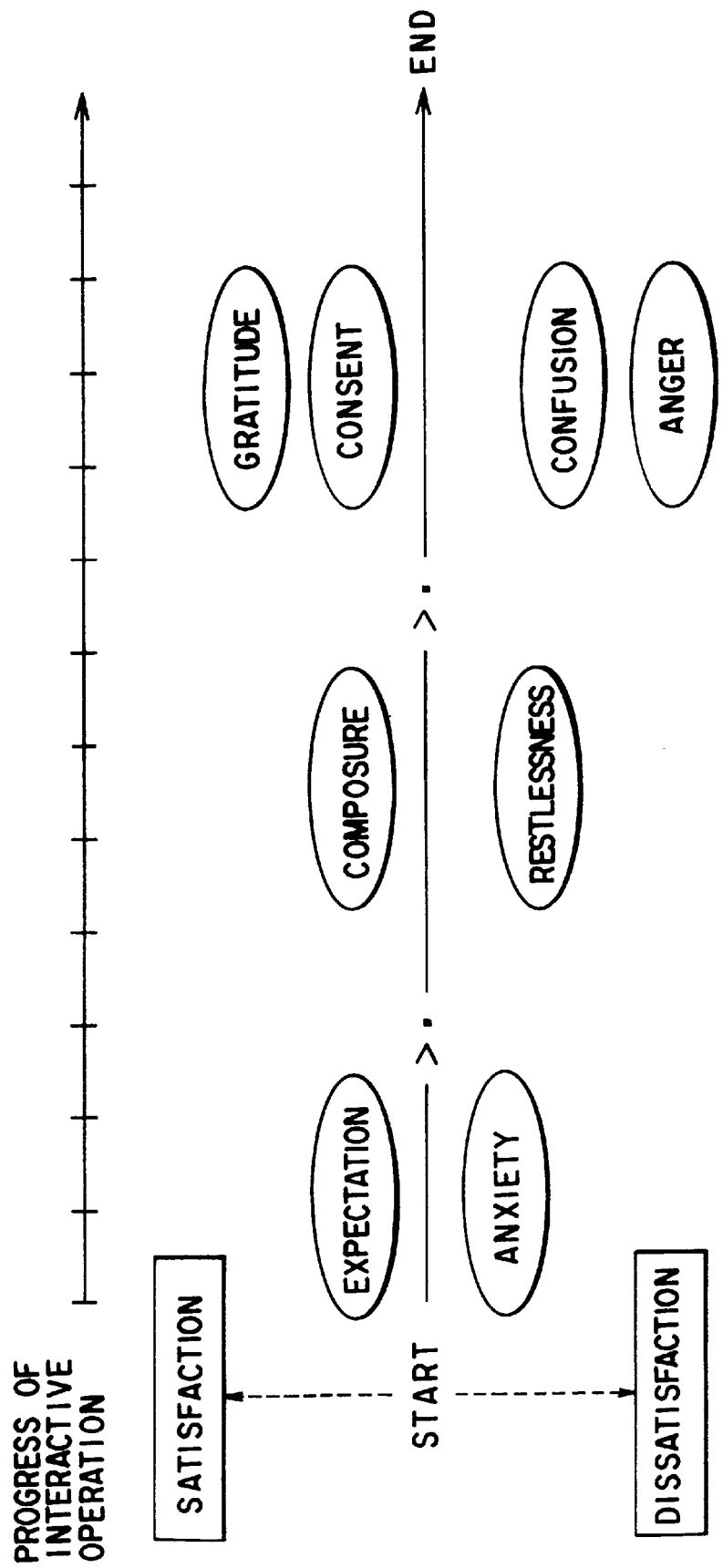
F I G. 151

| UTTERANCE INTENTION | | CORRECTION CONDITION | | |
|---|---|---|---|---|
| AGENT | USER | COMPOSURE | SATISFACTION | ACCEPTANCE |
| REJECTION | DEMAND | -2 | -1 | -1 |
| | NEGATION | -2 | -2 | -2 |
| | AFFIRMATION | 0 | -1 | +1 |
| APOLOGY | DEMAND | -1 | -2 | -1 |
| | NEGATION | -2 | -2 | -2 |
| | AFFIRMATION | 0 | -1 | +2 |

F I G. 153

S : HELLO! MR. KATO. WHAT HAPPENED

U : A TENNIS TRAINING CAMP IS SCHEDULED IN YAMAMOTO'S SUMMER VACATION, ISN'T IT

S : JUST A MOMENT. NO, IT ISN'T.

U : UNBELIEVABLE! THEN, LET ME KNOW YAMAMOTO'S SUMMER VACATION SCHEDULE.

S : JUST A MOMENT. A FOREIGN TOUR IS SCHEDULED IN THE SUMMER VACATION

U : OH! I SEE.

S : SYSTEM
U : USER

F I G. 155

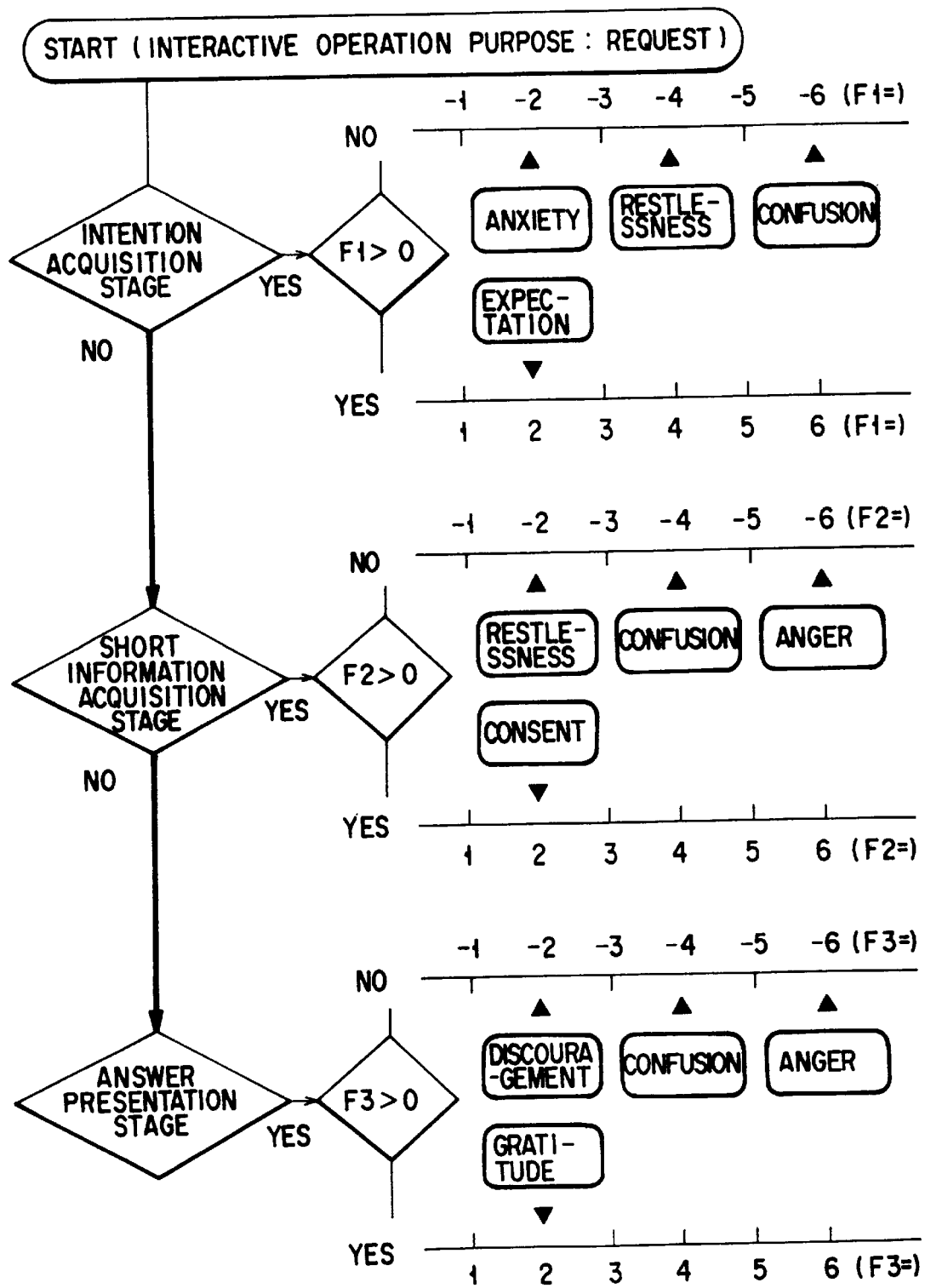
F I G. 156

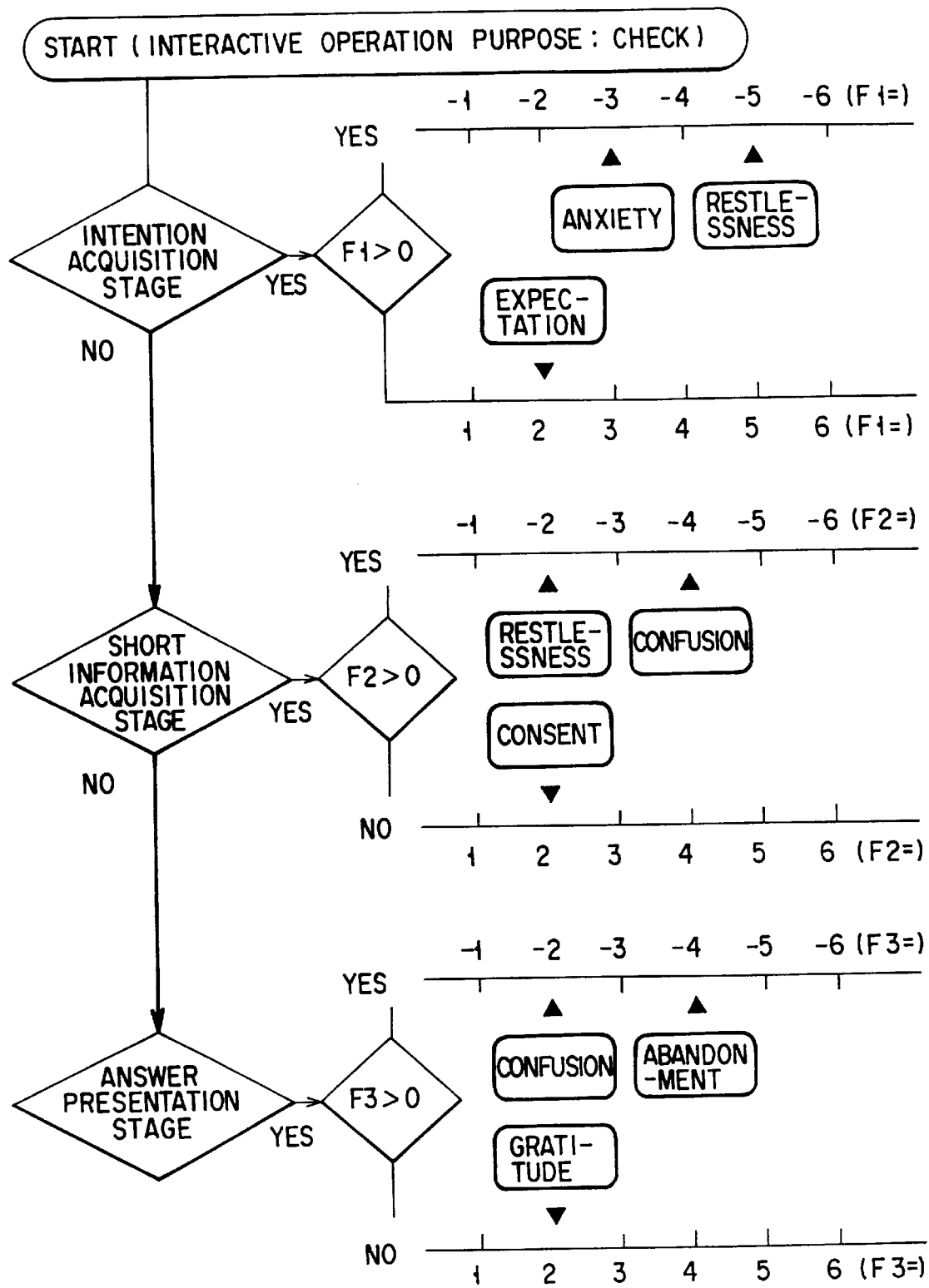
F I G. 157

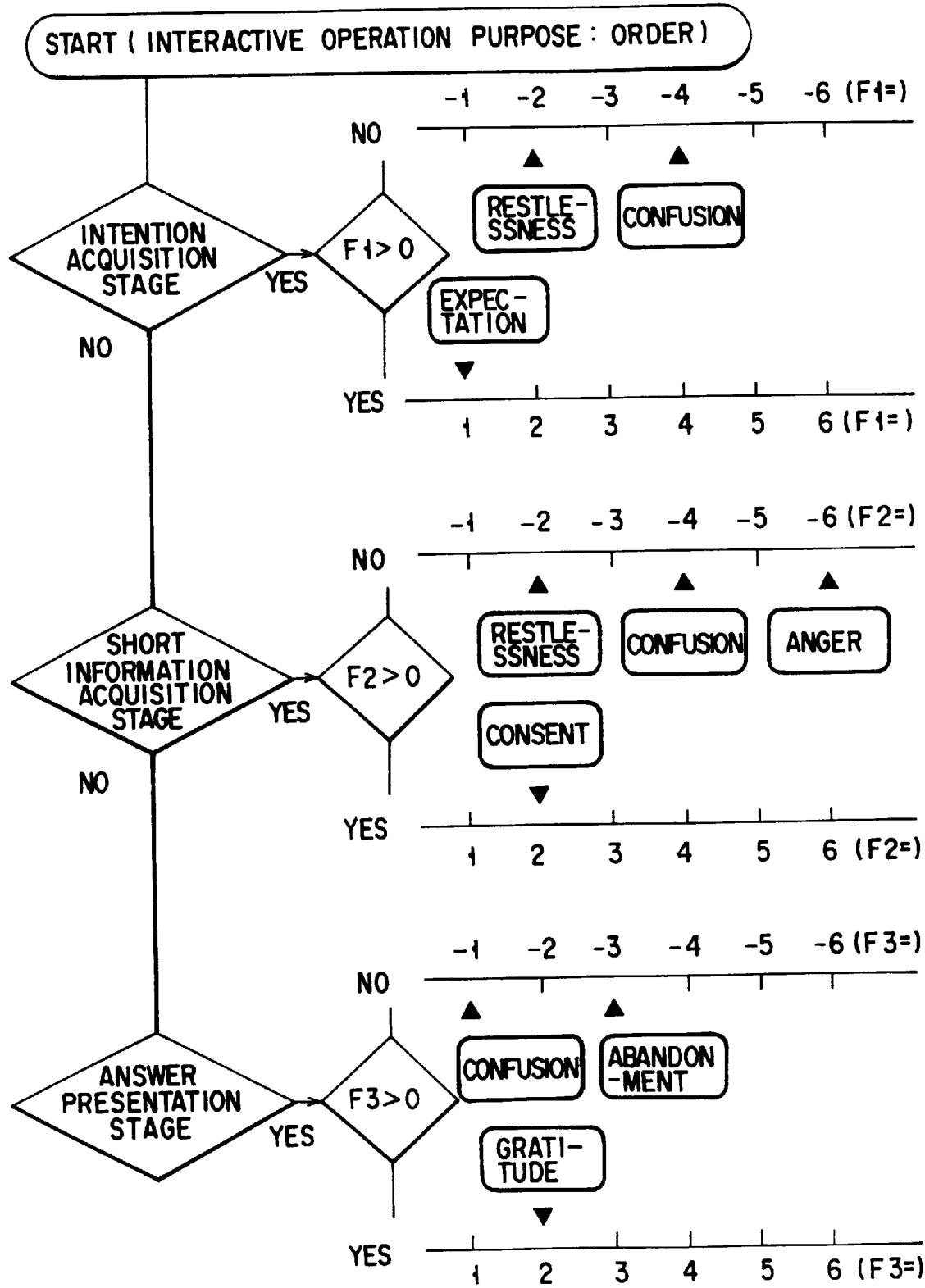
F I G. 158

| EXPECTATION | COMPOSURE | CONSENT | GRATITUDE |
|---|---|---|---|
| 1 | 2 | 3 | 4 |

| ANXIETY | RESTLESSNESS | CONFUSION | ANGER |
|---|---|---|---|
| -1 | -2 | -3 | -4 |

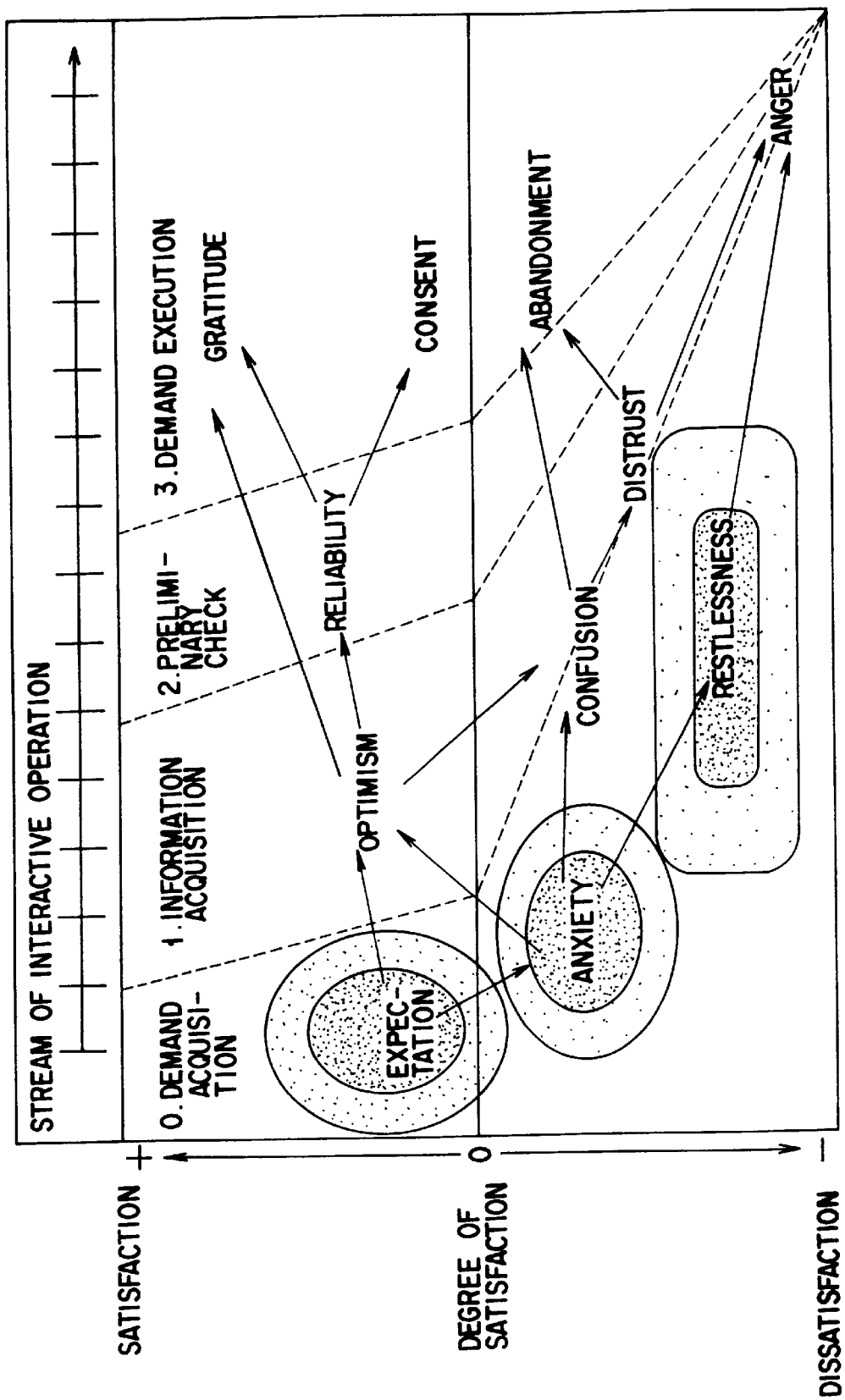
F I G. 162

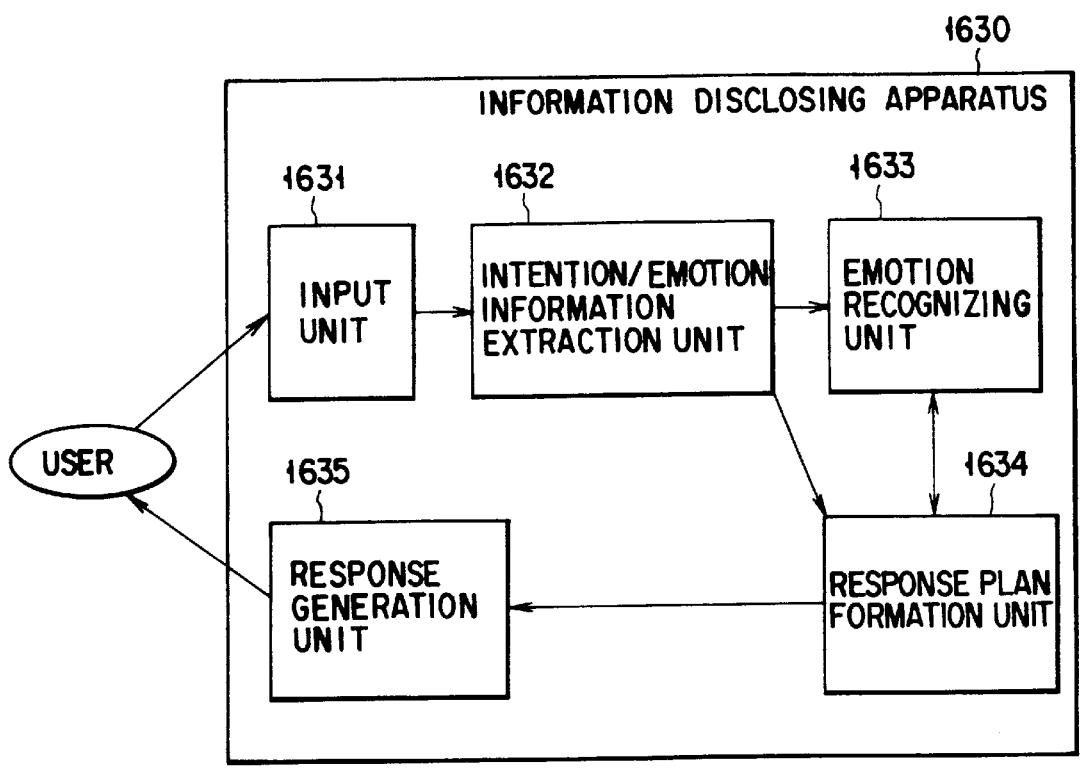
F I G. 163

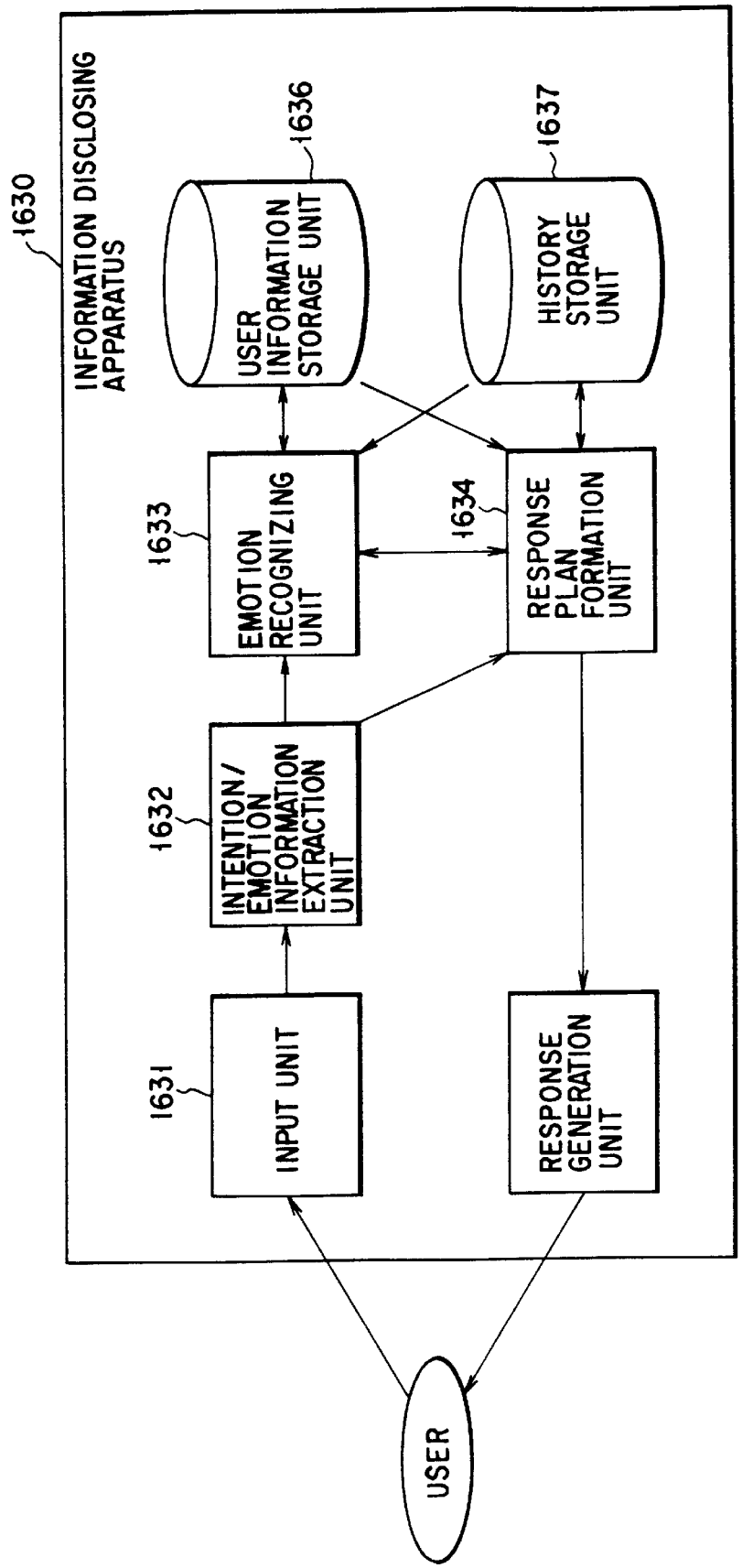
F I G. 164

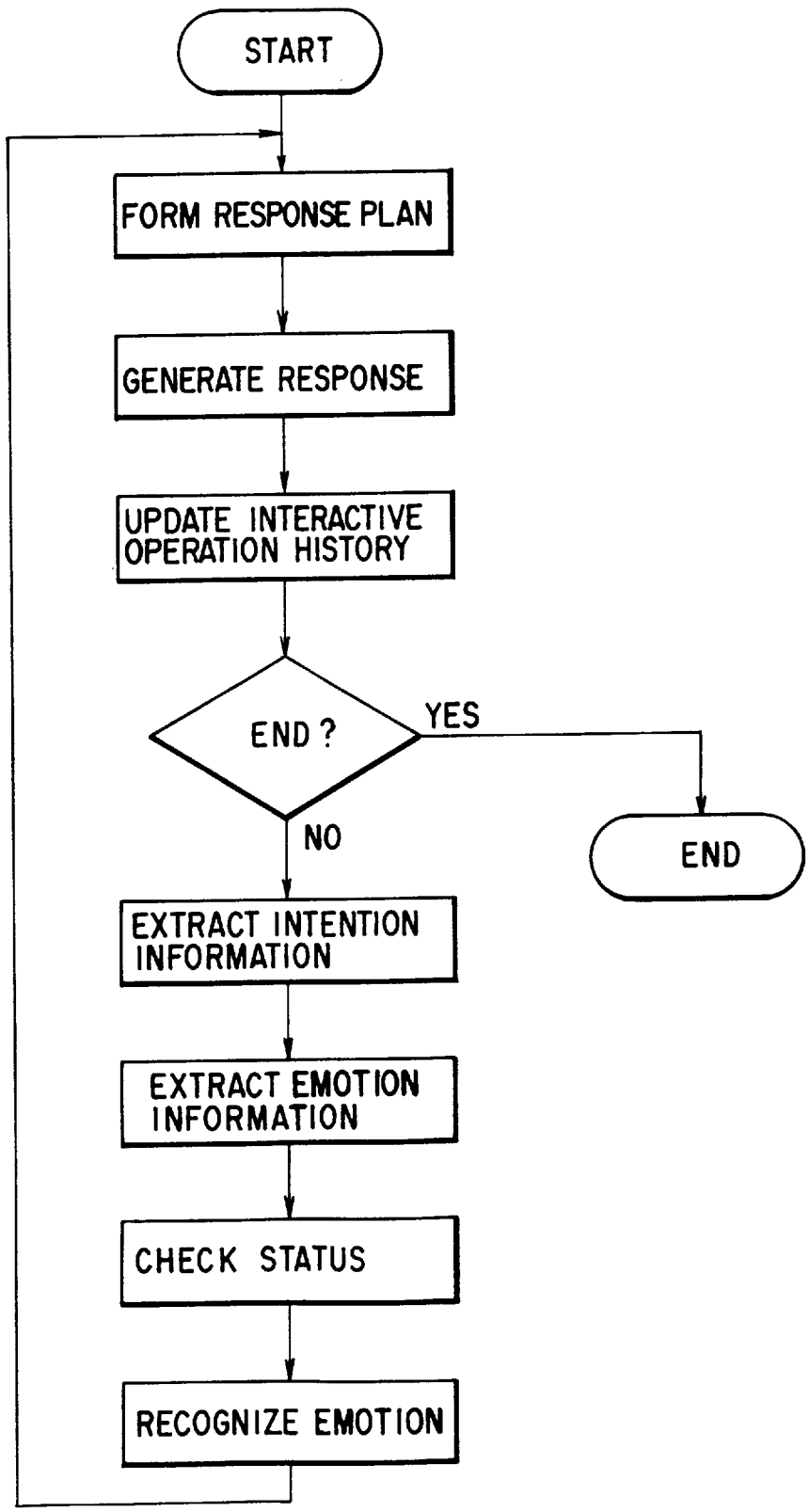
F I G. 167

| TYPE OF DEMAND | LIKELIHOOD VALUE | EXECUTION CONDITION | TRANSITION DESTINATION | PRIORITY |
|---|---|---|---|---|
| SCHEDULE RETRIEVAL | 0.4 | RETRIEVAL CONDITION = $x, y \ni x \in \{date\}$ or RETRIEVAL CONDITION = $x, y \ni x, y \in \{act, title, place, week, month\}$ | INFORMATION ACQUISITION | 1 |
| MASSAGE | 0.6 | CONTENTS OF MESSAGE = φ CHECK BY USER = Yes | INFORMATION ACQUISITION PRELIMINARY CHECK | 1 2 |
| END | 0.7 | | | |
| DIRECT INTERACTIVE OPERATION | 0.9 | STATUS OF PARTNER = OK CHECK BY USER = Yes | ACQUIRE DEMAND PRELIMINARY CHECK | 1 2 |
| | | | | |

F I G. 170

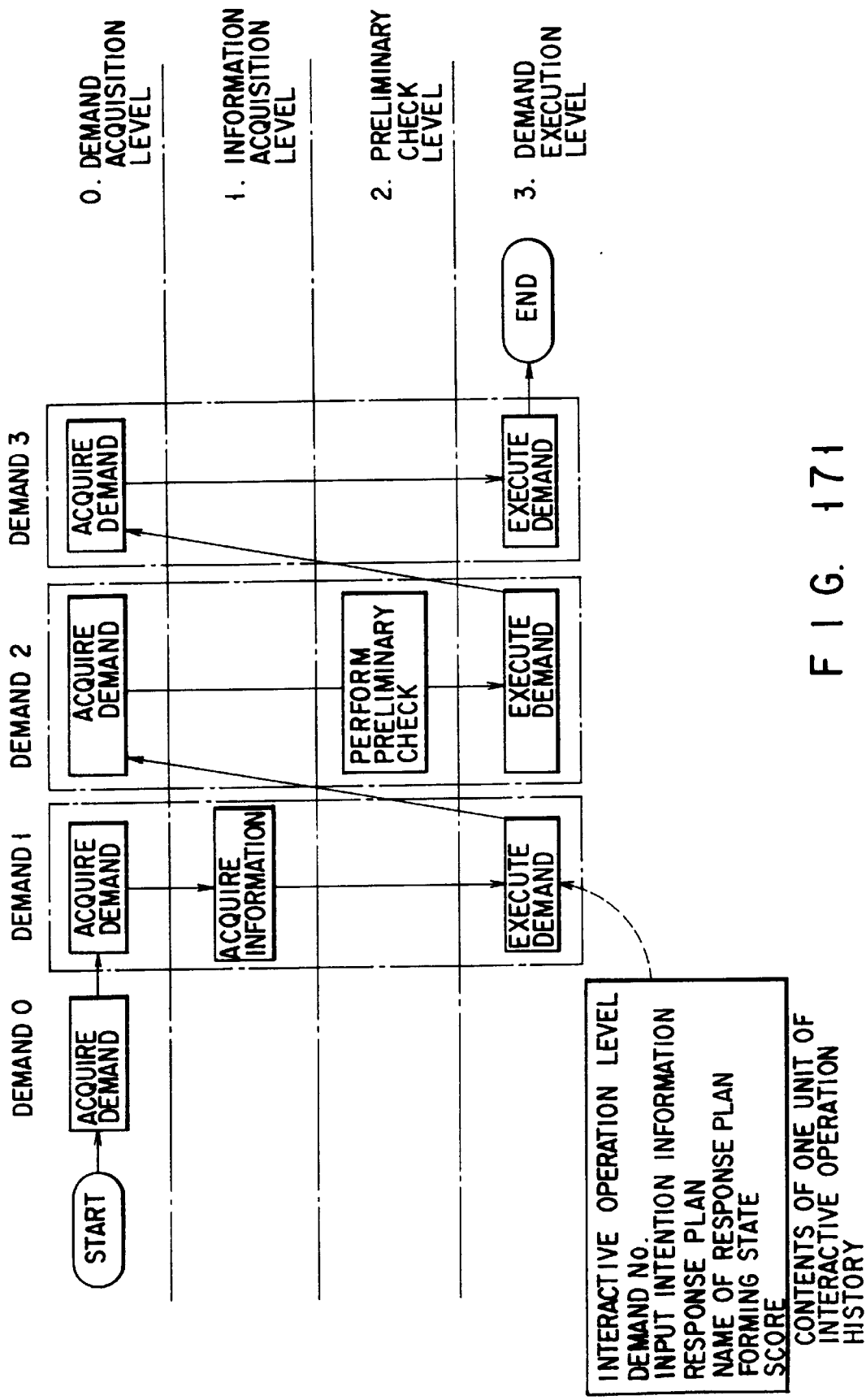
F I G. 171

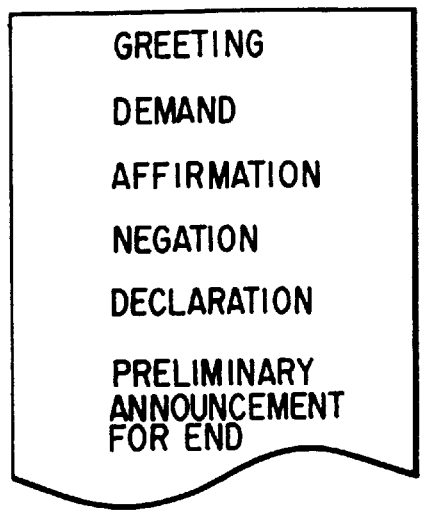

GREETING
DEMAND
AFFIRMATION
NEGATION
DECLARATION
PRELIMINARY ANNOUNCEMENT FOR END

FIG. 172

| DEMAND TARGET | CONTENTS OF DEMAND | | | |
|---|---|---|---|---|
| SCHEDULE | LOOK-UP | CHANGE | ADDITION | DELETION |
| DOCUMENT | LOOK-UP | CHANGE | ADDITION | DELETION |
| INFORMATION | LOOK-UP | CHANGE | ADDITION | DELETION |
| MESSAGE | LOOK-UP | CHANGE | ADDITION | DELETION |
| HISTORY | LOOK-UP | CHANGE | ADDITION | DELETION |
| | ANSWER | | | |
| | EXPLANATION | | | |
| | WAITING | | | |
| | DIRECT INTERACTIVE OPERATION | | | |

FIG. 173

FORMAT OF KEYWORD DICTIONARY

```
KEYWORD: SEMANTIC EXPRESSION (LIKELIHOOD, STRENGTH)
         [, SEMANTIC EXPRESSION (LIKELIHOOD, STRENGTH)];

TYPE OF SEMANTIC EXPRESSION
CATEGORY                            talk,request,act,month,date...
CATEGORY + ATTRIBUTE                monthtail,monthtop,monthend
CATEGORY (+ATTRIBUTE)-ITEM VALUE    weekend-THIS WEEK
                                    placetail-CONFERENCE ROOM
```

FIG. 174A (b) DESCRIPTION EXAMPLES

```
...MONTHS LATER ; monthtail-MONTHS LATER (7,5);
...MONTHS AGO ;   monthtail-MONTHS AGO (7,5);
YESTERDAY; date-YESTERDAY (9,5);
           ┆
           ┆
DATE: date-?(6,5):
DUE DATE; todate-?(6,5):
           ┆
           ┆
→ CONFERENCE; acttail-CONFERENCE (8,5),
              act-CONFERENCE (7,5);
  CONFERENCE ROOM; placetail-CONFERENCE ROOM(8,5)
                   place-CONFERENE ROOM (7,5):
           ┆
  WEEKEND; weekend-THIS WEEK (9,5);
  THIS MORNING; time-MORNING (8,5);
→ NEXT TIME; tense-NEXT TIME (7,5);
  TODAY; date-TODAY (9,5);
  TONIGHT; time-NIGHT (8,5);
           ┆
→ DATE; schedule (9,5);
           ┆
```

FIG. 174B

FORMAT EXAMPLE OF INPUT SEMANTIC EXPRESSION

UTTERANCE NO., SENTENCE NO., SENTENCE PATTERN, LIKELIHOOD VALUE, STRENGTH VALUE, TYPE OF INTENTION, CONTENTS OF INTENTION, TYPE OF ITEM, NAME OF ITEM, PLACE, PARTICIPANT, TENSE, START MONTH, START DAY OF MONTH, START WEEK, START DAY OF WEEK, START TIME, END MONTH, END DAY OF MONTH, END WEEK, END DAY OF WEEK, END TIME, OTHERS

F I G. 175A

CONVERSION EXAMPLES OF INPUT SENTENCES

INPUT SENTENCE 1 = THERE IS SOMETHING I WANT TO ASK YOU.
1,1, DECLARATIVE, 7,5, affirmation INPUT SENTENCE 2 = DO YOU KNOW THE DATE OF THE NEXT CONFERENCE ?
2,1, INTERROGATIVE, 9,5, request, schedule, CONFERENCE...NEXT....

INPUT SENTENCE 3 = I WONDER IF IT IS THE FIRST HALF OF THIS WEEK.
3,1 INTERROGATIVE, 4,5, request, schedule.... THIS WEEK-FIRST HALF....

INPUT SENTENCE 4 = I'M SORRY, BUT WILL YOU LEAVE A MESSAGE TO CHANGE THE TIME OF THE CONFERENCE ON THE 18TH DAY OF THIS MONTH TO THE MORNING TIME?
4,1, INTERROGATIVE, 7,5, request, message, CONFERENCE, I'M SORRY, BUT I WANT TO CHANGE THE TIME OF THE CONFERENCE ON THE 18TH DAY OF THIS MONTH TO THE MORNING TIME...18TH DAY OF THIS MONTH.....MORNING TIME.....

INPUT SENTENCE 5 = I TRUST IT TO YOUR DISCRETION
5,1, DECLARATIVE, 6,5, affirmation.....

INPUT SENTENCE 6 = YES
6,1, DECLARATIVE, 6,5, affirmation.....

F I G. 175B

| [COMFORT-DISCOMFORT] | USER'S EVALUATION FOR USER PREDICTION, CONTNENTS OF SYSTEM RESPONSE, AND EXECUTION RESULT |
|---|---|
| [ACCEPTANCE-REJECTION] | USER'S ATTITUDE FOR SYSTEM ITSELF AND CONTENTS OF SYSTEM RESPONSE |
| [COMPOSURE-PRESSURE] | DESIRE FOR ACHIEVING USER DEMAND<br>$\updownarrow$ ------ FEELING RESULTING FROM DIFFERENCE<br>ACTUAL ACHIEVEMENT STATUS |

F I G. 176

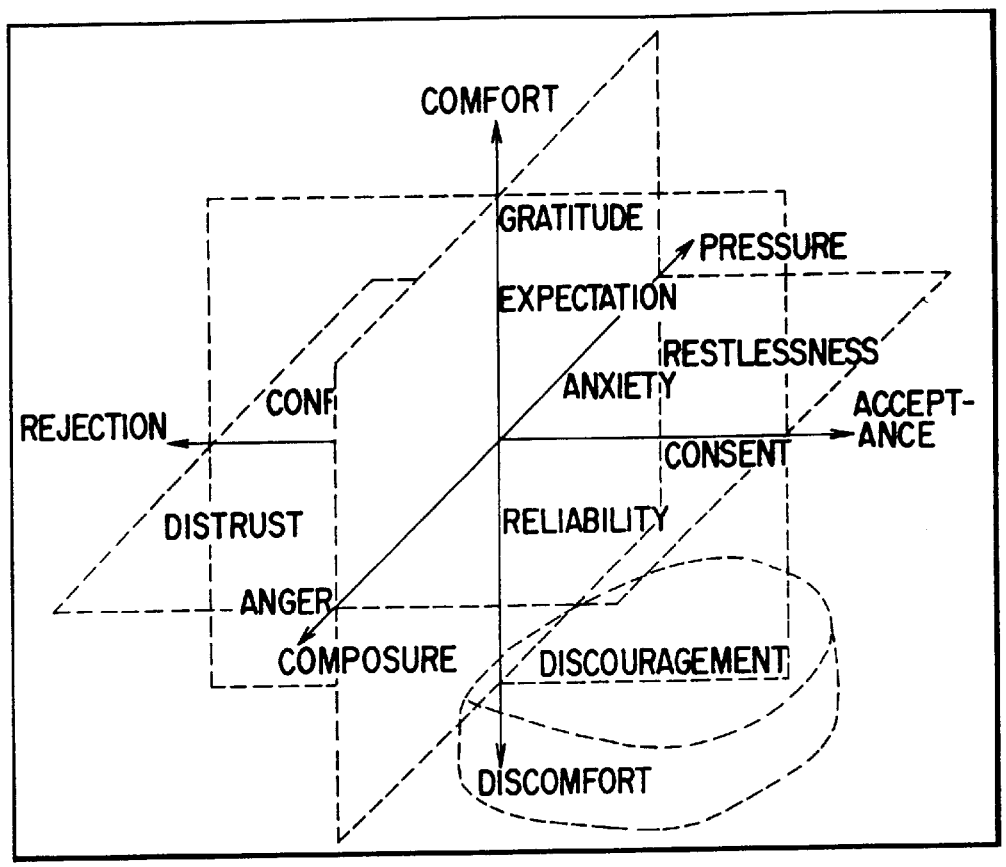
F I G. 177
| NAME OF FEELING | REGION | | |
|---|---|---|---|
| | [COMFORT-DISCOMFORT] | [ACCEPTANCE-REJECTION] | [COMPOSURE-PRESSURE] |
| EXPECTATION | 3>x>-1 | 3>y>-3 | 1>z>-3 |
| ANXIETY | 1>x>-3 | 3>y>-3 | 1>z>-3 |
| RESTLESSNESS | 1>x>-4 | 1>y>-4 | -2>z |
| | | | |
F I G. 178

FIG. 180A

| FORMING STAGE | RESPONSE PLAN | | EXAMPLES OF TEXT RESPONSE SENTENCES | |
|---|---|---|---|---|
| | TYPE OF INTENTION | CONTENTS OF INTENTION | DECLARATIVE SENTENCE | INTERROGATIVE SENTENCE |
| START | greeting | | HELLO! | |
| DEMAND ACQUISITION | request | order | PLEASE LET ME KNOW WHAT YOU WANT. | WHAT CAN I DO FOR YOU? |
| | suggest | message schedule | | SHALL I LEAVE A MESSAGE? SHALL I EXHIBIT THE SCHEDULE? |
| | | talk | | DO YOU WANT TO DIRECTLY TALK WITH HIM/HER? |
| | confuse | | I CAN'T UNDERSTAND WHAT YOU'VE SAID. | |
| DEMAND CHECK | confuse | message | YOU MEAN THE MESSAGE. | DO YOU WANT LEAVE A MESSAGE? |
| | | schedule | YOU MEAN THE SCHEDULE. | DO YOU ASK ABOUT THE SCHEDULE? |
| | | state | YOU MEAN CURRENT STATUS. | DO YOU WANT TO KNOW ABOUT THE CURRENT STATUS? |
| | | talk | YOU MEAN YOU WANT TO DIRECTLY TALK WITH HIM/HER. | DO YOU WANT TO DIRECTLY TALK WITH HIM/HER? |
| | | quit | YOU MEAN YOU HAVE NOTHING YOU WANT. | IS THERE ANYTHING I CAN DO? |
| | chime | | YES. | |
| INFORMATION ACQUISITION | request | message schedule | I WILL LEAVE YOUR MESSAGE. PLEASE ENTER THE DATE. | WHAT IS YOUR MESSAGE? WHICH CONFERENCE? |

FIG. 180B

| | | | MAY I LEAVE YOUR MESSAGE AS.... IS IT YESTERDAY'S CONFERENCE? WILL YOU DIRECTLY TALK WITH HIM/HER? |
|---|---|---|---|
| PRELIMINARY CHECK | confirm | message | YOUR MESSAGE IS.... |
| | | schedule | YOU MEAN YESTERDAY'S CONFERENCE. |
| | | talk | I'M GOING TO DIRECTLY CONNECT THE LINE WITH HIM/HER. |
| | request | wait | JUST A MOMENT |
| DEMAND EXECUTION | accept | message | AGREED! |
| | | schedule | I'LL CHECK IT. |
| | | talk | I'M GOING TO CONTACT HIM/HER. |
| | answer | schedule | IT IS AKABANE. |
| | | state | HE/SHE IS IN THE CONFERENCE. |
| | sorry | | I'M VERY SORRY. |
| | reject | schedule | I CAN'T FIND THE SCHEDULE. |
| | | state | I'M SORRY, BUT I CAN'T FIND IT. |
| | | talk | I CAN'T CONTACT HIM/HER. |
| | goodbye | | THANK YOU VERY MUCH. |

[ID, ID, pattern, times, intent, reqest, other, ]
  SENTENCE NO.  TYPE OF INTENTION  ITEM
UTTERANCE NO.  COUNT  CONTENTS OF INTENTION
         SENTENCE PATTERN TYPE OF INTENTION        accept, answer, chime, confirm, confuse, goodbye, greeting,
                         reject, request, sorry, suggest, thanks,
CONTENTS OF INTENTION    schedule, talk, state, message, order, wait,
SENTENCE PATTERN         INTERROGATIVE SENTENCE, DECLARATIVE SENTENCE, .....
ITEM INSCRIPTION METHOD                    EXAMPLE
        TIME FORMAT      00:mm    15:15
        QUESTION         ?        date = ?
ADDITIONAL INFORMATION   —        YAMAMURA-TL & SHIRAISHI-MANAGER
FORMAT FOR "MANY"        &        YAMAMOTO & SATO

FIG. 181

1,1, DECLARATIVE, 0, greeting
1,2, DECLARATIVE, 0, request, order,,
GENERATED SENTENCE 1 = HELLO! LET ME KNOW WHAT YOU WANT.

2,1, INTERROGATIVE, 0, request, order,,,
GENERATED SENTENCE 2 = WHAT CAN I DO FOR YOU?

3,1, INTERROGATIVE, 0, request, schedule, act=CONFERENCE&date?
GENERATED SENTENCE 3 = ABOUT WHAT TIME WILL THE CONFERENCE BE HELD?

4,1, DECLARATIVE, 0, confirm, schedule, act=CONFERENCE & week=THIS WEEK-FIRST HALF,
4,2, DECLARATIVE, 0, request, wait
4,3, DECLARATIVE, 0, answer, schedule, place=A CONFERENCE ROOM&month=7&date=18&time=15:00&title= PROGRESS FOLLOW-UP, 4,4, INTERROGATIVE, 1, request, order,,,
GENERATED SENTENCE 4 = IT IS ABOUT THE PROGRESS FOLLOW-UP IN THE (KIG) CONFERENCE ROOM FROM 15:00 ON THE 18TH OF THIS MONTH. IS THERE ANYTHING ELSE I CAN DO?

5,1, INTERROGATIVE, 0, confirm, message, title=I'M SORRY, BUT PLEASE CHANGE THE SCHEDULE OF THE CONFERENCE ON THE 18TH TO SOME MORNING TIME.
GENERATED SENTENCE 5 = IS IT OK TO LEAVE YOUR MESSAGE AS "I'M SORRY, BUT PLEASE CHANGE THE SCHEDULE OF THE CONFERENCE ON THE 18TH TO SOME MORNING TIME"?

6,1, DECLARATIVE, 0, accept, message,,
6,2, INTERROGATIVE, 2, request, order,,,
GENERATED SENTENCE 6 = OK. IS THERE ANYTHING ELSE I CAN DO?

7,1, DECLARATIVE, 0, goodbye,,,
GENERATED SENTENCE 7 = THANK YOU FOR YOUR ACCESS.

F I G. 182

FORMAT EXAMPLE OF RESPONSE SENTENCE EXAMPLE DICTIONARY intent.(request,pattern[,other]);sentence;

TYPE OF          CONTENTS OF  SENTENCE,  PATTERN        EXAMPLE SENTENCE
INTENTION.       INTENTION.                ITEM (IF ANY).

FIG. 183A

DESCRIPTION EXAMPLES OF DICTIONARY request(schedule, questionable. act, date=?); ABOUT WHAT TIME WILL $act BE HELD?

request(schedule, questionable. act, palce=?); WHERE WAS $act HELD?

request(schedule, questionable. act, time=?);DO YOU KNOW THE START TIME OF $act?

FIG. 183B

| ID, | ID, | pattern, | times, | N, | N, | intent, | request, | other, |

UTTERANCE NO., SENTENCE NO., SENTENCE PATTERN, COUNT, ATTITUDE INTIMACY, TYPE OF INTENTION, ITEM CONTENTS OF INTENTION.

TYPE OF INTENTION: accept, answer, chime, confirm, confuse, goodbye, greeting, reject, request, sorry, suggest, thanks, . . . . . .

CONTENTS OF INTENTION: schedule, talk, state, message, order, wait, . . . . . .

SENTENCE PATTERN: questionable, affirmative

ITEM INSCRIPTION METHOD: EXAMPLE

TIME FORMAT: 00:mm   15:15

QUESTION: ?   date=?

ADDITIONAL INFORMATION: —   YAMAMURA-TL & SHIRAISHI- MANAGER

FORMAT FOR "MANY": &   YAMAMOTO & SATO

FIG. 184

1.1, DECLARATIVE, 0,4,0, greeting...,
1.2, DECLARATIVE, 0,4,0, request, order...,
GENERATED SENTENCE 1 = HI! MR. SATO. PLEASE LET ME KNOW WHAT YOU WANT?

2.1, INTERROGATIVE, 0,4,0, request, order...,
GENERATED SENTENCE 2 = WHAT DO YOU WANT?

3.1, INTERROGATIVE, 0,4,0, request, schedule, act=CONFERENCE & date=?
GENERATED SENTENCE 3 = WHICH CONFERENCE?

4.1, DECLARATIVE, 0,4,0, confirm, schedule, act=CONFERENCE & week=THIS WEEK-FIRST HALF
4.2, DECLARATIVE, 0,4,0, request, wait...,
4.3, DECLARATIVE, 0,4,0, answer, schedule, place=A CONFERENCE & month =7 & date =18 & time =15:00 & title PROGRESS FOLLOW-UP.

4.4, INTERROGATIVE, 1,4,0, request, order...,
GENERATED SENTENCE 4 = IT IS THE CONFERENCE IN THE FIRST HALF OF THIS WEEK, ISN'T IT? JUST A MOMENT. IT IS PROGRESS FOLLOW-UP IN THE A CONFERENCE ROOM FROM 15:00 ON THE 18TH. ANYTHING ELSE?

5.1, INTERROGATIVE, 0,4,0, confirm, message, title=I'M SORRY BUT I WANT TO CHANGE THE DATE OF THE CONFERENCE ON THE 18TH TO SOME MORNING TIME.
GENERATED SENTENCE 5 = OK. DO YOU WANT LEAVE YOUR MESSAGE "I'M SORRY BUT I WANT TO CHANGE THE DATE OF THE CONFERENCE ON THE 18TH TO SOME MORNING TIME"?

6.1, DECLARATIVE, 0,4,0, accept, message,
6.2, INTERROGATIVE, 2,4,0, request, order...,
GENERATED SENTENCE 6 = OK. ANYTHING ELSE?

7.1, DECLARATIVE, 0,4,0, goodbye...,
GENERATED SENTENCE 7 = OK. SEE YOU!

FIG. 185

| STRATEGY | FEELING | CONDITION BEFORE CHANGE | CHANGE | EFFECT |
|---|---|---|---|---|
| HUMBLE ONESELF | ANGER<br>CONSENT<br>DISTRUST | 1<INTIMACY<3, 1<ATTITUDE<3<br>0<INTIMACY<3, ATTITUDE<3<br>0<INTIMACY, ATTITUDE<3 | INTIMACY−1, ATTITUDE+1<br>INTIMACY−1, ATTITUDE+1<br>INTIMACY−1, ATTITUDE+1 | +1<br>+1<br>+1 |
| BECOME FORMAL | ANGER<br>ANXIETY<br>CONSENT<br>CONFUSION<br>GRATITUDE<br>RESTLESS-NESS | INTIMACY<=1, ATTITUDE<3<br>0<ATTITUDE<3<br>2<INTIMACY, ATTITUDE<3<br>1<INTIMACY, ATTITUDE<3<br>INTIMACY<3, ATTITUDE<3<br>1<INTIMACY, 2<ATTITUDE | ATTITUDE+1<br>ATTITUDE+1<br>ATTITUDE+1<br>ATTITUDE+1<br>ATTITUDE+1<br>INTIMACY−1 | +1<br>+1<br>+1<br>+1<br>+1<br>+1 |
| FLATTER | GRATITUDE<br>CONSENT | 0<INTIMACY<3, 1<ATTITUDE<br>0<INTIMACY<3, 0<ATTITUDE<3 | INTIMACY+1, ATTITUDE+1<br>INTIMACY+1, ATTITUDE+1 | +1<br>+1 |
| BE FRANK | GRATITUDE<br>EXPECTA-TION | 2<INTIMACY<4, 0<ATTITUDE<3<br>0<INTIMACY<4<br>2<INTIMACY, 0<ATTITUDE<3 | INTIMACY+1, ATTITUDE−1<br>INTIMACY+1<br>ATTITUDE−1 | +1<br>+1<br>+1 |

FIG. 186

```
answer(schedule, affirmative, place, act, INTIMACY=0-1, ATTITUDE=0):$act IN $place.
answer(schedule, affirmative, place, act, INTIMACY=0-1, ATTITUDE=2-3):$act IS IN $place.
answer(schedule, affirmative, place, act, INTIMACY=0-1, ATTITUDE=2-3):$act IS IN $place, SIR(MA'AM) THOUGH
answer(schedule, affirmative, place, act, INTIMACY=2-4, ATTITUDE=0):$act IS IN $place, ISN'T IT?
answer(schedule, affirmative, place, act, INTIMACY=2-4, ATTITUDE=2-3):$act IS IN $place, SIR(MA'AM)
answer(schedule, affirmative, place, act, INTIMACY=2-4, ATTITUDE=2-3):YES, $act IS IN $place greeting(affirmative, INTIMACY=1, ATTITUDE=1, MORNING): GOOD MORNING
greeting(affirmative, INTIMACY=1, ATTITUDE=1-3, NOON): HELLO!
greeting(affirmative, INTIMACY=1, ATTITUDE=1-3, NOON): GOOD EVENING
greeting(affirmative, INTIMACY=1, ATTITUDE=2-3, MORNING):GOOD MORNING, SIR (MA'AM)
greeting(affirmative, INTIMACY=2-3, ATTITUDE=1-3, NOON):HELLO!    MR. (MISS) $user
greeting(affirmative, INTIMACY=2-3, ATTITUDE=1-3, NIGHT):GOOD EVENING, MR. (MISS) $user
greeting(affirmative, INTIMACY=2-3, ATTITUDE=2-3,        ): THANK YOU FOR YOUR COOPERATION MR.(MISS) $user
greeting(affirmative, INTIMACY=2-3, ATTITUDE=2-3 MORNING: GOOD MORNING SIR(MA'AM) MR(MISS) $user
greeting(affirmative, INTIMACY=2-4, ATTITUDE=0-1, NOON):HELLO! MR. (MISS) $user
greeting(affirmative, INTIMACY=2-4, ATTITUDE=0-1, MORNING): GOOD MORNING MR.(MISS) $user
greeting(affirmative, INTIMACY=2-4, ATTITUDE=0-1, NIGHT): GOOD EVENING. MR. (MISS) $user
greeting(affirmative, INTIMACY=3-4, ATTITUDE=1-3, NOON): HELLO! MR. (MISS) $user
greeting(affirmative, INTIMACY=3-4, ATTITUDE=1-3, NIGHT): GOOD EVENING. MR. (MISS) $user
greeting(affirmative, INTIMACY=4, ATTITUDE=1, MORNING): GOOD MORNING. MR. (MISS) $user
greeting(affirmative, ATTITUDE=1,       ):HOW DO YOU DO?
greeting(affirmative, ATTITUDE=2-4,     ):HOW DO YOU DO?   MR. (MISS) $user
```

2, 1, INTERROGATIVE, 0, 2, 1, request, order, FEELING = EXPECTATION

GENERATED SENTENCE 2 = WHAT CAN I DO FOR YOU 3, 1, INTERROGATIVE, 0, 2, 1, request, order, FEELING = ANXIETY GENERATED SENTENCE 3 = I CAN LOOK UP THE YAMAMOTO'S SCHEDULE, LEAVE A MESSAGE TO YAMAMOTO, OR DIRECTLY CONNECT THE LINE TO YAMAMOTO ? WHAT WOULD YOU LIKE TO SELECT ?

4, 1, INTERROGATIVE, 0, 2, 1, request order FEELING = CONFUSION

GENERATED SENTENCE 4 = WHICH WOURD YOU LIKE TO SELECT THE SCHEDULE, THE MESSAGE, AND DIRECT LINE CONNECTION ?

5, 1, INTERROGATIVE, 0, 2, 1, request, order, FEELING = RESTLESSNESS

GENERATED SENTENCE ·5 = WILL YOU PLEASE ENTER YOUR CHOICE FROM THE END, THE SCHEDULE, THE MESSAGE, AND DIRECT LINE CONNECTION ?

6, 1, INTERROGATIVE, 0, 2, 1, request order FEELING = ANGER

GENERATED SENTENCE 6 = I'M SORRY, BUT I CANNOT UNDERSTAND WHAT YOU WANT. WHEN YOU ENTER DIRECT LINE CONNECTION YAMAMOTO WILL DIRECT TALK WITH YOU. DO YOU WANT THIS ?

| ID. | ID. | pattern. | times. | N. | N. | N. | N. | intent. | request. | other. | ITEM |
|---|---|---|---|---|---|---|---|---|---|---|---|

SENTENCE PATTERN — TYPE OF INTENTION CONTENTS OF INTENTION

UTTERANCE NO., SENTENCE NO., COUNT, REDUNDANCY, CONFORMITY, ACCURACY, SUPERIORITY, DEGREE OF INFORMATION DISCLOSURE

RESPONSE GENERATION EXAMPLES IN DIFFERENT RESPONSE POLICIES 5,1, DECLARATIVE, 0, 3,3,5,3,3, reject, talk, reason= DRAFTING PATENT SPECIFICATION
GENERATED SENTENCE 5 = I'M SORRY, BUT YAMAMOTO CANNOT TALK TO YOU BECAUSE HE IS DRAFTING THE PATENT SPECIFICATION 5,1, DECLARATIVE, 0, 4,3,1,3,1, reject, talk, reason= DRAFTING PATENT SPECIFICATION
GENERATED SENTENCE 5 = I'M SORRY, BUT YAMAMOTO CANNOT TALK TO YOU BECAUSE HE IS OUT 5,1, DECLARATIVE, 0, 3,0,5,3,3, reject, talk, reason = DRAFTING PATENT SPECIFICATION
GENERATED SENTENCE 5 = YAMAMOTO CANNOT TALK TO YOU BECAUSE HE IS DRAFTING THE PATENT SPECIFICATION 5,1, DECLARATIVE, 0, 5,4,4,2,3, reject, talk, reason= DRAFTING PATENT SPECIFICATION
GENERATED SENTENCE 5 = I'M SORRY, BUT YAMAMOTO CANNOT TALK TO YOU BECAUSE THE DUE DATE OF THE PATENT SPECIFICATION WHICH IS BEING DRAFTED BY YAMAMOTO IS CLOSE 5,1, DECLARATIVE, 0, 5,4,1,4,3, reject talk reason= DRAFTING PATENT SPECIFICATION
GENERATED SENTENCE 5 = I'M SORRY, BUT YAMAMOTO IS VERY BUSY AND CANNOT TALK TO YOU NOW 5,1, DECLARATIVE, 0, 1,1,3,5,3, reject talk reason= DRAFTING PATENT SPECIFICATION
GENERATED SENTENCE 5 = YAMAMOTO SAYS THAT HE HAS NO TIME

| STRATEGY | RESPONSE EXAMPLE | FEELING | CONDITION | EFFECT |
|---|---|---|---|---|
| PROPOSAL OF DIRECT INTERACTIVE OPERATION | DO YOU WANT MR. YAMAMOTO WILL TAKE MY PLACE? | ANGER | INTIMACY>2, ATTITUDE<2 | +2 |
| | | REST-LESSNESS | INTIMACY>1 | +3 |
| | ... | ... | ... | ... |
| FEELING CHECK | ARE YOU ANGRY? | ANGER | INTIMACY>2, ATTITUDE<1 | +2 |
| | ARE YOU IN A HURRY? | REST-LESSNESS | INTIMACY>2 | +1 |
| | ... | ... | ... | ... |
| CAUSE ACQUISITION | WHY ARE YOU ANGRY? | ANGER | INTIMACY>3, ATTITUDE<2 | +2 |
| CHANGE | I'M SORRY, PIP-B WILL TAKE MY PLACE. | ANGER | INTIMACY<2 | +1 |
| | ... | ... | ... | ... |
| APOLOGY | I'M SORRY. | ANGER | ... | +1 |
| INTENTION CHECK | I EAGER TO CHECK THE SCHEDULE. | ANGER | ... | ... |
| STATUS EXPLANATION | THE SCHEDULE FOR THE NEXT MONTH IS NOT INPUT YET. | ANGER | INTIMACY>1 | +1 |
| | ... | ... | ... | ... |
| COMPROMISE | OK. I'M GOING TO CHANGE TOMORROW'S SCHEDULE | ANGER | INTIMACY>3, ATTITUDE>2 | +1 |
| | ... | ... | ... | ... |
| PROPOSAL OF SUBSTITUTE | SHALL I CHECK THE SCHEDULE OF NEXT WEEK? | ANGER | INTIMACY>1 | +1 |
| | ... | ... | ... | ... |

F I G. 191A

| | | | | |
|---|---|---|---|---|
| PROVIDING OF ASSOCIATED INFORMATION | HE/SHE IS FREE IN THE NEXT MORNING. | ANGER | INTIMACY>2 | +1 |
| CONFORMITY | I'M SICK AND TIRED OF YAMAMOTO'S IRRESPONSIBLE BEHAVIOR | ANGER | INTIMACY>3, ATTITUDE<3 | +1 |
| SYMPATHY | | ANGER | INTIMACY>1, ATTITUDE<3 | +1 |
| ACCEPTANCE | I UNDERSTAND THE SITUATION | ANGER | ATTITUDE 3 | +1 |
| INCREASE IN SPEED OF INTERACTIVE OPERATION | I'M GOING TO DISPLAY THE SCHEDULE LIST OF THE NEXT WEEK. | ANGER | | +1 |
| DECREASE IN SPEED OF INTERACTIVE OPERATION | DO YOU KNOW THE DAY OF THE NEXT WEEK ON WHICH IT IS HELD? | ANGER | INTIMACY>2, ATTITUDE<3 | -1 |
| COMPLAINT | I ALSO HAVE A TROUBLE. | ANGER | INTIMACY>3, ATTITUDE<3 | -1 |
| SILENCE | | ANGER | ATTITUDE 2 | |
| TURNING-UP | I CANNOT ANSWER TO YOUR QUESTION ABOUT WHAT I DON'T KNOW | ANGER | INTIMACY<1, ATTITUDE<2 | -2 |
| NEGLECT | ANYTHING ELSE? | ANGER | INTIMACY<1, ATTITUDE<1 | -2 |

FIG. 191B

INFORMATION DISCLOSING APPARATUS AND MULTI-MODAL INFORMATION INPUT/OUTPUT SYSTEM

BACKGROUND OF THE INVENTION

1. Field of the Invention

The present invention relates to an information disclosing apparatus for disclosing data owned by individuals to third parties, and a multi-modal information input/output system.

2. Description of the Related Art (1) The environments of networks in each university and each business enterprise and networks connecting universities, business enterprises, or homes have been recently prepared. Along with the cost reduction in information communication equipments and memory devices, each individual can actively or passively receive to have a large amount of information. However, exchange of the large amount of information causes a flood with information. It becomes difficult for an end user to collect necessary information from wide network environments due to the limited capacity and time of the end user. Even a user who is familiar to a network to some extent is difficult to find information of a profession different from his own profession. Each end user relies on another user who may have necessary information or another user who may know the source of the information.

In environments where individual persons have a wealth of sources and are active, access to a user having an information collection and filtering capacity is concentrated. Even the user having such a capacity cannot take time only to provide information. It takes time to understand the contents of each individual question and provide a proper answer. Smooth information exchange is interfered by delays, omissions, and misunderstanding because such exchange is performed by a communication means on a network, thus further increasing the wasteful time.

In order to solve the above problem, there is provided a method in which information owned by each user is disclosed and searched by a necessary user as needed. It is difficult and takes time to exhibit an information structure which is accessible to any user. Information constantly increases and changes, and the information structure itself must be changed accordingly. To assure security and perform smooth communications, the range of information to be disclosed and its exhibition method must change depending on partners. These management operations are not enjoyable in proportion to the required time. Even a user familiar to data collection tends to stay away from these time-consuming operations. For this reason, most of users who have a large amount of information forget the locations of the information, and such information becomes dead information. A user who wants to find necessary information must find it from all pieces of information of another user who may have this information. When the information structure is complicated, the retrieval operation becomes time-consuming. The problem is posed even in use of an existing database if the user is not familiar to the retrieval function of this database. As a result, the filing capacity of each individual is not utilized.

In order to solve this problem, an agent function is proposed in which necessary information is collected from a network in response to an instruction given by a user. When the user does not have knowledge of information retrieval environments, an accurate instruction cannot be given. When a time lag is present from the input of an instruction to the end of retrieval or the report of a result, the deficiency of an instruction causes repetition of the trial and error, resulting in wasting the time. To solve this problem, it is difficult to realize an advanced instruction analysis function capable of causing an end user to simply input a complicated instruction, or to impart a wealth of knowledge for network environments to an agent.

If a retrieval destination is individual information, a time lag tends to occur because a permission must be obtained from an owner unless necessary information is obvious disclosed information. A user who discloses information is required for extra operations if the range of contents to be disclosed varies depending on different partners. Even a user who obtains or makes a permission may hate watching information of others or hate others to watch his own information. The pieces of information owned by each individual have different formats and structures. It is very difficult for an agent to notify all these different formats and structures. It is difficult to force to standardize these pieces of information because they are owned by different individuals.

An attempt has been made to virtually reproduce working place environments (virtual office) in a computer, a worker located in the working place is expressed as an agent, and simple question-answer processing is performed in accordance with a response from the agent even in the absence of a worker (Jpn. Pat. Appln. KOKAI Publication No. 6-95997). If the type of task is limited to a specific field, a multi-modal interface system sample capable of performing a sales operation in place of a salesperson is manufactured (e.g., Jpn. Pat. Appln. KOKAI Publication No. 5-216618). Such a system, however, has the outer appearance designed by a system designer and outputs responses based on predetermined knowledge expressions and response rules. The system is not developed to an end user so as to disclose individual information and knowledge of his own in an arbitrary form. If a system does not have a certain degree of freedom, the expressions of the user who discloses information cannot be satisfied. At the same time, a user who wants to obtain information cannot be interested in standardized answers. Therefore, this system may be used for only regular business operation information.

(2) Since computers have recently been popular, automation using computers has spread over in a variety of fields. At the same time, a natural interface is implemented so as to allow an end user to use a computer. In particular, along with the improvement of recognition techniques, research and development have been made for a multi-modal interface system capable of understanding the intention of a user from the natural language uttered by the user or an image or speech and responding to the user. A smooth interactive operation between a machine and a user is impossible without using various behaviors of users.

As in a video camera for a cash dispenser, the response history between users and the machine may often be recorded to assure the security and manage the system. In an information retrieval system involving charges and copyrights, a history representing a correspondence between specific information and a specific user who is provided with the specific information must be positively recorded.

A user who uses such a system worries about easy recording of a response history because this may infringe privacy and the right of likeness. A possibility of misuse of the response history is normally regarded to be low because the social pressure acts on an enterprise which manages the system. In a public message exchange system such as a message dial, a message registered once cannot be deleted, but a message can be checked and reentered prior to its registration. When a predetermined period of time has elapsed, the record is erased.

Along with the development of multi-modal interface techniques, it is possible for an end user to offer an information service through such a system. In this case, the management of a response history depends on the intention of the user who offers the service. A possibility of misuse of this response history becomes high because of a low social pressure acting on the end user and careless management. That is, a user who enjoys the service may not stand in front of a video camera or microphone with a sense of security.

(3) Along with the preparation of network environments, information collected by individuals tends to be actively shared by a plurality of users. Operations such as formation of an agent function on this network, disclosure of necessary individual information, or collection of other individual information have been considered.

Pieces of individual information disclosed to many and unspecified persons are classified into information which can be disclosed to users and information which cannot be disclosed to them. In addition, the disclosure enable range changes. That is, agent operations must change depending on different users.

The agent operations change depending on different users in the following attempt. The priority is determined in advance in accordance with the ranks, posts, and question contents of users, and the agent operations are decided in accordance with this priority. The reliability of a user for an agent (finally the reliability of a user for an information provider) is actually updated in every conversation. An agent is desired to take proper steps to meet the instantaneously changing statuses of users without being restricted to the rules. This also applies to Jpn. Pat. Appln. KOKAI Publication No. 6-95997 and Jpn. Pat. Appln. KOKOKU Publication No. 6-79304 in which the current status of an information provider is analyzed by an explicit user's demand to directly connect a line.

When an agent cannot meet the demand of a user, the right to answer is transferred to the information provider. It is easily anticipated that a line is directly connected to the information provider every time the agent cannot answer a question. In this case, the operation efficiency of the information provider is degraded, and an effect resulting from the use of an agent cannot be obtained.

In addition, the arrangement of acquired information in an optimal category, and setup of an appropriate disclosure range are time-consuming jobs to the information provider.

(4) Along with the development of database techniques and communication network techniques, a system having a variety of functions and forms has recently been proposed as a system for retrieving information demanded by a user and providing it to the user. For example, a database service retrieves information covered by a subscription to a user as a subscriber in accordance with a demand falling within a predetermined range and providing the retrieved information to the user. A CAI system provides an answer or teaching to a student's question so as to match the degree of familiarity of the student. A claim processing system and a guide system to a customer receives a demand in a form specified in each business operation and provides information. Jpn. Pat. Appln. KOKAI Publication No. 6-95997 proposes a method for automating an information providing job to the third party using an agent serving as a human agency business system.

These various types of information providing systems are effective in the corresponding services and business operations, and their forms are limited to provide predetermined specific data to specific users. For example, in a most advanced CAI system, information matching the degree of familiarity of students and the progress of curricula of students is effectively provided on the basis of the user model of students. The range of this most advanced CAI system aims at education in a specific field and is limited only to provide information to specific users as students.

At present as well as in the future, most of pieces of electronic information stored in a computer are data owned by individual persons at individual sites. Exchange of these pieces of information is performed through electronic mails, news systems, and the like. Each individual person manually acquires or provides information. The acquisition of information depends on knowledge associated with individual knowledge associated with specific locations and persons as information sources (e.g., human relationships and networks). Information is provided by only the voluntary activity of each individual person, e.g., by an answer to a question through an electronic mail. Under these circumstances, data owned by each individual person cannot be effectively utilized and are possessed among persons having a certain human relationship. The voluntary information exchange activity of each individual person is limited. The time and labor required to answer to a question through, e.g., an electronic mail cannot be neglected. Therefore, the information disclosing jobs performed by individual persons must be automated and supported.

Information has an indefinite form and makes it difficult to determine meanings and forms in advance. Users who demand to provide information personally are not classified as, e.g., customers in the database service and students in the CAI system. For this reason, the information disclosing system for regular business operations, as described above, cannot perform human agency business for flexible and careful information exchange performed between users. That is, a method of changing a method of providing information depending on different users and a means for setting conditions for changes in information providing method have not been established.

Conditions for disclosing information generally change over time, and no countermeasure is not taken for this problem. A means for correcting a system failure resulting from the inappropriate disclosure of information has not been realized, either.

Various problems are posed to realize an information disclosing apparatus for effectively and safely disclosing useful information, owned by individual persons, in place of users.

Data owned by individual persons have various meanings, forms, confidentialities, and the degrees of difficulty. Application programs for retrieving and presenting these data are not standardized. To arrange these data for disclosure is difficult and requires much labor.

Various types of persons are assumed as information demanders who demand information to information providers. It is difficult with much labor to assume all responses to the demands from the various types of persons. In particular, whether private information of an information provider is disclosed or how information within a specific range is disclosed depends on various factors such as the personal relationship between the information provider and an information demander, ages and sexes of the users, and organizations to which the users belong.

The confidentiality and the degree of difficulty of data owned by an information provider as well as the right and the degree of familiarity of an information demander dynamically change over time. Even if the method and limitations for disclosing a variety of information to a variety of persons are set in detail, these may become invalid with a lapse of time. Even if the information disclosing apparatus fails to provide information which can meet a user's demand, it is desired not to repeat the failure in the same status.

As has been described above, a conventional information disclosing apparatus has the following problems:

(1) A large amount of information collected by individual persons cannot be easily disclosed in a conventional information disclosing apparatus. There is no means for adjusting the degree of disclosure from an information owner to specific types of persons.

(2) In a conventional information disclosing apparatus, a response history is managed by a person who owns the information disclosing apparatus. For this reason, a user who feels doubt to the manager of the response history cannot use this information disclosing apparatus.

(3) The conventional information disclosing apparatus does not have a means for dynamically reflecting the status of a user and its change in a negotiation step with an agent and disclosing information so as to take proper steps to meet instantaneously changing status of the user.

There is no means for grasping the status of an information provider and considering an effective countermeasure to the information provider.

There are neither a means for arranging acquired information in a proper category nor a means for reflecting a negotiation process and other negotiations and flexibly correcting the disclosure range.

(4) The conventional information disclosing apparatus has no means for providing countermeasures for a personal relationship between an information provider and an information demander which dynamically changes with time or for the confidentiality and the degree of difficulty of data owned by the information provider. Therefore, it is difficult to constantly disclose information in an easy and appropriate form.

In recent years, human interfaces employing a plurality of information transmission means possessed by men, such as a natural language interface/multi-modal interface, have been enthusiastically created.

In addition to a variety of media, transmission of emotions between speakers plays an important role as a factor for efficiently progressing interactive operations. In practice, the interactive operations do not often reach a conclusion due to differences in contextual recognition and interpretation of utterance intentions between speakers. These circumstances necessitate an apparatus for supporting extraction/recognition/transmission of the psychological status or emotions of a speaker.

As for recognition and understanding, and synthesis of the intention and emotional information of speech, a variety of studies have been reported, such as Kanazawa et. al. (Journal of the Electronics, Information, and Communication Engineers of Japan D-11, Vol. J77-D-11, No. 8, pp. 1,512–1,521) and Cahn et. al. ("Generating Expression in Synthesized Speech", Technical Report, Masachusett Institute of Technology, 1990).

These are based on "rhythmic information" such as the pitch and accents of speech signals, and intention information and emotional information such as anger, joy, sorrow, agreement, admiration, and connection are recognized/understood and generated.

An attempt has been made to recognize emotions from a character string expressing emotions in a text. Examples are Fujimoto et. al. proposing a scheme (Jpn. Pat. Appln. KOKOKU Publication No. 6-822376) in which emotional information included in a word string is extracted using an emotion dictionary registered upon numerical conversion of emotional information in units of words and a scheme (Jpn. Pat. Appln. KOKOKU Publication No. 6-822377) having rules for converting the emotion information on the basis of a syntactic analysis result.

The above schemes extract emotions included in one sentence or utterance, but do not recognize the emotions of a user throughout the interactive operation. In practice, the emotions of users often vary depending on situations or statuses even if the same utterance or verbal expression is used. In addition, utterances or verbal expressions for expressing the emotions vary depending on different users.

An attempt has been made to recognize the emotions of main characters in accordance with the narration of a story. Studies by W. G. Lehnert et. al. ("The Role of Affect in Narrative Structure", Cognition and Emotion, 1987, pp. 299–322) and M. G. Dyer ("Emotions and their Computations: Three Computer Models", 1987, Lawrence Erlbaum Associates Limited) have been reported. The situation is recognized in accordance with sentences described in a natural language to reason the emotional states of the main characters. The verbal expression and situation which represent emotions are extracted from the narration of the story. However, the emotions and situation using only the contents of utterances and conversations of the main characters is not recognized.

Interactive systems having chat structure models to generate appropriate responses for the utterance intentions of users have also been extensively studied. Examples of interactive operations of texts are proposed by Sumida et. al. ("Consideration of Naturalness of Responses in Question-Answer System", Shigaku Giho NLC86-16, pp. 25–32, 1986) and Ukita et. al. ("Equipment Manipulation Guide System by Natural Language Input", Shigaku Giho OS-88-18, pp. 13–18, 1988). An example of interactive operations of speech is proposed by Araki et. al. ("Understanding of Utterances Using Structure of Interactive Operations and Concept of Words", Joho Shori Gakkai, 42nd National Meeting, 3, pp. 61–62, 1991). These prior arts aim at recognizing a user's intention corresponding to the situation from a user's utterance or input text and generating an appropriate response. However, they do not recognize the emotions of the user.

In an information disclosing apparatus and a multi-modal information input/output system described in Japanese Patent Application No. 7-86266, emotion recognition is decided using emotion information included in one sentence or utterance. Information associated with the status of an interactive operation is not utilized.

As described above, no conventional information disclosing apparatus has a means for analyzing the emotions of a user on the basis of the status of the interactive operation. For this reason, it becomes difficult to generate a response in consideration of the emotions of the user. Misunderstanding occurs in the interactive operations to erroneously understand the intention of the user. In this manner, an unnecessary mental load is imposed on the user.

SUMMARY OF THE INVENTION

An object of the present invention is to provide an information disclosing apparatus for interactively disclosing information as an agent of each individual owner who owns information.

Another object of the present invention is to provide an information disclosing apparatus capable of reflecting the intention of an information demander in management of a response history between the information disclosing apparatus and the information demander as a user.

Yet another object of the present invention is to provide an information disclosing apparatus capable of dynamically analyzing the statuses of an information demander and an information provider who are users and selecting an appropriate countermeasure to both the information provider and the information demander.

It is still another object of the present invention to provide a multi-modal information input/output system capable of understanding the intention, emotions, and status of a user and greatly improving the satisfaction and comfort of a user.

It is still another object of the present invention to provide an information disclosing apparatus capable of efficiently forming and correcting information associated with data to be disclosed and information associated with an information demander as a user, in order to disclose a variety of information owned by individual persons in a form suitable for a variety of types of persons.

(1) The present invention is characterized by comprising data storage means for storing data in a predetermined information form (e.g., a text, speech, an image, and a moving picture), information retrieval means for retrieving the data stored in the data storage means, demand reception means for receiving an information disclosure demand from an information demander, response rule storage means for storing general knowledge for generating a response responding to the information demander and personal relationship information associated with a unique personal relationship between a user having the data on an information provider side and a user on an information demander side, response plan formation means, responsive to the demand received by the demand reception means, for planning a response for exhibiting, to the information demander, data obtained by causing the information retrieval means to retrieve the data stored in the data storage means on the basis of the knowledge and the personal relationship information stored in the response rule storage means, and response generation means for generating the response to the information demander in accordance with the plan formed by the response plan formation means.

The present invention is preferably characterized in that the personal relationship information includes at least one of information associated with a social relationship between the user on the information provider side and the user on the information demander side, and information associated with an individual relationship therebetween.

The present invention is preferably characterized in that the response plan formation means plans a range of data to be disclosed to the information demander or contents of a message to the information demander in accordance with the personal relationship information.

The present invention is preferably characterized by further comprising response rule management means for performing formation, change, and addition for knowledge stored in the response rule storage means, wherein the response rule management means is preferably characterized to allow a specific user to perform formation, change, and addition for the knowledge stored in the response rule storage means.

The present invention is preferably characterized by further comprising response feature information storage means for storing information representing a response feature (e.g., an outer appearance, a nature, and a tone color) unique to the response plan formation means, and response feature information management means for allowing a specific user to perform formation, a change, and addition of the information stored in the response feature information storage means, wherein the response plan formation means forms a response plan so as to maintain a unique response feature.

The present invention is preferably characterized in that either the response rule storage means comprises a plurality of response rule storage means or the response feature information storage means comprises a plurality of response feature information storage means, or both the response rule storage means comprises a plurality of response rule storage means and the response feature information storage means comprises a plurality of response feature information storage means, wherein the response plan formation means switches one or both of the response rule storage means and the response feature information storage means in accordance with an information demander or a status.

The present invention is preferably characterized in that the response rule storage means stores a connection method to another information disclosing apparatus in storing data from the another information disclosing apparatus in the data storage means, and the response plan formation means looks up the response rule storage means to plan a response which provides the connection method to the another information disclosing apparatus when a demand associated with data obtained from the another information disclosing apparatus is made from the information demander.

The present invention is preferably characterized in that when it is determined that an answer cannot be formed, the response plan formation means plans a response for demanding another information disclosing apparatus as a substitute information disclosing apparatus to form a response in accordance with contents of the response rule storage means, and the response rule management means performs addition and updating of the contents of the response rule storage means on the basis of the response from another information disclosing apparatus as the substitute information disclosing apparatus.

The present invention is preferably characterized by further comprising status determination means for observing behaviors of another information demander and another information disclosing apparatus, wherein the response plan formation means searches a disclosure partner on the basis of determination of the status determination means and plans a response for causing the partner to generate a demand to a home user.

The present invention is preferably characterized in that the demand reception means receives contract information associated with a start of a contract of an information demander and revocation of the contract, the response rule management means stores user contract information received by the demand reception means in the response rule storage means, and the response plan formation means looks up the contract information in the response rule storage means and observes a behavior of an information demander who has a predetermined contract condition using the status determination means.

The present invention is preferably characterized by further comprising means for managing feature information associated with a target field in which the user on the information demander side is interested, and means for disclosing the feature information to the information disclosing apparatus.

The present invention is preferably characterized by further comprising information retrieval presentation means for estimating contents of data desired by the information demander with use of the feature information disclosed by the information demander, extracting the data of the estimated contents from the data storage means, and disclosing the extracted data to the information demander.

(2) The present invention is characterized by comprising demand reception means for receiving a demand of a demander which is input in a predetermined information form, response rule storage means for storing general knowledge for generating a response responding to the demander or a status, response plan formation means, responsive to the demand received by the demand reception means, for planning a response exhibited to the demander using the knowledge stored in the response rule storage means, response generation means for generating the response to the demander in accordance with the plan formed by the response plan formation means, history storage means for storing the demand of the demander which has been received by the demand reception means and the response generated by the response generation means to the demand so as to cause the demand to correspond to the response, and history editing means for performing at least one of recording, a change, and deletion of the history information stored in the history storage means in accordance with an instruction from the demander.

The present invention is preferably characterized in that the history editing means sets an editing right in accordance with contents of the history information and edits history information in which the demander has the editing right.

(3) The present invention is characterized by comprising data storage means for storing data in a predetermined information form (e.g., a text, speech, an image, and a moving picture), demand reception means for receiving an information disclosure demand from an information demander, retrieval means for retrieving the data from the data storage means in response to the demand received by the demand reception means, analysis means for analyzing an intention and emotions associated with a user on an information demander side in response to the demand received by the demand reception means, response plan formation means for planning a response to the information demander on the basis of an analysis result of the analysis means, and response generation means for generating the response to the information demander in accordance with the plan formed by the response plan formation means.

The present invention is preferably characterized by further comprising status check means for checking whether a line can be directly connected between the information demander and an information provider having the data, direct line connection decision means for deciding to directly connect the line between the information demander side and the information provider having the data on the basis of the analysis result of the analysis means and a check result of the status check means, and direct line connection execution means for directly connecting the line in accordance with a result of the direct line connection decision means.

The present invention is preferably characterized in that the response plan formation means forms a personal relationship model from personal relationship information between the user on the information provider side and the user on the information demander side and edits the personal relationship model in accordance with the contents of an interactive operation, thereby estimating a change in user emotions on the information demander side.

The present invention is preferably characterized by further comprising negotiation outline exhibition means for exhibiting a negotiation outline or contents in the form of a figure or table to the information demander, so that a reference for causing the information provider side to decide to directly connect a line is presented to the information provider side.

The present invention is preferably a multi-modal information input/output system having means for inputting at least one of user language information and instruction information through an input medium (e.g., a keyboard input, a mouse input, and a pen input in addition to the speech input) having at least one form including a speech input, and means for performing at least one of accumulation processing, data processing, recognition processing, and understanding processing for the input language information or the input instruction information, characterized by comprising means for understanding at least one of an intention, emotions, and a status of a user from the speech input of the user.

The present invention is preferably characterized by further comprising means for presenting at least one of linguistic speech accompanying emotional information and non-verbal utterances accompanying the emotion information.

(4) The present invention is characterized by comprising data storage means for storing data in a predetermined form, data information storage means for storing data information describing a confidentiality and a degree of difficulty for individual data stored in the data storage means, user information storage means for storing user information describing a right and a degree of familiarity for each data to each individual information demander, retrieval presentation means for retrieving and presenting data for a data presentation demand from the information demander on the basis of the data information, input/output means for performing input/output between the information demander and an information provider for managing the information disclosing apparatus, response history storage means for storing response history information representing a history of a response of the information disclosing apparatus using the input/output means between the information demander and the information provider, and editing means for forming or changing the data information on the basis of the response history information when data satisfactory to a demand of the information demander cannot be presented and the information provider directly responds to the information demander or presents demand data to the information demander.

The present invention is characterized by comprising data storage means for storing data in a predetermined form (e.g., a text, speech, an image, and a moving picture), data information storage means for storing data information describing a confidentiality and a degree of difficulty for each data stored in the data storage means, user information storage means for storing user information describing a right and a degree of familiarity for each data to each individual information demander, retrieval presentation means, responsive to a data presentation demand from the information demander, for retrieving and presenting data of the confidentiality and the degree of difficulty corresponding to the right and the degree of familiarity of the information demander on the basis of the user information and the data information which correspond to the information demander, input/output means for performing input/output between the information demander and an information provider for managing the information disclosing apparatus, response history storage means for storing response history information representing a history of a response of the information disclosing apparatus using the input/output means between the information demander and the information provider, and editing means for forming or changing the data information and the user information of the information demander on the basis of the response history information when data satisfactory to a demand of the information demander cannot be presented and the information provider directly responds to the information demander or presents demand data to the information demander.

The present invention is preferably characterized in that each user information stored in the user information storage means is described with the confidentiality of the user information itself, and when the information demander demands to present user information of a given user, the user information is presented in accordance with a right of the information demander and the confidentiality of the user information.

The present invention is preferably characterized in that when a demand is made by the information demander to present data which should not be presented in terms of a right of the information provider himself and a degree of familiarity, user information in which the right and the degree of familiarity to the data are higher than the confidentiality and the degree of difficulty of the data and in which the information demander has a right to the user information itself is selected from the user information stored in the user information storage means, and the information demander is notified so as to demand for user data represented by the selected user information. (1) Since the present invention has personal relationship information of individual persons who own information, an information disclosing method can change depending on partners. According to the present invention, individual information can be disclosed to appropriate partners. Only necessary information is disclosed by an interactive interface. Therefore, the third party can easily use the information filing capacity of each individual person, and a time required for information disclosure and retrieval can be shortened.

(2) Since the present invention has a function of permitting to record and reproduce information transmitted by a user in an interactive operation with the apparatus, a user history cannot be stored against the intention of the user. There can also be provided an information disclosing apparatus capable of permitting not only recording, but also addition, editing, and deletion by the user. Therefore, according to the present invention, the user can interact with the apparatus or through the apparatus with a sense of security to store his history.

(3) According to the present invention, not only countermeasures are determined in accordance with the registered posts and question contents of users, but also the status of a user is dynamically analyzed in accordance with a negotiation process, and flexible information disclosure and a countermeasure are determined. As a result, user reliability for the processing capability of the information disclosing apparatus can be improved. A line can be directly connected to a user in consideration of the current status of the information provider. Therefore, the conventional load acting on an information provider who must be engaged in all negotiations failed by the information disclosing apparatus can be reduced.

In a multimedia system according to the present invention, it is found that parallel processing between language information and non-language information and between intentional user information and non-intentional user information is important. Based on this point, the parallel processing nature of the speech medium is utilized to realize a comfortable, natural, warm interactive operation with a computer as a user-centered multi-modal interface. In particular, understanding for the intention, emotions, and status of the user using language information by a keyboard, a mouse, a pen, or a speech input as well as non-language information mainly using an instruction information input and speech can greatly improve the satisfaction and comfort of the user.

(4) The right and the degree of familiarity of the information demander, and the confidentiality and the degree of difficulty of data itself dynamically change. Information associated with the right, degree of familiarity, the confidentiality, and the degree of difficulty must be appropriately changed and formed to present appropriate data. According to the present invention having the above arrangement, these pieces of information can be automatically or interactively updated and formed on the basis of interactive operation history between the information demander, the information disclosing apparatus, and the information provider. The load of these jobs on the information provider can be reduced. The right, the degree of familiarity, the confidentiality, and the degree of difficulty associated with the information demander and the disclosure data can be appropriately, easily, and efficiently performed. That is, according to the present invention, data to be disclosed can be flexibly changed in accordance with the right and the degree of familiarity of the information demander.

Further, an information disclosing apparatus according to the present invention comprises: input means for inputting data in a plurality of forms including a text, speech, an image, and a pointing position, extraction means for extracting an intention and emotion information of a user from the data input by the input means, response plan formation means for forming a response plan on the basis of an extraction result from the extraction means, and response generation means for generating a response to the user on the basis of this formed response plan is characterized by comprising emotion recognition means for recognizing an emotional state of the user on the basis of an internal state of the response plan formation means, the extracted intention and emotion information of the user, and a shift of interactive operation status information including a type of the formed response plan along a time axis, wherein the response plan formation means selects or changes a response strategy in accordance with a recognition result of the emotion recognition means and forms a response plan matching the response strategy.

According to the present invention, a user emotion corresponding to an interactive operation status is recognized to allow generation of a response corresponding to a response strategy made in consideration of the user emotion. More specifically, in addition to an answer to a demand explicitly expressed by a user, an appropriate response is generated also in consideration of an implicit demand. The metal load on the user can be reduced, and an interactive operation can be smoothly and efficiently performed. In this case, the intention and emotion of the user can be accurately understood not by a single input form, but by using a plurality of input information such as a text, speech, and an image. A plurality of response forms are combined and used to know a change in emotional state of the user, thereby selecting a response form matching the favor and status of the user.

BRIEF DESCRIPTION OF THE DRAWINGS

FIG. 1 is a view showing the arrangement of a basic system including an information disclosing apparatus according to an embodiment of the present invention;

FIG. 2 is a view showing the arrangement of an information disclosing apparatus according to the first embodiment;

FIG. 3 is a flow chart showing a processing flow of the first embodiment;

FIG. 5 is a view showing an example of a state transient chart of a disclosing agent;

FIG. 7 is a view showing an example of a user history information table;

FIG. 8 is a view showing an example of a user information registration table;

FIG. 9 is a view showing an example of access permission level decision rules;

FIG. 10 is a view showing an example of a disclosure permission range table;

FIG. 11 is a view for explaining an example of a method of deciding a response form;

FIG. 12 is a view showing an example of a response plan list;

FIG. 13 is a view showing an example of response formation rules;

FIG. 14 is a view showing an example of a greeting response plan;

FIG. 15 is a view showing an example of a term registration table;

FIG. 16 is a view showing an example of user demand items;

FIG. 18 is a view showing an example of an utterance intention obtained from an utterance sentence of a user;

FIG. 19 is a view showing an example of a user demand table extracted by a response with a user;

FIG. 20 is a view showing an example of a user demand table extracted by a response with a user;

FIG. 21 is a view showing an example of a response with a user;

FIG. 22 is a view showing an example of a response with a user;

FIG. 23 is a view showing an example of a user demand table extracted by a response with a user;

FIG. 24 is a view showing an example of a response with a user;

FIG. 25 is a view showing an example of a user demand table extracted by a response with a user;

FIG. 26 is a view showing an example of a response with a user;

FIG. 27 is a view showing an example of a response with a user who accesses an agent for the first time;

FIG. 28 is a view showing an example of a response with a user who accesses an agent for the first time;

FIG. 29 is a view showing an example of a response between a plurality of disclosing agents and a user;

FIG. 30 is a view showing an example of a response between an image retrieval disclosing agent and a user;

FIG. 32 is a view showing an example of a response when an information provider participates in an interactive operation;

FIG. 33 is a view showing one modification of the first embodiment;

FIG. 37 is a view showing another modification of the first embodiment;

FIG. 38 is a view showing still another modification of the first embodiment;

FIG. 39 is a view showing an example of a disclosing agent;

FIG. 41 is a view showing the arrangement of an information disclosing apparatus according to the second embodiment;

FIGS. 42A through 42C show views showing examples of interest information of the second embodiment;

FIG. 43 is a view showing the arrangement of an information disclosing apparatus and a client apparatus according to the third embodiment;

FIG. 44 is a flow chart showing an example of a processing flow of the third embodiment;

FIG. 45 is a flow chart showing another example of the processing flow of the third embodiment;

FIG. 46 is a view showing an example of a response with a user;

FIG. 49 is a view showing an example of an utterance intention of a user;

FIG. 50 is a view showing an example of a demand from a user;

FIG. 51 is a view showing an example of a demand table (level 1);

FIG. 53 is a view showing an example of a demand table (level 2);

FIG. 54 is a view showing an example of a demand table (level 2);

FIG. 55 is a view showing an example of a demand table (level 3);

FIG. 56 is a view showing an example of a demand table (level 2);

FIG. 57 is a view showing an example of a demand table (level 3);

FIG. 58 is a view showing an example of a demand table (level 1);

FIG. 59 is a view showing an example of a response with a user;

FIG. 60 is a view showing an example of a response with a user;

FIG. 62 is a view showing an example of a demand synonym table;

FIG. 63 is a view showing an example of a demand table (level 1);

FIG. 64 is a view showing an example of a demand table (level 2);

FIG. 67 is a view showing an example of a response history presentation interface;

FIG. 77 is a view showing another example of a response history editing interface;

FIG. 78 is a view showing another example of a response history editing interface;

FIG. 80 is a view showing another example of a response history editing interface;

FIG. 84 is a view showing an example of a response with a user when a history is edited during the response;

FIG. 86 is a view showing an example of a response with a user when a history portion to be deleted is automatically determined;

FIG. 87 is a flow chart showing an example of a processing flow for permitting to record a history first;

FIG. 90 is a flow chart showing a processing flow of the fourth embodiment;

FIG. 92 is a view showing an example of person's categories of users;

FIG. 93 is a view showing an example of disclosure information categories;

FIG. 99 is a view for explaining a user's intention, emotion analysis items, and an example of a technique;

FIG. 100 is a view for explaining a user's intention, emotion analysis items, and an example of a technique;

FIG. 101 is a view for explaining a user's intention, emotion analysis items, and an example of a technique;

FIG. 102 is a view for explaining a user's intention, emotion analysis items, and an example of a technique;

FIG. 103 is a flow chart showing a flow of user negotiation decision processing using a personal relationship model;

FIG. 114 is a view showing an example of the structure of semantic categories stored in a data information storage means;

FIGS. 115A through 115C show views showing examples of the respective semantic categories;

FIG. 116 is a view showing an example of the structure of data form categories stored in the data information storage means;

FIGS. 117A through 117C show views showing examples of the respective data form categories;

FIGS. 119A through 119C show views of examples of the respective person's categories;

FIGS. 120A and 120B show views of examples of data information;

FIGS. 121A and 121B show views of examples of data information;

FIGS. 122A and 122B show views of examples of user information;

FIGS. 123A and 123B show views of examples of user information;

FIG. 124 is a flow chart showing a flow of information disclosure processing performed by an information disclosing apparatus;

FIG. 125 is a flow chart showing a flow of information disclosure processing performed by the information disclosing apparatus;

FIG. 126 is a flow chart showing a processing flow for correcting data information or user information or forming new data information or new user information;

FIG. 127 is a flow chart showing a processing flow for correcting data information or user information or forming new data information or new user information;

FIG. 128 is a view showing an example of user information of an information demander connected to an information disclosing apparatus;

FIG. 129 is a view showing an example of an interactive operation between an information disclosing apparatus and an information demander;

FIG. 130 is a view showing an example of a method of presenting information of an information disclosing apparatus;

FIGS. 131A and 131B show views of screens for requesting an information provider to participate in an interactive operation between an information disclosing apparatus and an information demander;

Figure 135A:
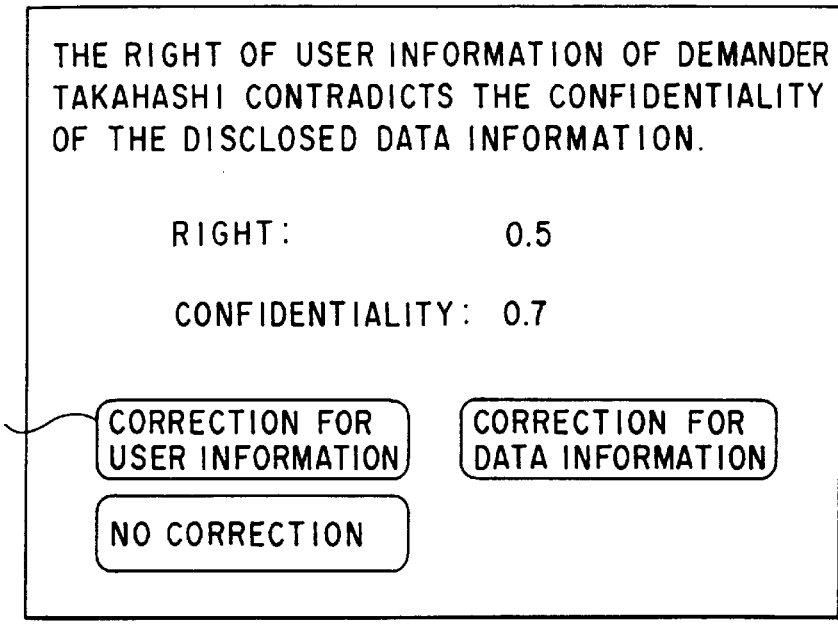
Figure 135B:
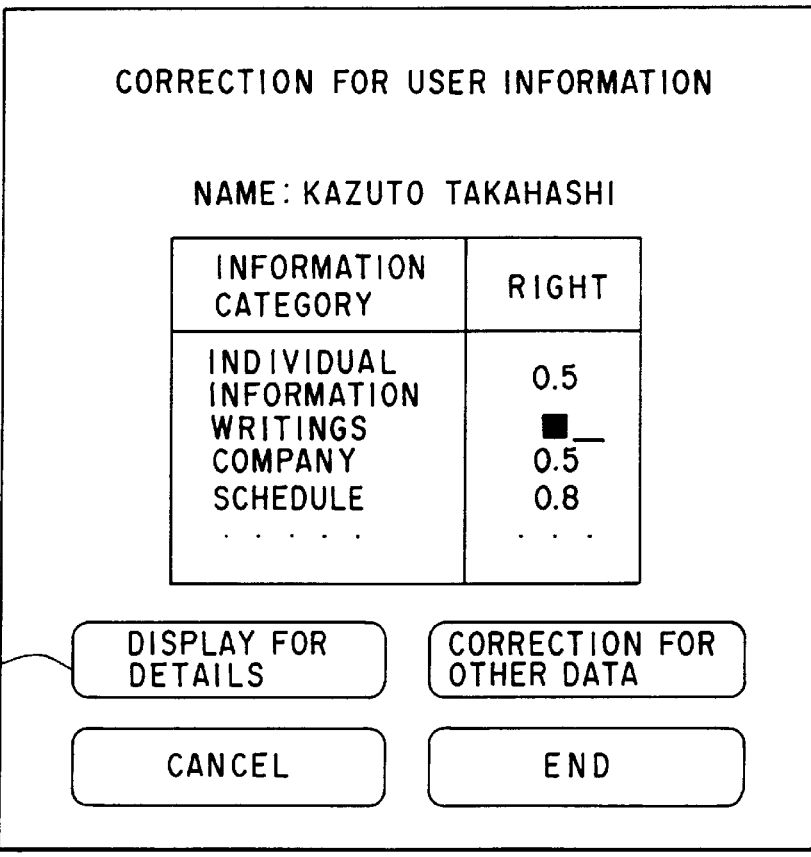
Figures 144A, 144B:
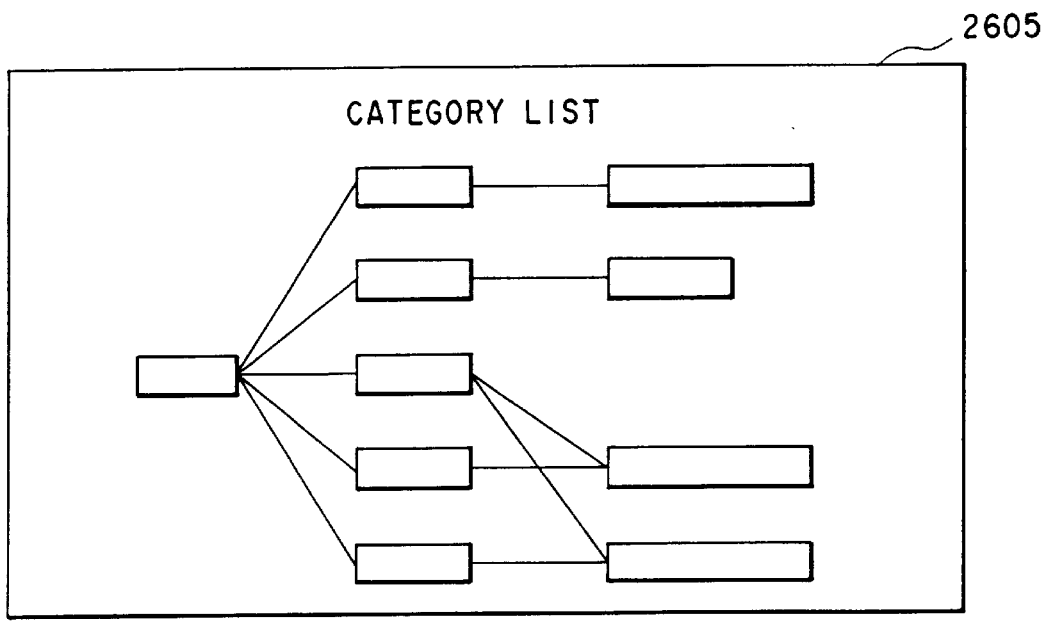
Figure 148:
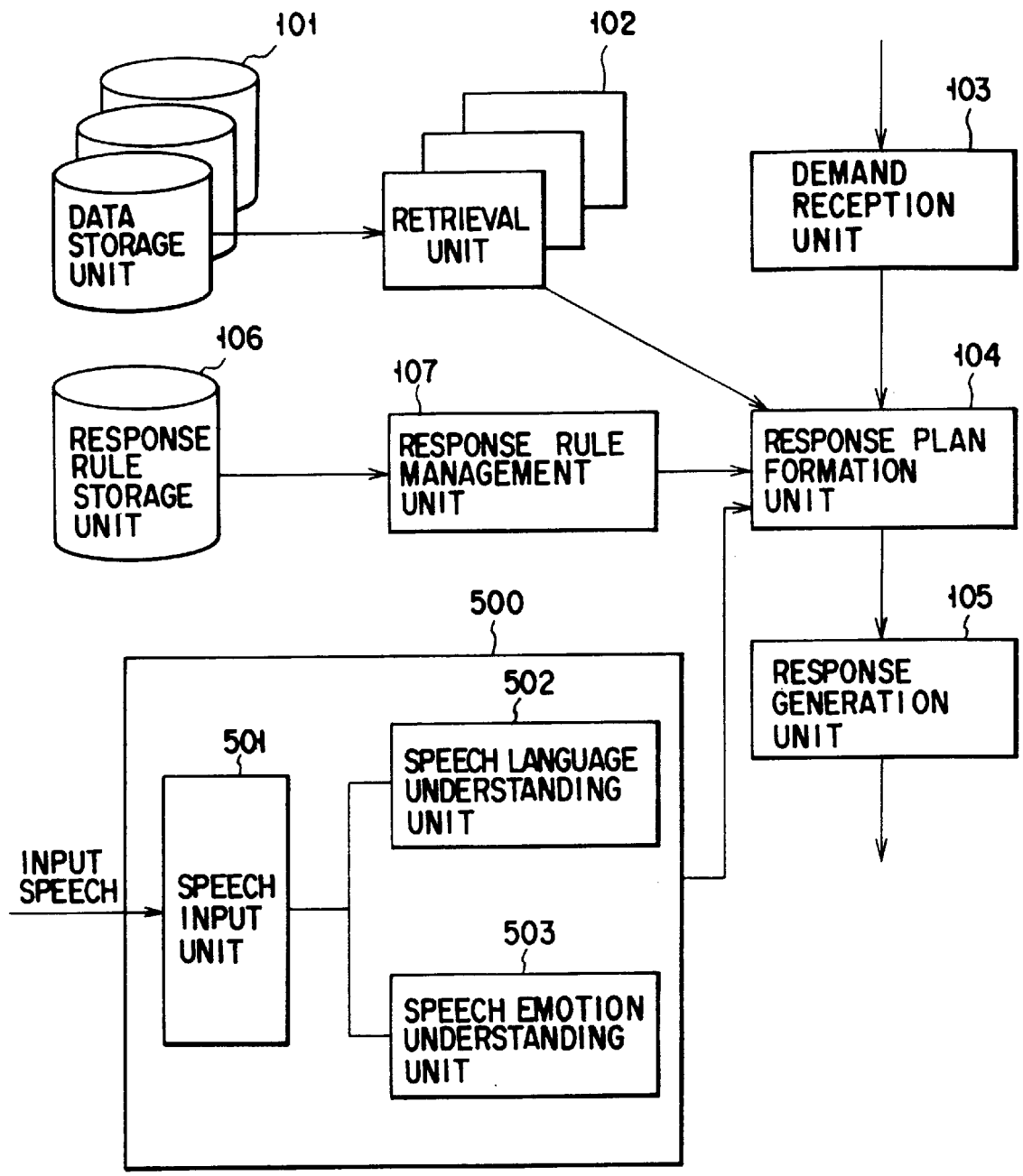
Figure 149:
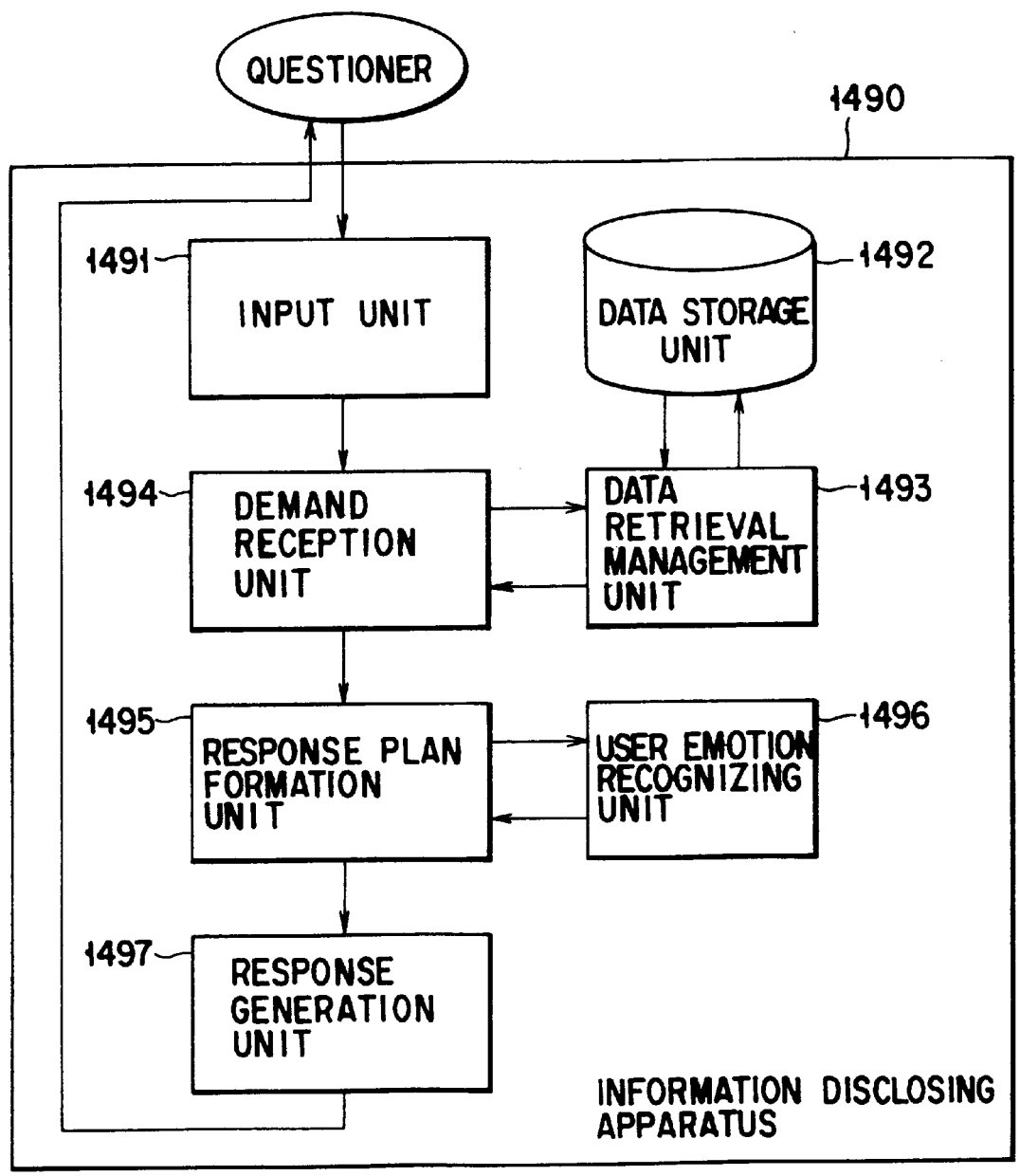
Figure 152:
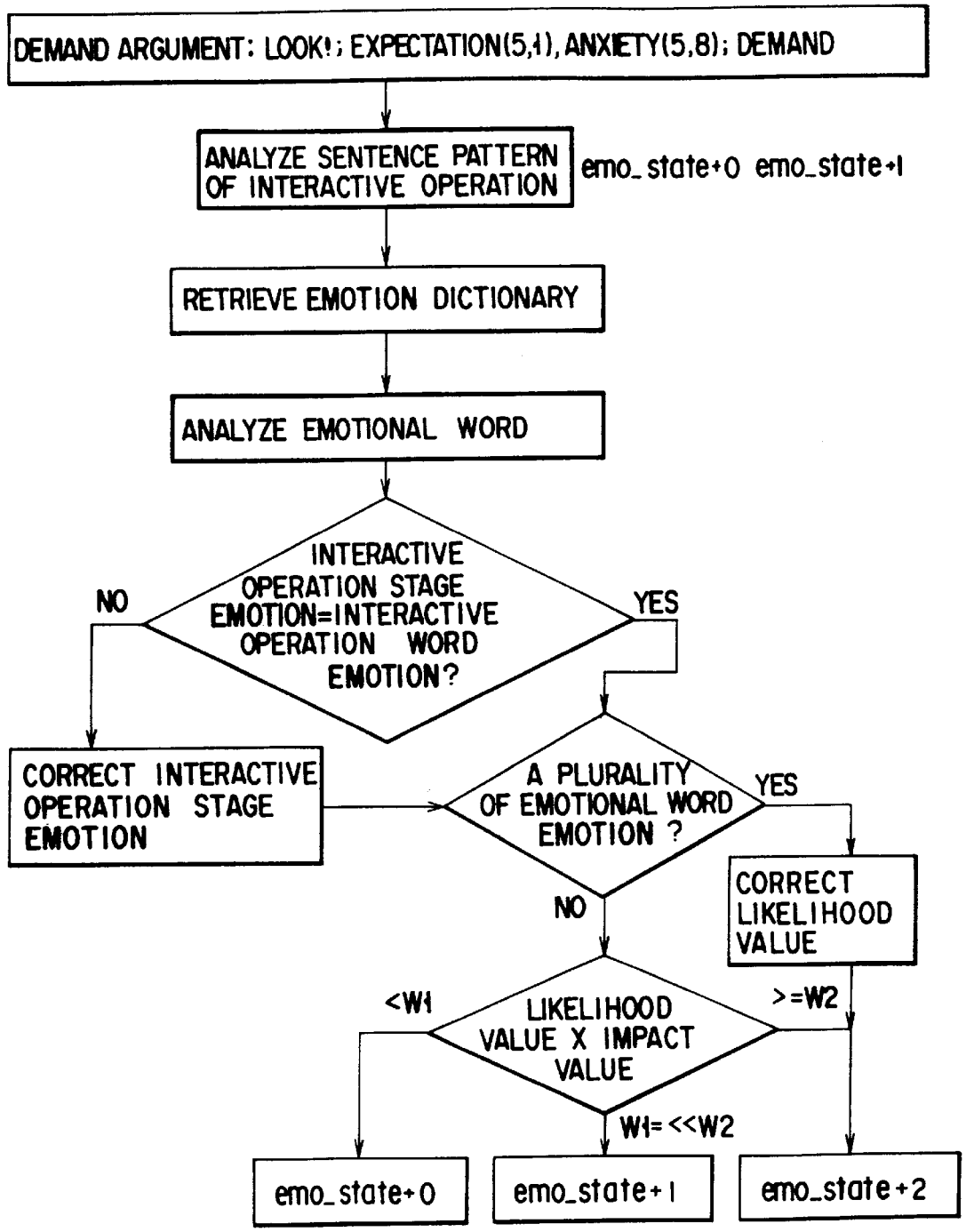
Figure 154:
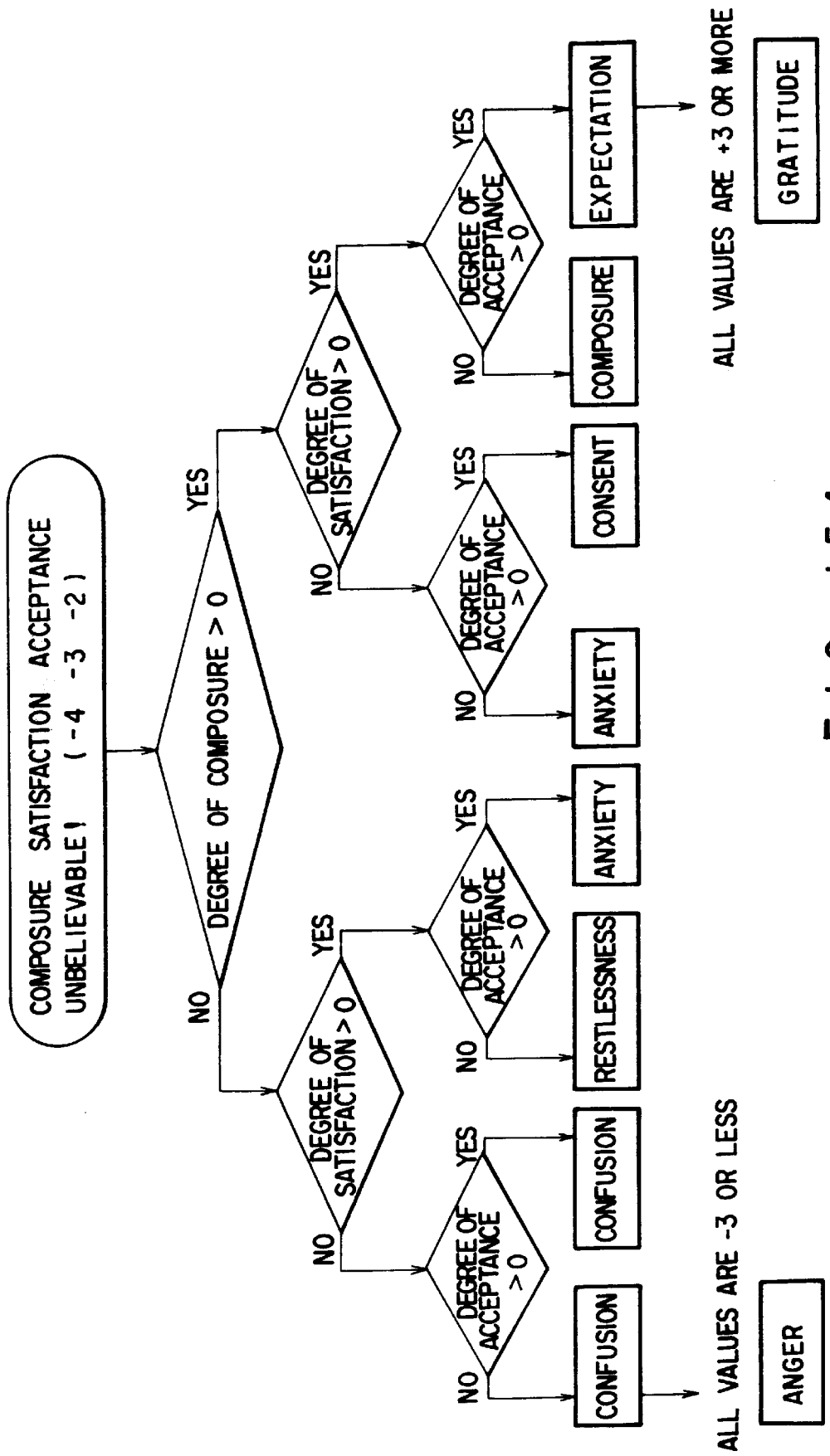
Figure 159:
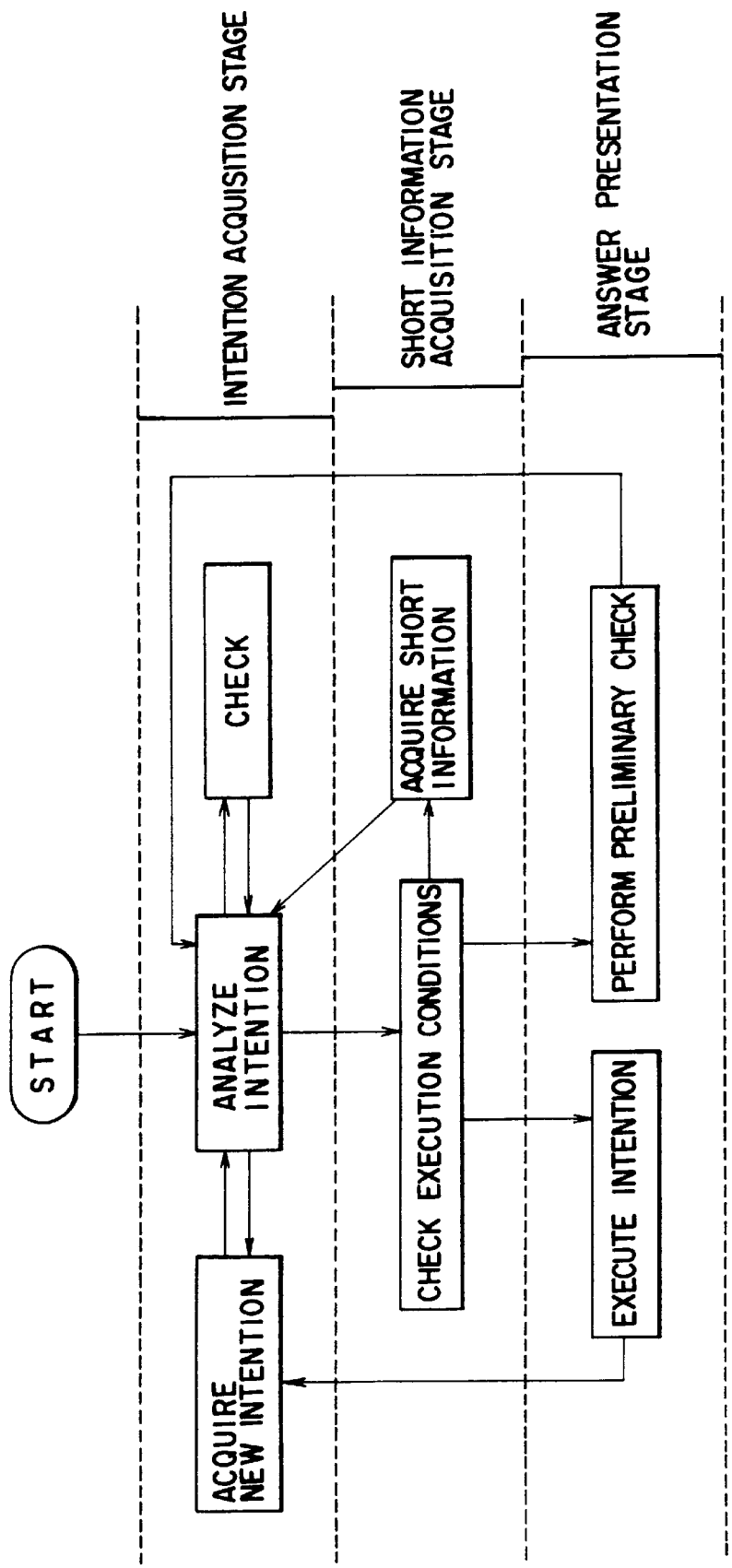
Figures 160A, 160B:
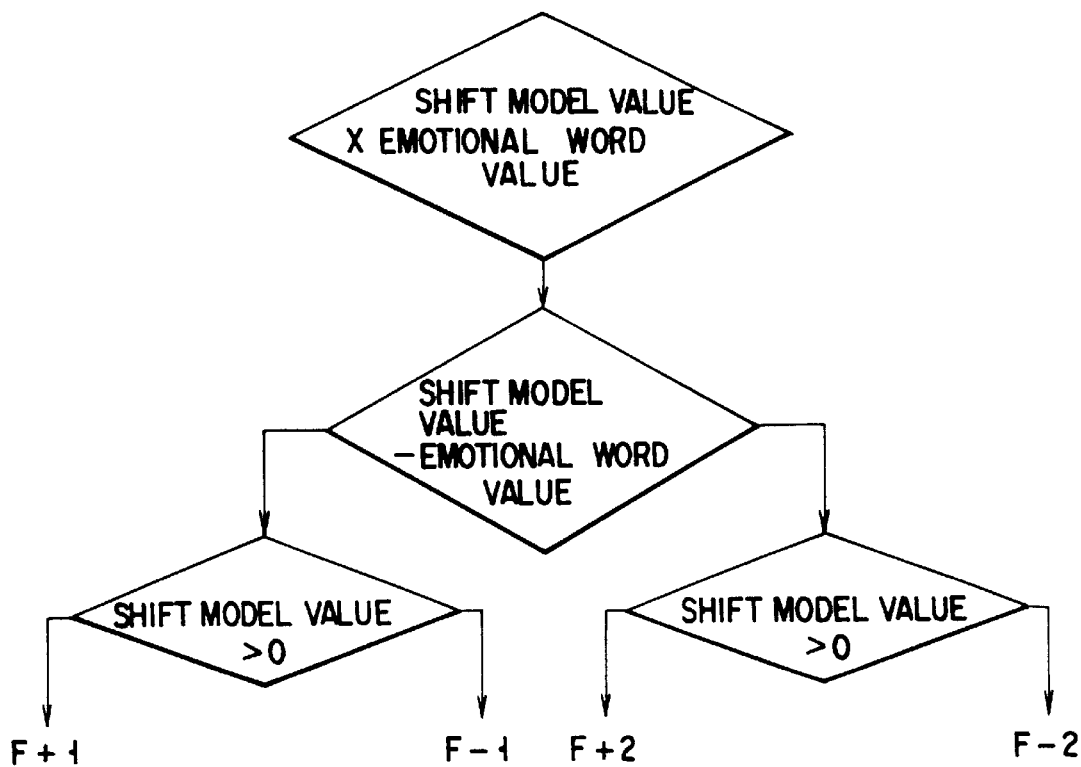
Figure 161:
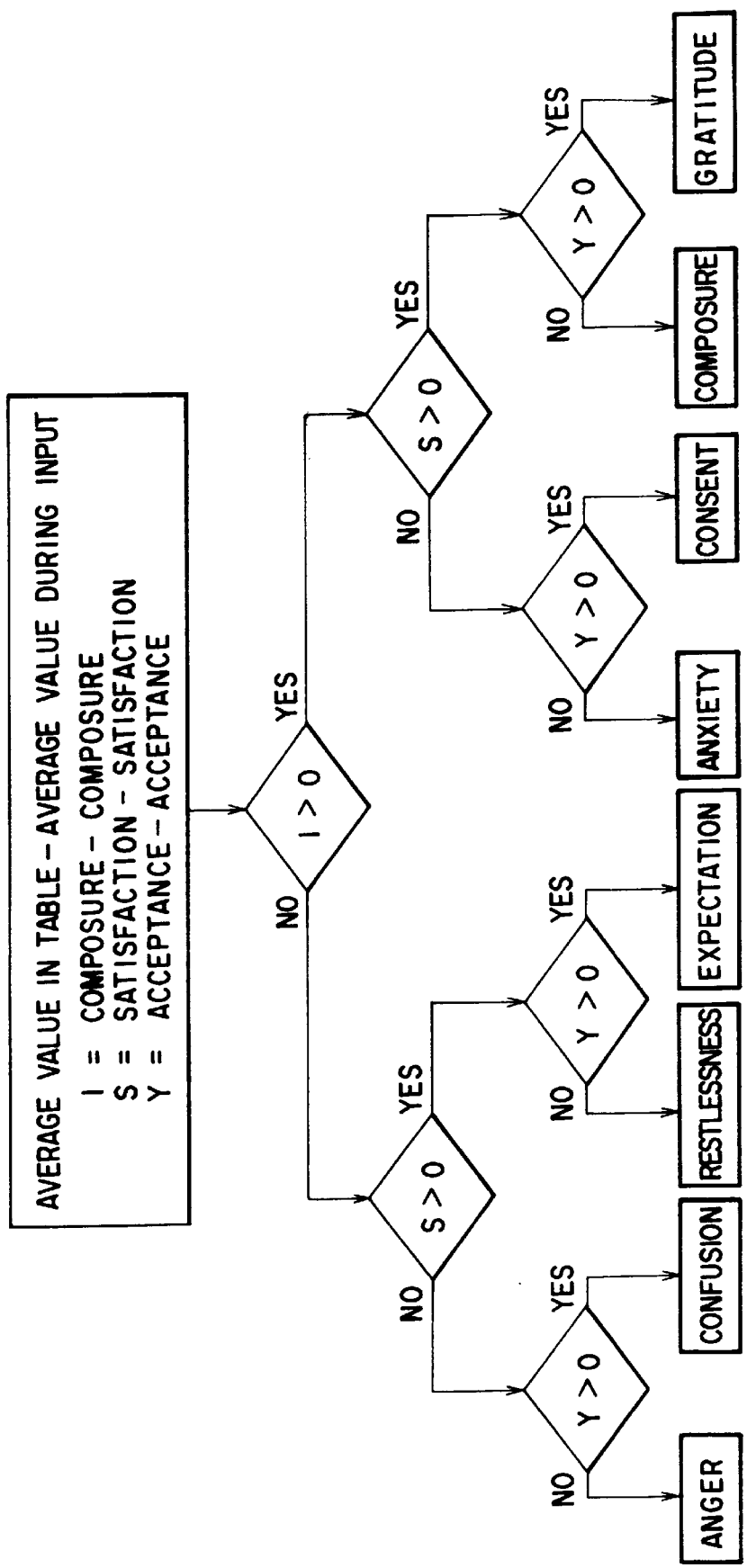
Figure 165:
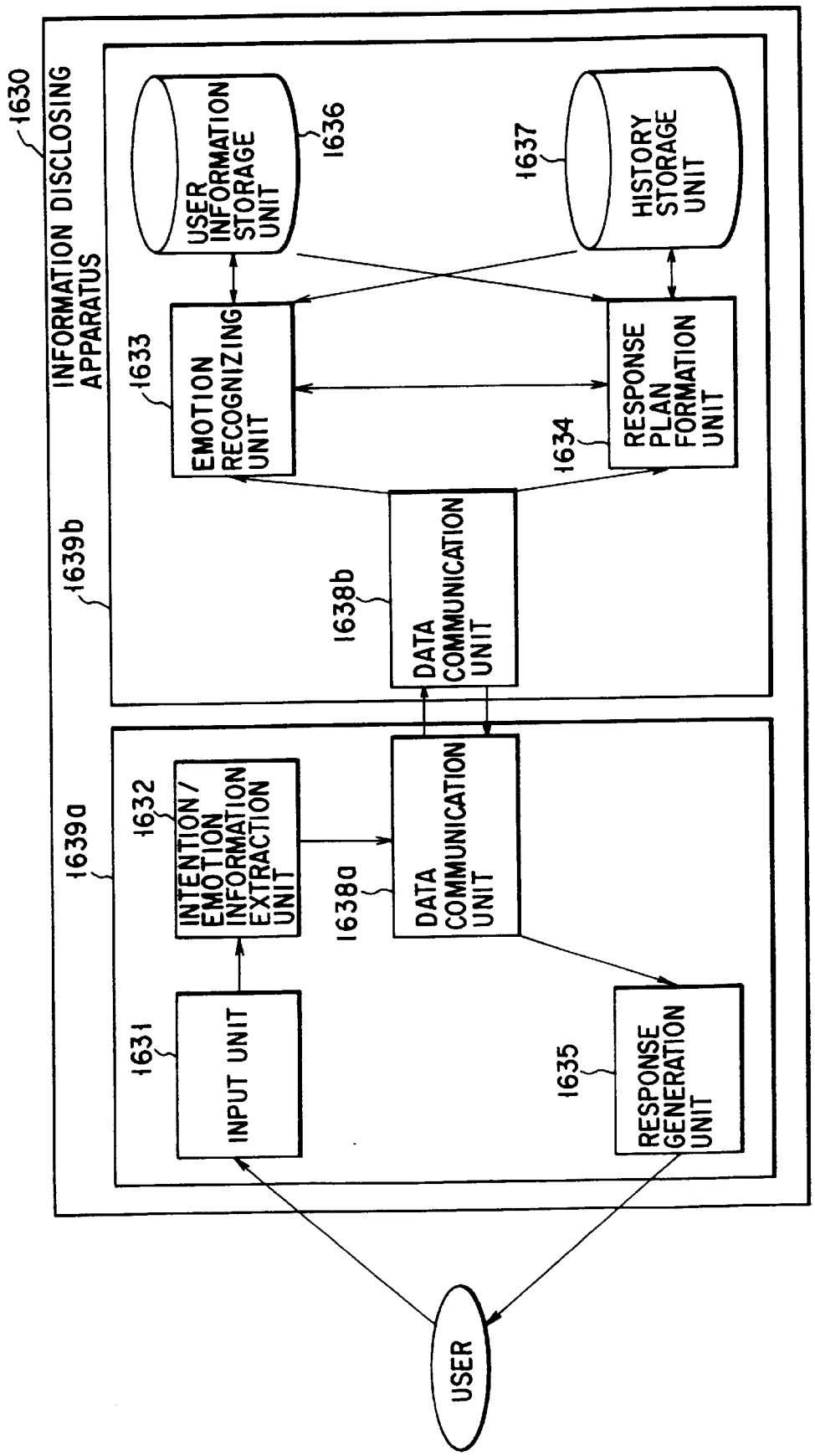
Figure 166:
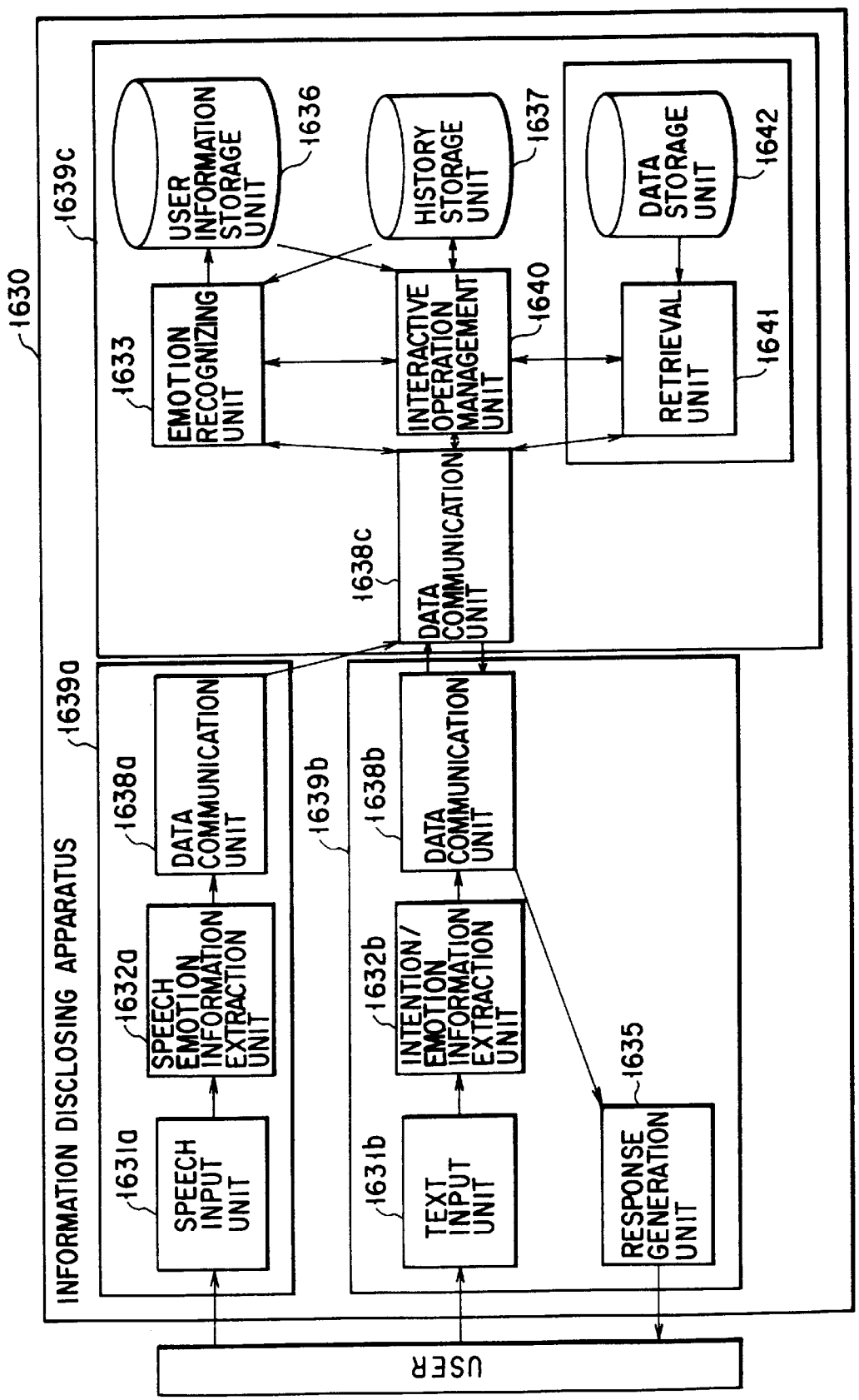
Figure 168:
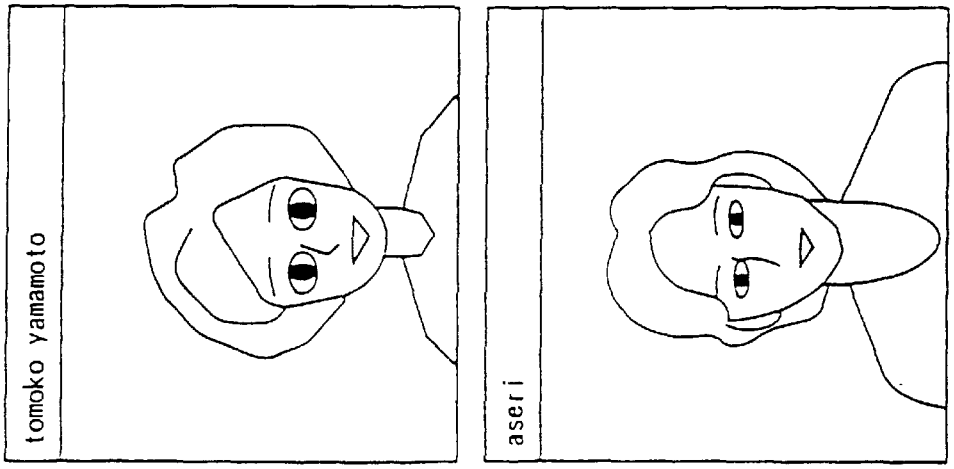
Figure 169:
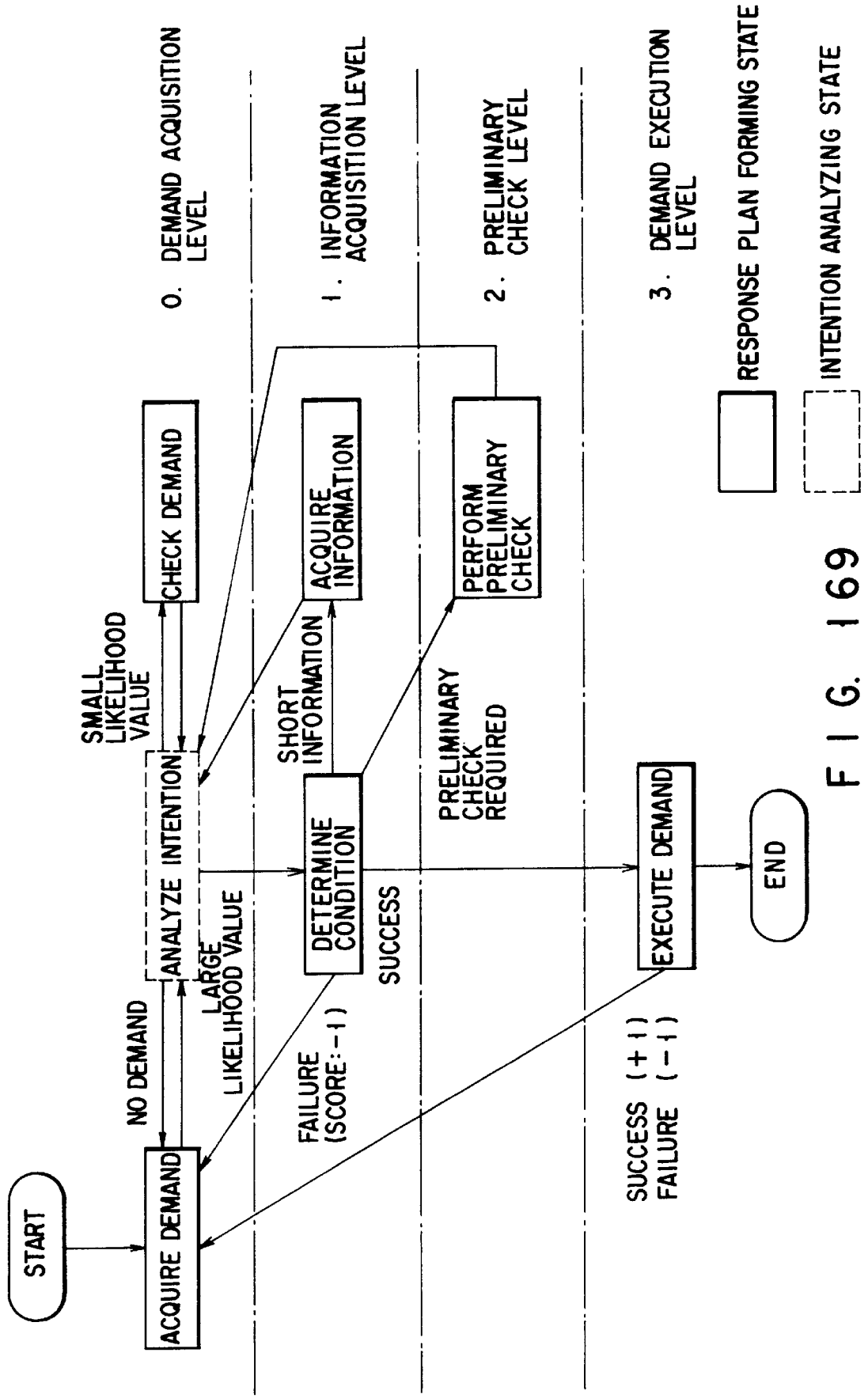
Figure 179:
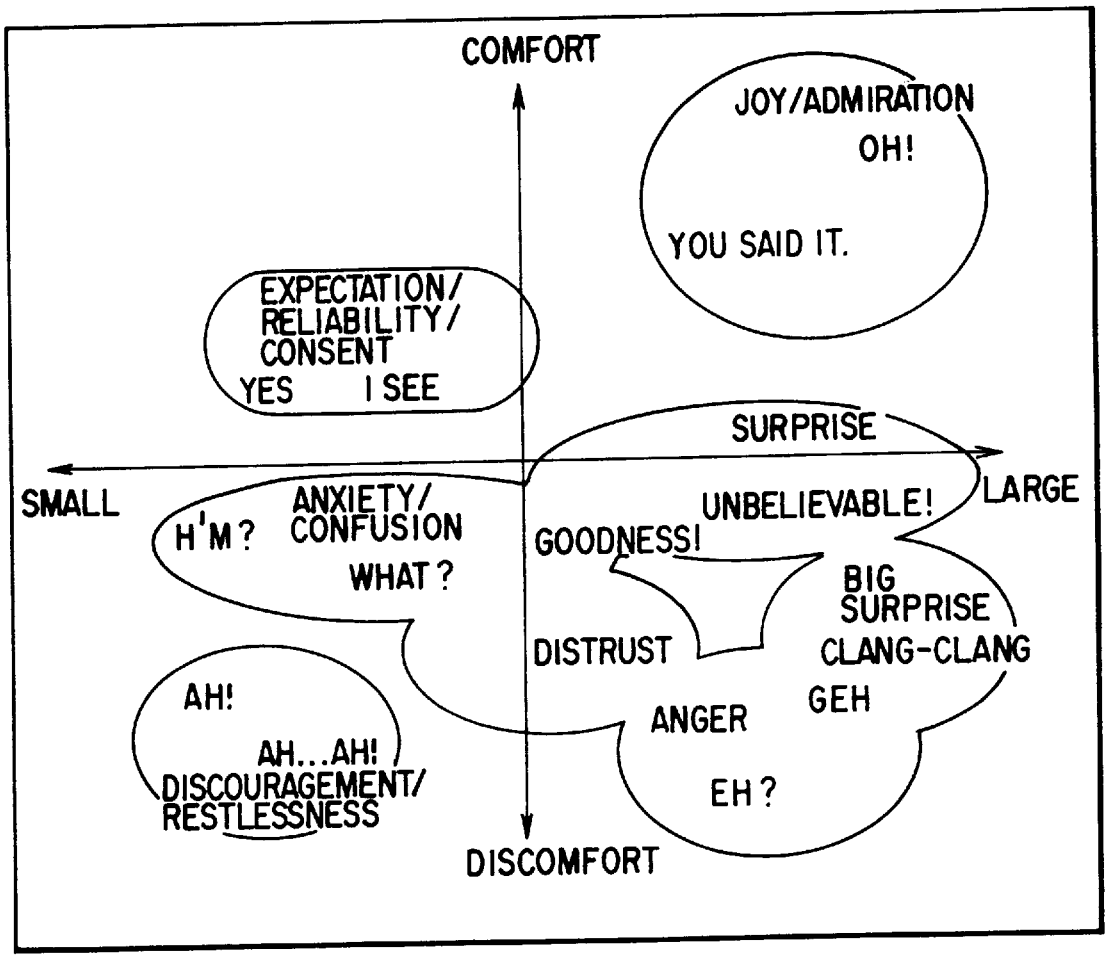
Figure 192:
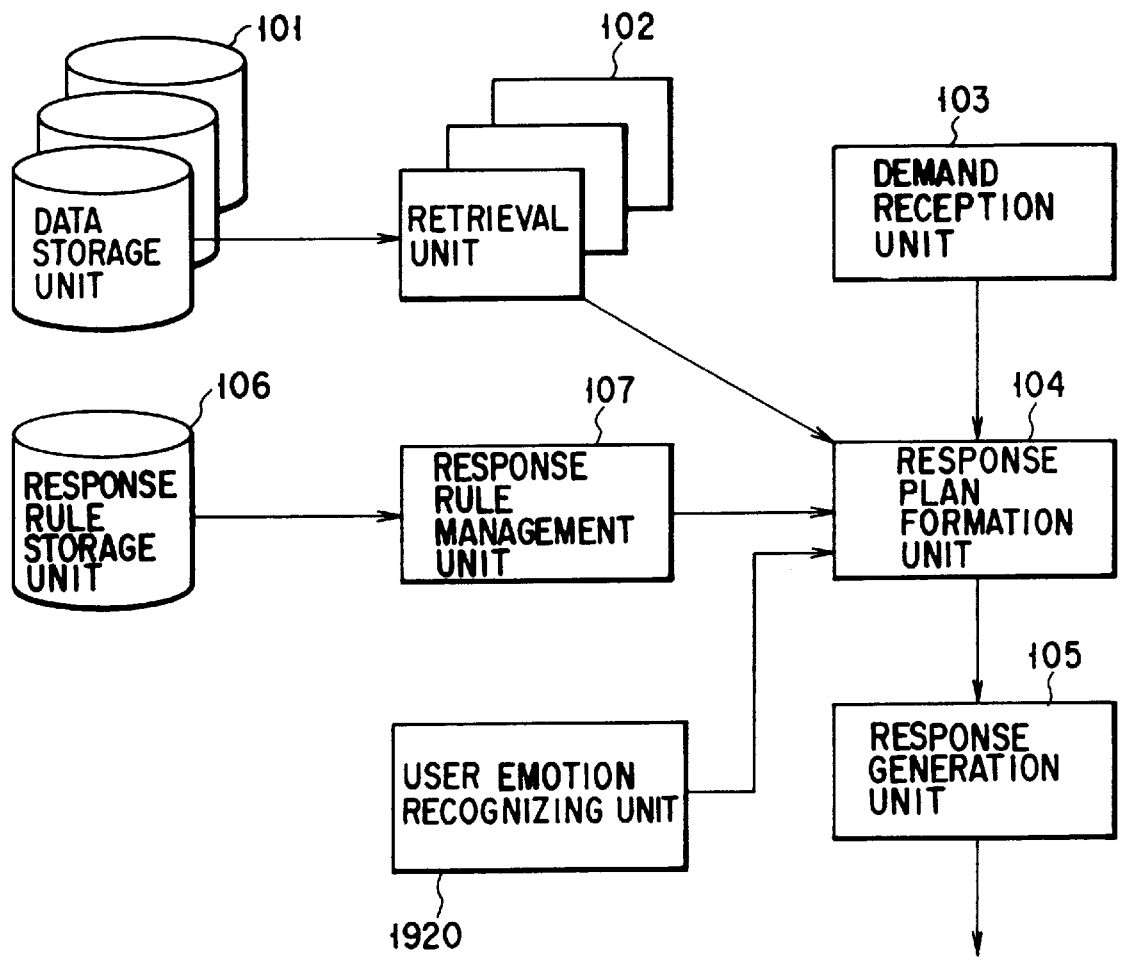

FIG. 132 is a view showing an example of an interactive operation between an information disclosing apparatus and an information demander;

FIG. 133 is a view showing an example of an interactive operation between an information disclosing apparatus and an information demander;

FIG. 134 is a view showing an example of an interactive operation between an information disclosing apparatus, an information demander, and an information provider;

FIGS. 135A and 135B show views of display examples of screens for changing attribute values of user information;

FIG. 136 is a view showing an example of an interactive operation between an information disclosing apparatus and an information demander;

FIGS. 137A and 137B show views of examples of results obtained when an information disclosing apparatus performs retrieval in accordance with a demand from an information demander;

FIGS. 138A and 138B show views of examples of results obtained when an information disclosing apparatus performs retrieval in accordance with a demand from an information demander;

FIGS. 139A and 139B show views of examples of results obtained when an information disclosing apparatus performs retrieval in accordance with a demand from an information demander;

FIG. 140 is a view showing an example of a result obtained when an information disclosing apparatus performs retrieval in accordance with a demand from an information demander;

FIG. 141 is a view showing an example of an interactive operation between an information disclosing apparatus and an information demander;

FIG. 142 is a view showing an example of an interactive operation between an information disclosing apparatus and an information demander;

FIGS. 143A and 143B show views of display examples of screens for changing attribute values of user information;

FIGS. 144A and 144B show views of display examples of screens for inputting additional data information;

FIG. 145 is a view showing an information disclosing apparatus and an example of a result of retrieval performed by the information disclosing apparatus;

FIGS. 146A and 146B show views of examples of data information;

FIGS. 147A and 147B show views of display examples of screens for inputting to correct data information;

FIG. 148 is a block diagram of the seventh embodiment according to the present invention;

FIG. 149 is a functional block diagram of an information disclosing apparatus according to the first embodiment of the present invention;

FIG. 150 is a flow chart for explaining an operation sequence of the information disclosing apparatus according to the first embodiment;

FIG. 151 is a view showing an interactive operation count feeling model of the first embodiment;

FIG. 152 is a view showing an interactive operation count feeling model to which feelings of the first embodiment are added;

FIG. 153 is a table showing correction conditions of the first embodiment;

FIG. 154 is a view showing an algorithm for specifying feelings expressed by emotional words of the first embodiment;

FIG. 155 is a view showing an example of an interactive operation of the first embodiment;

FIG. 156 is a view showing a feeling shift model of the first embodiment;

FIG. 157 is a view showing a feeling shift model of the first embodiment;

FIG. 158 is a view showing a feeling shift model of the first embodiment;

FIG. 159 is a view showing a chat transition model of the first embodiment;

FIGS. 160A and 160B show views of a feeling correspondence table of the first embodiment;

FIG. 161 is a view showing an algorithm for expressing a user feeling in a numerical value according to the first embodiment;

FIG. 162 is a view showing a feeling shift model of the first embodiment;

FIG. 163 is a functional block diagram of an information disclosing apparatus according to the second embodiment of the present invention;

FIG. 164 is a functional block diagram of the information disclosing apparatus of the second embodiment;

FIG. 165 is a functional block diagram of the information disclosing apparatus of the second embodiment;

FIG. 166 is a functional block diagram of the information disclosing apparatus of the second embodiment;

FIG. 167 is a flow chart for explaining an operation sequence of the information disclosing apparatus of the second embodiment;

FIG. 168 is a view showing an example of a response of the second embodiment;

FIG. 169 is a view showing an interactive operation transition model of the second embodiment;

FIG. 170 is a view showing an execution condition list of the second embodiment;

FIG. 171 is a view showing an interactive operation history storage structure of the second embodiment;

FIG. 172 is a view showing an example of an utterance intention of the second embodiment;

FIG. 173 is a view showing an example of a user demand of the second embodiment;

FIGS. 174A and 174B are views showing a keyword dictionary of the second embodiment;

FIGS. 175A and 175B are views showing the semantic expression of utterances of the second embodiment;

FIG. 176 is a view showing three axes constituting a feeling space of the second embodiment;

FIG. 177 is a view showing a state in which the names of feelings are assigned to the feeling space of the second embodiment;

FIG. 178 is a view showing a feeling region table of the second embodiment;

FIG. 179 is a view showing a state in which pieces of non-linguistic information are assigned to the feeling space of the second embodiment;

FIGS. 180A and 180B are views showing a response plan formation table of the second embodiment;

FIG. 181 is a view showing the format of a response of the second embodiment;

FIG. 182 is a view showing response generation examples of the second embodiment;

FIGS. 183A and 183B are views showing the format of a response of the second embodiment;

FIG. 184 is a view showing the format of a response to which expression information is added according to the second embodiment;

FIG. 185 is a view showing response generation examples to which the attitude and intimacy are added according to the second embodiment;

FIG. 186 is a view showing a response strategy of the second embodiment;

FIG. 187 is a view showing an example of a response sentence example dictionary of the second embodiment;

Figure 188:
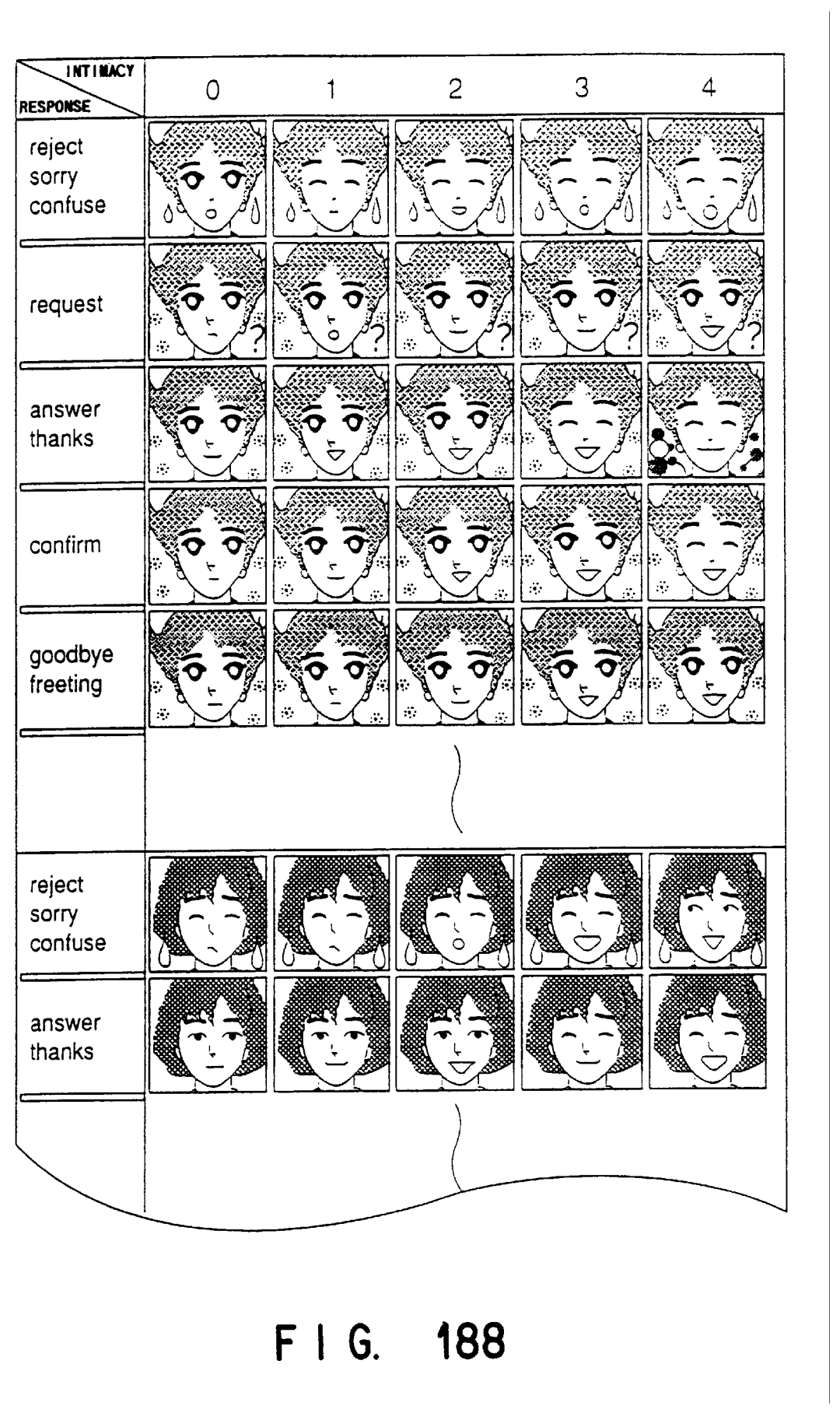

FIG. 188 is a view showing expression patterns of images of the agent according to the second embodiment;

FIG. 189 is a view showing response generation examples upon recognition of feelings according to the second embodiment;

FIG. 190 is a view showing an example of an application plan according to the second embodiment;

FIGS. 191A and 191B are views showing a response strategy of the second embodiment;

FIG. 192 is a block diagram showing a tenth embodiment according to the present invention; and FIGS. 193A through 193E are views explaining the fourth embodiment of the present invention.

DETAILED DESCRIPTION OF THE PREFERRED EMBODIMENTS

Embodiments of the present invention will be described below with reference to the accompanying drawings.

FIG. 1 shows the basic system configuration including an information disclosing apparatus according to an embodiment of the present invention. Generally, an information disclosing apparatus 1 is connected to a demander terminal 4 through a communication means such as a network. The information disclosing apparatus performs an interactive operation for information disclosure on the basis of a message sent from the demander terminal 4, retrieves information owned by an information provider and stored in a data storage unit 2, and discloses the retrieved information to the demander terminal 4 or rejects information disclosure, as needed.

A retrieval unit for retrieving information in the data storage unit 2 may be arranged in the information disclosing apparatus 1, or a retrieval unit 5 arranged outside the information disclosing apparatus 1 may be used.

Information exchanged through an interactive operation between a demander and the information disclosing apparatus 1, or information disclosed from the information disclosing apparatus to the demander have an arbitrary combination of forms such as a text, speech, an image, and a moving picture.

The first to sixth embodiments of the present invention will be described below.

The first embodiment exemplifies the information disclosing apparatus for looking up information such as a personal relationship between an information provider and the demander to control a range of information to be disclosed, the contents of a response message, and the like.

The second embodiment exemplifies a case in which information associated with an interest of a demander is given to the information disclosing apparatus to easily obtain desired information without repeating cumbersome interactive operations.

The third embodiment exemplifies a case in which a demander can edit (e.g., record, change, and delete) history of interactive operations (including speech, images, and moving pictures in addition to texts) between the demander and the information disclosing apparatus 1.

The fourth embodiment exemplifies a case in which the current status of a demander interacting with the information disclosing apparatus 1 is grasped, and this is reflected in a response (e.g., the contents of a response message and direct line connection between the information provider and the demander).

The fifth embodiment exemplifies a case in which speech, expressions, and the like of the demander are looked up in addition to the contents of texts so as to grasp the status of the demander.

The sixth embodiment exemplifies a case in which deficiencies of management information of a demander and management information for information to be disclosed are identified in accordance with a response history obtained upon a failure of information disclosure, thereby interactively or automatically correcting the deficiencies.

(1) (First Embodiment)

First, the first embodiment will be described below.

FIG. 2 shows the configuration of an information disclosure apparatus according to the first embodiment. This information disclosing apparatus comprises a data storage unit 101, a retrieval unit 102, a demand reception unit 103, a response plan formation unit 104, a response generation unit 105, a response rule storage unit 106, and a response rule management unit 107.

Data such as a text, speech, an image, and a moving picture are stored in the data storage unit 101.

The retrieval unit 102 extracts necessary data from the data stored in the data storage unit 101.

The demand reception unit 103 receives an input through a communication means (e.g., 3 in FIG. 1) such as a network and understands the intention included in the input.

The response rule storage unit 106 stores knowledge or rules required in planning a response in the response plan formation unit 104. These rules are managed by the response rule management unit 107.

The response plan formation unit 104 plans a response to meet the demand received by the demand reception unit 103, using the knowledge or rules stored in the response rule storage unit 106. If the data stored in the data storage unit 101 is required, a retrieval demand is sent to the retrieval unit 102, and the response plan formation unit 104 makes a plan using the knowledge or rules in the response rule storage unit 106 on the basis of the retrieval result.

The response generation unit 105 generates a response as data such as a text, speech, an image or a moving picture, or a combination thereof in accordance with the plan from the response plan formation unit 104.

Figure 4:
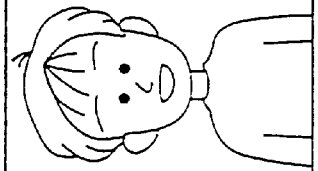
FIG. 4 is a view showing an example of a response with a user.

The operation of this embodiment will be described below. A processing flow of this embodiment is shown in FIG. 3. FIG. 4 and the subsequent drawings show responses of this embodiment.

Among all users, a demander for enjoying information disclosure is called a user, and a person whose discloses information is called an information provider. The information disclosing apparatus is called an information disclosing agent.

First, a user who wants information accesses the information disclosing apparatus which is managed by a user serving as the information provider. For example, the user inputs a command string "pip jim yasuda" within his/her own text input enable window in a window-based interface, as shown in FIG. 4 (S0 in FIG. 4). A process activated by the user using the command pip accesses an information disclosing agent jim of an information provider yasuda and interfaces with the input/output data with the information disclosing agent. The process activated by the user is called a client process.

Figure 6:
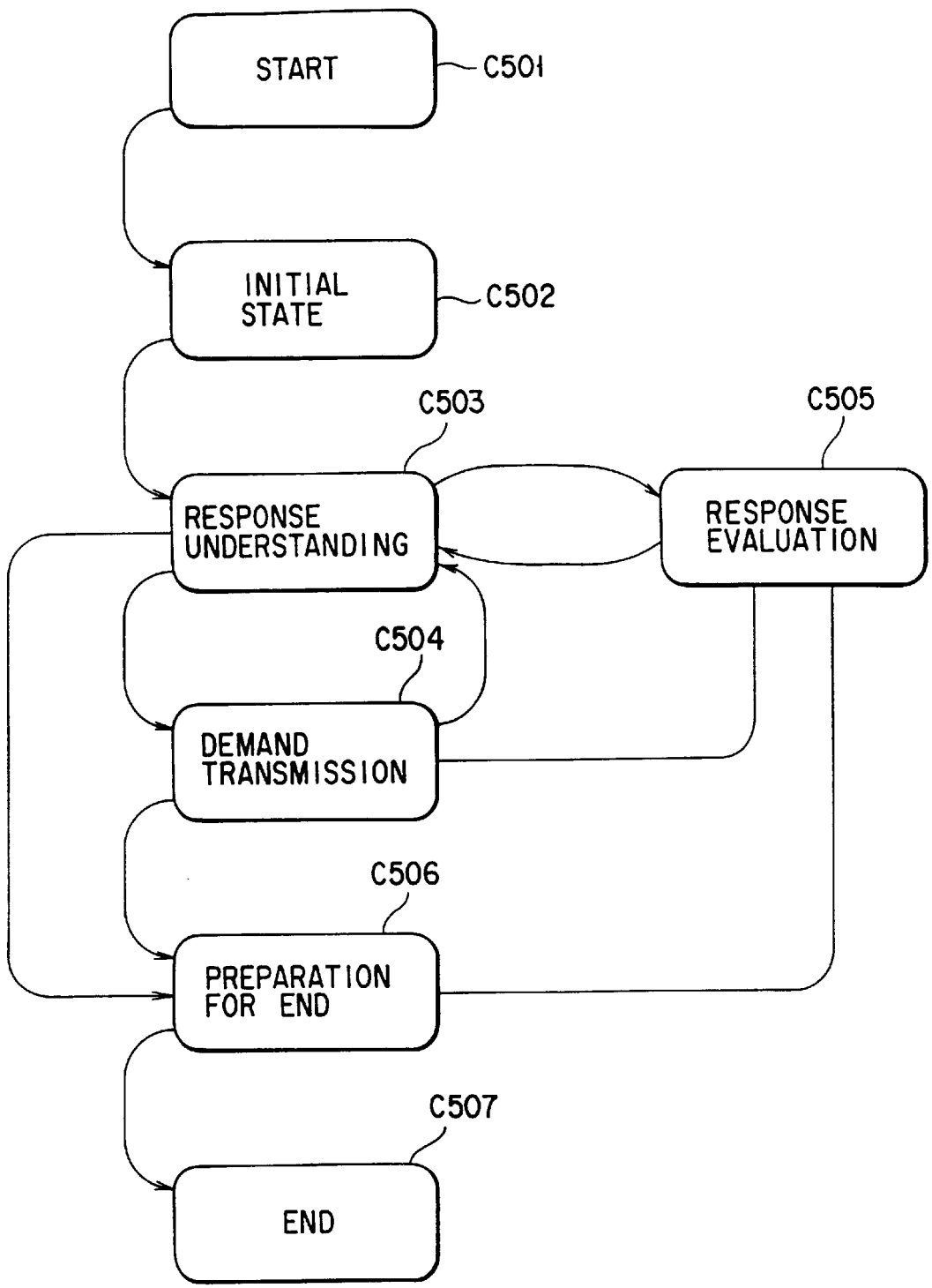
FIG. 6 is a view showing an example of a state transient chart of a user.

The information disclosing agent has a state transient model of the information disclosing agent itself and a state transient model of the user in order to grasp the current response status. The state transient model of the information disclosing agent is shown in FIG. 5, and the state transient model of the user is shown in FIG. 6. The states of the information disclosing agent are mainly classified into a "connected state" and a "disconnected state". When the information disclosing agent is connected to the client process of the user, these two models for the user are set in the initial states (C402 in FIG. 5 and C502 in FIG. 6). When a plurality of users simultaneously access the information disclosing agent, sets of agents and user models are held in number corresponding to the number of users.

When the connection is completed, the information disclosing agent shifts to a personal reference check state and checks the personal reference of the user in accordance with the information obtained from the client process (201 in FIG. 3). For example, in a UNIX system, a user ID (uid) is obtained using a system function getuid( ) in the client process. For example, a user's login name (str) is obtained using the following C-language program:

uid=getuid ( );
if (passwdp=getpwuid (uid)) strcpy (str, passwdp→pw*name);

Alternatively, a login name or password may be input through the client process every time the user accesses the information disclosing agent.

The client process notifies the information disclosing agent of these values using, e.g., a socket or a shared memory. The information disclosing agent collates the personal reference using this data.

A history of accesses by each user is recorded, and, for example, a user history information table shown in FIG. 7 is stored in the response rule storage unit 106 in order to change a response to be generated on the basis of the history. The personal reference of the user is compared with the contents of the user history information table to check if this user is a user who has previously accessed the agent. If this user is a new user who has not accessed the agent, a user history information table is newly formed. However, if the user is a user who has previously accessed the agent, the corresponding user history information is called.

The user history information table in the response rule storage unit 106 stores information obtained by the information disclosing agent for users who have previously accessed the agent. For example, user information includes, e.g., a login name, his/her real name, the number of accesses up to the present, the date and time of each access, each access time, an index of pieces of information provided to the previous responses, an amount of provided information, an index of information acquired from the user, an amount of acquired information, a keyword included in a demand, a common job, a computer environment, and the like. The information disclosing agent updates the user history information table every time it is accessed.

All pieces of user information whose users are expected to access the agent are registered in the response rule storage unit 106 so as to include personal relationship information, and a response to be generated can be changed. For example, a user information registration table shown in FIG. 8 is prepared and can be updated any time by the information provider. The contents of the user information registration table are the age, the sex, a field in which a user is interested, a relationship with the information provider, and the like. When the information provider exchanges information with a user by a means except for the information disclosing agent, the storage location of this history is also written. When a user who is currently accessing the agent is registered in the user information registration table, the information disclosing agent calls this information.

The personal relationship includes a social relationship determined by, e.g., the age and a section or department to which the user belongs, and an individual relationship (e.g., an acquaintance, a friend, an undesirable but unseverable friend, and a breach) formed in a one-to-one or one-to-many friendship. The treatment of a user is determined by the personal relationship. If user information shared by enterprises, universities, and the like is available, the social relationship of even a non-registered user can be determined in accordance with the contents of the shared user information. For example, if two persons belong to the same department of a company and have almost the same year of employment, they are determined to have a relationship of "colleagues". However, if two persons belong to the same department of a company and the first person has the year of employment earlier than that of the second person, the first person has a relationship of a "service superior" with respect to the second person. If personal letters are exchanged through, e.g., electronic mails between the user and the provider, an individual relationship of "acquaintances" can be automatically determined to some extent.

To limit the range of users who are allowed to access the agent, the information provider determines the upper limit of access permission levels in the user information registration table (FIG. 8) for users who are already known to the information provider. An access within the limited range can be allowed for a user having a low access permission level. For example, the upper limit of the access permission levels is designated to level 0 representing perfect rejection of access for a user to whom the information provider does not want to notify the presence of an agent.

When an unexpected user accesses the agent, access permission level determination rules shown in, e.g., FIG. 9 are stored in the response rule storage unit 106. An access permission level is defined by user information and his/her status which can be obtained by the agent from the current responses (e.g., a user name and a current use environment), the contents of shared user information, if any, and the user history information table in FIG. 7, and the contents of the user information registration table in FIG. 8.

To designate an access permission for each information to be provided, a disclosure permission range table shown in FIG. 10 can be input by the information provider. The range of users who can enjoy information disclosure is designated in accordance with the access permission level, user registration information, and the contents of the user history information. Access permission information may be added for each data automatically or with a judgment of the information provider in storing the data. In this case, it is determined upon information retrieval whether the information is disclosed.

Upon checking the personal reference, the information disclosing agent checks the current status (step S202 in FIG. 3).

For example, physical status information such as a user's window environment, display performance, a memory transfer capacity, and a data transfer capacity is obtained from the client process. In addition, states in the information disclosing agent and the user state transient model are checked. The information disclosing agent is kept in personal reference check state C403 in FIG. 5, and the user is kept in initial state C502 in FIG. 6.

Upon completion of the status check, the information disclosing agent updates the history information in the response rule storage unit 106 on the basis of the current status (step S203 in FIG. 3). For example, the user status, the contents of information provided up to the present, and the like are stored in the user history information table shown in FIG. 7.

Upon updating the response history, the information disclosing agent forms a response plan on the basis of the current status (step S204 in FIG. 3).

A method of understanding the intention of a user in limiting a task and generating a response is described in detail in Jpn. Pat. Appln. KOKAI Publication No. 5-216618. A method of causing an agent to understand the intention of a user, solve a problem, and generate a response is described in detail in Jpn. Pat. Appln. KOKAI Publication No. 6-95997.

The response plan formation unit 104 forms a response form limitation table shown in, e.g., FIG. 11 and limits the response forms (modality) such as a text, speech, and an image. For example, in consideration of the limitations in the priority order of information providers, a possibility of comfortable use with the performance of a user terminal or the like, and use status such as time, location, and application, the respective response forms are evaluated. Finally, the response forms are evaluated by a combination of a main response form and an auxiliary response form.

A user sakura currently uses a shared terminal in the working location of the company and has an environment in which a Japanese text and Japanese speech can be exhibited in real time. However, assume that a headphone is not used and the size of a display is small. For example, the main response form is a text, the speech is not generated during the service hours, and an image is a still image displayed in a small size. If a terminal having the same arrangement as described above, for example, is used in his/her house or private room, or in the absence of other persons around the user, or is used to call a plurality of users, speech is used. A person who discloses information may change the response form evaluation rules. The rules may be set such that responses are made using only texts or using moving pictures as much as possible. Alternatively, the response form may be changed in response to a user demand during the response. A user demand is stored in a user history information table, and the same response form is employed when the same user accesses the agent in the same environment.

The response plan formation unit 104 then selects an appropriate response plan. As shown in FIG. 12, a selectable response plan is defined for each state of the information disclosing agent shown in FIG. 5. The response plan formation unit 104 has response formation rules shown in FIG. 13 to select an appropriate plan.

The information disclosing agent is regarded to be set in the personal reference check state in the state transient model in FIG. 5, and the user sakura is regarded to be set in the initial state in the state transient model in FIG. 6. The purpose of the information disclosing agent in the personal reference check state is to inform the user of the personal reference check result of the user. The way of notifying the user of the result varies depending on the resultant information obtained upon the personal reference check result. A variety of responses for a greeting, a question, a check, an explanation, and a demand such that "Hello! Ms. Sakura", "How do you do? Ms. Sakura", "Are you Ms. Sakura?", "Are you Ms. Sakura in charge of materials?", "Is it the first time?", "Please tell your name.", "Your are not registered yet." The response formation rules for selecting an appropriate plan from the above responses can be changed by the information provider.

The access permission level is 5, and the number of accesses is one or more, and the personal relationship is the friendship according to the contents of the user history information table and the user information registration table. Using the response formation rules shown in FIG. 13, a response template "greeting" representing recognition of the partner is selected.

Finally, the response plan formation unit 104 fill necessary information in the selected response plan.

The response template "greeting" is to designate parameters and attributes in units of modalities. For example, as shown in FIG. 14, when a template having type 0 for a text is selected, proper terms are filled in the columns of "name" and "greeting words" to prepare a sentence formation plan. The terms are retrieved from the user history information table in FIG. 7, the user information registration table in FIG. 8, or a term registration table or dictionary in FIG. 15. The information provider can designate a new term or a use condition in the term registration table. As shown in FIG. 14, several types of response plans may be prepared and switched in accordance with the response rules and an instruction from the information provider.

An image drawing plan is designated by attribute values, i.e., image type=jim, and expression=smile (see FIG. 4). Alternatively, a self-portrait or scene may be output in place of the figure of the agent, or attribute values for a degree of busyness, a season, and the like may be designated to change a corresponding image drawing method in the response generation unit 105. As for music, attribute values such as a type, an agent name, a degree of busyness, and a season are designated to change the title, performance form, tone color, tempo, and the like of the actual musical piece in the response generation unit 105 in accordance with the plan.

When a data retrieval instruction is output from the response plan formation unit 104, data retrieval is performed in the data retrieval unit 102, and a response plan is formed again on the basis of the retrieval result (step S205 in FIG. 3). A data retrieval instruction is not generally included in a greeting plan.

When a message function is assigned to the information disclosing agent, a greeting plan and a message plan are formed to send a message if a message for a user is present.

If no data retrieval instruction is output, a response is generated in accordance with the response plan generated by the response generation unit 105 (step S206 in FIG. 3). Each response is generated for is each modality determined in a response plan for a text, speech, an image, or the like. The response is transferred to the client process or transferred and exhibited to an output device of a user terminal by a means for generating another process or the like. When a plurality of modalities are used, output timings are synchronized. In addition, the display position and size and a positional relationship with other information are also considered. Alternatively, a window layout may be generated on the basis of the previous user history information.

As shown in FIG. 4, for example, image data representing the figure of the agent and text data J0 representing the verbal expressions of the agent are displayed on the terminal of the user sakura.

At this time, an agent response must be distinguished from a user input. For example, as shown in FIG. 4, the responses of the agent jim are added with "J:" and arranged in lines. To prompt a user input, "S:" is displayed to distinguish the agent response from the user prompt. In the responses in which a plurality of agents and a plurality of users participate, the outputs of all the members must be distinguished from each other.

Upon generation of the response, the state of the information disclosing agent is normally shifted to demand release state C404 in FIG. 5, and the user state is normally shifted to response understanding state C503 in FIG. 6.

When an appropriate output cannot be sent from the information disclosing agent to the user, or the line is disconnected, the history information in the response rule storage unit 106 is updated to end processing. The client process reports the status to the user to perform post-processing to prompt whether communication is continued. Even if the client process cannot access the corresponding information disclosing agent, the client process notifies the user of the absence of the corresponding information disclosing agent, and the same processing as described above is performed.

When information is intentionally concealed for a user having access permission level 0, this user may feel doubt to the agent or force to permit access to the agent. To avoid this, for example, the same message as in the case in which the client process cannot access the corresponding information disclosing agent is displayed for the user having access permission level 0, thereby concealing the information disclosing agent itself. This method is generally effective, but is invalid if the operation of the information disclosing agent process of the information provider cannot be concealed to other users. Assume that all the user information disclosing agents are given as resident agents. In this case, the same behavior is done when the agents are disclosed to nobody and limited types of users, thereby preventing the above problem.

For the user having access permission level 0, control is shifted to disabled state C407 in FIG. 5 to generate a response for concealment. If no information disclosure is performed upon an access of the corresponding information disclosing agent, the disabled state is set, and a response for explaining this is generated, as shown in the response formation rules shown in FIG. 13. Processing is then ended.

Upon generation of the response, the information disclosing agent analyzes a user input (step S207 in FIG. 3).

A user input is entered to a client process through an input device such as a keyboard, a camera, a microphone, a pen input, or a mouse. For example, the user input is sent to the information disclosing agent through, e.g., a socket, a shared memory, or any other communication means.

A user input can be accepted even during generation of an agent response. However, the user input is rejected during generation of an instruction for rejecting reception in a response plan. A demand reception enabled or disabled state is indicated to the user. As shown in FIG. 4, for example, a cursor is flickered to indicate that a text can be input (see ■ in FIG. 4).

The demand reception unit 103 extracts the user's intention from the input data (step S207 in FIG. 3). Processing such as natural language analysis, speech recognition, expression recognition, and the like is performed for each input data modality such as a text, speech, or image data. The intention of the user is determined in accordance with a combination of analysis results.

The state of the information disclosing agent has been shifted to the demand understanding state in FIG. 5. The user state is response understanding demand C503 in FIG. 6. In this state, a schedule is changed, and a plan for retrieving the schedule of, e.g., a target conference is formed (step S205 in FIG. 3).

For example, items shown in FIG. 16 are assumed as user demands. The upper column represents main purposes for causing a user to respond to an information disclosing agent, and the lower column represents auxiliary purposes generated in the responses.

Figure 17:
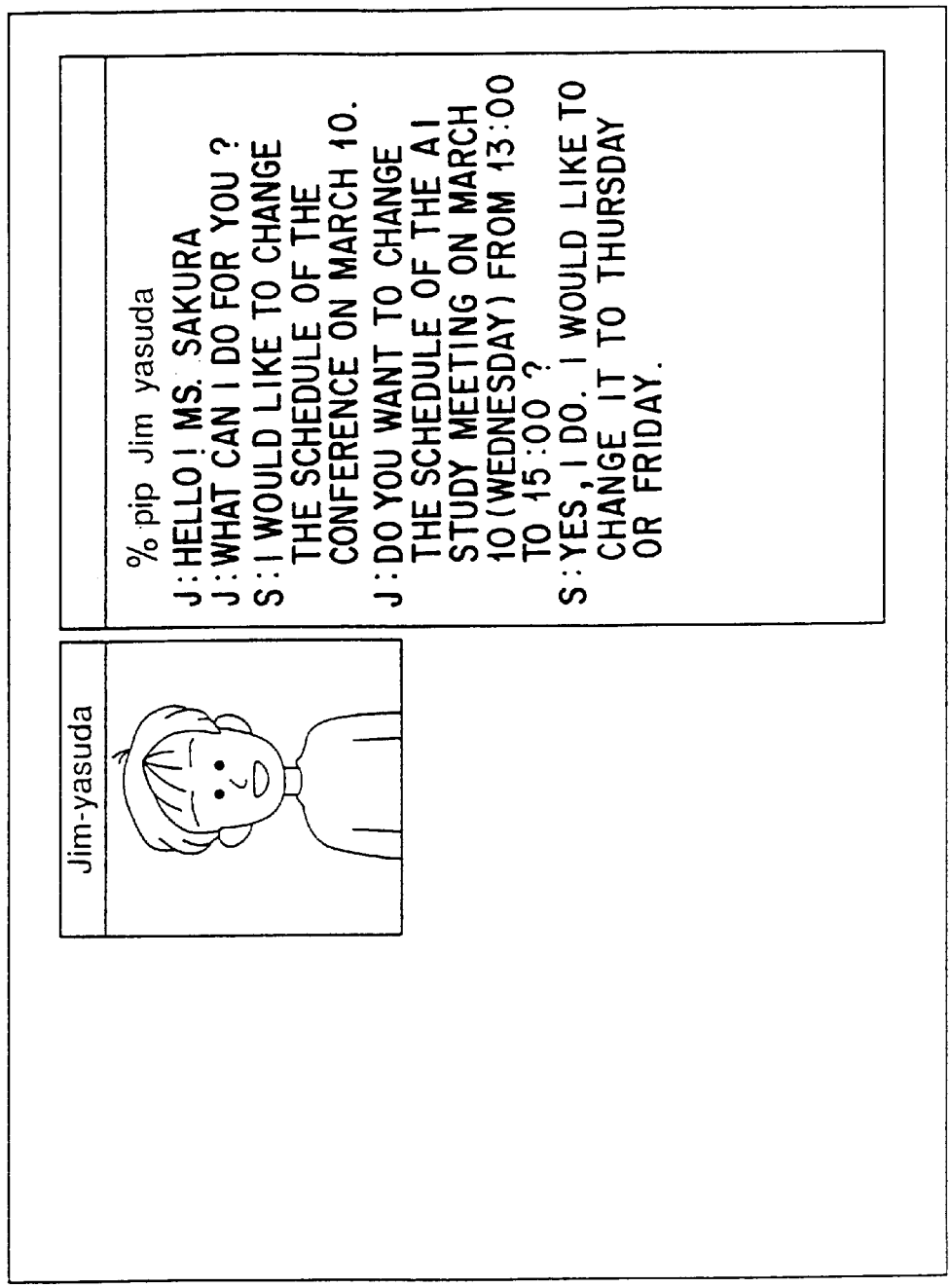
FIG. 17 is a view showing an example of a response with a user.

Assume that a user inputs a text "I would like to change the schedule of the conference on March 10.", as shown in S2 of FIG. 17. Morphemic analysis and syntactic analysis of an input sentence are performed by the natural language analysis function in the demand reception unit 103 to generate a plurality of candidates of semantic structures of the sentence. The appropriateness of the candidates is evaluated from a user state to be assumed next and the information obtained from the user. The meaning of the sentence is determined, and a state into which the user is shifted is determined (return to step S202 in FIG. 3). FIG. 18 shows the intentions included in the utterances of users.

The semantic structure of input sentence S2 of the user in FIG. 17 is given as (desire: change; target: conference (date: March 10)). Since the conference is a target, the user demand is assumed as a change in schedule. Demand table 1 shown in FIG. 19 is formed in accordance with the semantic structure of the user demand.

Upon generation of the response, the flow returns to the status check in step S202 in FIG. 3. The user is set in a demand transmission state, so the information disclosing agent is set in the demand understanding state. After the response history is updated, a response plan for checking the assumption of the user demand is formed. Since the assumption represents a schedule change, a plan for retrieving the schedule of the target conference is formed (step S205 in FIG. 3).

When the response plan formation unit 104 designates data retrieval, data is retrieved from the data storage unit 101 through the retrieval unit 102 (step S205 in FIG. 3), and a response plan is formed using the retrieval result.

When access permission information (e.g., copyright protection) is directly added to the retrieved data, control follows this information. Information to be immediately exhibited is checked on the basis of the disclosure permission range table (FIG. 10) input by the information provider to determine on the basis of the contents of the access permission level, the user registration information, and user history information whether the retrieved data are disclosed.

For example, if the schedule on March 10 is retrieved to find a plurality of conferences as candidates, one of the conferences is selected in accordance with the contents of the user history information and the user registration information table.

Control returns to the response plan formation unit 104 (step S204 in FIG. 3) to form a response plan for checking the user demand using the retrieved data. An example is given as J2 in FIG. 17.

A user input corresponding to the response plan is input as, e.g., a sentence shown in S3 in FIG. 17. The user input is analyzed in the demand reception unit 103 to obtain the following semantic structure.

(Affirmative) (desire: change; after change: (day: Thursday) or (day: Friday)

The affirmative statement is made for the contents of demand table 1. The next desire is assumed to supplement the contents of demand table 1. The contents of demand table 1 are changed as shown in FIG. 20.

The response plan formation unit 104 shifts to one of a state in which the contents of demand table 1 are achieved and a state in which the demand is understood in detail. In this case, since the contents of demand table 1 are still vague, the demand is understood in detail. As shown in FIG. 21, the corresponding portion of the schedule table is displayed to form a response plan for allowing the user to select items. The access permission level of sakura is set to 5 from the description of the user history information table in FIG. 7 in accordance with the access permission level decision rules in FIG. 5. Since the user and the information provider are in a friendship, the schedule can be exhibited in accordance with the contents of the disclosure permission range table in FIG. 10. An agent response is indicated by J3 in FIG. 21.

The subsequent user input and the subsequent agent response are shown in FIG. 22. The semantic structure of next user input S4 in FIG. 22 is analyzed as (request: waiting; period: just a moment) This is regarded as another demand from that of demand table 1, thereby forming demand table 2. Since the contents of demand table 2 are not vague at all, the response plan formation unit 104 shifts the state to demand achievement state C405 and displays an answer (J4 in FIG. 22). The contents of demand table 1 are not canceled.

The user instructs another process to display the corresponding portion of user's own schedule table. The user compares user's own schedule with the schedule table exhibited by the disclosure agent and inputs a change plan (S5 in FIG. 22). As a result of interpretation of the user input, the contents of demand table 1 is changed to those shown in FIG. 23.

The response plan formation unit 104 of the agent forms a response in which the intention of yasuda is reflected on the user change plan (J5 in FIG. 24).

The user evaluates this answer and inputs an affirmative statement (affirmative, tense: past) (S6 in FIG. 24).

In response to this, the response plan formation unit 104 understands the user's evaluation and determines that the answer is approved. The response plan formation unit 104 forms a response plan to the approved answer (J6 in FIG. 24).

The user then enters input S7 in FIG. 24 (check, target; (day: Thursday) and (start time: 10:30 a.m.) and (end time: 12 noon).

The agent which has understood the demand of the user changes demand table 1 as shown in FIG. 25. A response for check is formed (see J7 in FIG. 26), and the contents of the data storage unit 101 are updated. The updated contents are reflected on the schedule table under exhibition. At the same time, a text is exhibited (see J8 in FIG. 26).

A response for sending a message to the information provider is formed (J9 in FIG. 26) in accordance with a user input (end announcement) as "See you later!", thereby completing line connection between them.

If a user accesses an agent for the first time, a self-introduction response as indicated by J1 in FIG. 27 may be formed to prompt a user input. If information "sakura" is not registered even in the user registration information table, the agent cannot determine one of a plurality of conferences if they are scheduled on March 10. For this reason, a response is generated for a plurality of candidates (J2 in FIG. 27). Since the user and the information provider are not in a friendship, time prior to 10 a.m. proposed by the user is directly received (J3 in FIG. 28).

As described above, the user registration information and the response formation rules are changed to generate different responses depending on different users.

Figure 29:
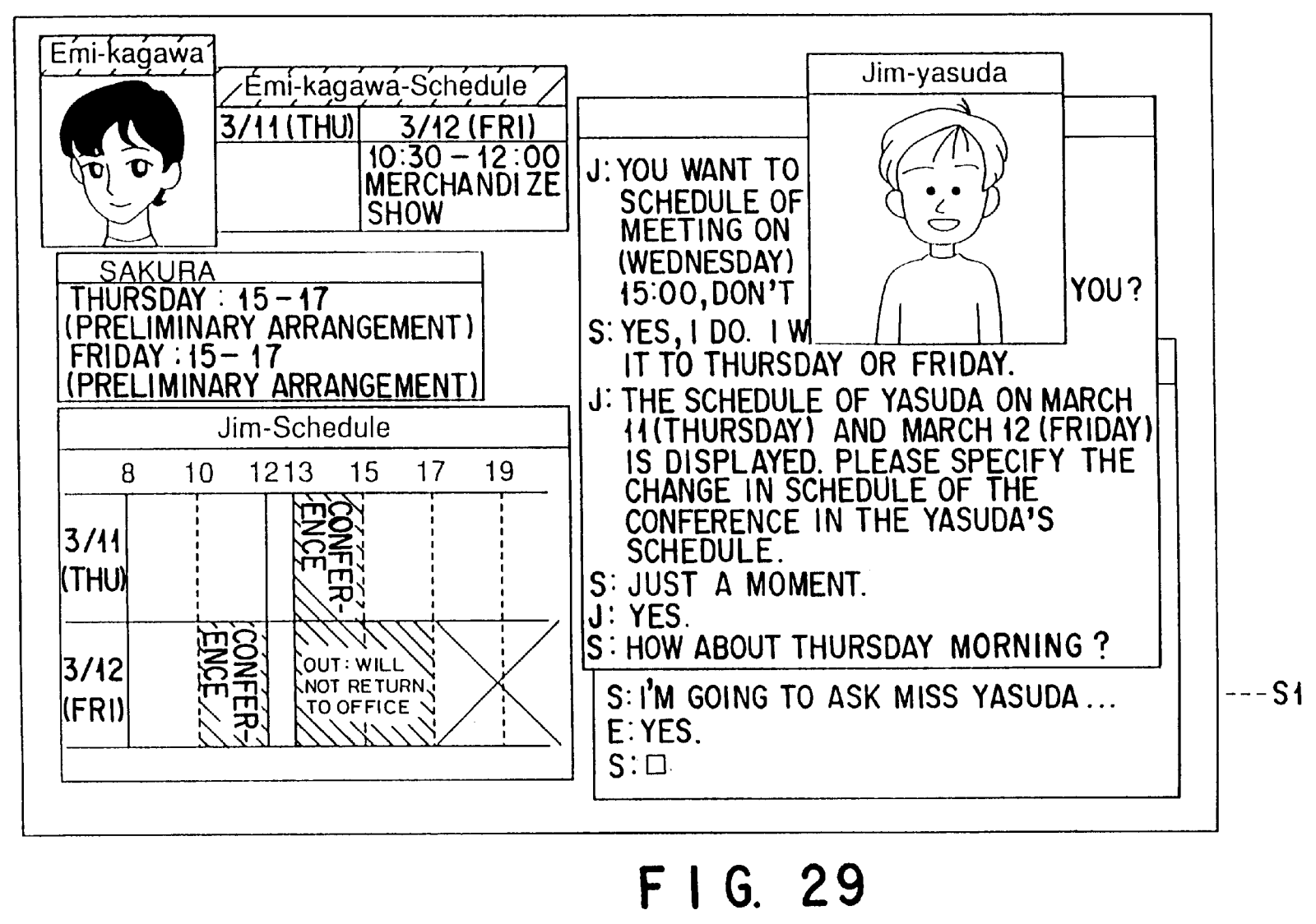

To simultaneously change the schedules of a plurality of persons, a user makes contact with the information disclosing agent of another information provider and compares the schedule tables of the three persons, thereby adjusting the schedules. FIG. 29 shows a case in which a user adjusts the schedule with an information disclosing agent Emi-kagawa of an information provider kagawa. The user sakura inputs "I'm going to ask Ms. Yasuda . . . " as indicated by S1 in the lower right window in FIG. 29, holds a response from the agent of kagawa, and adjusts the schedule with the agent of yasuda. The image of the information disclosing agent (Emi-kagawa) of another information provider is displayed on the upper left portion, and the schedule table of the information provider kagawa is displayed to the right of the image. If the partner is human, a plurality of persons must be simultaneously accessible, and it is impolite to restrict the human partners by time. However, since the partner is an agent, the user can simultaneously make contact with a plurality agents without worrying about the agents.

In the example of FIG. 29, the user interacts with each agent and manages exchange between the agents. Different windows are displayed to easily distinguish responses from each other. However, these responses may be displayed on a single window when a client program function is assigned to the single window. It is also possible to impart the state transient models of other agents to a given agent in order to respond and exchange information in the same session between a plurality of agents and the user. The interactive operation technique using a natural language is used to achieve mainly a user interface. If the agents can respond to each other using a natural language, information can be advantageously exchanged unless the response protocols of the agents are standardized.

When an agent cannot understand the question of a user or cannot answer to the question, the corresponding information provider designates the contents of a response.

An operation for retrieving image information owned by an individual person is shown in FIG. 30. The user sakura accesses the information disclosing agent of the information provider in accordance with a vague memory associated with recent actions of the information provider. The information provider has a simple map database, but retrieval cannot be made with a key as "Asahi Hall". The name of station as a major key is asked to the user. In this manner, when retrieval has failed, a specific support can be designated.

This will be described in detail with reference to the sixth embodiment.

An information provider can directly answer to the question of a user who is not satisfied with the answer, or to the question depending on the type of user or the contents of a question. The information disclosing agent has a means for accessing the information provider and assures an interactive operation means between the agent, the information provider, and the user depending on a status. This will be described in detail with reference to the fourth embodiment. The information provider may monitor responses between provider's own information disclosing agent and users and may generate an interrupt any time. A monitor screen is automatically displayed depending on the type of user and status in accordance with an instruction from the information provider. Alternatively, a message "I will answer to the question by mail later." may be displayed to the user, and the information provider may answer to the question with the response history being displayed to the information provider.

Figure 31:
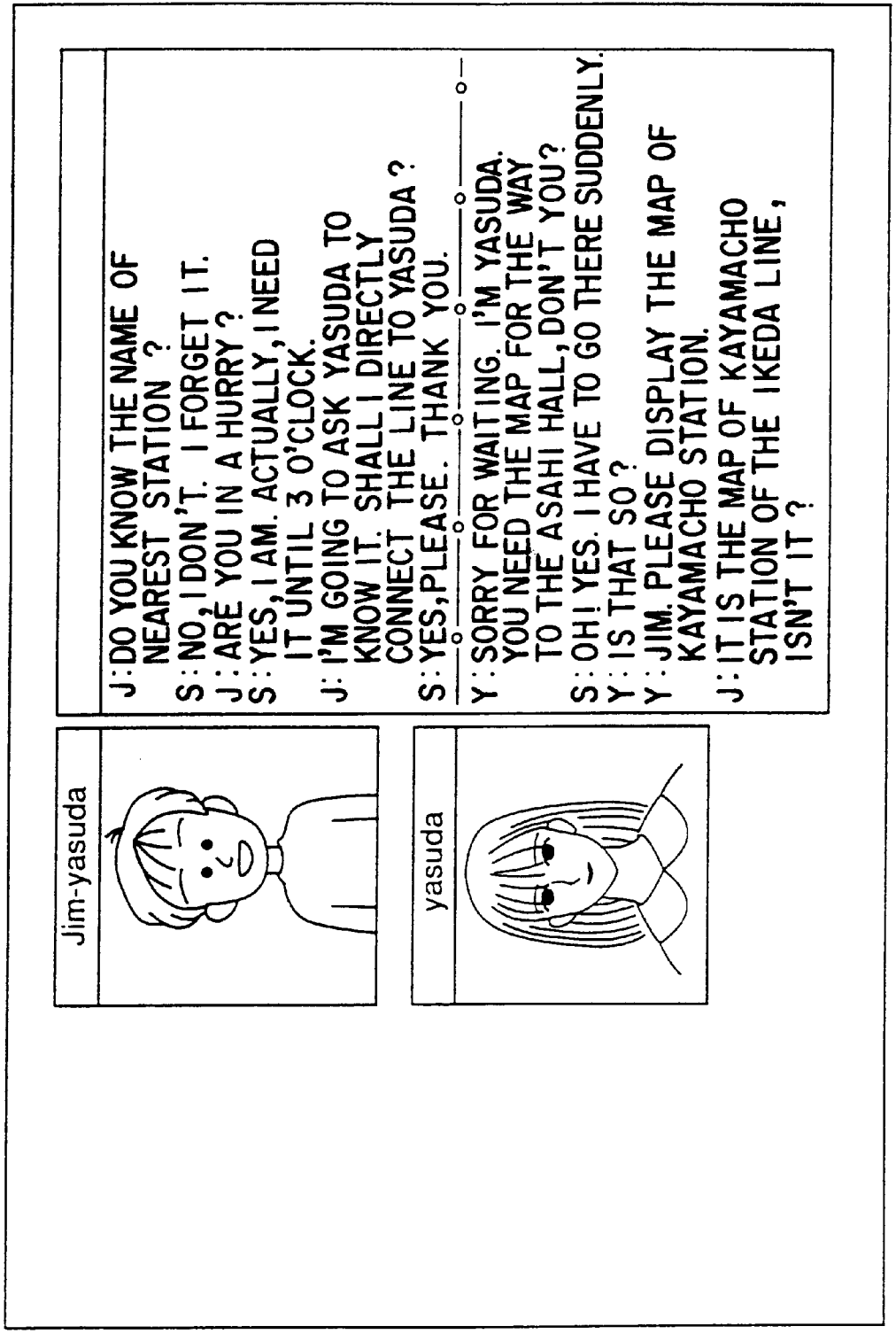
FIG. 31 is a view showing an example of a response when an information provider participates in an interactive operation.

FIGS. 31 and 32 show a case in which an agent, an information provider, and a user interact with each other. FIG. 31 shows a user window, while FIG. 32 shows the window of the information provider. As shown in FIG. 31, the agent checks a terminal at which the information provider is located and that the information provider is not busy. The agent receives the approval for line connection from the user and the information provider and directly connects an interactive operation line between the user and the information provider. In this case, a photographic image (see the block labeled as yasuda in FIG. 31) of the information provider yasuda is displayed on the user window to indicate that the information provider has joined in addition to the information disclosing agent. The information provider can designate what is displayed as his own image. An interrupt window (see the block labeled with jim-yasuda in FIG. 31) of the information disclosing agent in FIG. 32 is displayed in the window environment in operation of the information provider. The information disclosing agent simply notifies the information provider of the contents of a user demand and asks the information provider whether to directly answer to the question. In the state shown in FIG. 32, the agent may have a function of recording and reproducing a response history with the user and faithfully reproduce a response in response to a demand of an information provider or the like.

When the information provider approves a direct response demand, the image (see block labeled with sakura in FIG. 32) of the user sakura is displayed as shown in FIG. 32 to notify the information provider of the start of a direct interactive operation with the user. The image representing the user is a portrait or photographic image input by the information provider in advance.

Text data input by the information provider is displayed on the user window (FIG. 31) and the window (FIG. 32) of the terminal at which the information provider looks. A user input and an input of the information disclosing agent are also displayed in the same manner as described above. Retrieval is performed in accordance with an instruction from the information provider. In this case, the information disclosing agent stores a user question and an answer of the information provider in the response knowledge and data storage unit 101. When the same question is made, the information disclosing agent can answer to this question. In the example shown in FIGS. 31 and 32, a retrieved map image is newly added with a key "Asahi Hall".

Unlike in FIG. 29, FIGS. 31 and 32 show one window for displaying a response text. When the user interacts with only the agent or the user interacts with the agent and the other user, the texts are displayed on the same window because a rule for opening one text window for each agent is present. In FIG. 29, since a plurality of agents are present, the response text windows are present in number corresponding to the number of agents. Since only one agent is used in FIGS. 31 and 32, one window is used. A boundary line or the like is used to partition the window prior to participation of other users to distinguish the part of a new user from the part of an old user in FIGS. 31 and 32.

When the response rules are rewritten, a plurality of response text windows may be opened even in FIGS. 31 and 32. In this case, opening of the plurality of response text windows has an impression as if only the two users open a new session without adding any agent. If an agent joins a new session, this is declared to the users. Even if an agent asks participation in a new session, the corresponding information provider may output an instruction for rejecting it. If an additional window is used, individual responses between each user and the agent can be performed independently of responses between the three parties. This facilitates an operation for causing an information provider to output an instruction to an agent without notifying the user of it.

When owned information is not original, an information source may be added to this information. For example, a method of connection to the agent of an information provider A is stored in the agent of a user B who has obtained the information. When a third user C wants detailed information which is known to the agent of the user B, the third user C can simply access the agent of the information provider A as the information source. If the user B does not want clarify the information source, the connection method can be concealed from other users. In this manner, in a status wherein each user owns an information disclosing agent, information transmission can be smoothly performed.

Figure 34:
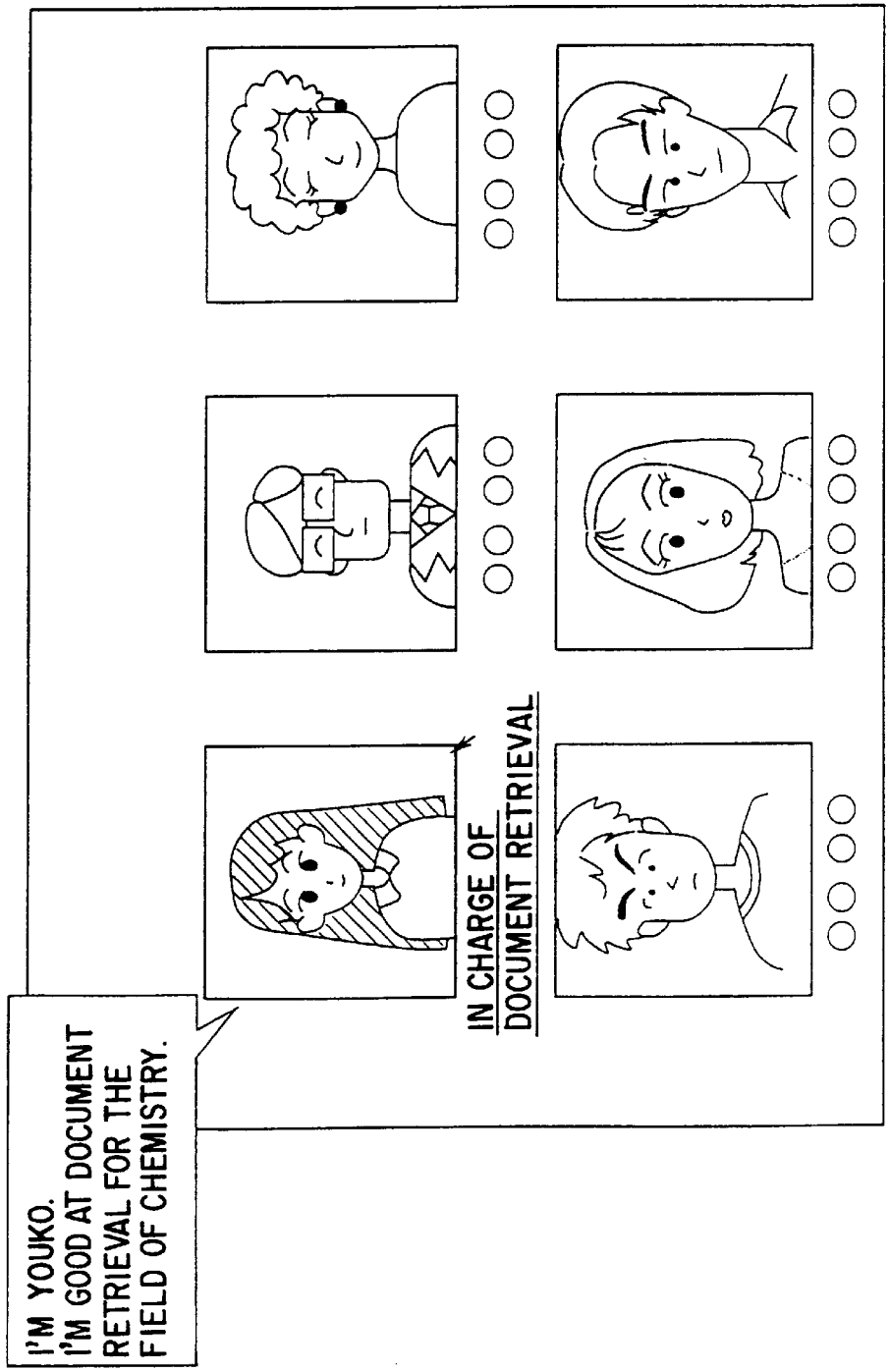
FIG. 34 is a view showing the list of functions of a disclosing agent.
Figure 35:
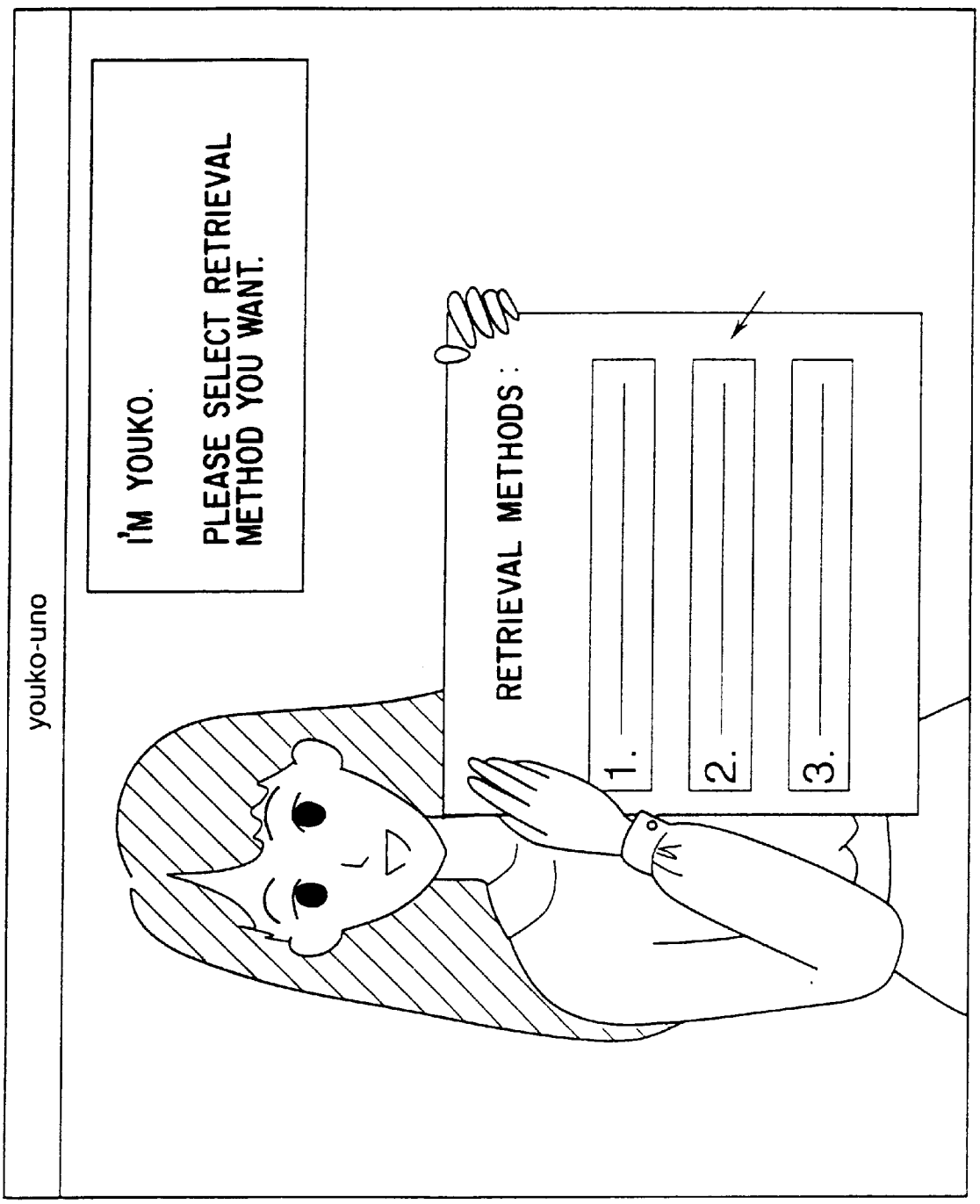
FIG. 35 is a view showing an example of a disclosing agent.

As shown in FIG. 33, response feature information such as the outer appearance and expressions of the information disclosing agent can be stored in a response feature information storage unit 308, and the response feature information can be changed by the information provider using a response feature information management unit 309, thereby imparting individuality to the information disclosing agent. For example, as shown in FIG. 34, a display form or speech information changing depending on different information providers can be designated. In FIG. 34, a user can obtain the self-introduction of each agent from a list of information disclosing agents. The list of agents may be exhibited hierarchically in accordance with organizations to which information providers belong, or in the favorite fields of the respective agents. When an agent is designated from this list using an input device such as a mouse to start response to the designated agent (see FIG. 35).

Figure 36:
FIG. 36 is a view showing another example of the disclosing agent.

By maintaining data compatibility with a commercially available three-dimensional CAD, a response can be formed in accordance with the outer appearance of a three-dimensional agent formed by an information provider, as shown in FIG. 36. As shown in FIG. 37, a response rule storage unit 116 having a plurality of response rule storage units 106 shown in FIG. 33 and a response feature information storage unit 318 having a plurality of response feature information storage units 308 shown in FIG. 33 may be prepared, and appropriate units may be selectively used depending on the type of partner or status. For example, type 0 to type 2 of the greeting plan shown in FIG. 14 are switched depending on the types of users. An agent of type 1 can be felt as if the agent and the information provider overlap because job busyness of the information provider is reflected on the outer appearance of the provider's portrait. However, an agent of type 2 can be felt with a sense of the season because a scene is drawn, so the presence of the information provider is not appealed to the user.

As shown in FIG. 38, a status determination unit 220 can be arranged to determine the user status on the agent side and positively disclose the information without receiving a demand from the user. For example, as shown in FIG. 39, when the agent finds a user who is reading information associated with that of this agent, the agent offers the user the information representing that an abstract formed by this agent is available.

Figure 40:
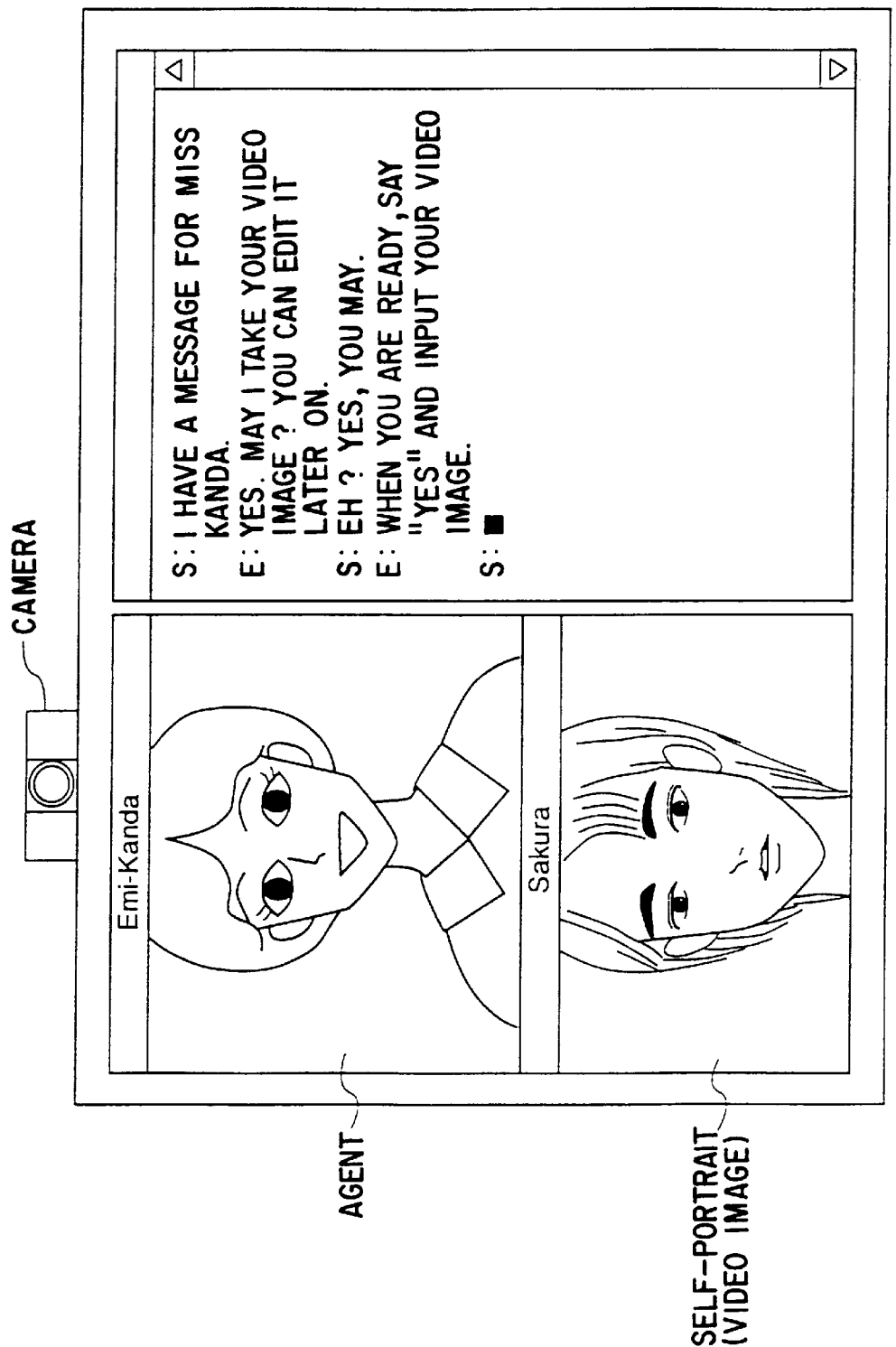
FIG. 40 is a view showing an example of a disclosing agent which receives an expression input.

It is also possible to receive a user's expression using a video as a user input. This function is effective to recognize the user's expression, use a face image for personal reference, and cause the information provide to check a user response later. The use of an expression will be described with reference to the fourth embodiment. In this case, as shown in FIG. 40, if a user has a function of sequentially monitoring video information sent to a partner on user's own window, and a function of editing recorded data in the recording mode, the user can preserve a video image with a sense of security. A necessary image can be deleted by the user and does not occupy a data storage area. The information provider can check data without the waste of time.

All text information input by a user need not be recorded. For example, only an analysis result in the demand reception unit may be recorded. Alternatively, only a text whose utterance intention is designated by the provider as a result of analysis may be recorded. For example, only a text whose the intention is a "request" or "proposal" and an interrogative sentence are recorded, only words of "gratitude" are recorded, or only a prolonged interactive operation is recorded.

The user history information is information which serves as a clue for knowing the favor of an individual user. When access is repeated, detailed information can be obtained. Similar history information of another agent is looked up to form an appropriate response to a user who has accessed this agent for the first time. Note that individual information which need not be disclosed to other agents and individual information which should not be disclosed to other agents are concealed from these other agents. Since the history information formed by an agent is associated with the privacy of each user, information which should not be accessed even by the information provider is included. Information formed by an agent is not disclosed to others without permission. Information which should not be disclosed must be encrypted even to a person who is the owner of the agent. In this case, even if agents freely exchange individual information to some extent, the information can be concealed to the users as the owners of the agents.

Editing and management of a response history by a user will be described with reference to the third embodiment.

(Second Embodiment)

The second embodiment will be described below.

FIG. 41 shows the arrangement of information disclosing apparatuses on the information provider side and the information demander side.

The information disclosing apparatus on the information provider side comprises a data storage unit 101, a retrieval unit 102, a demand reception unit 103, a response plan formation unit 104, a response rule storage unit 106, a response rule management unit 107, and a communication processing unit 111.

The information disclosing apparatus on the information demander side comprises a communication processing unit 161, an interactive operation processing unit 162, a demand reception unit 163, an information collection processing unit 164, a feature information extraction unit 165, a field-of-interest information management unit 166, a data storage unit 176, and an interest information storage unit 168.

In this embodiment, when a user cannot obtain desired information from the agent of an information provider by a series of interactive operations, a recent target of interest of the user is notified from the agent of the user to the agent of the information provider in accordance with an instruction from the user, and the notified information is looked up in causing the agent of the information provider to estimate information desired by the user. Therefore, the estimation precision can be improved, and desired information can be obtained without causing the user to repeat cumbersome interactive operations with the agent of the information provider.

More specifically, the individual information disclosing apparatus must estimate information desired by a user from all pieces of information stored in the data storage unit of the information provider during interactive operations with the user. Since most of the demands from the user are vague, a cycle of estimation, presentation, and evaluation must be repeated a number of times as a series of interactive operations during the interactive operations with the user in order to obtain information necessary for estimation. This becomes a cumbersome operation for the user.

In causing the agent of the information provider to estimate information desired by the user, when a sufficient precision cannot be obtained by clue information obtained through the interactive operations with the user, and clue information used in the previous accesses, information for correcting the above pieces of information is provided from the user, thereby improving estimation precision and providing desired information with a smaller number of interactive operations with the user.

For this reason, the information collection processing unit 164 is arranged in the information disclosing apparatus on the information demander side to extract feature data of information collected by the user from the user information collection history as additional information for estimating a field in which the user is interested, and learning and managing the feature data as user interest information in addition to estimating the field, in which the user is interested, in accordance with information accessed by and known to the user, the field of the accessed information from the previous access history of the user and the information as of fields for which the user have retrieved in the past. The information disclosing apparatus on the information provider side receives the extracted and learnt information of the field, in which the user is interested, from the information collection processing unit 164 and extracts information belonging to this interest field from the information source on the basis of the interest information.

When information desired by a user is not appropriately provided by a series of interactive operations, the feature information associated with the field as a user interest target, extracted from the previous information retrieval of the user, and extracted and managed by the individual information disclosing apparatus of the user is sent to the individual information disclosing apparatus of the information provider in accordance with the instruction from the user. The individual information disclosing apparatus of the information provider looks up the feature information and can appropriately estimate information demanded by the user.

The information collection processing unit 164 collects information estimated to interest the user. The information thus collected is stored in the data storage unit 167 of the user.

The feature information extraction unit 165 extracts the feature information for information serving as a user interest target.

The field-of-interest information management unit 166 classifies feature information extracted by the feature information extraction unit 164 into categories and manages it in accordance with time information or the like. The feature information is stored in the interest information storage unit 168 under the management of the field-of-interest information management unit 166. Examples of interest information are shown in FIGS. 42A through 42C.

The demand reception unit 103 estimates information desired by the user through interactive operations with the user, using the internal intention extraction function. In addition, the demand reception unit 103 estimates information desired by the user together with user interest information notified from the user.

The retrieval unit 102 extracts information from the data storage unit 101 on the basis of the estimation result using the intention extraction function.

As described above, the feature information associated with the field in which the user is interested is notified to the individual information disclosing apparatus of the information provider in accordance with the user instruction, and the individual information disclosing apparatus of the information provider looks up this feature information to more appropriately estimate the information desired by the user. Therefore, the user can simply and appropriately receive the desired information from the individual information disclosing apparatus of the information provider. Therefore, information can be smoothly exchanged and shared between individual persons.

This embodiment will be described in detail below.

In the system having the information collection processing unit 164, the feature information extraction unit 165, the field-of-interest information management unit 166, and the interest information storage unit 168, the information collection processing unit 164 files electronic mails and articles of the electronic news and accesses various information sources such as a database to collect information estimated to interest the user. The collected information is stored in the data storage unit 167 on the user side.

This information collection means is described in detail in Jpn. Pat. Appln. KOKAI Publication No. 4-127370.

The feature information looks up to estimate information which interests the user in causing the information collection processing unit 164 to automatically collect information is directly defined by the user or extracted by the feature information extraction unit 165. Alternatively, information directly defined by the user is added with new information and corrected by the feature information extraction unit 165, thereby obtaining the feature information.

A method of extracting and correcting feature information about information which interests the user in the feature information extraction unit 165 is described in Jpn. Pat. Appln. KOKAI Publication No. 4-127370 described above. A method of extracting the features of a desired document for a retriever on the basis of the frequency of words appearing in the retrieved document and feeding back the extraction result in the next retrieval is described in "SMART Information Retrieval System" (Gerald Salton, edited by Kenji Jinbo and published by Kikaku Center). Recent popular techniques are an indexing technique, a relevance feedback technique, and the like used in an information retrieval system WAIS on an internet.

The field-of-interest information management unit 166 manages feature information extracted by the feature information extraction unit 165 for information which interests the user.

The feature information is stored in the interest information storage unit 168 through the field-of-interest information management unit 166.

For example, when the information demander does not obtain desired information even through a series of interactive operations with the individual information disclosing apparatus of the information provider, interest information of the information demander which is held in the individual information disclosing apparatus of the information demander is disclosed as auxiliary information for helping transfer of the intention in the interactive operations. The precision of estimation of the intention of the individual information disclosing apparatus of the information provider can be improved.

The disclosure of the interest information from the information demander is designated as an offer for providing interest information of the information demander from the information demander to the individual information disclosing apparatus of the information provider.

The individual information disclosing apparatus of the information provider demands the disclosure of the interest information of the information demander to the individual information disclosing apparatus of the information demander in accordance with the offer for providing interest information from the information demander.

Note that the disclosure level of the interest information of the information demander to the individual information disclosing apparatus of the information provider is appropriately set in advance. If this setting is not appropriate, and the individual information disclosing apparatus of the information demander cannot automatically disclose interest information, the individual information disclosing apparatus of the information demander may ask the information demander to disclose the interest information.

The individual information disclosing apparatus of the information demander extracts interest information from the interest information storage unit 168 through the field-of-interest information management unit 166 in accordance with the disclosure demand for the interest information of the information demander from the individual information disclosing apparatus of the information provider.

The extracted interest information is transferred to the interactive operation processing unit 162, and the interactive operation processing unit 163 communicates with the individual information disclosing apparatus of the information provider through the demand reception unit 163 and the communication processing unit 161 of the information demander, thereby transmitting the interest information of the information demander.

The individual information disclosing apparatus of the information provider estimates desired information of the information demander on the basis of the interest information disclosed from the individual information disclosing apparatus of the information demander.

To record an access history for each information demander and form a response based on this access history, the response rule storage unit 107 stores a user history information table.

This table stores past interactive operation information with information demanders, already accessed information, and the like. These pieces of information can be used to estimate desired information of the information demander in a current interactive operation.

When the current interactive operation information is appropriately combined with the above history information and the interest information of the information demander which has been disclosed from the information demander, desired information of the information demander can be estimated with a higher precision.

The retrieval unit 102 extracts information from the data storage unit 101 on the basis of the estimation result using the intention extraction function in the demand reception unit 103.

(Modification 1 of Second Embodiment)

Pieces of interest information are not classified into specific categories in the second embodiment.

The pieces of interest information are stored and managed in the interest information storage unit 168 through the field-of-interest information management unit 166 in accordance with categories in units of fields.

The field-of-interest information management unit 166 classifies these pieces of interest information into categories in units of fields and can extract feature information of each category in response to a demand.

Upon reception of the offer for providing interest information from the information demander, the demand reception unit 103 of the individual information disclosing apparatus of the information provider simply demands disclosure of only the interest information of the information demander to the individual information disclosing apparatus of the information demander in the second embodiment.

In this modification, intention estimation information extracted by the intention extraction function in the past interactive operations with the information is disclosed to the individual information disclosing apparatus of the information demander together with a demand for disclosing interest information.

Upon reception of the intention estimation information associated with the information demander together with the interest information disclosure demand from the individual information disclosing apparatus of the information provider, the individual information disclosing apparatus of the information demander uses these pieces of information to extract interest information of an appropriate category from the interest information storage unit 168 through the field-of-interest information management unit 166.

A method using a neural network or the like is known as a means for determining the corresponding appropriate category on the basis of the received intention estimation information.

If one category as a target of interest cannot be currently specified by the above technique, quantitative information such as the number and size of cases for information classified in units of categories and quantitative information such as the number of accesses are provided. These pieces of information are used as a degree of concern, and one of a plurality of candidates regarded to belong to the categories is selected and presented in accordance with the degree of concern.

Assume that a user becomes interested in a new target, that a target of interest is specialized and divided, and that a user loses an interest not to perform detailed classification. In other words, when a change is required in the arrangement of classes, the user can directly input and edit the classes, as needed.

Alternatively, localization of pieces of information classified into the categories may be appropriately detected to prompt the user to correct the arrangement of classes.

(Modification 2 of Second Embodiment)

In the second embodiment and Modification 1 of the second embodiment, disclosure of interest information of the information demander is designated as an offer for providing the interest information of the information demander from the information demander to the individual information disclosing apparatus of the information provider.

In Modification 2, disclosure of interest information of the information demander is designated, from the information demander to the individual information disclosing apparatus of the information demander, as disclosure of the interest information to the individual information disclosing apparatus of the information provider.

Upon reception of an instruction for disclosing interest information from the information demander, the demand reception unit 163 in the individual information disclosing apparatus of the information demander extracts the interest information from the interest information storage unit 168 through the field-of-interest information management unit 166.

In this case, if the pieces of interest information are classified as in Modification 1, interest information in an appropriate desired category can be designated for disclosure.

The pieces of feature information may be added with time information used and may be managed. The pieces of feature information may be time-serially managed such as the latest incidence of interest or an incidence in which the user has been interested for a specific period.

When the field-of-interest information management unit 166 does not receive any instruction representing the period of interest information, the field-of-interest information management unit 166 extracts the latest interest information. If a specific period is designated, the field-of-interest information management unit 166 extracts interest feature information of the specific period.

(Modification 3 of Second Embodiment)

In the second embodiment and Modifications 1 and 2 of the second embodiment, the information demander directly performs an interactive operation with the information disclosing apparatus of the information provider to try to obtain desired information.

The information disclosing apparatus of the information demander communicates with the information disclosing apparatus of the information provider without any direct interactive operation between the information demander and the information disclosing apparatus of the information provider. Desired information of the information demander is disclosed from the information disclosing apparatus of the information provider.

The information disclosing apparatus of the information demander provides interest information of the information demander to designate desired information of the information demander to the information disclosing apparatus of the information provider who wants disclosure of information.

(2) (Third Embodiment)

The third embodiment is now be described.

FIG. 43 shows the arrangement of an information disclosing apparatus and an information demander terminal of this embodiment.

The information disclosing apparatus on the information provider side comprises a data storage unit 301, a retrieval unit 302, a response plan formation unit 304, a response rule storage unit 306, a data communication unit 311, and a history storage unit 312.

The information demander terminal comprises a data communication unit 321, a demand reception unit 323, a response generation unit 325, a history management editing unit 326, and a primary history storage unit 327.

The same names in the constituent elements in FIGS. 2 and 43 basically have the same functions. Note that a component corresponding to the response rule management unit in FIG. 2 is omitted in FIG. 43.

The demand reception unit 323 on the user side receives an input such as a text, speech, an image, or a moving picture through a communication means such as a network and understands the intention included in the input. The demand reception unit 323 receives inputs associated with approval of recording/reproduction of history information in the primary history storage unit 327 and operations such as addition, deletion, and editing of history information and sends the inputs to the history management editing unit 326. The data such as the intention of the user and the semantic expressions of the demand, which are extracted by the demand reception unit 323 are sent to the response plan formation unit 304 on the information provider side through the data communication units 321 and 311.

The history management editing unit 326 performs data management such as retrieval, addition, deletion, and editing of history information in the primary history storage unit 327. The history management editing unit 326 sends history presentation information to the response generation unit 325.

The primary history storage unit 327 stores the user demand received by the demand reception unit 323 in correspondence with a response generated by the response generation unit 325 to the user.

The response plan formation unit 304 plans a response meeting the user demand from the demand reception unit 323, using knowledge or rules stored in the response rule storage unit 306. The response plan formed by the response plan formation unit 304 is sent to the response generation unit 325 through the data communication units 311 and 321.

The response rule storage unit 306 stores knowledge and rules required for planning a response in the response plan formation unit 304.

The response generation unit 325 generates a response as data such as a text, speech, an image, or a moving picture, or a combination thereof in accordance with the response plan sent from the response plan formation unit 304. The response generation unit 325 presents history information to the user on the basis of the history presentation information sent from the history management editing unit 326.

The history storage unit 312 records the demand of the user's intention and semantic expressions received from the demand reception unit 323 through the data communication units 321 and 311 together with the response plan and the internal expression of the interactive operation state obtained from the response plan formation unit 304, thereby obtaining an interactive operation corpus. The history storage unit 312 also stores history information sent from the primary history storage unit 327 through the history management editing unit 326 and the data communication units 321 and 311.

An arrangement in a rectangle indicated by a broken line is required to disclose data owned by the information provider. The data storage unit 301 stores data such as a text, speech, an image, and a moving picture. The retrieval unit 302 extracts necessary data from the data stored in the data storage unit 301.

The operation of the present invention will be described below. The overall processing flow is shown in a flow chart in FIG. 44 or 45. FIG. 46 shows responses of this embodiment.

A user who wants an interactive operation accesses the information disclosing apparatus managed by another user. The former is simply called a user (or an information demander), the latter is called an information provider, and the information disclosing apparatus is called an information disclosing agent.

The user inputs, e.g., a command string "pip fumi ohno" within user's own test input enable window through a window-based interface shown in FIG. 46 (S0 in FIG. 46). A user process activated by the command pip accesses an information disclosing agent fumi of an information provider ohno and interfaces data input/output with respect to the information disclosing agent. In this case, the process activated by the user is called a client process.

The left side in FIG. 43 represents an information disclosing agent process, and the right side in FIG. 43 represents the client process. These processes exchange necessary data through the data communication units 311 and 321.

A personal reference check method for the user, a response plan formation method, an intention extraction method, and the like are described in detail in Jpn. Pat. Appln. KOKAI Publication Nos. 5-216618 and 6-95997.

The agent process and the client process exchange information for checking the personal reference of the user (S211 in FIGS. 44 and 45). For example, a user's login name "ume" is obtained using UNIX system functions getuid( ) and getpwuid( ) in the client process, and the login name is sent to the agent process. The sent login name is compared with a login name in user information registered in the response rule storage unit 306. Alternatively, another collation technique may be used.

It is also possible to receive a user's expression using a video as a user input. This function is effective to recognize the user's expression, use a face image for personal reference, and cause the information provider to check a user response later. The use of an expression will be described with reference to the fourth embodiment. In this case, user's own video information sent to the user can be sequentially monitored in user's own window, like a box labeled as ume in the lower left portion in FIG. 46.

Figure 47:
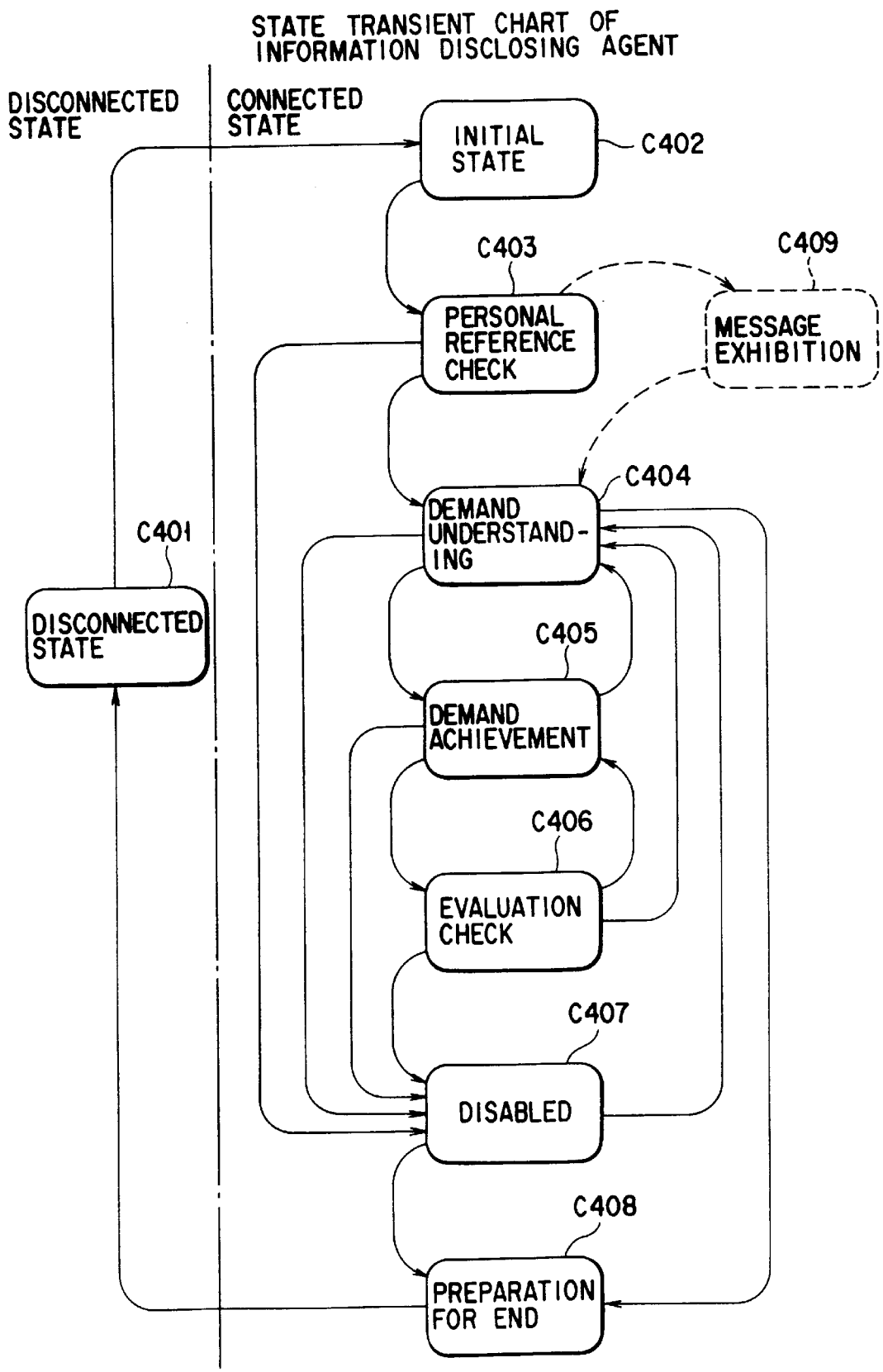
FIG. 47 is a view showing an example of a state transient chart of an information disclosing agent.
Figure 48:
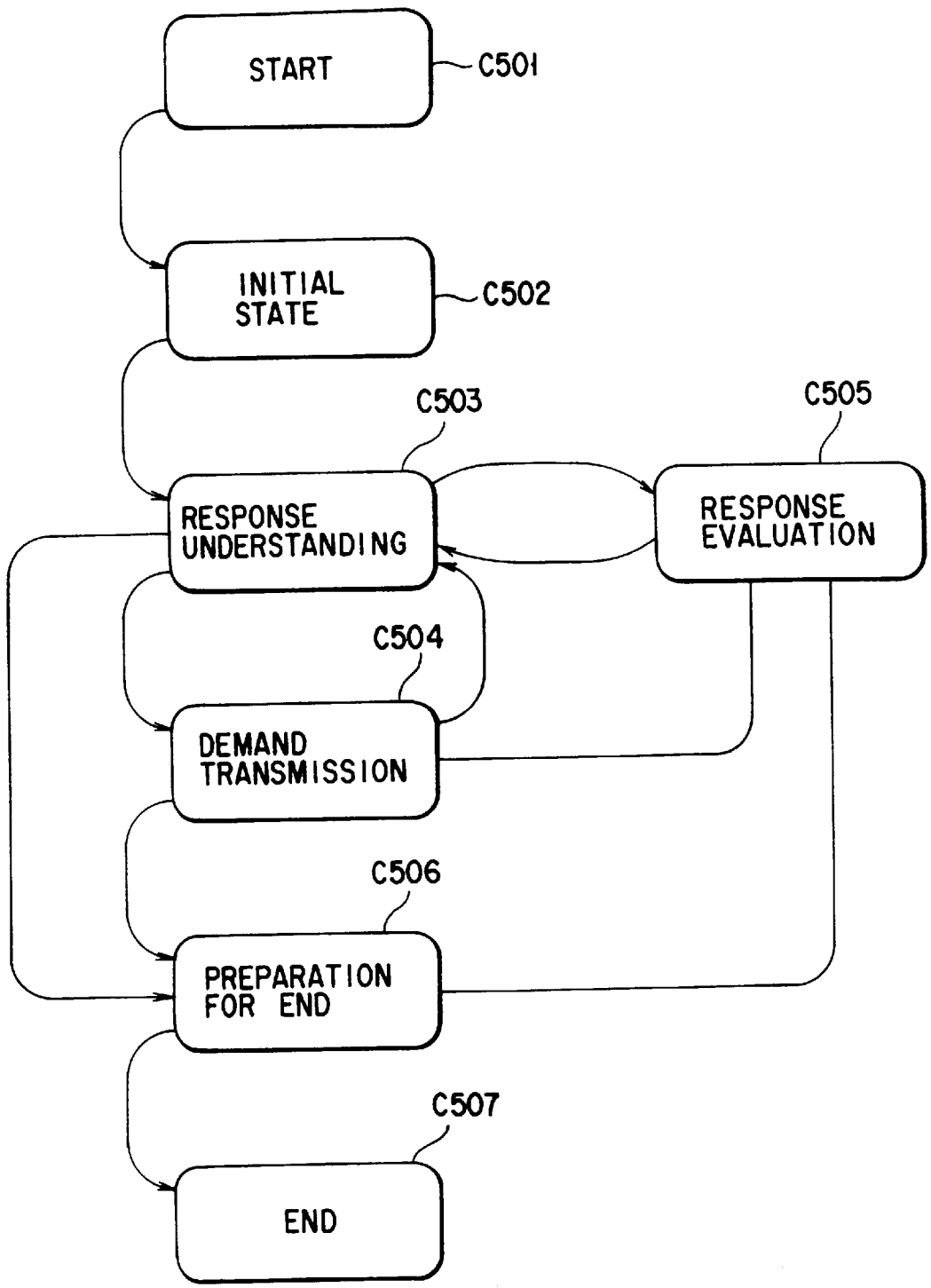
FIG. 48 is a view showing an example of a state transient chart of a user.

Upon checking the personal reference, the information disclosing agent checks the current status (S212 in FIGS. 44 and 45). For example, two state transient models for the information disclosing agent and the user are provided, as shown in FIGS. 47 and 48, respectively. The information disclosing agent estimates a specific state on each model.

Upon checking the status, the information disclosing agent updates the information in the response history storage unit 321 on the basis of the current status (S213 in FIGS. 44 and 45).

A response plan is then formed on the basis of the current status (S214 in FIGS. 44 and 45). The response plan has a template of responses such as a greeting, a question, an explanation, and a demand. An appropriate one of these responses is selected using the selection response rules, and necessary information is filled in the template. If retrieval is included in the response plan, necessary information is retrieved through the retrieval unit 302 (S216 in FIGS. 44 and 45). The resultant response plan is transferred to the client process through the communication unit 311.

In the response generation unit 325 of the client process, a response such as a text, an image, or speech is generated from the response plan (S217 in FIGS. 44 and 45). A user who has the right of access can enter subsequent inputs.

The user ume in FIG. 46 has already been registered in the user information. The first response plan generated by the agent is a "greeting" response. The client process receives this response plan and displays a greeting sentence.

As shown in FIG. 46, assume that the user ume calls the information disclosing agent fumi of the information provider ohno to look up a document own by the information provider ohno, and that a demand sentence is input in the form of a text.

The text input by the user is classified, e.g, as an intention shown in FIG. 49. The input text is classified into "12 request" in accordance with the conjugation of a verb "tell". When the intention of the utterance is "desire", "request", or "proposal", a user demand is contained, so that the agent shifts to a demand understanding state in FIG. 47 and performs the following analysis.

User demands are classified into types shown in, e.g., a list in FIG. 50. Terms such as demand targets "schedule", "document", and "history" and demand contents "look-up", "change", "add", and "delete" are extracted and combined to understand demands such as "change in schedule", "look-up of document", and "deletion of history". Synonyms such as "see", "know", and "change" are registered for "look-up"; "change" and "postpone", for "change"; and "report", "minutes", for "document". "Look-up of document" can be found as the user demand from the terms such as "report" and "tell" in FIG. 46. For example, a demand table shown in FIG. 51 is formed.

Figure 52:
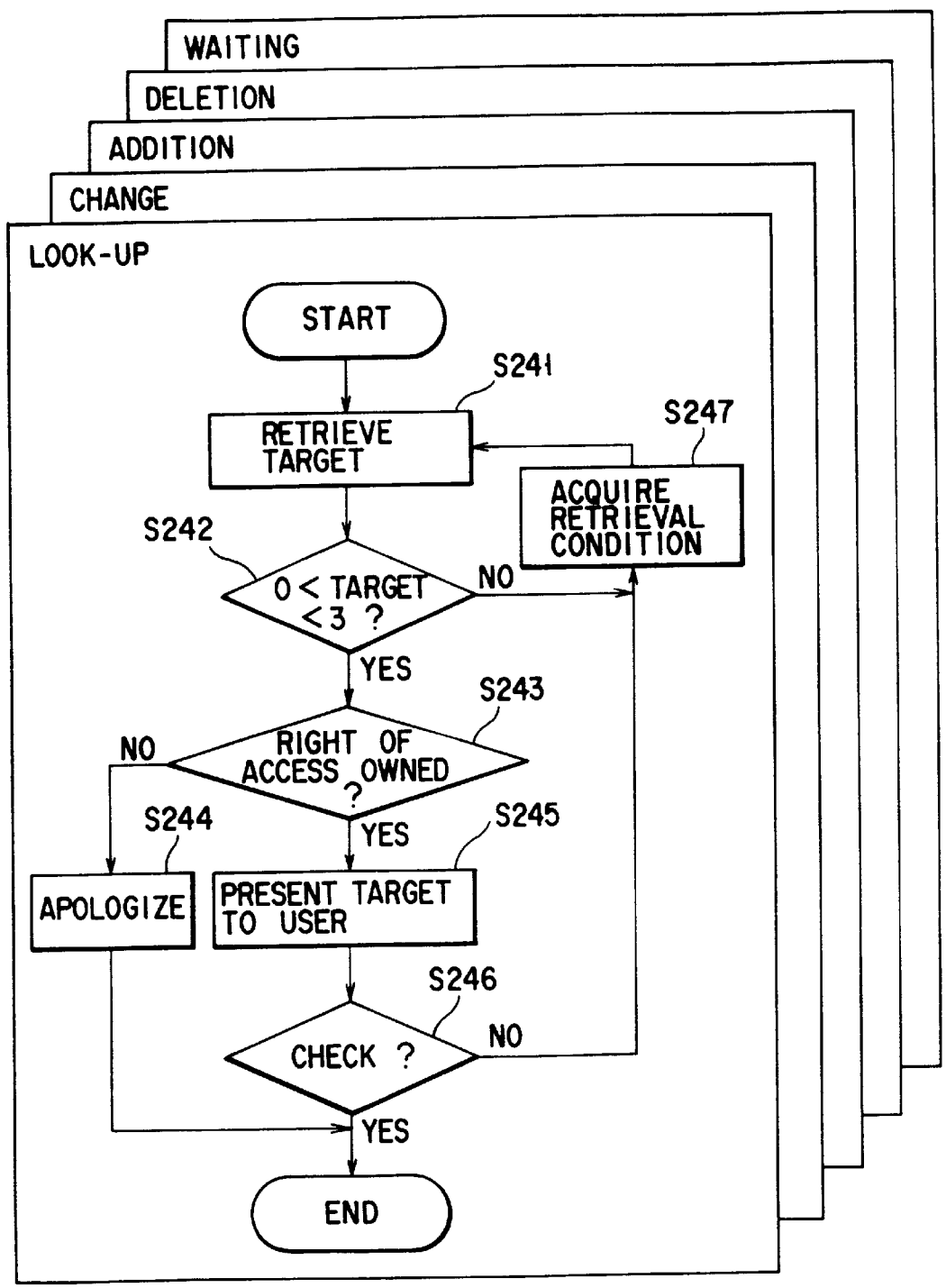
FIG. 52 is a view showing an example of a demand achievement plan template.

The contents of the resultant demand table are sent to the response plan formation unit 304 through the data communication unit 321. An appropriate one of the demand achievement template (FIG. 52) stored in the response rule storage unit 306 is selected in accordance with the contents of the demand table.

In the demand achievement plan "look-up", a target document is retrieved (step S241). Since conditions for retrieval are short, a request table "retrieval condition acquisition" of level 2 to achieve the demand of level 1 is set (step S247). Retrieval conditions to be acquired are items for blank columns in the demand table shown in FIG. 51. To obtain, e.g., a "subject", a "retrieval condition-acquisition" demand table shown in FIG. 53 is formed and sent as a response plan to the response generation unit 325 through the data communication unit 311. An item to be filled is assigned with "?", and an item which need not be filled is assigned with "-". By this response plan, a response sentence such as "What report?" is generated. The contents of the demand table are sequentially stored in the history storage unit 312 of the agent process.

Assume that a response of ume to the above question is "The report on the business trip to Osaka last week.", as shown in FIG. 46. In demand table level 2, the "type" is the "report on business trip", and "last week" represents a period during which he had a business trip. In this case, the "date of drafting and submission of the report" is kept unknown. The response plan formation unit 304 forms, e.g., a "schedule-look-up" demand table as level 3 shown in FIG. 55.

Figure 59:
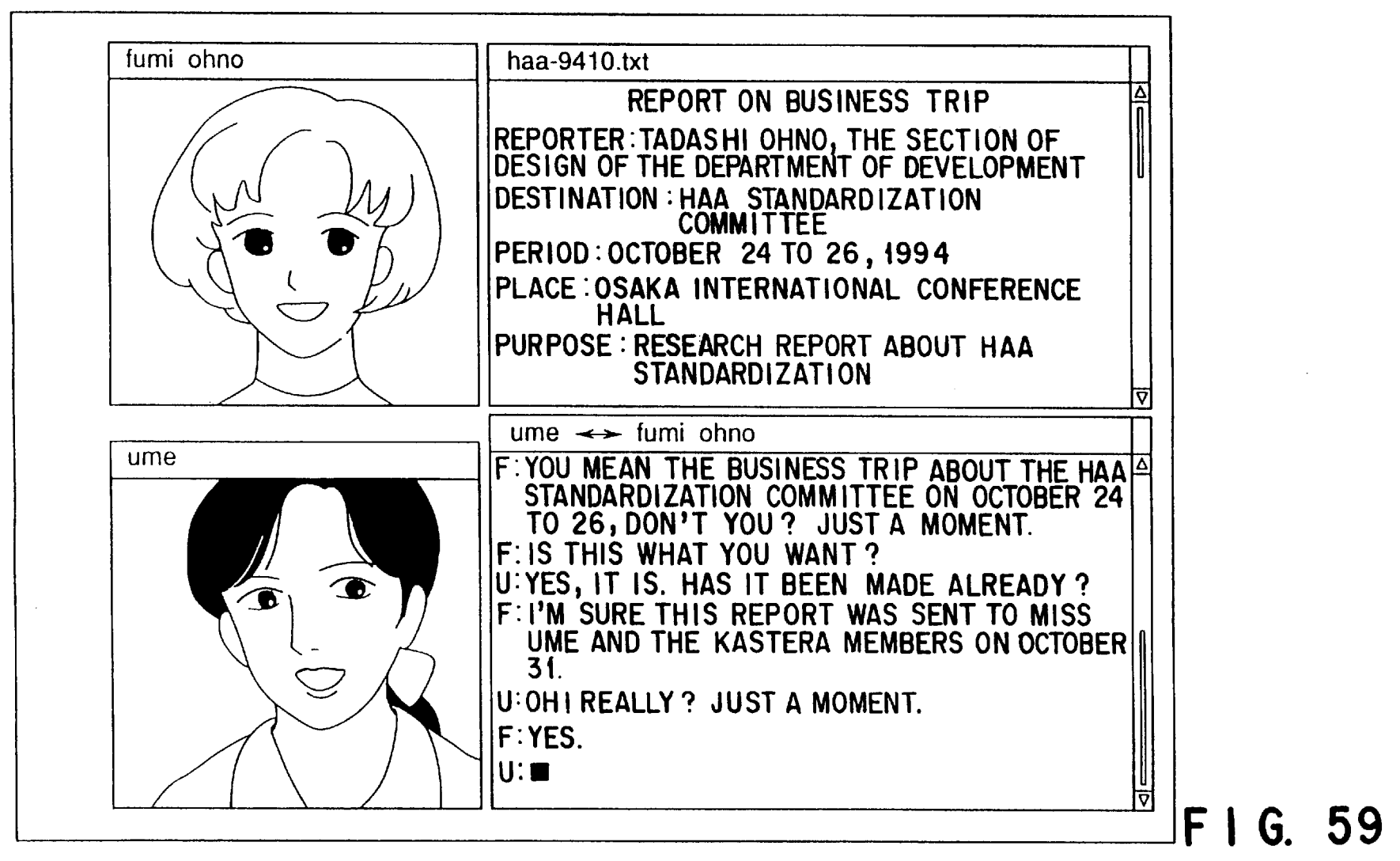

The schedules of the data storage unit 301 are retrieved to find one corresponding schedule. If the user has the right of access, the schedule is exhibited to the user to check the contents of the schedule (step S245). Demand table level 3 is filled with the information of the retrieved schedule, as shown in FIG. 57. Demand table level 2 is filled with the subject accordingly, as shown in FIG. 56. Since the demands for filling information for levels 2 and 3 are achieved, control returns to demand table level 1 (FIG. 58). For example, as shown in FIG. 59, a document having the corresponding subject is retrieved. If the user has the right of access, this subject is presented to the user.

In FIGS. 59 and 60, in response to a user demand, the date of transmission to the third party is presented as the time of document completion together with the name of user as the transmission destination. The user ume checks the document sent to herself and is upset because the report has already been transmitted.

Figure 61:
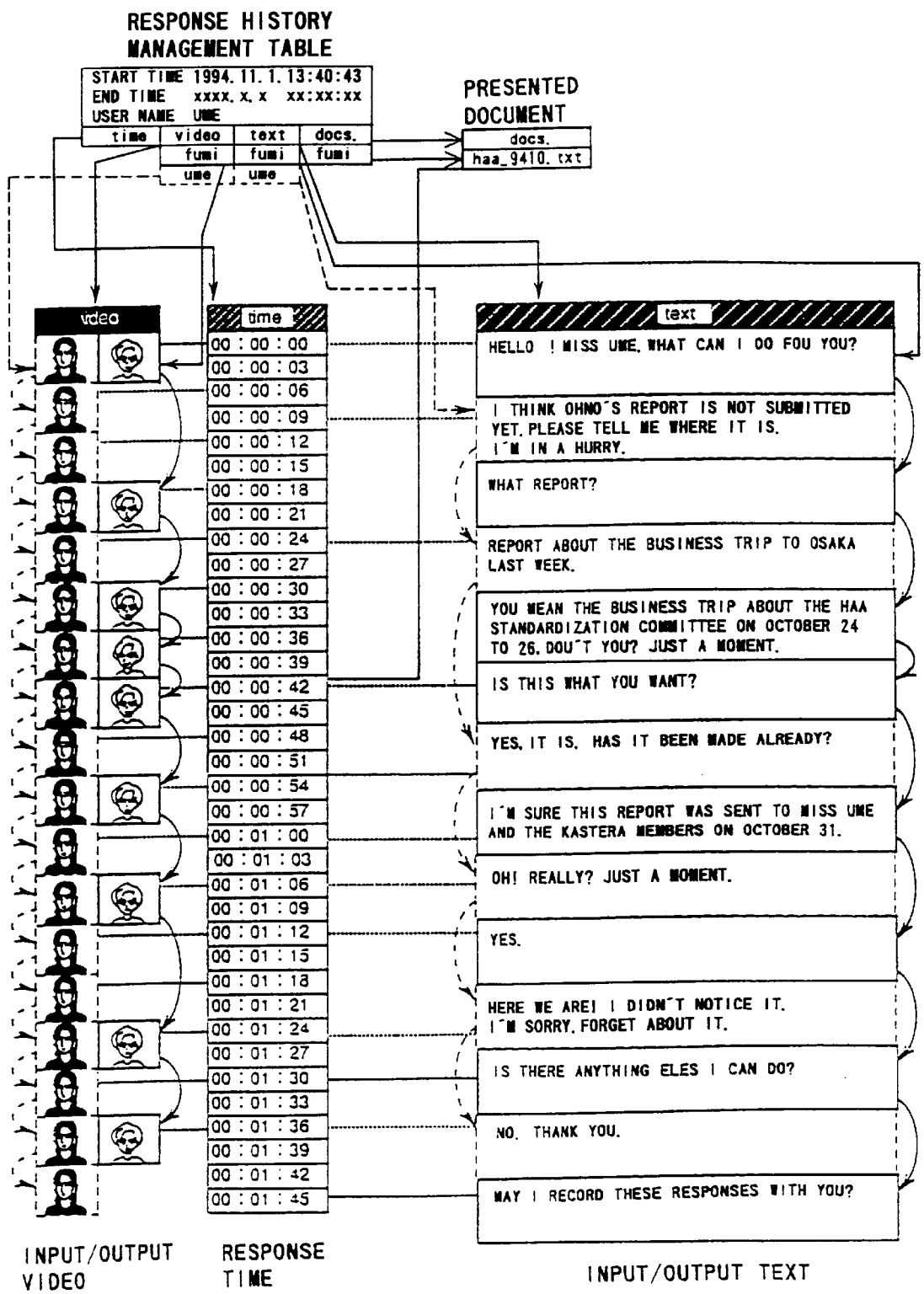
FIG. 61 is a view showing an example of the data structure of a primary response history management table.

Data such as an input text and speech from the user has a data structure shown in FIG. 61 and stored in the primary history memory unit 327 of the client process. This information in the primary history storage unit 327 cannot be directly looked up from the information disclosing agent. The video image of the user, the image of the agent, the input/output text, speech data, and the like are stored in correspondence with time.

When the end of response is preliminary announced, control shifts the end preparation state in FIG. 47. In a flow chart in FIG. 44, a response is generated to cause the user to check if a response history with the user, which is stored in the primary history storage unit 327 of the client process, is stored and presented to the information provider (step S220). It is then determined whether the user demand corresponding to this response is "history-deletion" in FIG. 50.

For example, terms shown in a list in FIG. 62 are registered as synonyms representing the demand target "history". In addition, terms such as "off the record" and "keep secret" are registered as terms representing the "history-deletion". In the example of FIG. 60, a demand table shown in FIG. 63 is formed by the response plan formation unit 304. A user response corresponding to this demand table is "keep secret", so that a demand table of level 2 shown in FIG. 64 is formed. The demand table in FIG. 63 has a user permission "none".

If the user permits it, a response history required by the information provider is stored from the primary history storage unit 327 to the history storage unit 312 through the data communication unit 321 (step S222). In this example, the contents of the demand table stored in the history storage unit 312 of the agent process are stored together with the response history sent from the primary history storage unit 327 so as to cause these response histories to correspond to each other. In the example of FIG. 60, if the user does not permit recording, only information of a demand table or the like recorded in the agent process is stored. If the information provider does not want to store all the history information due to the limitations such as a storage capacity, history information, already registered by the information provider, of all the history information permitted by the user can be set to be stored.

Upon sending the response history to be stored to the agent process, the client process deletes the response history information in the primary history storage unit 327, and the flow is ended.

A flow chart in FIG. 45 is to present a response history at the end of response (step S230) and allow the user to edit the response history. For example, a response history presentation window (left) and an editing dialogue box (right) are displayed, as shown in FIG. 65, to prompt the user to input instructions.

Figure 65A:
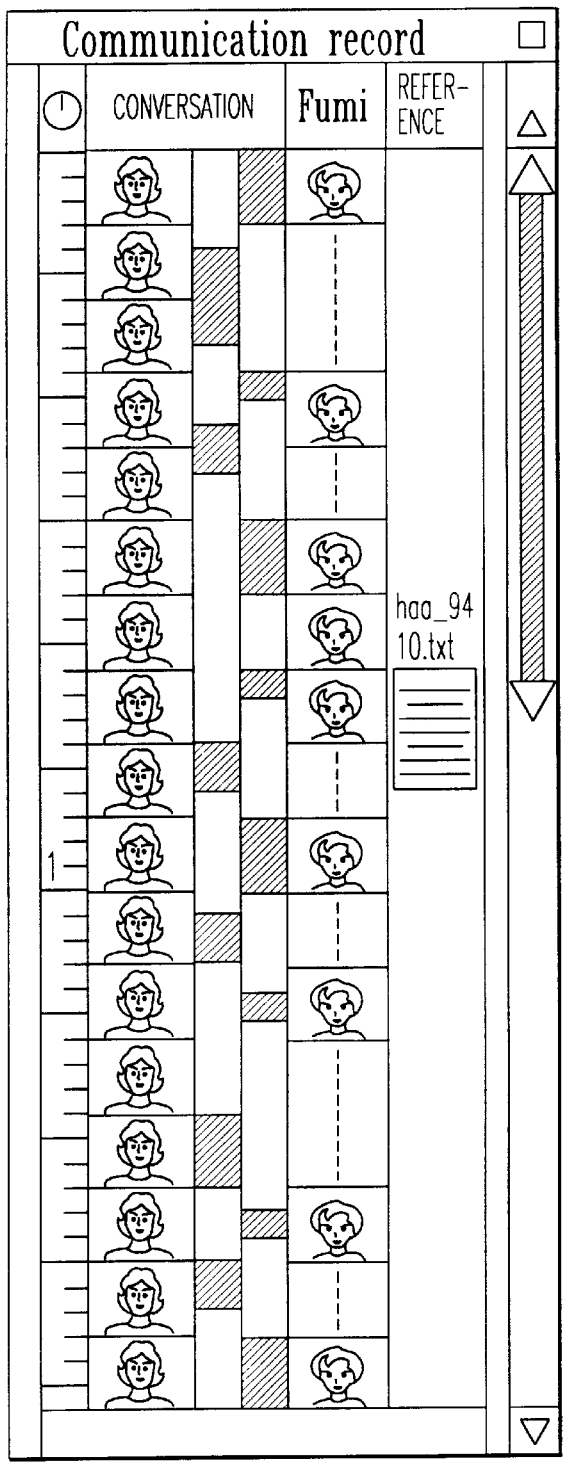
FIG. 65 is a view showing an example of a response history presentation interface.
Figure 65B:
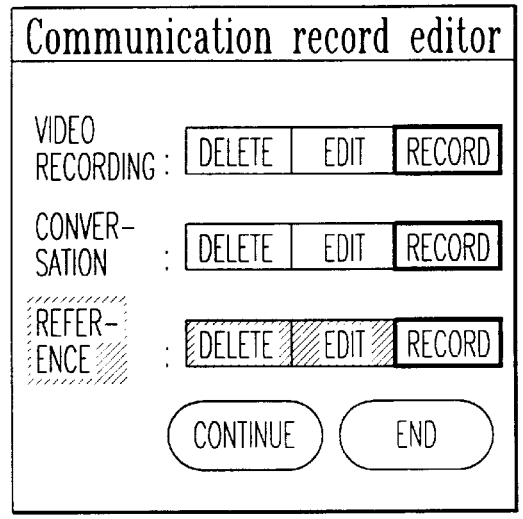

The response history presentation window on the left side of FIG. 65 is used to allow the user to simply grasp the state of the response history. With the lapse of time from the start of response, the user image, conversation using input/output texts, the agent image, and references presented to the user are illustrated. A scale mark pitch represents the lapse of two seconds. Each user image is displayed every 6 seconds. The conversation is divided into user utterances (ume) and agent utterances (fumi), utterance start times are indicated, and input times (presentation times for the agent) are indicated by a bar chart having a higher density than that of the remaining part. When color monitors are used, the utterance times and the remaining part may be distinguished from each other in different colors. Only changed agent images are displayed in FIG. 65. A reference is displayed in a reduced image together with the time presented to the user and a document name. If speech data are additionally stored in the primary history storage unit 327, speech input statuses are similarly represented.

Figure 66A:
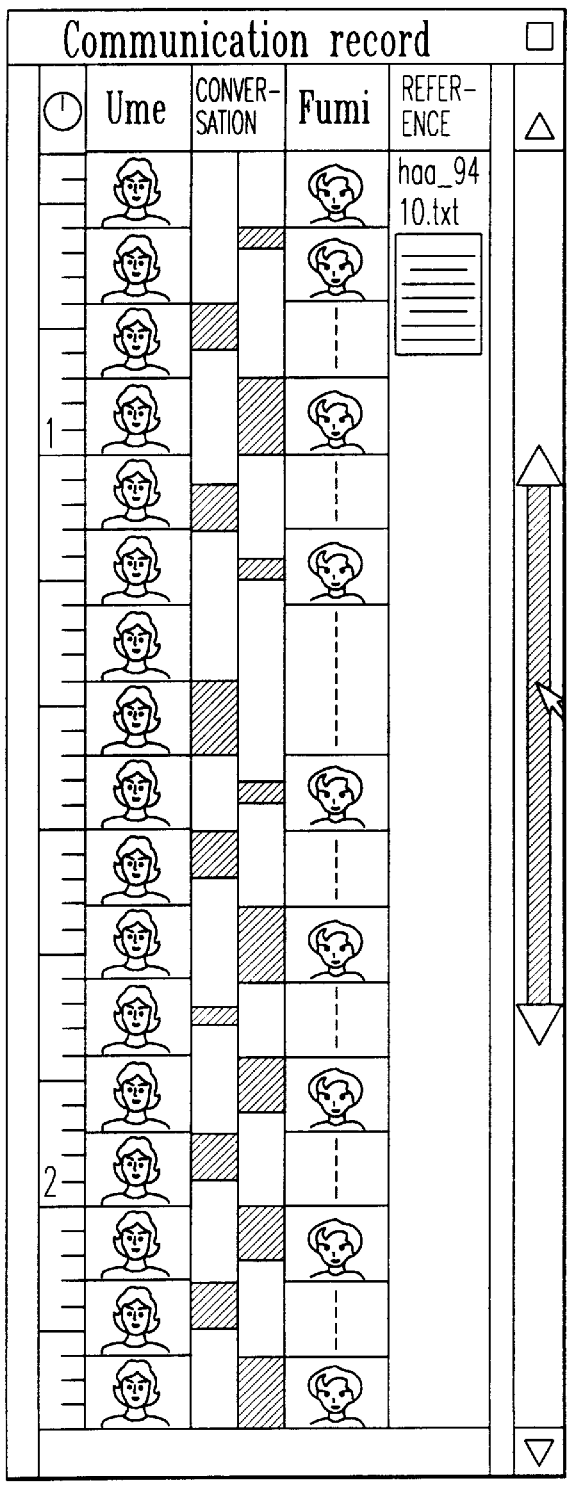
FIG. 66 is a view showing an example of a response history presentation interface.
Figure 66B:
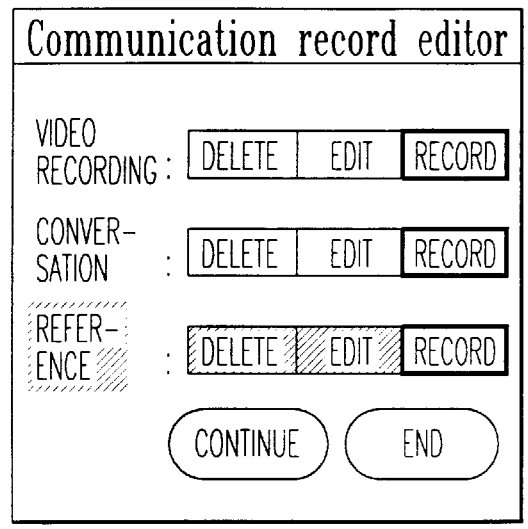
Figures 67A, 67B:
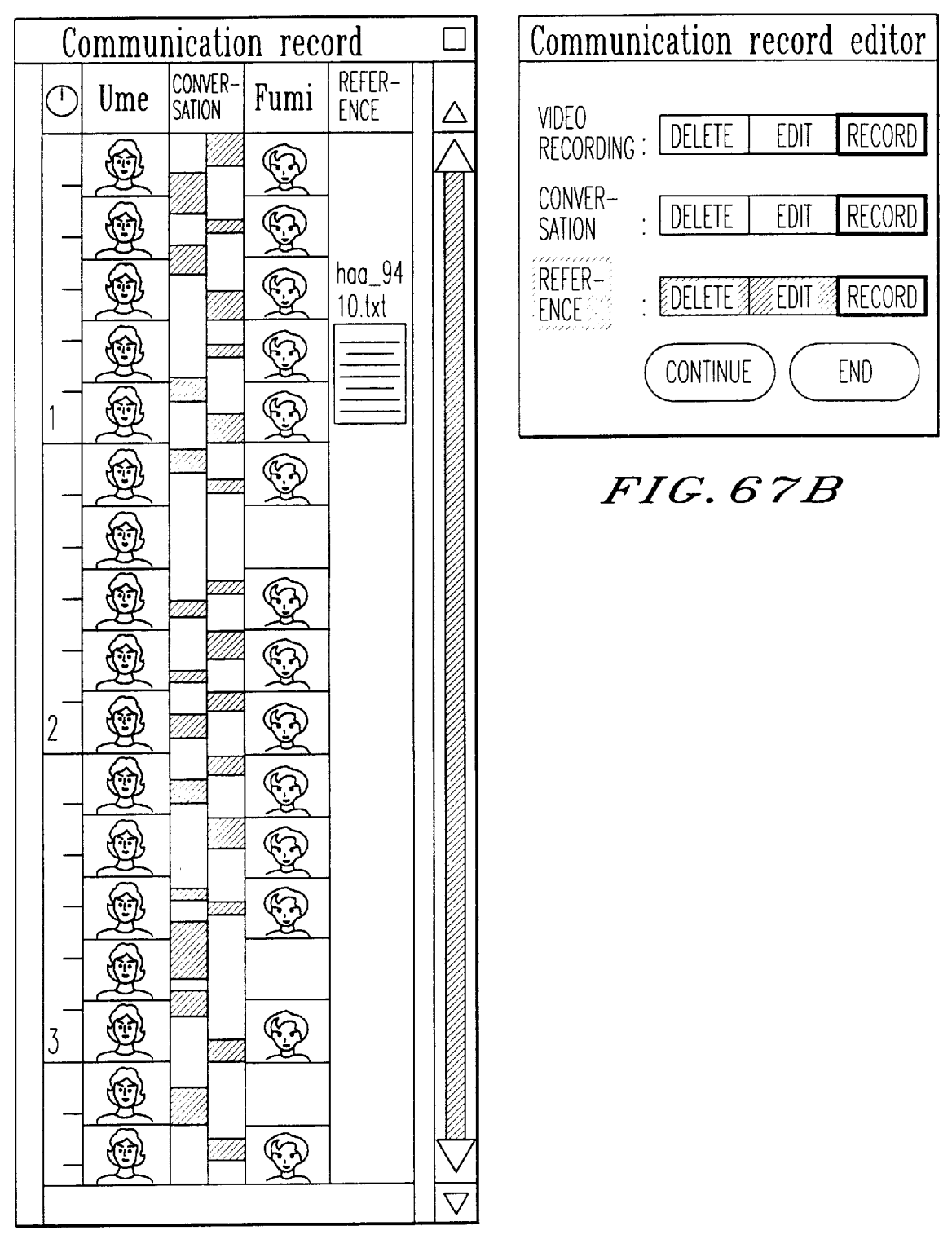

When the middle portion of a bar with upward and downward arrows is designated to move with a mouse or the like, the range of display time can be changed, as shown in FIG. 66. When each arrow itself is designated, the display range is increased or decreased, as shown in FIG. 67. The user can see the entire history in FIG. 67. The scale mark pitch representing the time interval from the start of response represents 10 seconds. At the same time, the number of frames of the user images is increased or decreased.

To make the user select a response history to be stored, an interface such as a dialogue box displayed on the right of FIG. 65 is prepared to accept a user instruction using a mouse. "Video recording" represents response contents using images, and "conversation" represents response contents using texts. Reference represents history information about a document presented to the user.

In this example, "video recording" modes are selected for all the "video recording", "conversation", and "reference" in default settings of the information provider. When "end" is selected (step S231), all the response histories stored in the primary history storage unit 327 are allowed to be recorded in the history storage unit 312 which manages the agent process (step S234). Upon storage of the history, the client process is disconnected from the agent process. If "continue" is selected (step S231), the contents of the primary history storage unit 327 are kept unchanged, and a response with the agent is resumed.

Figure 68A:
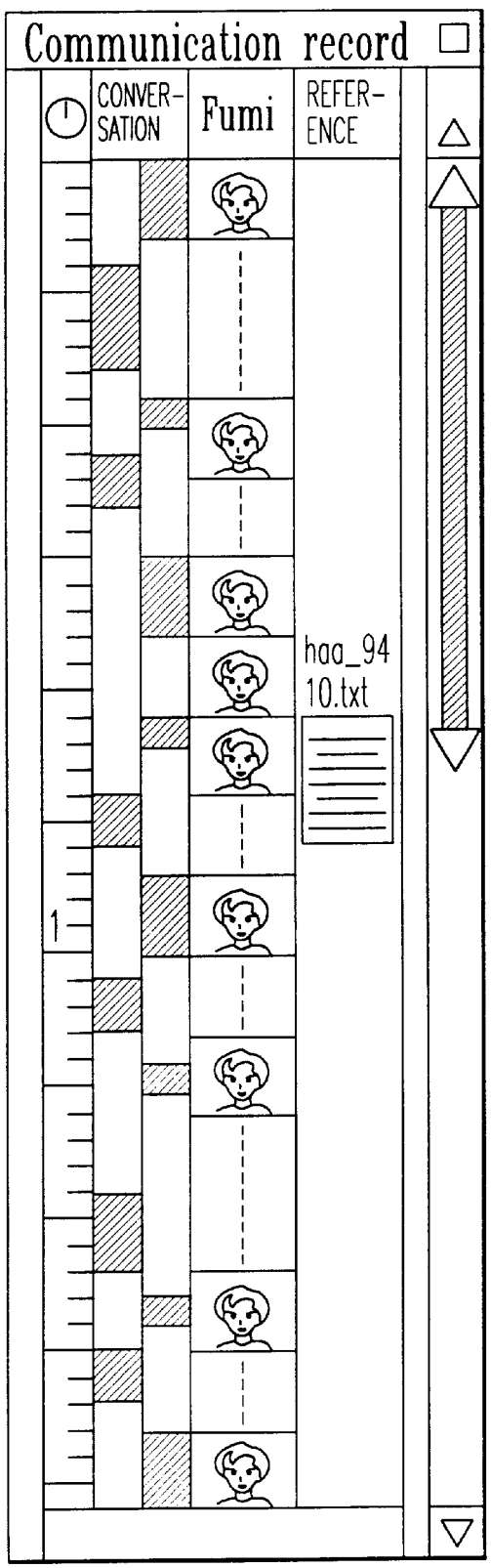
FIG. 68 is a view showing an example of a response history presentation interface.
Figure 68B:
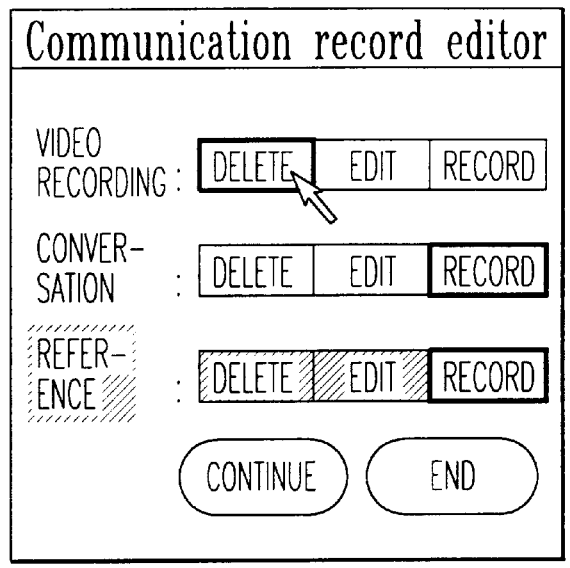

FIG. 68 shows a state in which "delete" is selected for "video recording". An image representing the user image data is deleted from the left response history presentation window. In this state, when "end" is selected (step S231), response history information except for the user image data is stored in the history storage unit 312 of the agent process (step S234). Unless "end" is selected, the contents of the primary history storage unit 327 are kept stored even upon selection of "delete". "Video recording" can be selected again any time.

Figure 69:
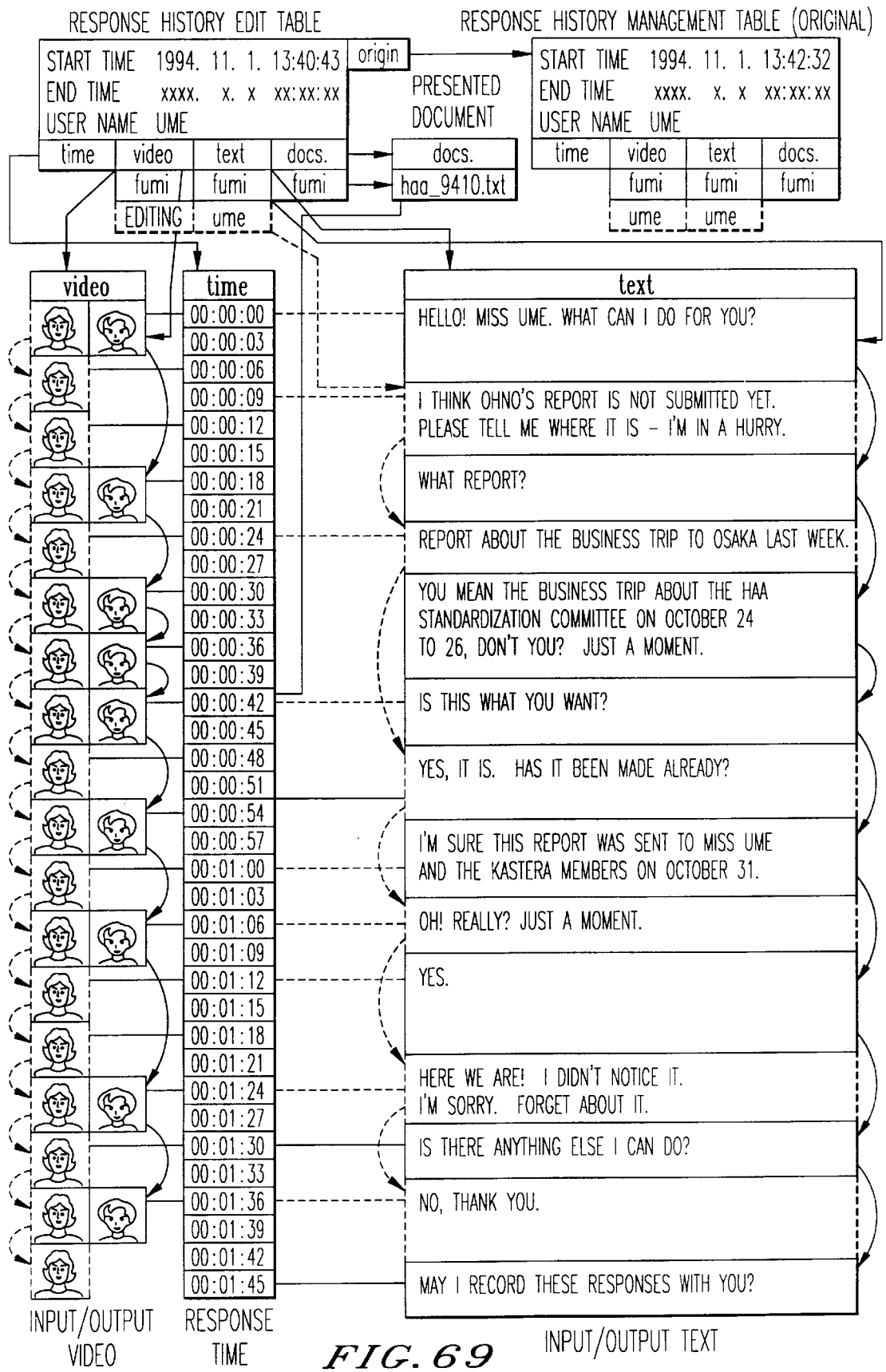
FIG. 69 is a view showing an example of the data structure of a primary response history management table.

History edit information is stored in the form to be added to the non-edited response history information in the primary history storage unit 327. For example, as shown in FIG. 69, response history edit table different from the original response history management table, and a data structure are prepared, and the user edits the response history edit table to rewrite data (steps S232 and S233). User edit information (represented as "edit" in FIG. 69) is written in a cell which designates the user image data. The data structure of the original response history management table is kept preserved.

Figure 70A:
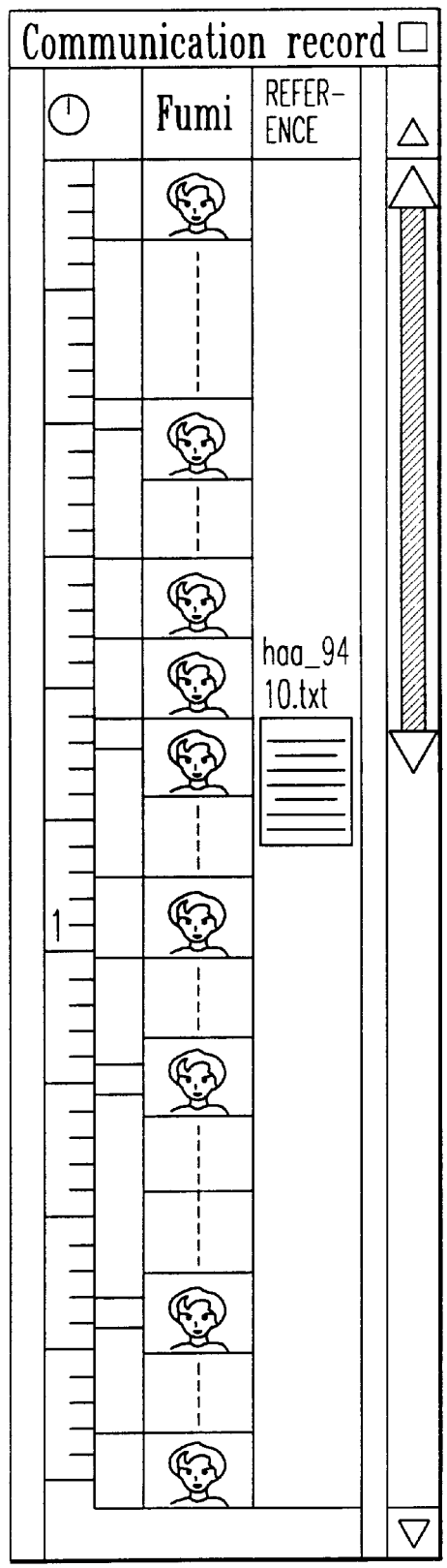
FIG. 70 is a view showing an example of a response history presentation interface.
Figure 70B:
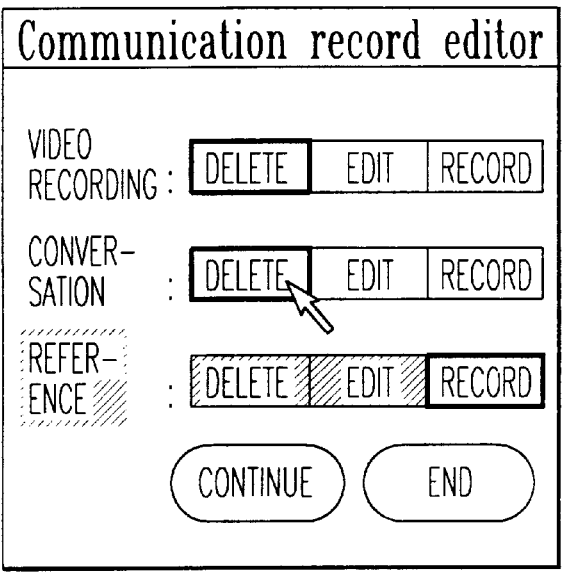

FIG. 70 shows a state in which "deletion" is selected for "video recording" and "conversation". The user image data and the text information input by the user are deleted from the left response history representation window. In this state, when "end" is selected (step S231), only the response history information associated with the presented reference is stored in the history storage unit 312 of the agent process (step S234).

Figure 71A:
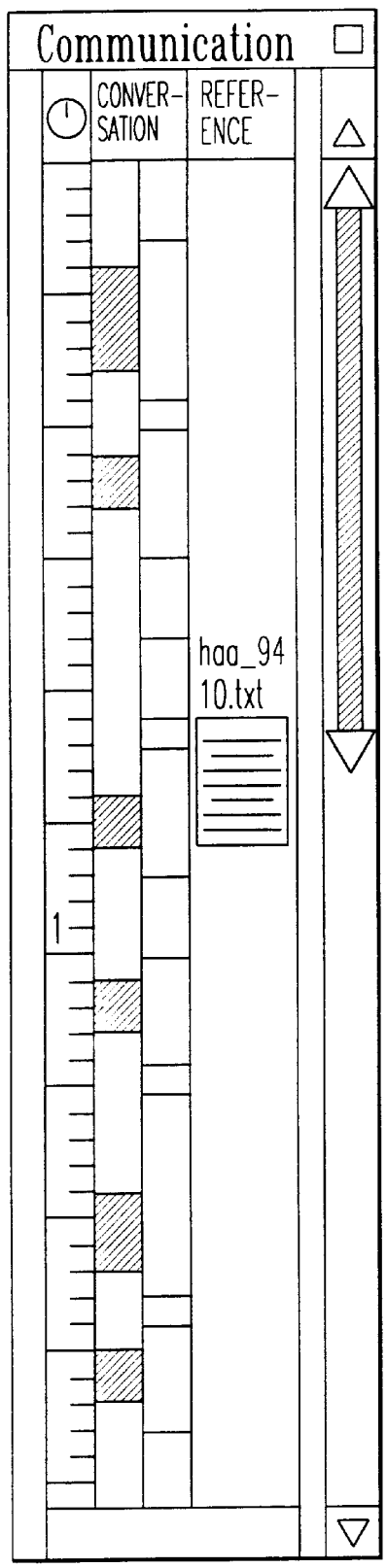
FIG. 71 is a view showing an example of a response history presentation interface.
Figure 71B:
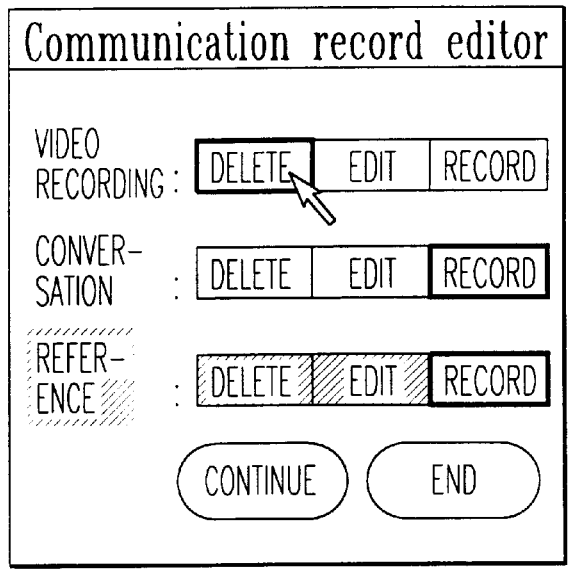

FIG. 71 shows another display example of FIG. 68. Since "video recording" within the right dialogue box represents the images of both the user and the agent, the image information of both the parties is deleted from the left response history presentation windows upon selection of "delete". Similarly, when "conversation" is deleted, the input and output texts are simultaneously deleted because user input information can be estimated to some extent when conversation information and image information of the agent are left. Therefore, when the input and output texts are determined to be simultaneously deleted, an instruction can be simply input.

Modes other than "recording" cannot be selected for "reference".

Figure 72B:
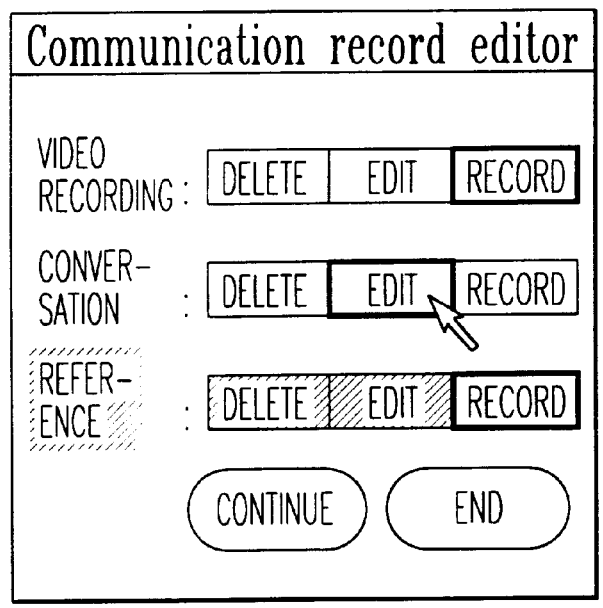
FIG. 72 is a view showing an example of a response history editing interface.
Figure 73B:
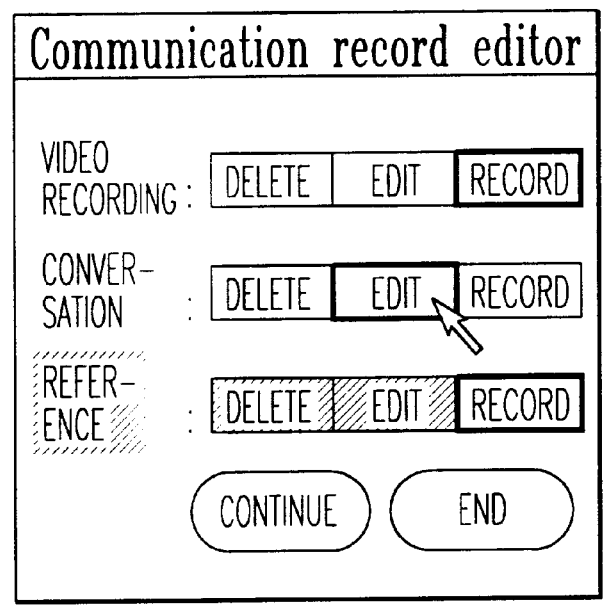
FIG. 73 is a view showing an example of a response history editing interface.

In copying a response history from the primary history storage unit 327 to the history storage unit 312 of the agent process, when a user designates to delete and update some of the contents and store the updated contents, "edit" is selected in the right dialogue box, as shown in FIG. 72. For example, "edit" is selected for "conversation", the details of the conversation can be checked, as shown in the left response history presentation window. FIG. 72 shows the presentation of the conversation status and conversation sentences in parallel to each other in a bar chart. In the example of FIG. 73, the bar chart is omitted, and only texts are surrounded by rectangles having a density or color different from that of the remaining portion.

Figure 74A:
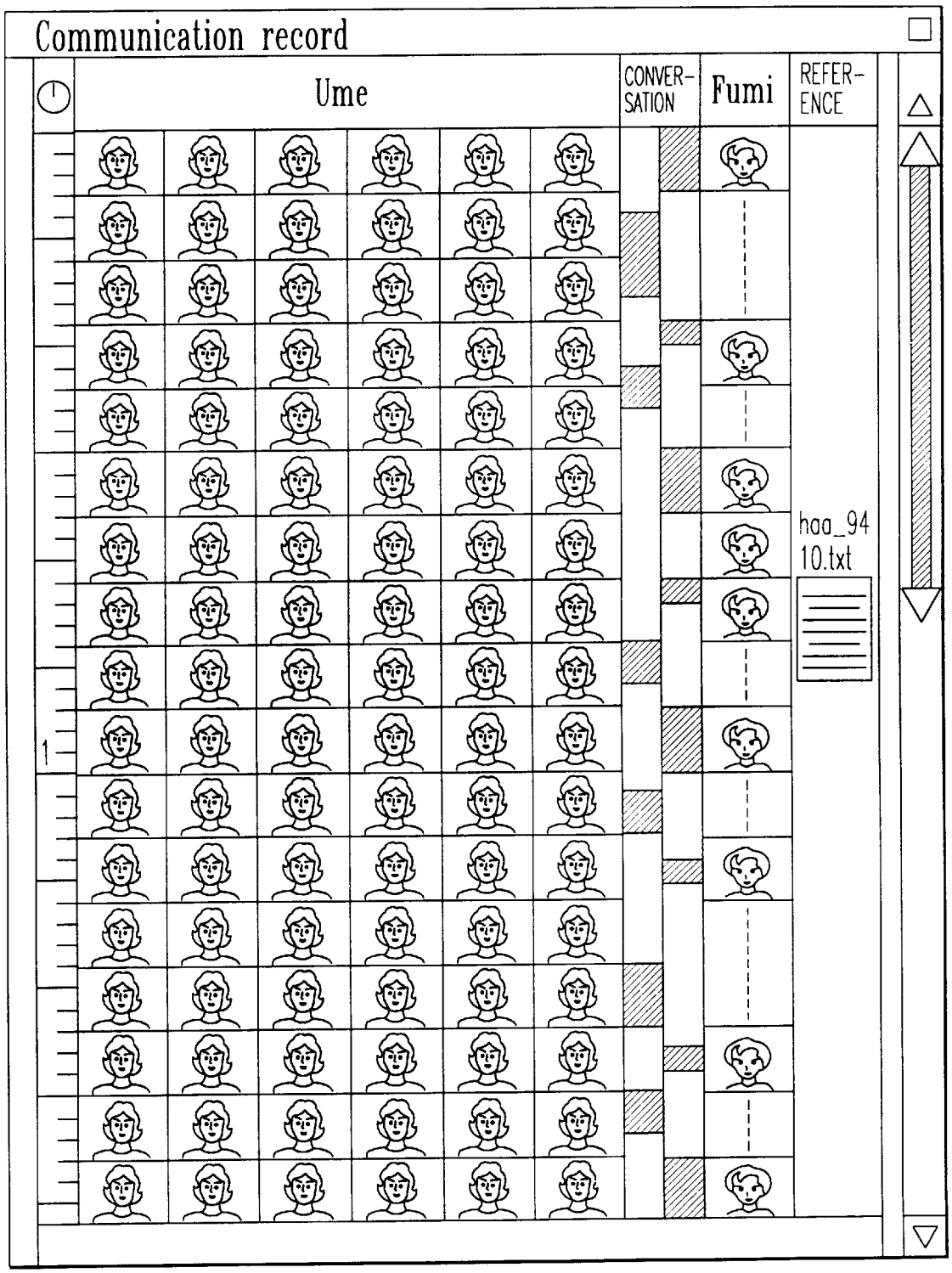
FIG. 74 is a view showing an example of a response history editing interface.
Figure 74B:

FIG. 74 is an example when "edit" is selected for "video recording". Although each image is displayed every 6 seconds, six images are displayed and aligned horizontally within six seconds. The user designates to simultaneously record or delete one or a plurality of images while observing these images.

Figure 75:
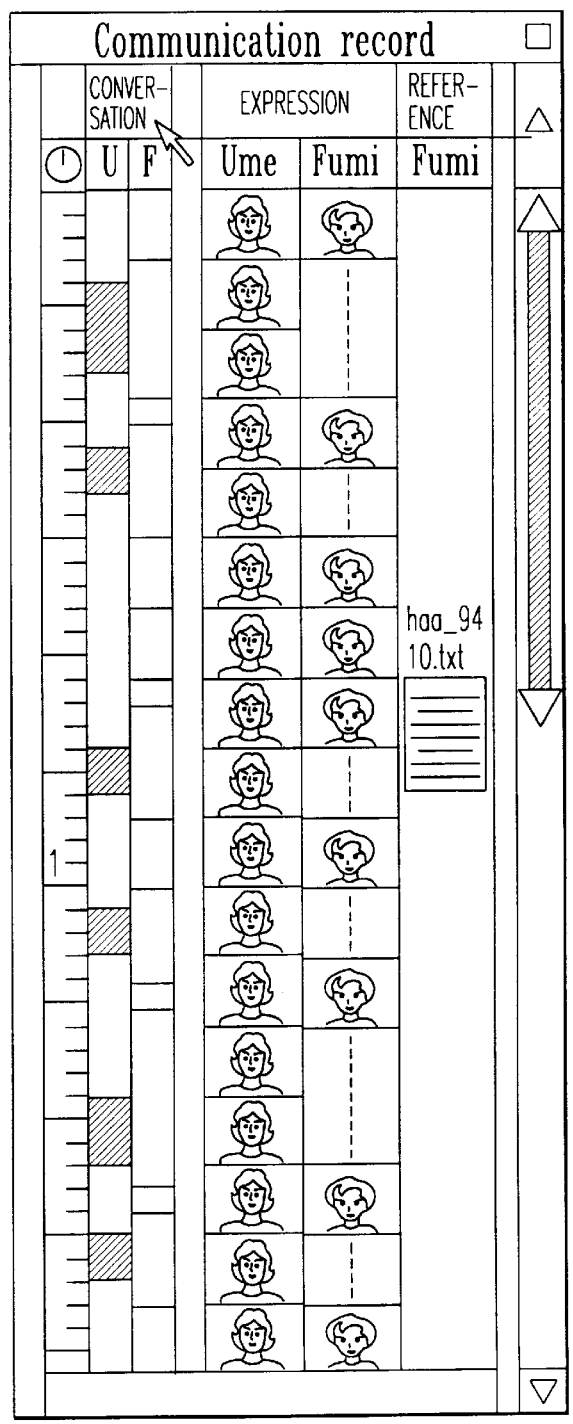
FIG. 75 is a view showing another example of a response history editing interface.

FIG. 75 shows an example of another interface having the same functions as in FIG. 65. As compared with the screen as in FIG. 65,.conversation, image, and reference parts are independently of each other. For example, a rectangle in which "conversation" is written is designated with a mouse or the like to display a menu shown in FIG. 76. The menu includes items such as "delete", "edit", "continue" as in the right dialogue box in FIG. 65. These items have the same functions as those in FIG. 65.

Figure 79:
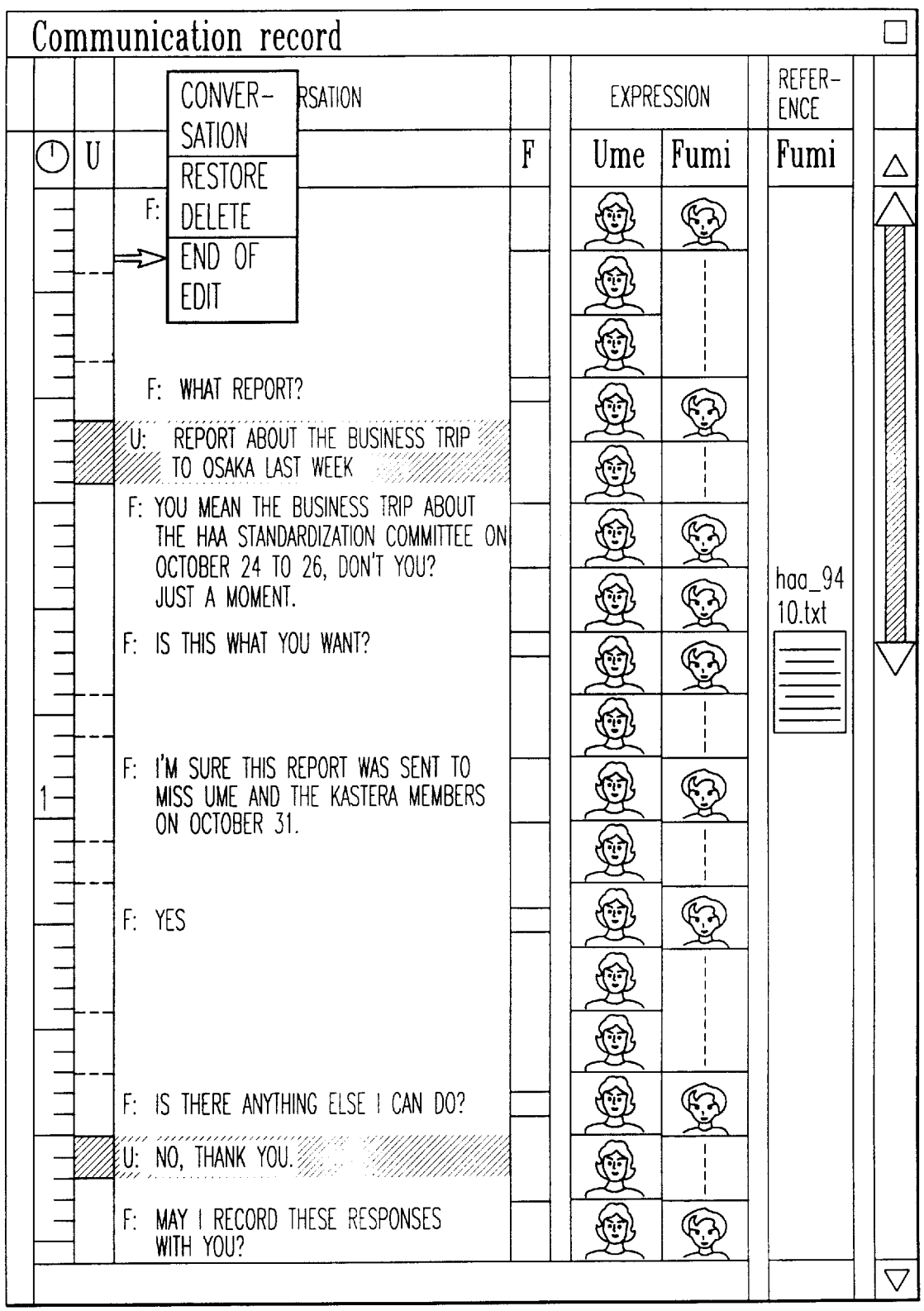
FIG. 79 is a view showing another example of a response history editing interface.

For example, when "edit" is selected, input and output sentences are displayed in FIG. 77 as in FIG. 72. When a bar chart portion having a different color is designated with the mouse, a pop-up menu shown in FIG. 78 is displayed. When "cut" is selected, the designated user text is deleted, as shown in FIG. 79. When "undo" is selected, the display returns to the previous state. After a text is designated for "cut" or "copy", an empty portion in the bar chart is designated, and "paste" is selected to insert the designated text in the designated portion.

Upon editing the text, when "end of edit" is selected in, e.g., the menu shown in FIG. 79, the display returns to the state with addition of the edited information in FIG. 75.

It is possible to directly change part of the response history from the state of FIG. 77, as shown in FIG. 80. In this example, "submitted" is changed to "found".

Figure 76:
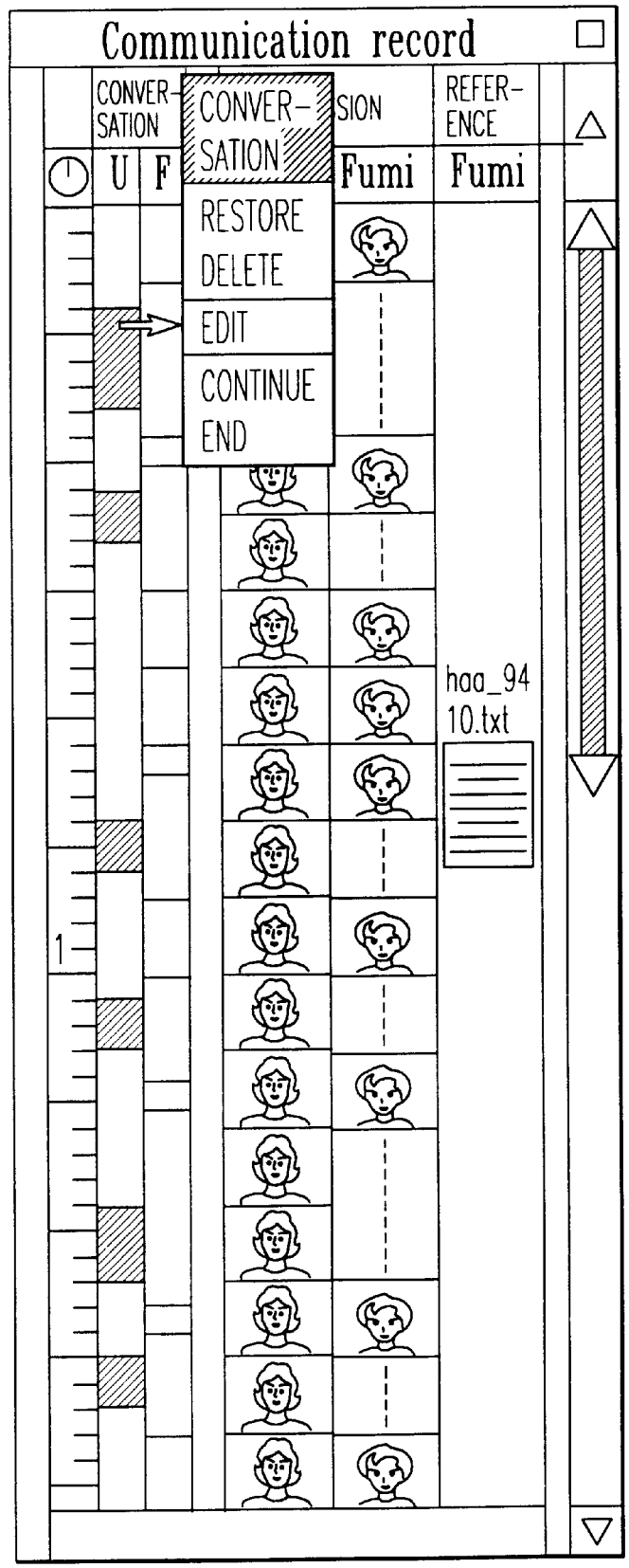
FIG. 76 is a view showing another example of a response history editing interface.
Figure 81:
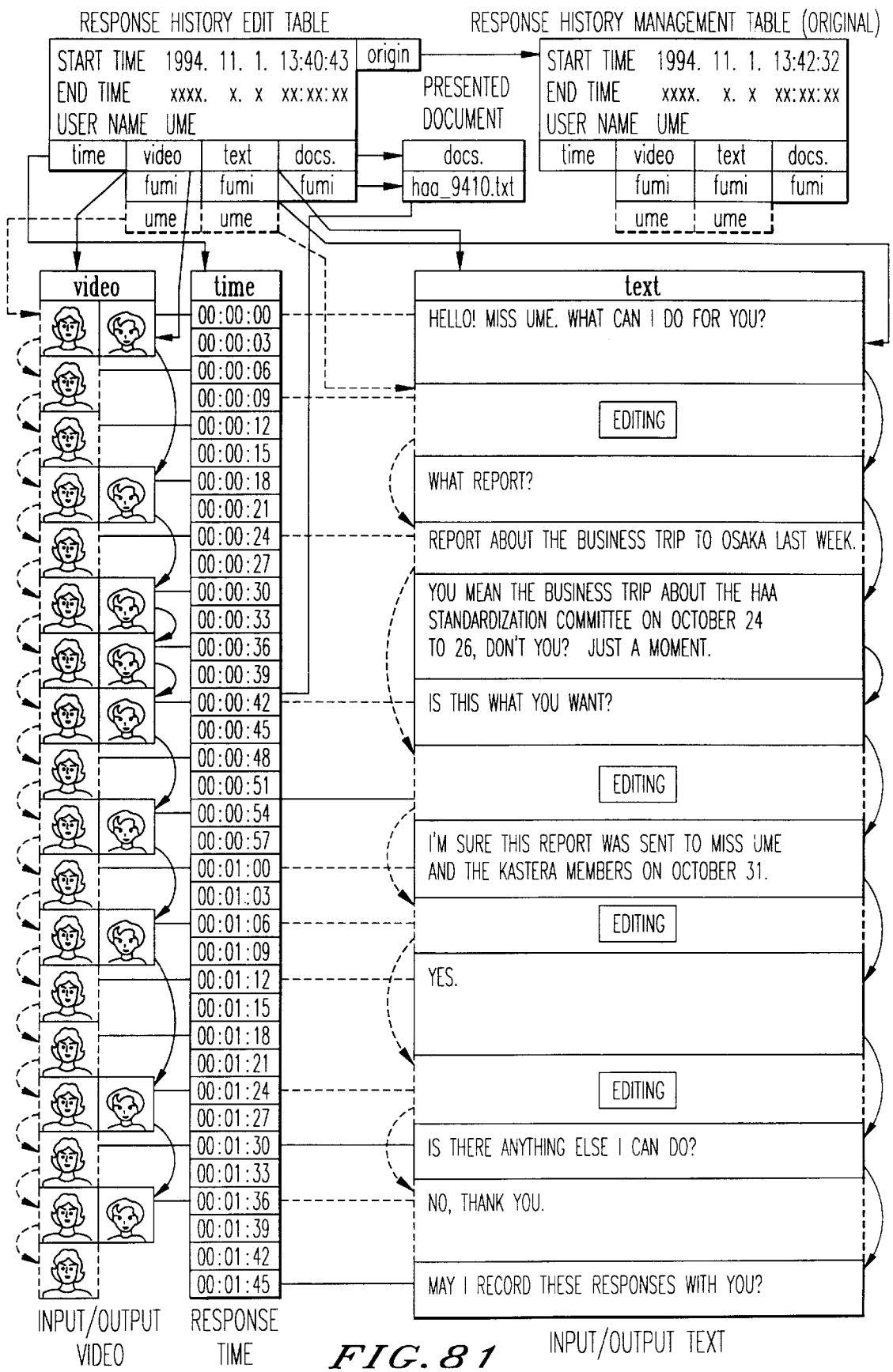
FIG. 81 is a view showing an example of the data structure of a primary response history management table.

Even if "delete" is selected in FIG. 76 or part of the response history is edited by the method shown in FIGS. 78 to 80, the original response history can be displayed upon selection of "restore" in the menu of FIG. 76. Unless "end" is selected in the menu of FIG. 76, the non-edited response history is kept stored without any modifications in the primary history storage. For example, the state in FIG. 79 is represented in a data structure shown in FIG. 81. In the response history edit table, a cell which represents a cut user input sentence is changed to an "edit" cell representing edit information. In the original response history management table, the original data structure is preserved. When "end" is selected, the edited history information is stored in the history storage unit 312 of the agent process. In this case, if the information provider requires response analysis, information representing the edited portion of the history information can also be stored in the history storage unit 312 of the agent process.

When "continue" is selected in FIG. 76, the response history management table and the response history edit table are left unchanged, and a response with a user is continued.

Figure 82:
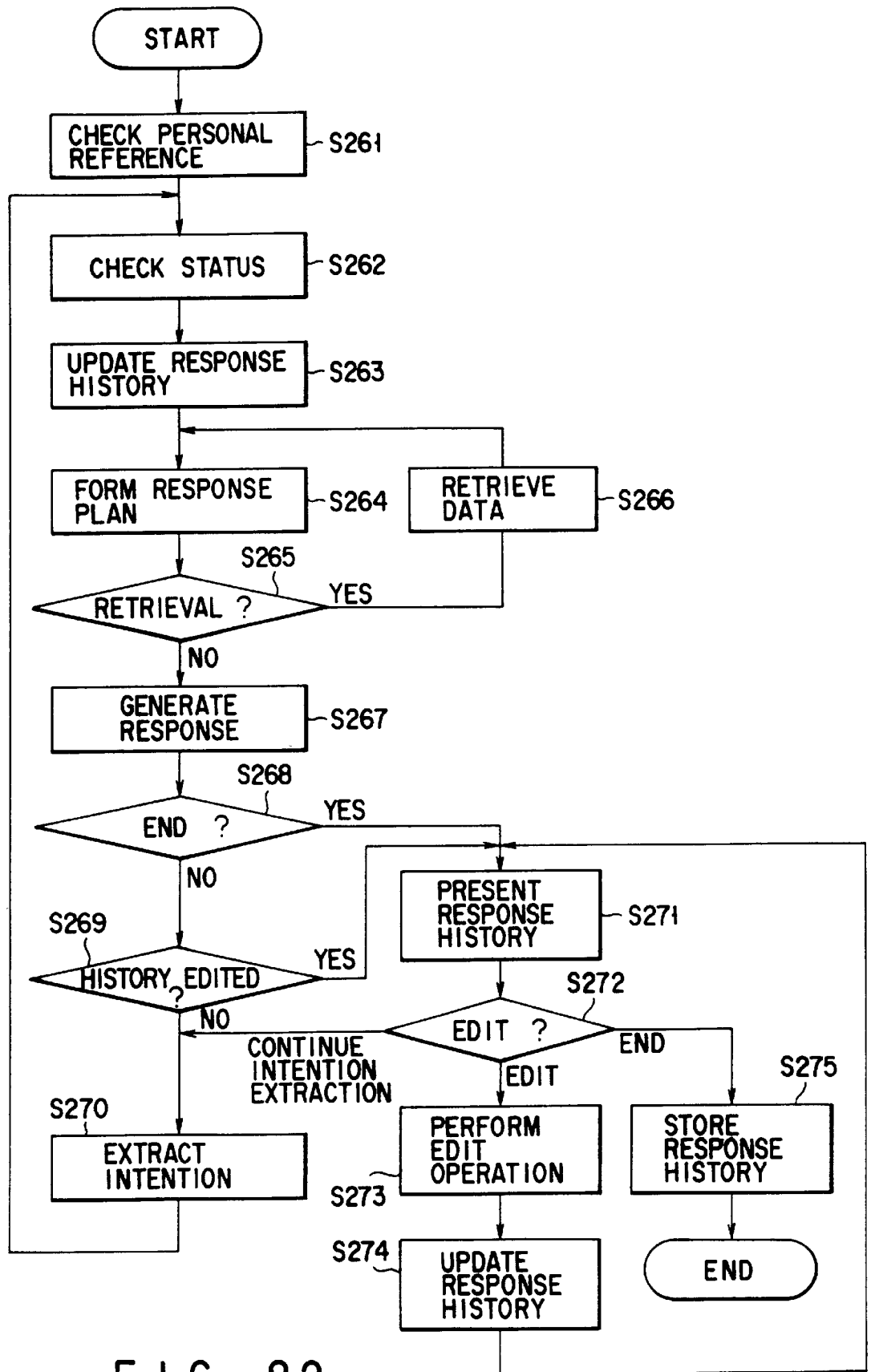
FIG. 82 is a flow chart showing an example of a processing flow for editing a history during a response.

FIG. 82 is a flow chart showing a processing flow when a user demand for editing a response history during a response is allowed. When the user demand is a response to the "history" in FIG. 50, the response history is presented to prompt the user to edit the response history.

Figure 83:
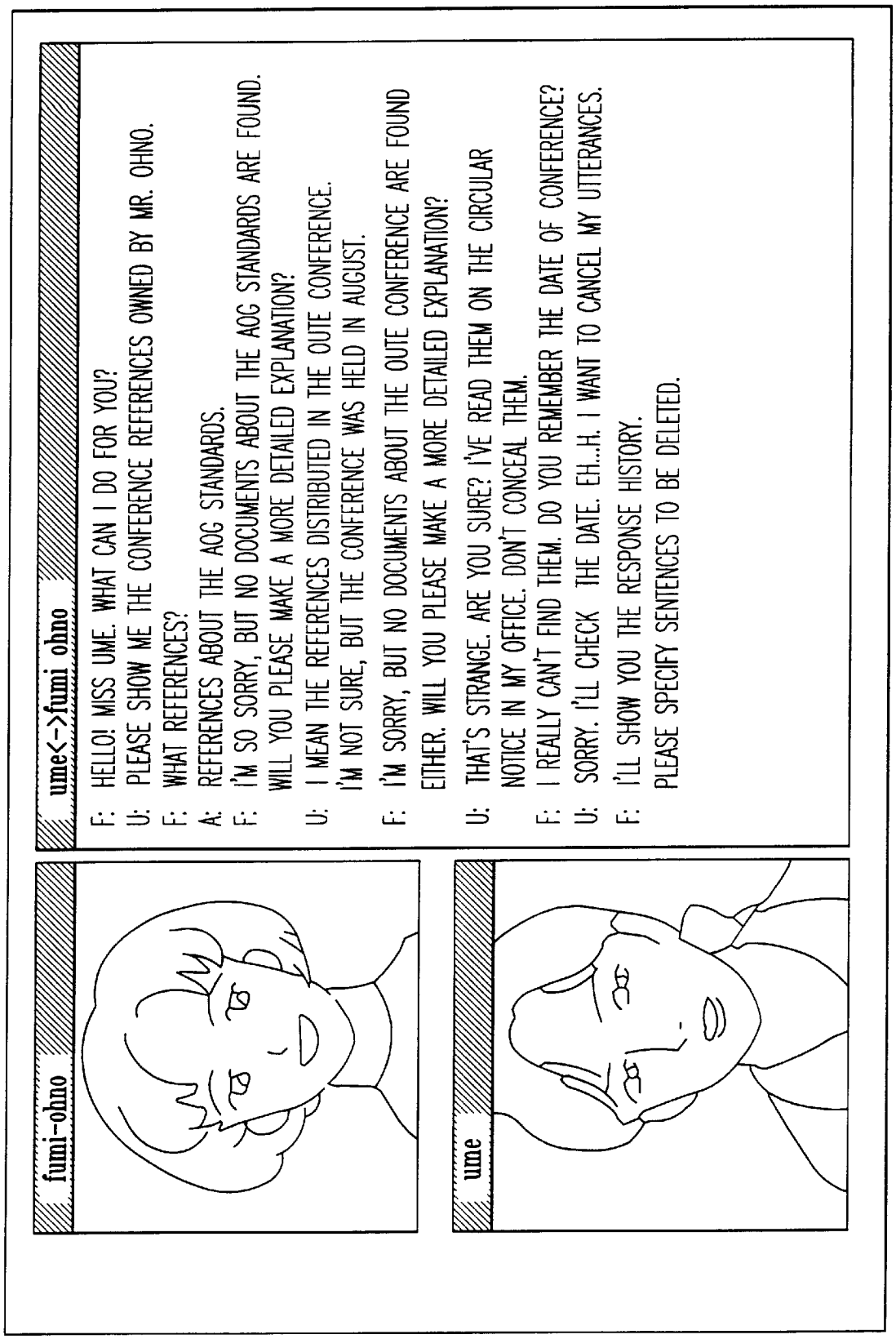
FIG. 83 is a view showing an example of a response with a user when a history is edited during the response.

For example, as in an example of FIG. 83, assume that the user notices the inappropriateness of a user input sentence during a response and inputs the intention of correction. The agent displays a response history presentation window (FIG. 84) similar to those described with reference to FIGS. 72 to 74 and 75 to 80 and receives a correction instruction from the user.

Figure 85:
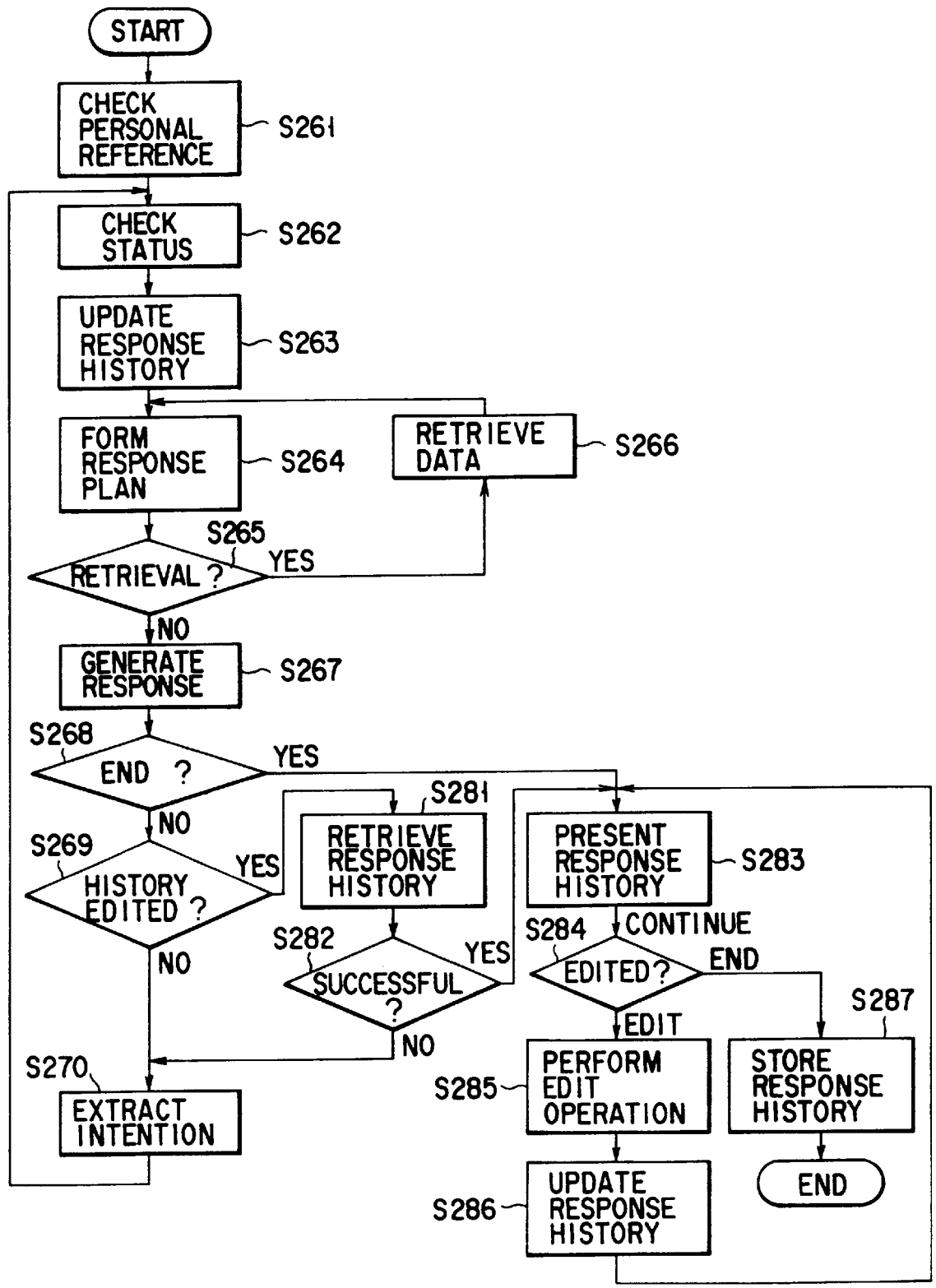
FIG. 85 is a flow chart showing an example of a processing flow when a history portion to be deleted is automatically determined.

FIG. 85 is a flow chart showing a processing flow for retrieving a target history in response history retrieval without causing the user to designate a correction portion.

For example, a remand "history-delete" is understood from an expression such as "this is off the record.", and a response history candidate to be deleted is represented by a halftone box, as shown in FIG. 86. For example, negatives such as "must not" and "never" and a part "Is it" in "Is it . . . yet?" are registered to determine the presence of portions to be deleted. In contrast to this, the words of gratitude such as "Thank you.", and "It is helpful . . . " should not be deleted. When a response history candidate to be deleted, as indicated by the agent in a halftone box does not match the intention of the user, the position is corrected by a user input sentence, or a correction instruction may be received in the response history presentation window shown in FIG. 84.

FIG. 87 is a flow chart showing a processing flow for obtaining a permission of history recording at the start of response.

Figure 88:
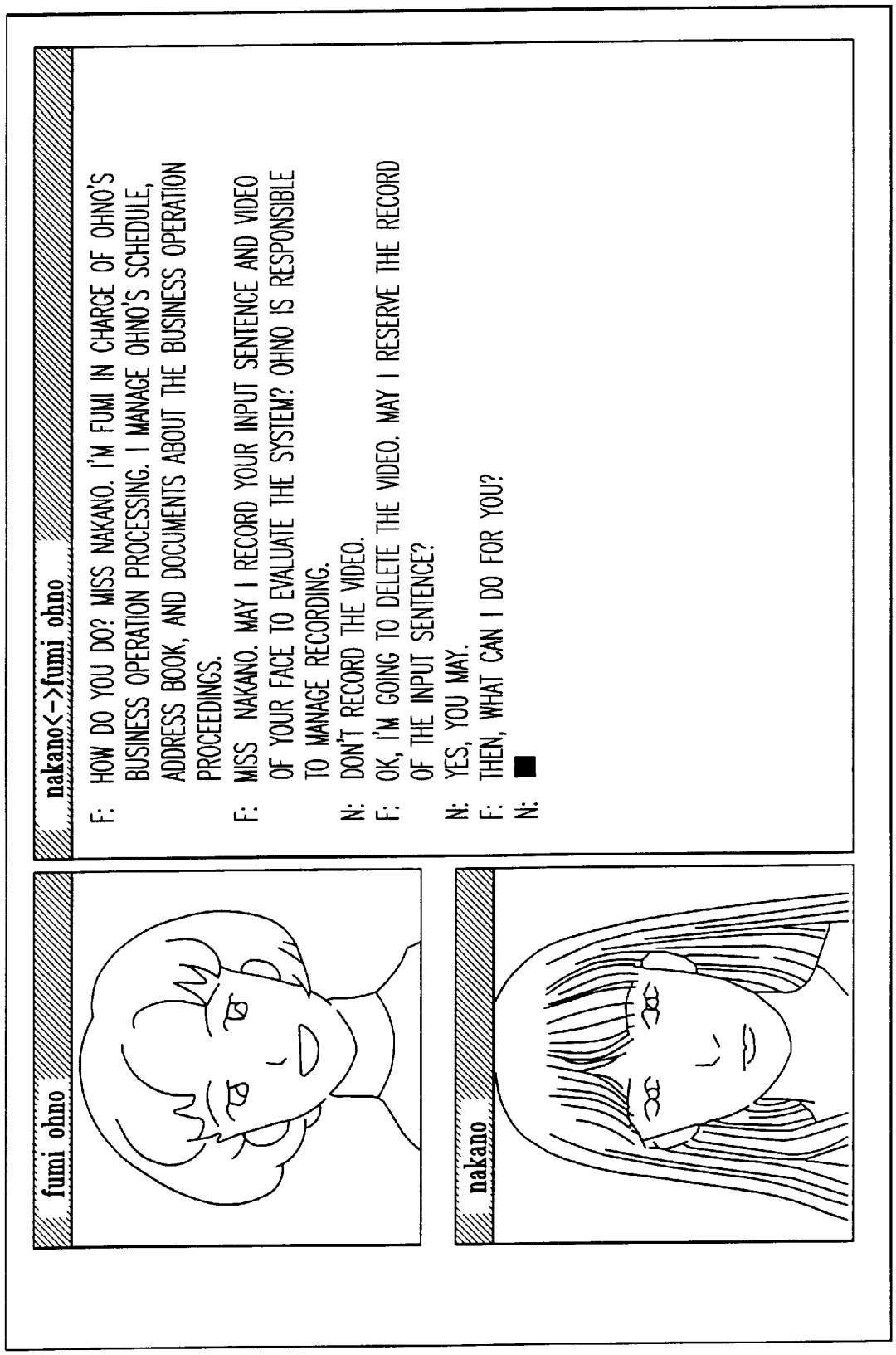
FIG. 88 is a view showing an example of a response with a user when recording of a history is permitted first.

For example, as shown in FIG. 88, a response is made to obtain a permission in advance for a user who accesses the agent for the first time. In this example, a purpose for recording a response history is mentioned to follow an instruction from the user. From the next access, a record may be left in the same setting as in the previous condition or upon check of the user each time.

(3) (Fourth Embodiment)

The fourth embodiment will be described below.

In the fourth embodiment, an example is shown in which a situation is grasped of an information demander who is communicating with the information disclosing apparatus, and the situation is reflected on the response (the contents of the response message, connecting directly the information provider and the information demander through a network, etc.).

Figure 193A:
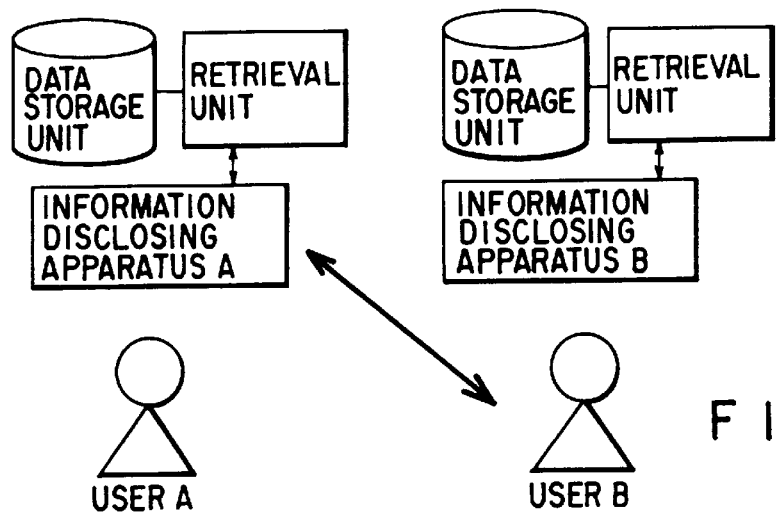

As shown in FIG. 193A, assume now that there are information disclosing apparatus managed by a user A and information disclosing apparatus managed by a user B. Furthermore, the user B makes an inquiry to the information disclosing apparatus of the user A to obtain the information that the user A owns.

Figure 193B:
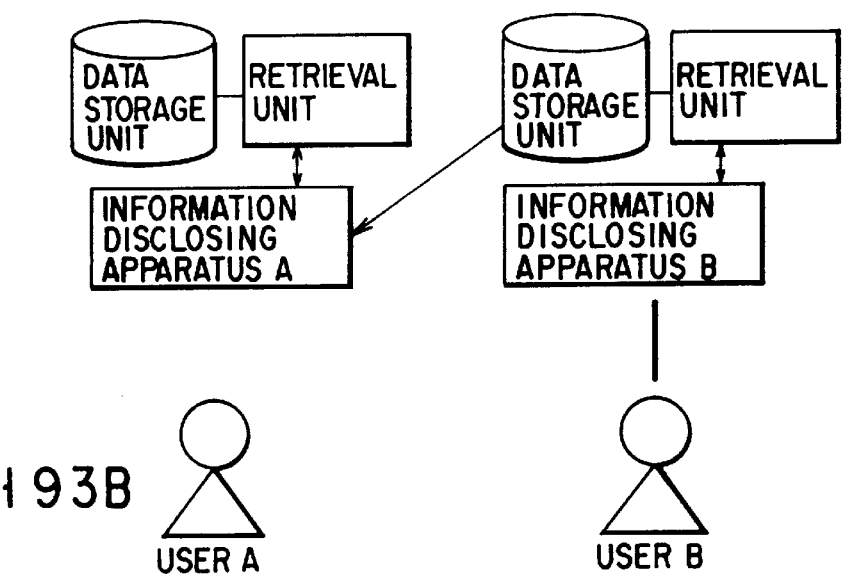

At this time, data indicating the contents of the data which the user B has obtained and a method of connecting to the information disclosing apparatus of the user A are stored in the data storage unit of the information disclosing apparatus of the user A (see FIG. 193B).

This storing may be realized by the voluntary work of the user B or either the apparatus A or B urges the user B to store them. Alternatively, the storage may be made automatically by a communication between the apparatuses A and B. Thereafter, a user C of a third party makes an inquiry to the information disclosing apparatus of the user B to make the demand regarding the above described information.

Figure 193C:
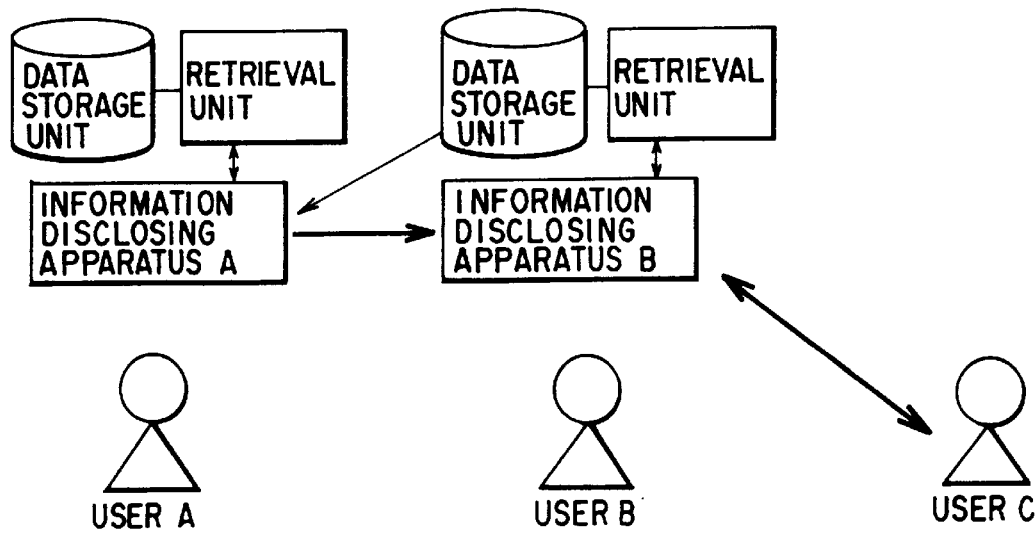

As shown in FIG. 193C, the apparatus B refers to the method of connecting to the apparatus A stored in the data storage unit to thereby connect to the apparatus A. As a result, the user C communicates with the apparatus A through the apparatus B to thereby obtain the information.

Alternatively, the apparatus B makes an inquiry to the apparatus A to obtain the information and then presents it to the user C.

Figure 193D:
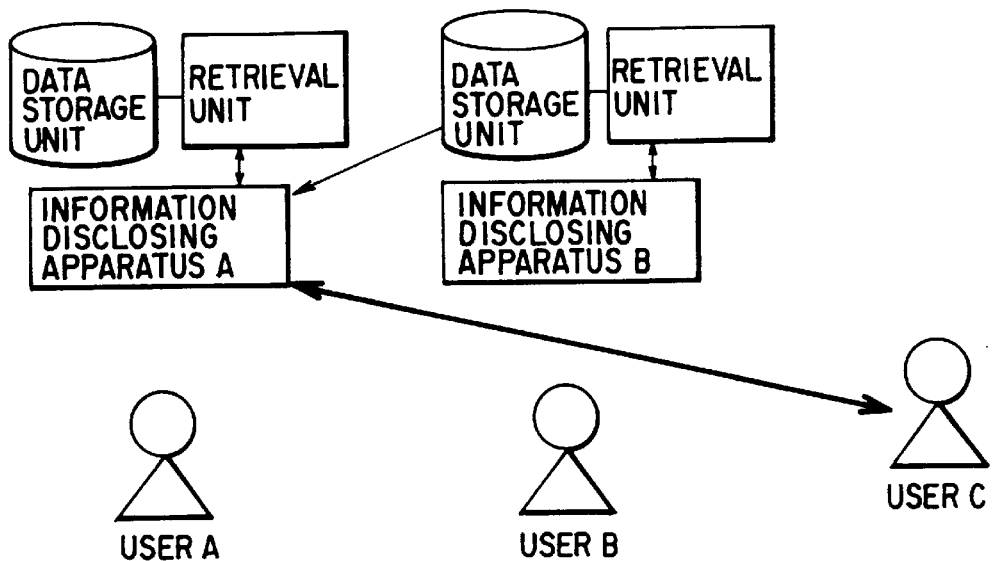

Alternatively, as shown in FIG. 193D, the method of connecting to the apparatus A is presented to the user C so that the user C may make the inquiry to the apparatus directly to obtain the information.

At this time, it is determined by referring to the personal relations between the user A and C prestored in the apparatus A whether or not the information should be disclosed to the user C.

Figure 193E:
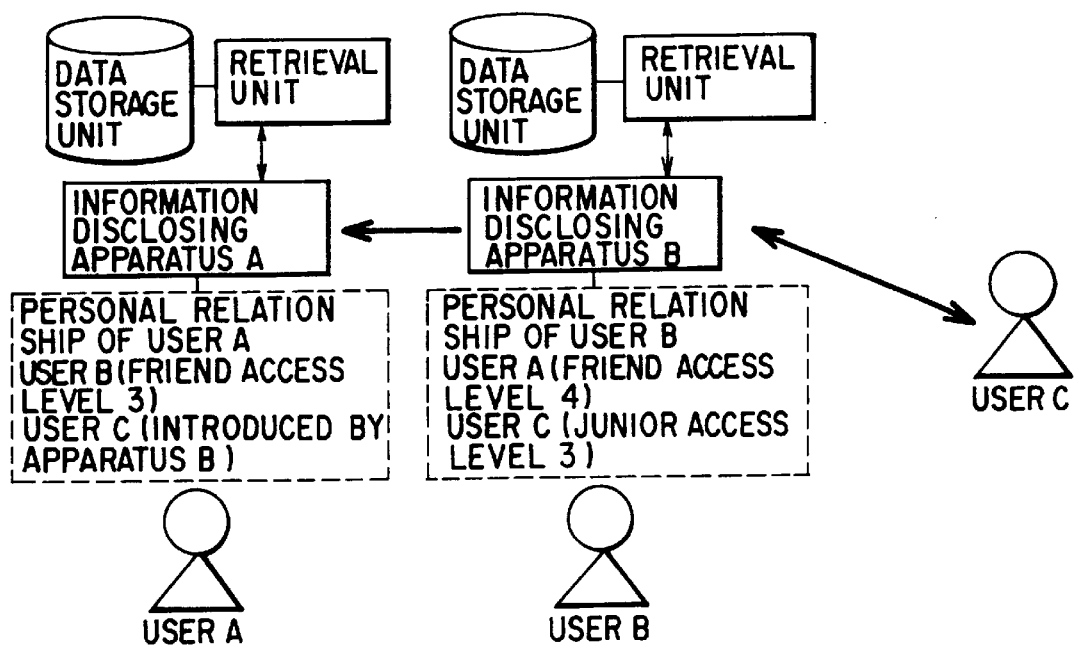

Alternatively, as shown in FIG. 193E, when the information disclosing apparatus of the user B mediates between the users A and C, the personal relations between the users A and C registered in the apparatus A, the information indicating that the user B has mediated, and so on may be added.

Due to this, the personal relations between the users A and C may be updated by referring to the personal relations between the users A and B registered in the apparatus A. Even if the user C is not personally acquainted with the user A, and thus there is no personal relations between the users A and C, the user C can obtain the information from the apparatus A.

Further, when the apparatus of the user B mediates, such information function may be provided that a part of the personal relations between the users B and C registered in the apparatus B is presented to the apparatus A. In the apparatus A, the personal relations between the users A and C is newly set based on the presented personal relations between the users B and C, and the registered personal relations between the users A and B.

Note that when the introduction is to be made, the information may be abused if the personal relations is recklessly disclosed to the apparatuses of other users. In order to solve the problem, a mechanism may be provided for deciding at what degree the personal relations with respect to the apparatus A based on the personal relations between the users A and B stored in the apparatus B.

The fourth embodiment will now be described in details.

Figure 89:
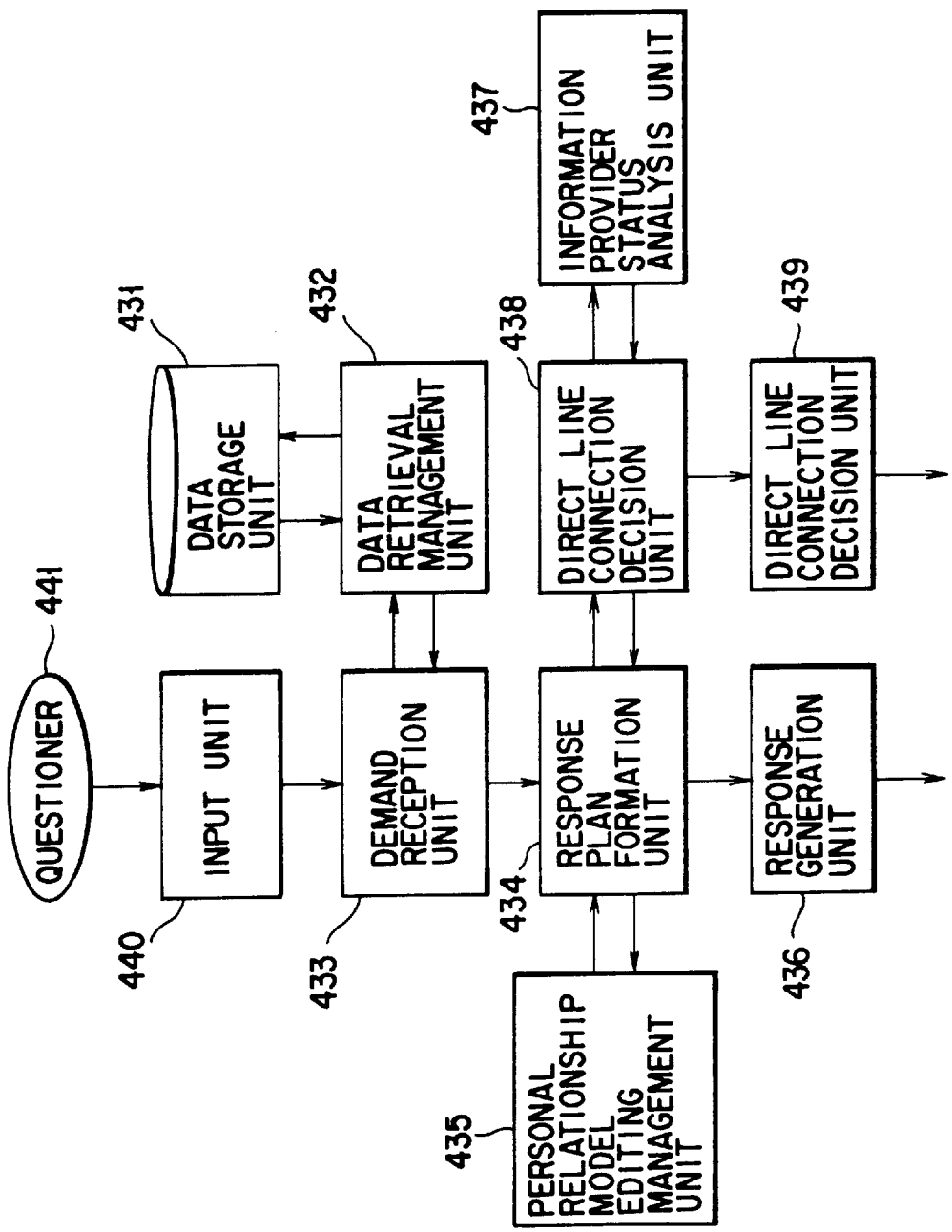
FIG. 89 is a view showing the arrangement of an information disclosing apparatus according to the fourth embodiment.

FIG. 89 is a view showing the arrangement of an information disclosing apparatus of this embodiment. This information disclosing apparatus comprises an input unit 440, a data storage unit 431, a data retrieval management unit 432, a demand reception unit 433, a response plan formation unit 434, a personal relationship model editing management unit 435, a response generation unit 436, an information provider status analysis unit 437, a direct line connection decision unit 438, and a direct line connection unit 439.

The input unit 440 has an interface function with a user.

The data storage unit 431 stores a list of users who can access the information disclosing apparatus, the relationships between the information provider and the users, user response rules (e.g., texts and speech), user expressions, and history data such as a text, speech, a still image, and a moving picture.

The retrieval unit 432 extracts user information from the data stored in the data storage unit 431.

The demand reception unit 433 receives inputs such as texts, images, and speech through a communication means such as a network.

The response plan formation unit 434 extracts the intention included in the demand received by the demand reception unit 433. The response plan formation unit 434 extracts the emotions of the user from the input data such as texts, images, and speech, and user information obtained in the data retrieval management unit 432. The response plan formation unit 434 analyzes the psychological process of the user during negotiation and at the same time predicts the next user demand.

The personal relationship model editing management unit 435 forms a personal relationship model from the user information retrieved by the data retrieval management unit 432. In addition, a personal relationship model is edited from the intention extracted by the response plan formation unit 434.

The response generation unit 436 generates a response from a response plan formed by the response plan formation unit 435 and outputs the response.

The information provider status analysis unit 437 analyzes whether the information provider is set in an environment which allows direct line connection.

In accordance with the analysis results using the intention understanding function and the emotion analysis function in the response plan formation unit 434, the demand prediction result of the response plan formation unit 434, and the analysis result of the information provider status analysis unit 437, the direct line connection decision unit 438 decides whether a line is directly connected between the user and the information provider.

The direct line connection unit 439 directly connects a line between the user and the information provider upon reception of the decision from the direct line connection decision unit 438.

The operation of this embodiment will be described below.

A person who discloses and provides information is called an information provider, and a person who accesses an information disclosing apparatus to obtain information is called a user. The information disclosing apparatus is called an agent. The direct negotiation between the user and the information provider without going through the agent is called direct line connection.

A processing flow of the present system is shown in a flow chart in FIG. 90. An example of a screen image upon input of a user demand is shown in FIG. 91.

Figure 91:
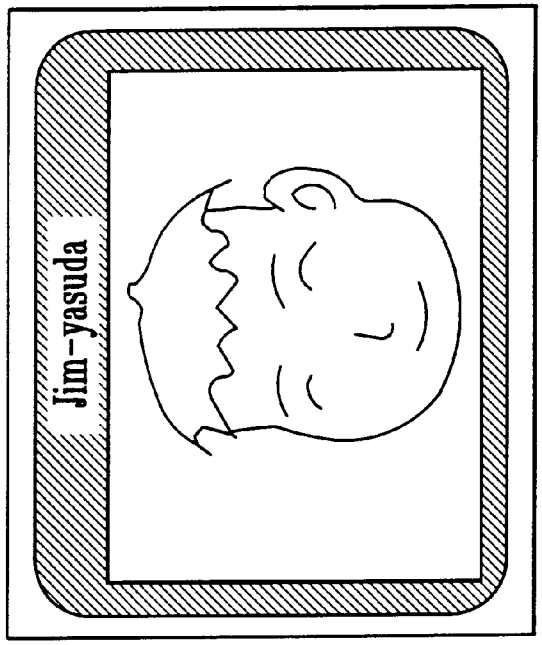
FIG. 91 is a view sowing an example of a screen image.

For example, when the user inputs a text command string "pip jim yasuda" in a window-based interface as shown in FIG. 91, the user can access to an agent jim of a user yasuda serving as the person who discloses information.

Upon reception of an access, the agent performs the personal reference check of the user (step S401 in FIG. 90). The agent rejects the negotiation with a user who is not registered yet at this moment. The user can register in a person's category, as shown in FIG. 92.

Figure 94:
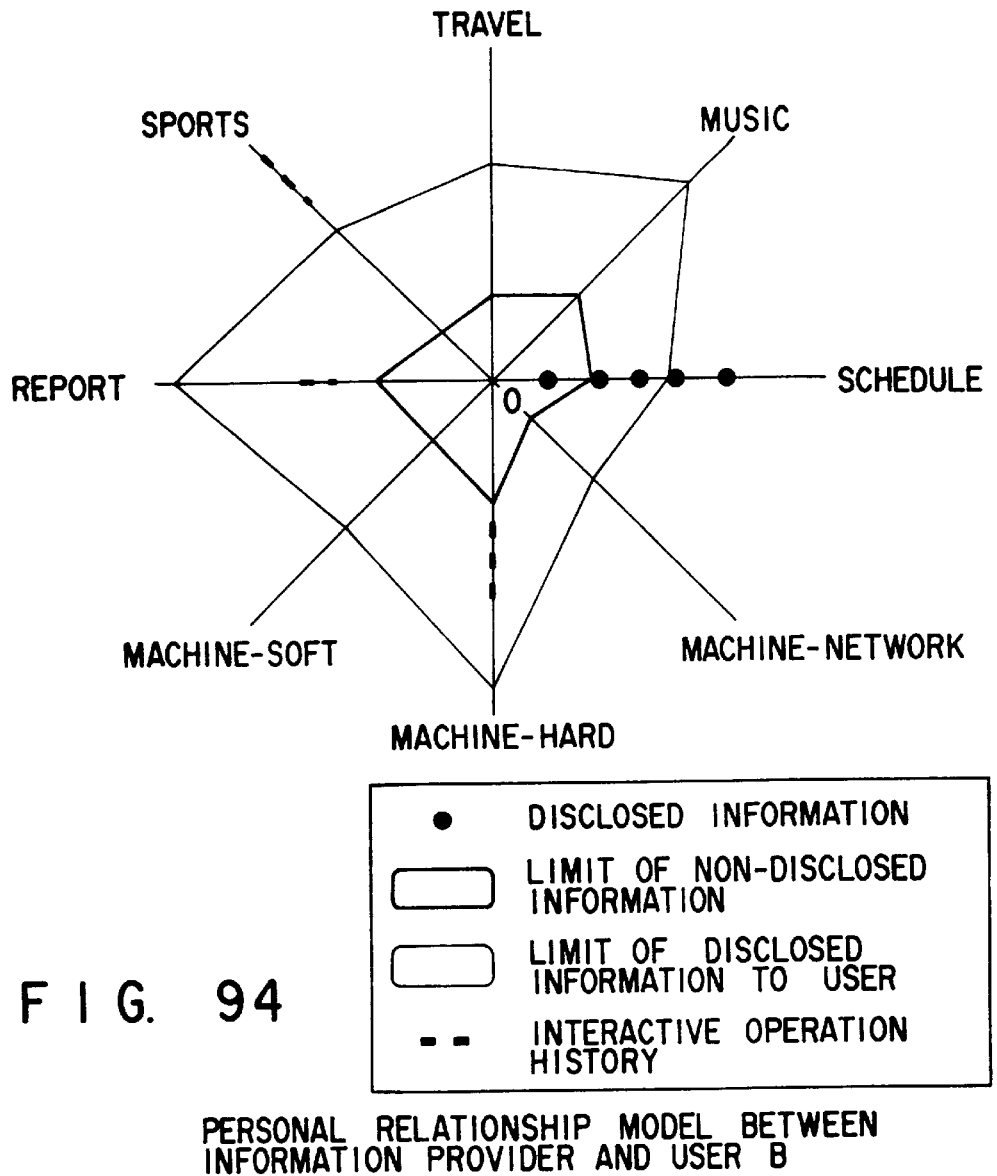
FIG. 94 is a view showing an example of a personal relationship model.
Figure 95:
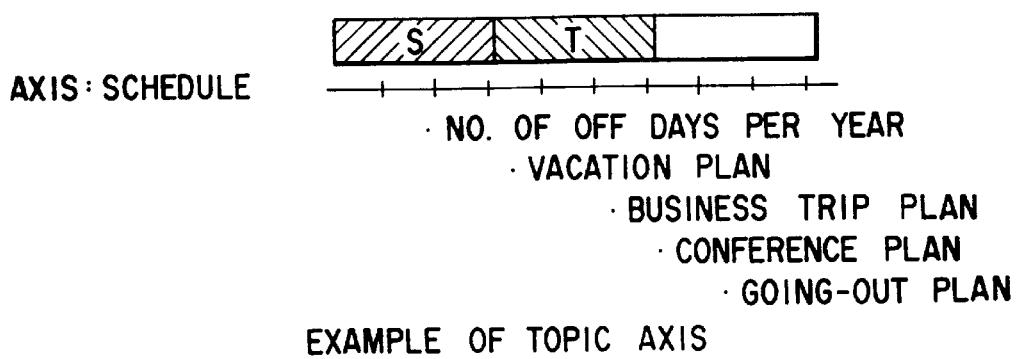
FIG. 95 is a view showing an example of a personal relationship model.

The user performs interactive operations using texts and speech. A user's expression can be captured through a video camera. The information provider prepares an information provider model having topics as axes (see FIG. 94). For example, several topic axes corresponding to the tree structure of the disclosure information categories shown in FIG. 93 are prepared, and pieces of disclosure information are arranged along each topic axis. Information having highly private factors, information having a higher degree of details, and private information shared by a smaller number of members are arranged toward a center 0, and pieces of general information are arranged away from the center 0. A sanctuary (non-disclosure range S) serving as a range in which disclosure is very passive is explicitly indicated near the center 0. FIG. 95 shows an example of the schedule axis. In this example, the number of off days per year is defined as non-disclosure information in the sanctuary.

The agent retrieves user information in step S402 in FIG. 90. User information such as the right of access and a degree of familiarity for a topic is traced on the information provider model axis to form a territory (T) serving as a disclosure enable range for a specific user, thereby forming a personal relationship model. A radar chart in FIG. 94 is an example o f the personal relationship model.

When the information provider and the user are more intimate, the number of shared topics is large, and the degree of details increases. The information disclosure range T of a user having a higher intimacy comes close to the sanctuary (S). To the contrary, the information disclosure range T of a user having a lower intimacy is away from the center 0, resulting in disclosure of only general topics. The information disclosure range changes depending on the types of users and topics.

Figure 96A:
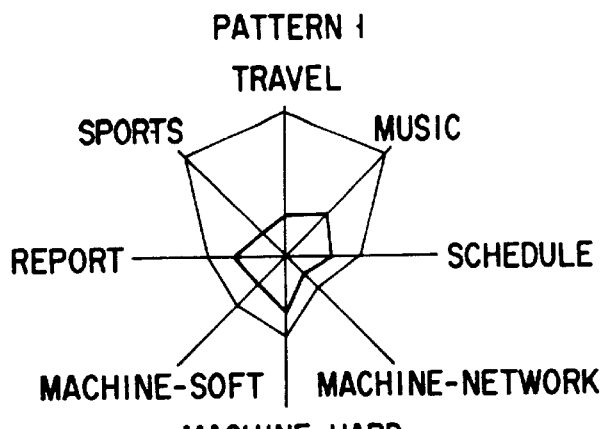
FIGS. 96A through 96D show views of examples of personal relationship patterns.

This user model can be patterned in accordance with the territorial features. FIGS. 96A thorough 96D show pattern examples.

For example, since the disclosure information is managed in a tree structure, a category to which each disclosure information belongs is clearly known. Pieces of disclosure information are classified into information derived from individual information, information derived from an organizational business operation, and highly public information. For example, in the model shown in FIGS. 94 and 95, the topic axes of the disclosure information, i.e., <schedule, machine-network, machine-hard, machine-soft, report, sports, travel, music> belong to business operation information. The topic axes, i.e., <sports, travel, music> belong to private information.

Figure 96B:
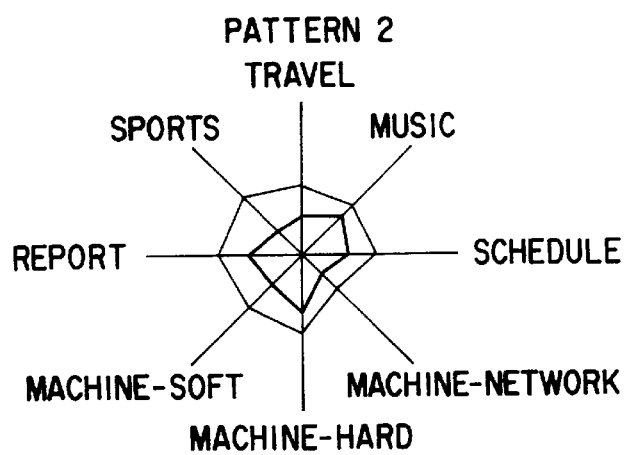
Figure 96C:
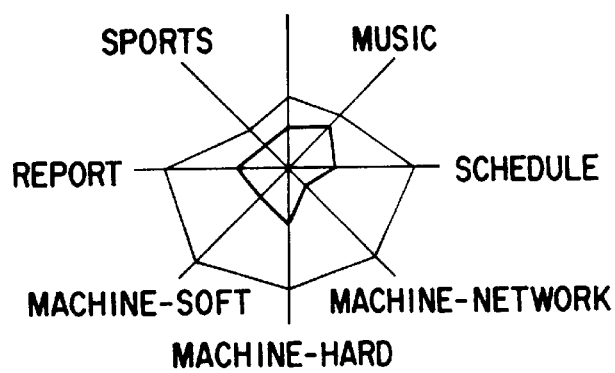
Figure 96D:
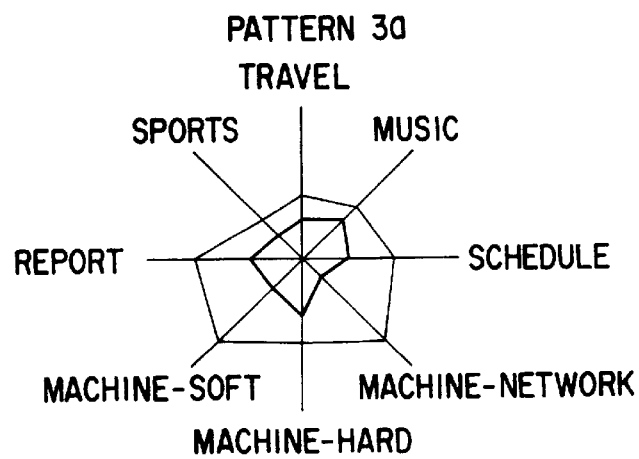
Figure 97:
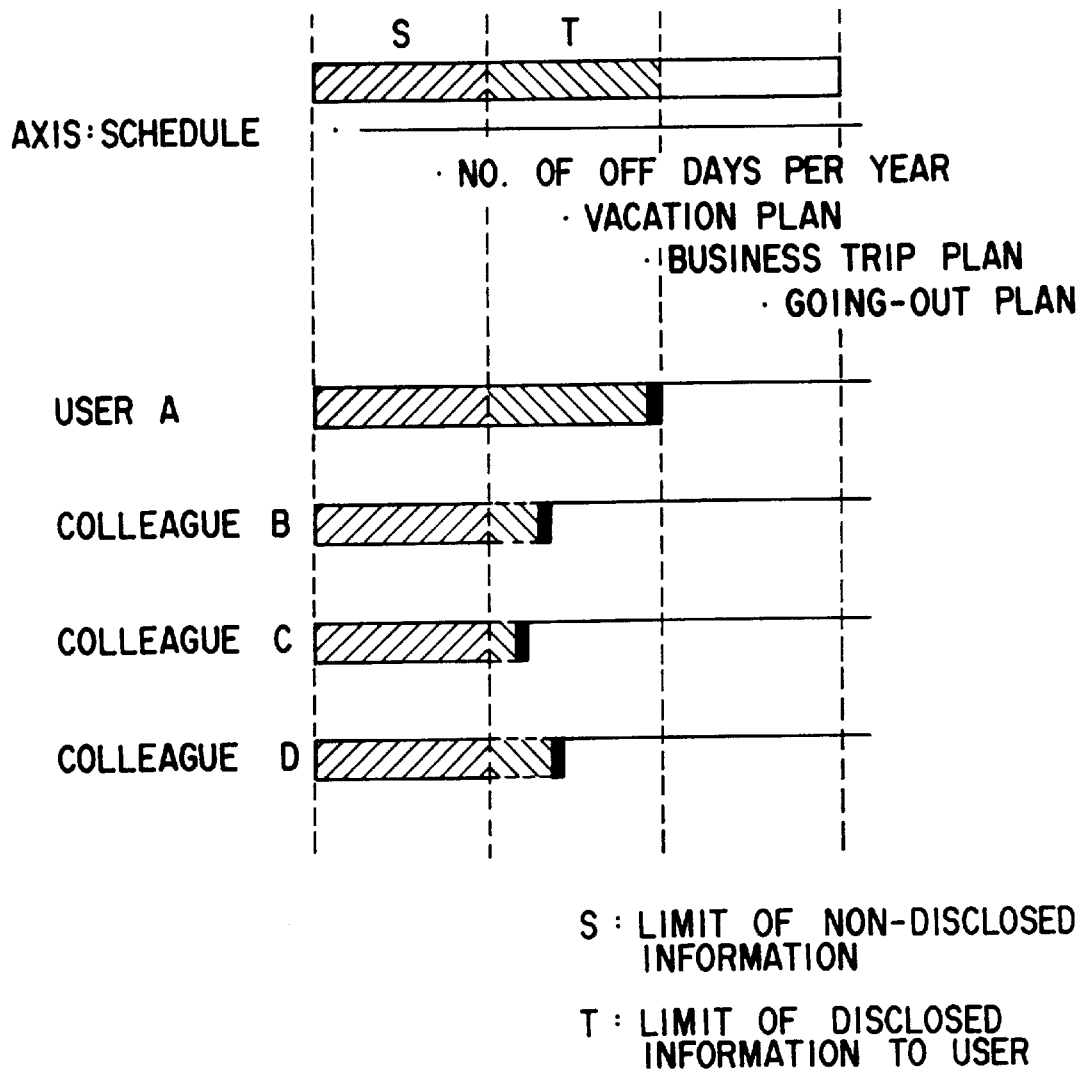
FIG. 97 is a view showing an example of temporal correction of a personal relationship model.

Other models are also available: a model for calculating a ratio <S/T> of the distance of the sanctuary S to the distance T of each territory; and a model in which accesses to the topic axes are compared and totalized to select a pattern. The ratio S/T can be defined as a degree of intimacy, and a specific topic having the highest degree of intimacy is analyzed to obtain a user pattern. In this manner, the degrees of intimacy are matched with the information categories to obtain Pattern 1 (FIG. 96A) as an access relationship on only business operations, Pattern 2 (FIG. 96B) as an access relationship on both the business operations and the private activities, Pattern 3 (FIG. 96C) as an access relationship on only the private activities, and the like. In addition, the value of the degree of intimacy is further divided to classify pieces of disclosure information into a more complicated pattern, as in Pattern 3a (FIG. 96D) as intimate relationships on both the business operations and the private activities.

When the users are classified into these patterns, the agent is not limited to the user model, but can adaptively disclose information upon looking up the territory of models belonging to the same pattern.

For example, vacation information is basically disclosed to colleagues, but its disclosure is limited to employee A having different job contents. However, if A must urgently get in contact with the information provider who is off, the agent analyzes other colleague model patterns. The agent autonomously adjusts the disclosure range such that the schedule axis of the user belonging to the person's category as colleagues is looked up to temporarily apply an average value of the territory, or an average value of models belonging to the same pattern is temporarily applied. The agent discloses only the telephone number of a place where the information provider stays. This history is reported to the information provider later on.

Figure 98A:
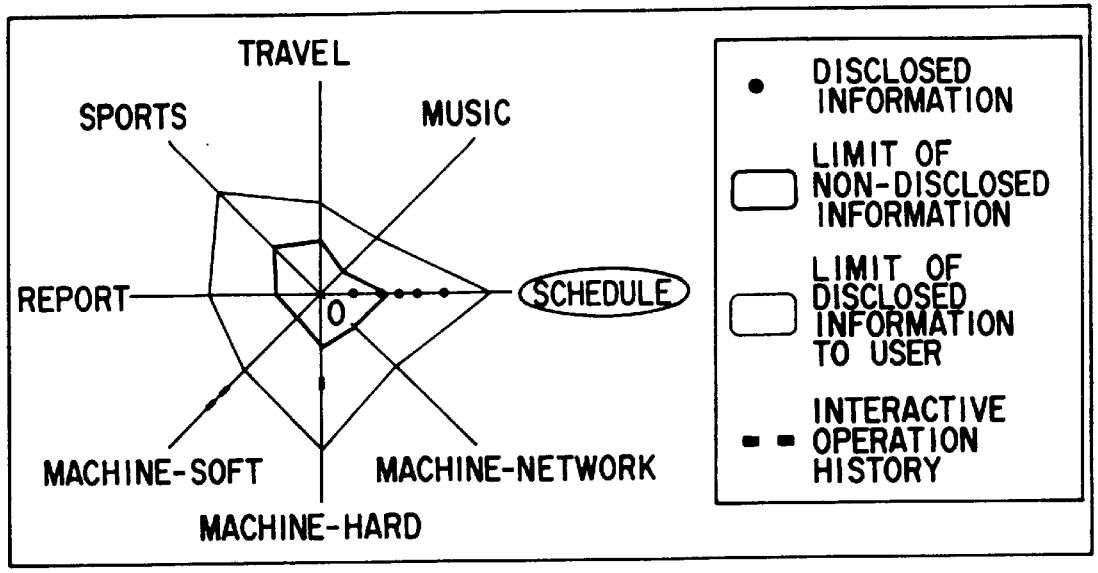
FIGS. 98A through 98C show views of an example of a user model reconstruction interface.
Figure 98B:
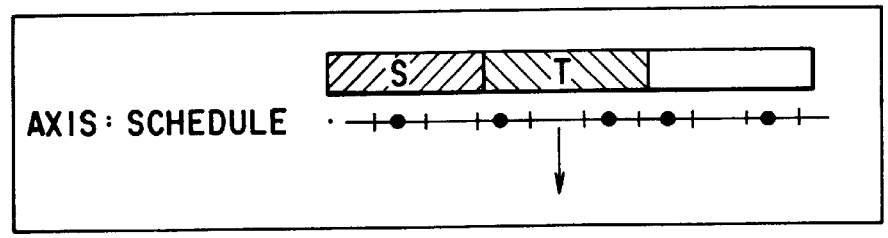
Figure 98C:
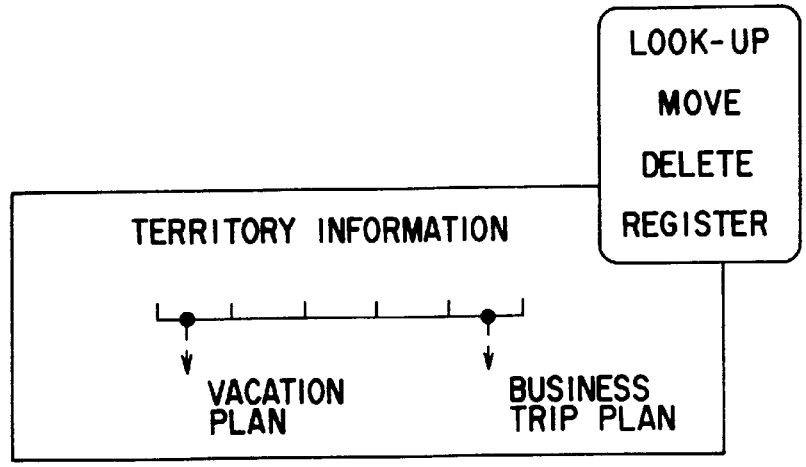

The user model can be reconstructed by storing the access contents. For example, a higher degree of familiarity of the user than expected can be grasped from a history in which the access topic falls within the territory. At this time, the model is reconstructed to narrow the territory (disclosure information range). As a method of narrowing the territory, an interface shown in FIGS. 98A through 98C are prepared to edit the territory line. When the topic axis in FIG. 98A is picked up, the topic axis is enlarged and displayed, as shown in FIG. 98B. When a point on the territory is picked up, an information memory of the territory appears as shown in FIG. 98C. When disclosure information is picked up from the memory, the details can be looked up in the form of a hypertext. In addition, disclosure information can be edited, e.g., moved, deleted, or registered. There is also available a method of changing the length of a territory line on the memory of FIGS. 98B and 98C.

The agent can automatically reconstruct the model by looking up the user model belonging to the same pattern, the same information category, and the same person's category. The topic axis and the topic which are adjusted by the agent are used as model reconstruction reference data by displaying the date, the contents of interactive operations, a fine adjustment reference model, a history, and the like.

An example of a method of arranging acquired information on an optimal axis will be described below. When information is acquired in an interactive operation, the agent analyzes the acquisition process such as a specific topic source of information (originating information) and locates the analysis result inside or outside the originating information. If the resultant information has a higher level than the originating information in accordance with the value of the information such as a degree of latest, a degree of details, and the number of persons who share the information.

An input sentence received by the demand reception unit 433 is subjected to morphemic analysis and syntactic analysis in accordance with the natural language analysis function of the intention understanding function in the response plan formation unit 434, thereby generating semantic structure candidates. An answer candidate table corresponding to each semantic structure candidate is formed (step S403 in FIG. 90).

For example, a user inputs a text "Ms. xx went to the Asahi Hall the other day, didn't she?" The pattern of a user intention in response to this input is prepared. By analyzing a part "went . . . the other day", the candidates of the intention are sequentially output from a candidate having a higher probability, such as "schedule" and "report".

In the intention analysis function, as shown in FIGS. 99 to 102, examples include an example of analyzing emotions with reference to the registered user data in addition to extraction of the intention.

To extract emotions from a Japanese input sentence, the types of emotions "satisfaction, joy, interest, dissatisfaction, confusion, and anger" and adverbs, adjectives, adjective verbs, and interjections which express these types of emotions are registered as a dictionary. Words obtained by morphemic analysis and syntactic analysis are determined looking up this dictionary whether they include emotions, and if so, the types of emotions are determined. This technique is known to those skilled in the art (e.g., Jpn. Pat. Appln. KOKOKU Publication No. 6-82377). Words expressing an emergency, such as "hurry" and "quick" are registered in this dictionary, and the dictionary can be used to extract an emergency. In addition, symbols "!!" and "?" can be registered in the dictionary and are used to auxiliarily express the emotional expressions.

The resultant emotion information is converted into a numerical value every time a demand is received, thereby determining a direct negotiation timing. The start of totalization is determined as the timing at which a difference occurs in recognition of the contents, i.e., at the timing at which a demand for setting an "item: difference" to be 1 is received S times.

Examples of analysis items in a combination of extraction of an intention and analysis of emotions are explained (see FIGS. 99 to 102).

(a) Whether User Expects Immediate Answer

For example, when either a word or a word in a sentence which is extracted from a Japanese input sentence in morphemic analysis and syntactic analysis contains a word representing an emergency, the value is set to 1.

(b) Whether Japanese Input Sentence Has the Same Number of Clauses as That of Corresponding Sentence in Conversation of Average or Ordinary User as the Result of Syntactic Analysis The initial value is zero. If any difference is found in the analysis, the value is incremented by one.

(c) Whether Japanese Input Sentence Contains Adverb, Adjective, Adjective Verb, or Interjection Properly Expressing Feelings (e.g., already, and entirely)

The initial value is zero. If the Japanese input sentence has an interjection, the value is incremented by one.

The initial value of the difference is zero. The difference indicates a difference between the predicted demand of the agent and the actual demand in the second and subsequent demands. When a difference between the predicted demand registered in the data storage unit 431 and the intention extracted in analysis of the intention is increased, a user's desire for directly connecting the user to the information provider is increased. The value is set to 1 when a difference occurs.

Analysis examples using the emotion analysis function are shown (see FIGS. 99 to 102).

(a) Time Interval Required from Presentation of Answer from Agent to Start of Next Demand from User When this time interval is decreased, the user's frustration is expected to increase. When the time interval in the previous demand is compared with the current time interval and longer than that, the value is set to 1.

(b) Expression

A user's expression is recognized through a camera installed in the input unit 440. The ordinary expression image of the questioner is retrieved from the information storage device, and a difference between the current expression image and the ordinary expression image is extracted. The user's expression is estimated from a point such as wrinkles between eyebrows. A method of detecting emotions is realized in a reference (Kobayashi and Hara: Basic Human Expression Recognition by Neutral Network, Journals of Keisoku Jidou Keigyo Gakkai, Vol. 29, No. 1, 112/118 (1993)) or the like. The initial value is zero. If a negative emotion such as anger is found, the value is set to 1.

(c) Feeling Extraction Using Speech Frequency

This realization method is to compare a user's voice frequency with reference frequencies representing boredom, anger, and joy detected in a reference (Takebayashi and Kanazawa: Non-linguistic Speech Recognition and Synthesis for Interactive Operations with Computer, Journal of the Electronics, Information, and Communication Engineers of Japan, No. 8, pp. 1,512–1,521, 1994.8) or the like. The initial value is zero. When a negative emotion such as anger is found, the value is set to 1.

A speech pitch represents the speed and intonation of conversation and the speed of utterances to estimate the user's emotions and has already been proposed in a reference (Watabe et. al.: Speech Interactive Understanding System Configuration—CHIBA-HI Symposium 581/5881994) or the like. The initial value is zero. If a negative emotion such as anger is found, the value is set to 1.

Data of all the items described above need not be prepared. For example, if a speech input device is not available, speech analysis is not performed.

For example, the lapses of time of values counted in FIG. 99 are calculated for the following items (see FIG. 100).

[Equation 1]

I: analysis item

N: current reception count

S: reception count in occurrence of a difference between extraction of the intention and prediction U: analysis value in intention analysis and emotion analysis $$U = \sum_{i=S}^{N} Pw \, I(i)/(N-S)$$

The analysis value can be calculated as described above.

An example of adding a priority value, i.e., a weighting value of the item to this calculation value is shown below see (FIG. 101).

Weighting values for the respective users upon analysis of the items in the table in FIG. 100 are registered in the data storage unit 431. For example, a large weighting value is set for a rational person in intention analysis. A weighting example is shown in FIG. 101. The weighting values are analog values ranging from 1 to 5. Alternatively, a weighting value in difference is initially set to zero. When a difference occurs, the value is incremented one by one. When a user claims an emergency, the weighting value in emergency is increased. The weighting value is increased or decreased in accordance with the demand reception count.

The values written in the table in FIG. 100 are totalized every reception, and the value is substituted into the following equation.

[Equation 2]

U: analysis value in intention analysis and emotion analysis

W: weighting value m: the number of items

Q: question priority $$Q = \sum_{j=0}^{m} (U(j) * W(j))/m$$

Response plan formation will be described (step S404 in FIG. 90).

The personal relationship model is edited. Interactive operations between the agent and the user become an offensive and defective battle of the territory. FIG. 103 is a flow chart of user negotiation decision processing using the personal relationship model.

Upon extraction of the intention, the agent sets the corresponding topic on the topic axis of the personal relationship model (step S502 in FIG. 103). If a point is present outside the territory, the agent may disclose information beyond the demand of the user to set the topic near the territory line (step S504). If a point is within the territory, the agent must return the topic up to the territory line. This information disclosure is passive to the user (step S505).

When the sanctuary is invaded, the agent sends a message representing discomfort or a message representing that the information cannot be disclosed to the user (step S506). When a topic is generally set within the territory line, the agent does not disclose information and forces the compromise about the topic. Therefore, the user may feel impatient at the discussion.

When a difference between the distance Tn in the current interactive operation and the distance T(n−1) in the previous interactive operation is large, the following estimation is made (step S510). The user understands that he/she accesses the non-disclosure information and makes compromise about the topic. If this state continues three times (step S512), it is possible to attempt to temporarily change the personal relationship (step S513).

If the difference between Tn and T(n−1) is less than zero, and this state continues three or more times (step S511), the agent estimates the user's dissatisfaction and may prepare to directly connect the line to the user (step S507).

The following demand contents are expected from the personal relationship model and the editing history. Basically, topics located before and after the present topic point become candidates. For example, if a topic is one outside the territory, it is expected that the user demands the affirmative contents or the contents of the territory, i.e., contents closer to the center of the topic axis.

If the topic is within the territory, information disclosure by the agent becomes passive to send an answer to force the user to make compromise about this topic. The user reaction in response to this answer is determined in the topic setting in the second and subsequent topic settings. More specifically, when the user demand in the second topic setting stays within the territory, the agent continuously forces the user to make compromise about this topic. This may hurt the user's emotion.

The response plan formation unit 404 dynamically grasps the present status of the information provider and compares the analysis value of the user in intention analysis and emotion analysis, thereby considering direct line connection.

An example of the current status analysis of the information provider is shown below. The current status examples of the information provider are as follows.

1: The information provider is out.
2: The information provider is busy and has no time to directly connect the line to the user.
3: The information provider has enough time to directly connect the line to the user.

The schedule data of the information provider which is registered in the data storage unit 401 in advance is looked up as status check. For example, a countermeasure is determined in accordance with the schedule, such as "during vacation" or "during conference". Alternatively, it is checked whether the information provider is present through a camera.

If the current status is not item 1, the following means can be considered.

For example, there is a method of using a threshold set for each item shown in the table in FIG. 99 in units of users. The threshold of the analysis item in the user intention/emotion analysis function is set as user information by the information provider in advance. A threshold example is shown in FIG. 102. The user intention/emotion analysis value U(J) of a given item calculated by [Equation 1] is compared with the threshold. For example, if the value of the "user analysis item: emergency" is 0.8, this value is compared with a threshold of 0.3. Since the user analysis value is larger than the threshold, a proposal for directly connecting the line to the user is prepared. Alternatively, direct line connection can be proposed when values each close to the threshold are calculated in a plurality of main items.

An example using the question priority Q obtained in [Equation 2] is shown below.

The computer use status of the information provider is checked. Using a UNIX command: ps or finger or the like, it is checked if the information provider is in operation or unread mails are accumulated. In addition, history information is checked using a UNIX command: history or the like. The agent determines whether the information provider is busy in accordance with the above operations.

Figures 104A, 104B, 107:
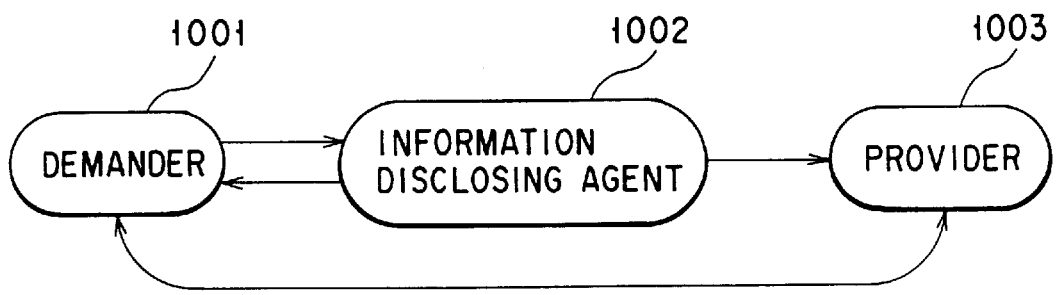
FIGS. 104A and 104B show views fore explaining current status analysis examples of an information disclosure.
FIG. 107 is a view showing an interactive operation form between a demander, an information disclosing agent, and a provider.

For example, as shown in FIG. 104A, the status of the information provider is converted into a numerical value in the form of an analog value. To grasp the current status of the information provider, the following means is considered. The processing and time of the information provider are grasped using a UNIX history command. It is checked using the finger command if the information provider is reading mails. If unread mails are stacked, the agent determines that the information provider is busy, and 1 is registered in the table. The expression of the information provider which is acquired through the camera is analyzed. If "anger" is found in the expression of the information provider, 1 is written. In addition, the schedule priority registered by the information provider is looked up.

The information provider registers weighting values for the respective items in advance, as shown in FIG. 104B.

[Equation 3]
p: analysis item
W: weighting value
m: the number of items
P: current status analysis value of information provider $$P = \sum_{j=0}^{m} Pw(p(j) * W(j))/m$$

The current status analysis value is calculated by [Equation 3] and compared with the question priority Q of the user which is obtained in [Equation 2]. If P>Q, then direct line connection is proposed, or the like.

When the user continuously invades the territory although the agent forces the user to return the topic to the territory line using the editing history of the personal relationship model, the information provider may directly connect the line or the like.

A response plan formation plan except for direct line connection is shown below. This example shows emotion check plan formation. The emotion check indicates the check of a user's reaction upon a change in topic. For example, in the following conversation, check 1 corresponds to a change in topic. In this case, reliability of the user for the agent is lost. The change in topic may be performed using, e.g., a topic as the third candidate of all answer candidates prepared in the interactive operation f times before the current interactive operation.

In the following conversation, if an answer "Yes" is obtained, the agent determines that the user may not feel impatient. As in emotion recognition 1, direct line connection is proposed. Otherwise, a conversation is continued with the agent as in emotion recognition 2.

(Sample 1)
User: "Ms. Yasuda went to the Asahi Hall the other day, didn't she."
Agent: "Shall I retrieve the schedule?"
User: "No, I want to know the way to get the Asahi Hall."
Agent: "Shall I display the map. Do you know the name of nearest station?"
User: "I don't know the name of it."
Agent: "Do you known the address of the Asahi Hall?"
User: "I don't know the address, either."
Agent: "Do you know the telephone number of the Asahi Hall?"
User: "No, I don't."
(Feeling Recognition 1)
1: agent: "Are you going to join the lecture meeting?" check . . . check 1
1: user: "Will you show me the map?"
1: agent: "I want to directly connect the line to you. How about you?" . . . propose 1
1: user: "Yes, please."
1: agent: "I will be in time. Please wait."
(Feeling Recognition 2)
2: agent: "Are you going to join the lecture meeting?" check . . . check 1
2: user: "Yes, I am. I go to the place for the first time."
2: agent: "You receive the information map, don't you?"
2: user: "Oh! yes."
2: agent: "Then, you know the address, don't you? Please let me know the address."
2: user: "Yes. Just a moment."

Figure 105:
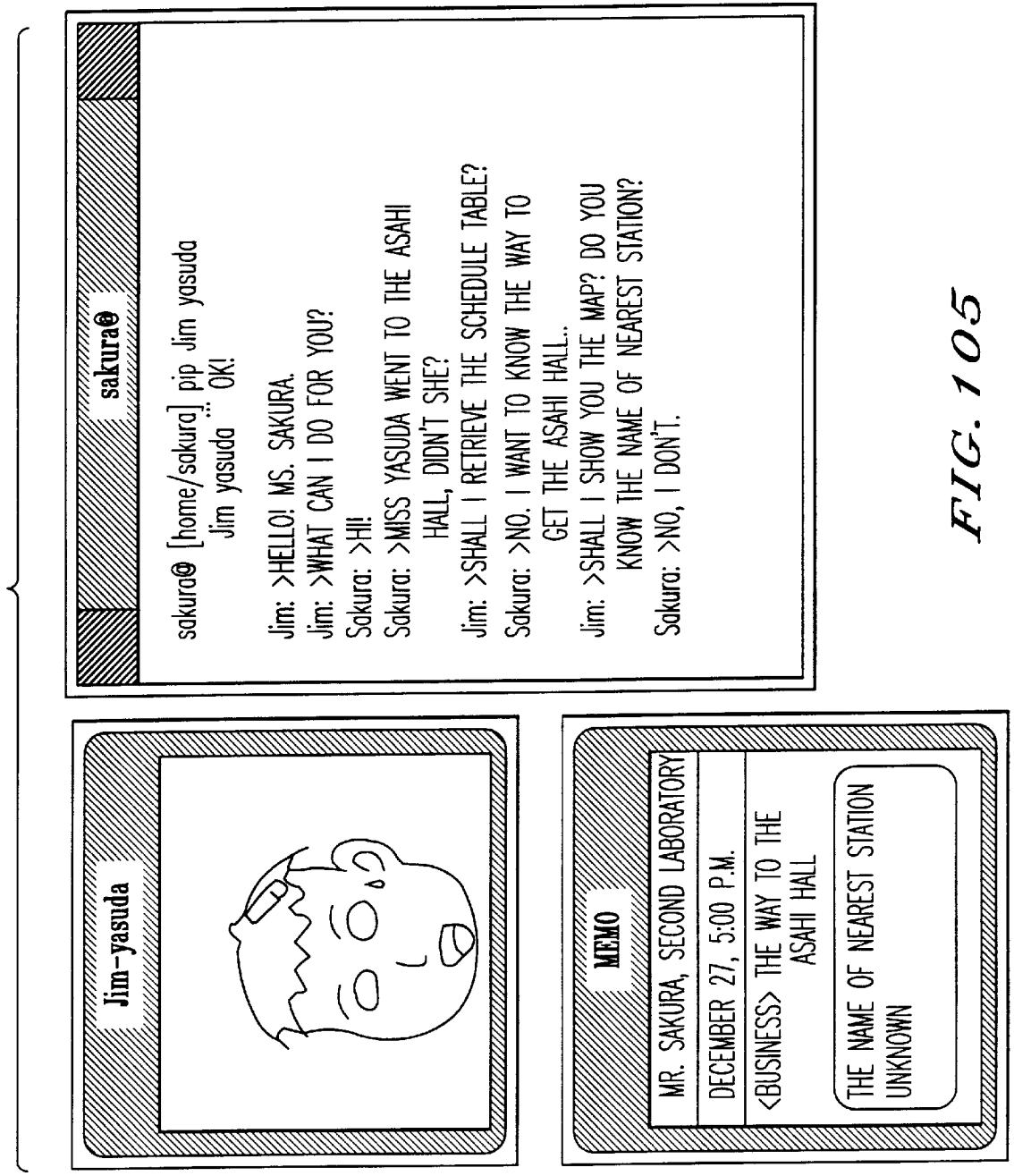
FIG. 105 is a view showing an example of negotiation outline presentation.

The contents extracted by understanding of the intention (i.e., a negotiation record) are graphically displayed in the negotiation content presentation function in the response formation plan formation unit 404. FIG. 105 shows a negotiation outline display example (i.e., a box labeled as MEMO in FIG. 105). Using the MEMO box, the user can continue negotiation with the agent while checking the degree of understanding of the agent. This chart is reused by the information provider to check the process of the negotiation contents between the user and the agent. The agent checks the information provider if the direct line connection is made (step S405 in FIG. 90).

An example of causing the information provider to check direct line connection to the user is shown below.

A window is opened to present a negotiation record chart during editing to ask the information provider to directly connect the line to the user (step S406 in FIG. 90).

Agent: "Please directly connect the line to the user immediately" . . . emergency mode Agent: "Is it OK to directly connect the line to the user?"
OK: direct line connection
NO: the response table is looked up to generate a response in consideration of the question priority.

Figure 106:
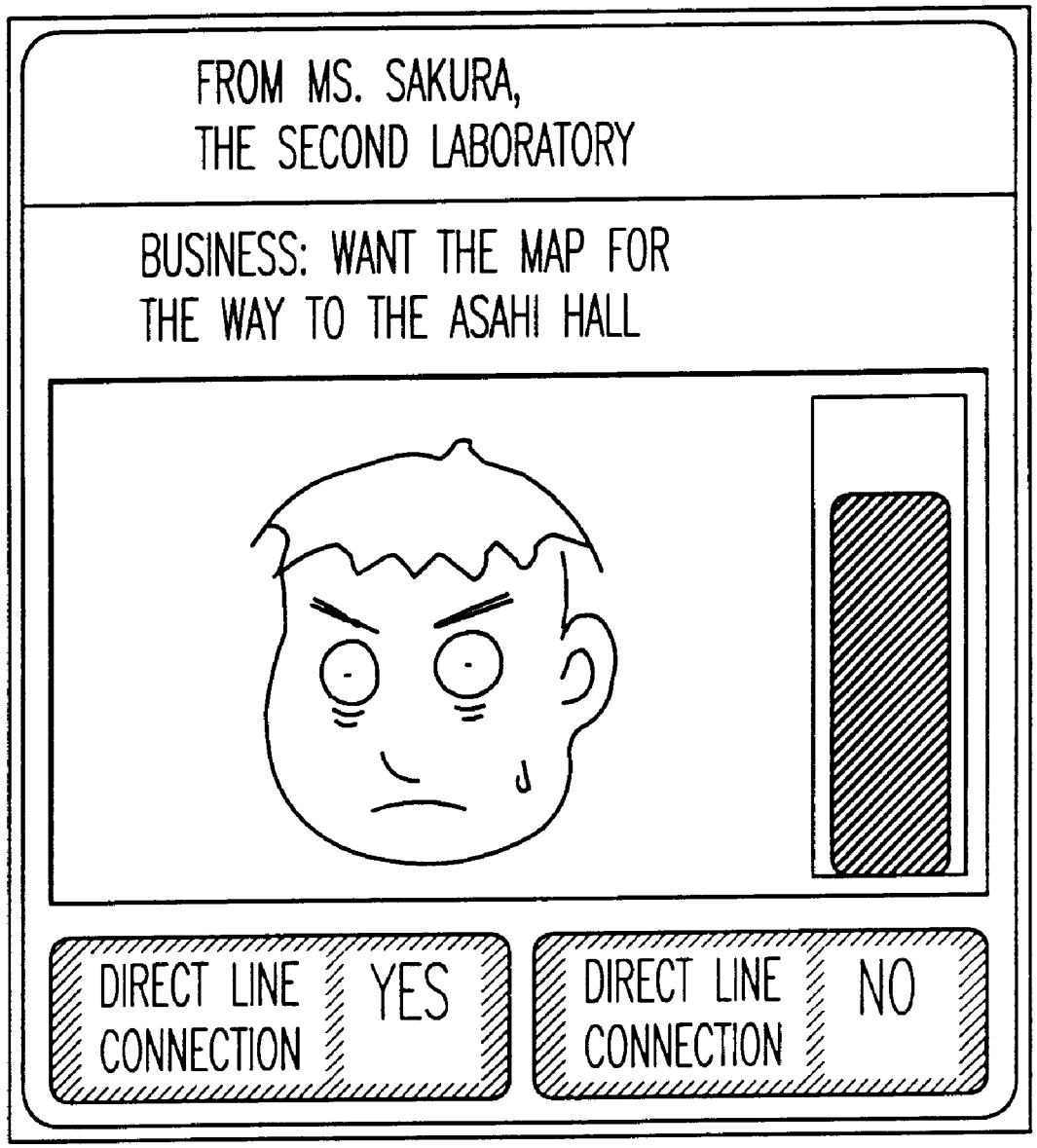
FIG. 106 is a view fore explaining an example for causing an information disclosure to check if a line is directly connected to a user.

An example of the direct line connection check window is shown in FIG. 106. The window is displayed by changing an appealing method in accordance with the priority by means of speech, a color, flickering, the size of a character, a window open position, the size of a window. Alternatively, the AGENT expression, and a stimulative color in case of emergency may be used to display the window.

For an inquiry for directly connecting the line or a highly emergent demand, the "YES" button is flickered, an expression at the time of emergency is displayed, the degree of emergency or priority is displayed in a graph, or the speed of the motion is increased.

In consideration of the above situation, the agent combines the following answer sentences and exhibit this combination. Answer sentences for not directly connecting the line are the following combinations.

Agent: "I'm sorry ○ is out now."

Agent: "I'm sorry ○ is drafting a report for patent application, so I cannot get in touch with ○." (schedule look-up example)

Agent: "I'm going to leave a message to let Sakura to get in touch with you by mail later. Is it OK?"

Agent: "★ also knows about it. Shall I call the agent of ★?"

In this embodiment, the intention understanding and emotion analysis are performed by the response plan formation unit 404. However, the intention understanding and the emotion analysis may be performed in the demand reception unit 403.

(Fifth Embodiment)

The fifth embodiment will be described below.

Speech is the most natural and daily communication medium and the main factor in communication between men.

A speech recognition/understanding system has been conventionally developed by paying attention to the linguistic aspect of the speech uttered by a user (i.e., eliminating the non-linguistic aspect). For this reason, any system utilizing a comfortable, friendly feature of the speech medium has never been available.

The utilization form of speech information to perform smoother communication is shown below.

In this embodiment, a speech medium input/output (recording/reproduction) type, or speech recognition/ understanding and speech synthesis can be utilized in the form shown in FIG. 107. In this case, it is important in this embodiment to impart intention information and emotion information in understanding of the user's intention and emotions or speech synthesis in addition to the linguistic understanding of the contents of a speech input from a user, thereby presenting the resultant information to the user.

The studies on recognition/understanding and synthesis of intention information and emotion information of the speech have been reported by Kanazawa et. al. (Journal of the Electronics, Information, and Communication Engineers of Japan D-11, Vol. J77-D-11, No. 8, pp. 1,512–1,521) and Cahn et. al. ("Generating Expression in Synthesized Speech", Technical Report, Massachusetts Institute of Technology, 1990). These are based on "rhythmic information" such as the pitch and accents of speech signals, and intention information and emotion information such as anger, joy, sorrow, agreement, admiration, and connection are recognized/understood and generated.

On the other hand, a text, i.e., a written language also has emotional words. Feelings can be expressed using specific words. For example, words such as "good", "skillful", "marvelous", "unfair", "like", "disgusting", "delicious", "unfashionable", "unbelievable!", and "really?" can express the intention of the speaker. These words of the written language can extract the emotion information and the intention information. Unlike the spoken language, the written language cannot produce expressions with reality, which reflect the psychological states.

This embodiment is based on the above points to cause demand reception units 103 and 403 to understand the emotional states and intentions, and the situations of users to smoothly perform communication.

Figure 108:
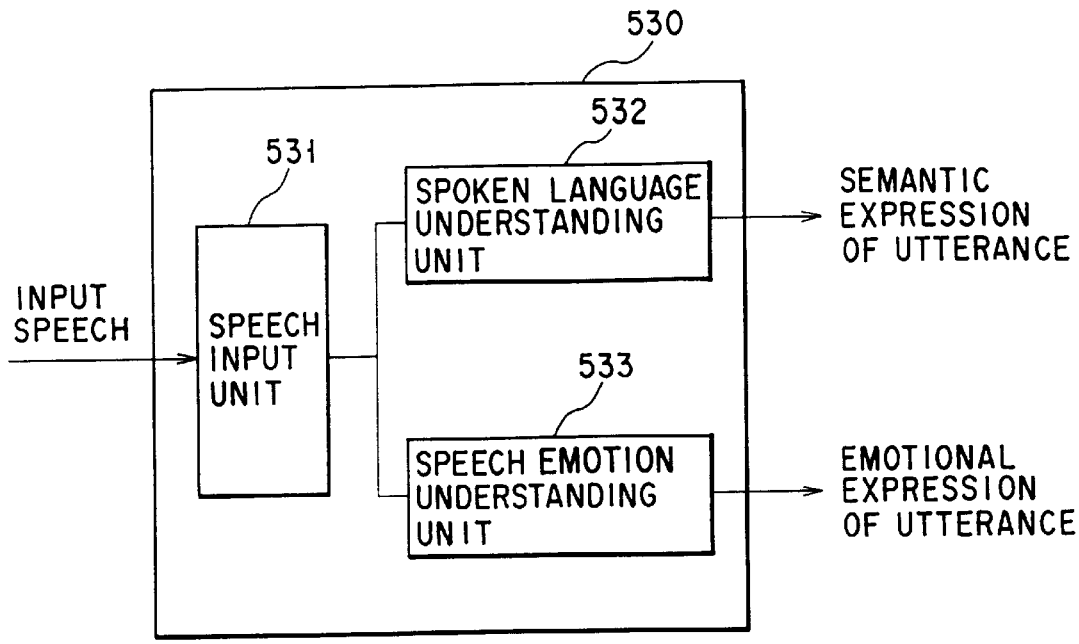
FIG. 108 is a view showing the arrangement of a speech demand reception unit according to the fifth embodiment.

FIG. 108 shows the arrangement of a speech demand reception unit 530 of this embodiment. This speech demand reception unit 530 comprises a speech input unit 531, a spoken language understanding unit 532, and a speech emotion understanding unit 533. The speech demand reception unit 530 is characterized in that the contents of the spoken language are understood, and the emotions of the user are understood.

The speech input unit 531 converts input speech into digital data through an LPF (Low-Pass Filter) using a sampling frequency of 12 kHz and 16 quantization bits. Through digital signal processing, spectral analysis and pitch extraction are performed. For example, as in the reference of Kanazawa et. al., smoothing is performed in a frequency range on the basis of FFT analysis, and logarithmic switching is performed to obtain a 16-channel bandpass filter (BPF) output every 8 ms. At this time, the FFT raw spectrum can be used for recognition within the bandwidth of 50 Hz to 1,000 Hz.

In addition, cepstrum analysis and the like can be performed to obtain a pitch frequency.

Preprocessing for understanding the contents of the spoken language is different from that for understanding emotions.

Figure 109:
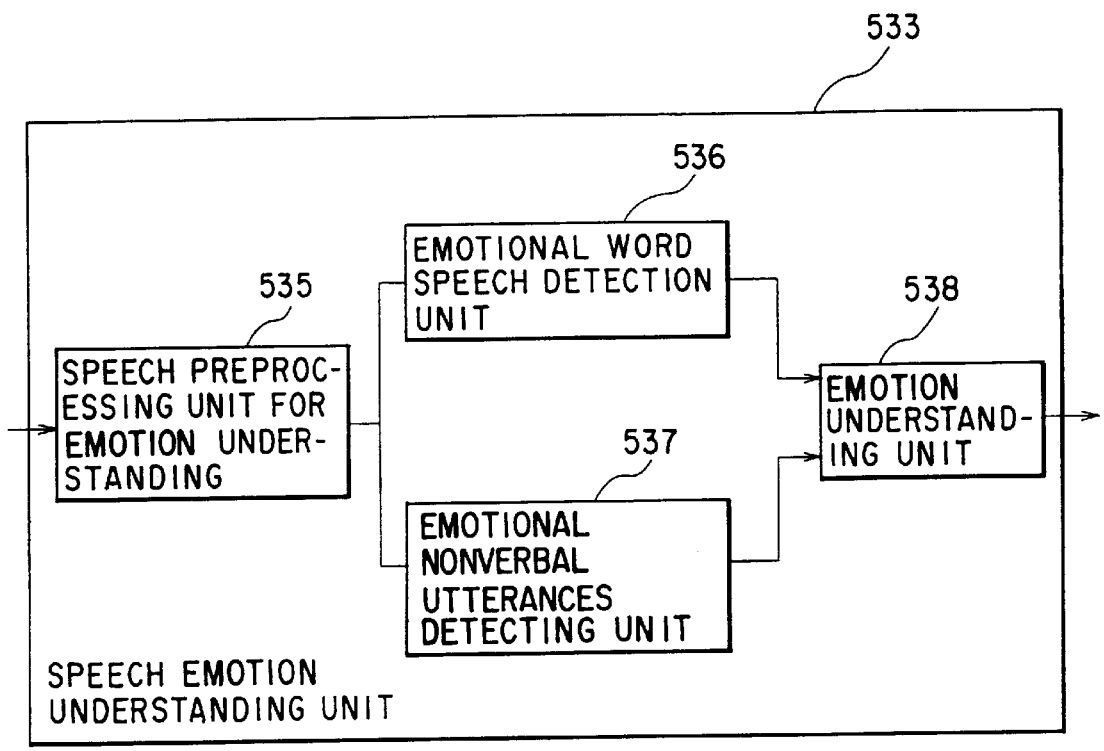
FIG. 109 is a view showing the arrangement of a speech emotion understanding unit in the speech demand reception unit of the fifth embodiment.

FIG. 109 shows the arrangement of the speech emotion understanding unit 533 using speech spotting for emotional words and speech spotting for emotional non-language. The speech emotion understanding unit 533 comprises a speech preprocessing unit 535 for speech understanding, an emotional word detection unit 536, an emotional non-language detection unit 537, and an emotion understanding unit 538.

As described above, the intention and emotions of the user can be understood from the linguistic contents of the speech, and a specific emotional word can be detected using a word spotting technique used in speech recognition and free-talking understanding. Using this technique, the emotions of speakers can be understood from emotional words such as "unfair", "like", "disgusting", "no good", "stop it", "unbelievable", "more and more", "no". These can be realized by the word spotting method using the hidden Markov model (HMM) or a neural network. Only several hundreds or less of emotional words are enough, and this can be coped with the prior art such as the method of Takebayashi (Journal of the Electronics, Information, and Communication Engineers of Japan D-11, Vol. J77-D11- No. 8, pp. 1,417–1,428). At this time, the same LPC cepstrum and filter bank outputs as in normal speech recognition are used in the speech preprocessing unit 535 for emotion understanding.

Emotional word speech recognition in the emotional word speech detection unit 536 can be realized in any unit of recognition based on phonemes, syllables, or words.

On the other hand, emotional non-language recognition in the emotional non-language speech detection unit 537 performs word spotting. At this time, the non-language speech include vowels and syllabic nasal such as "eh!", "ah!", "h'm!", "oh!", and "uh", laughing voices such as "ha-ha!" and "he, he!", a chuckle such as "hu-hu-hu!", a yarn such as "Ah . . . h! ah . . . h!", a sign such as "Ah . . . h", a tongue-clicking such as "tut!", and the like.

A difference between recognition of the non-linguistic speech and recognition of linguistic speech does not depend on the envelope (outline shape) of the frequency spectrum, but appears in a change in speech pitch frequency and in a tempo and a duration.

For this reason, this embodiment uses the FFT raw spectrum as in the reference of Kanazawa et. al., the pitch frequency, or the duration as the feature parameter of the non-linguistic speech. The non-linguistic speech is detected such that non-linguistic speech is represented as a N-dimensional fixed feature vector at 25 points in the time direction and XX points in the frequency direction (75 to 950 Hz) in accordance with keyword spotting using, e.g., the FFT raw spectrum in units of words, voiced/voiceless, sound/silent, and pitch time patterns are integrated to collate a pattern. When a high-speed summation operation is used, about several tens of non-linguistic speech samples can be processed in real time.

Figure 110:
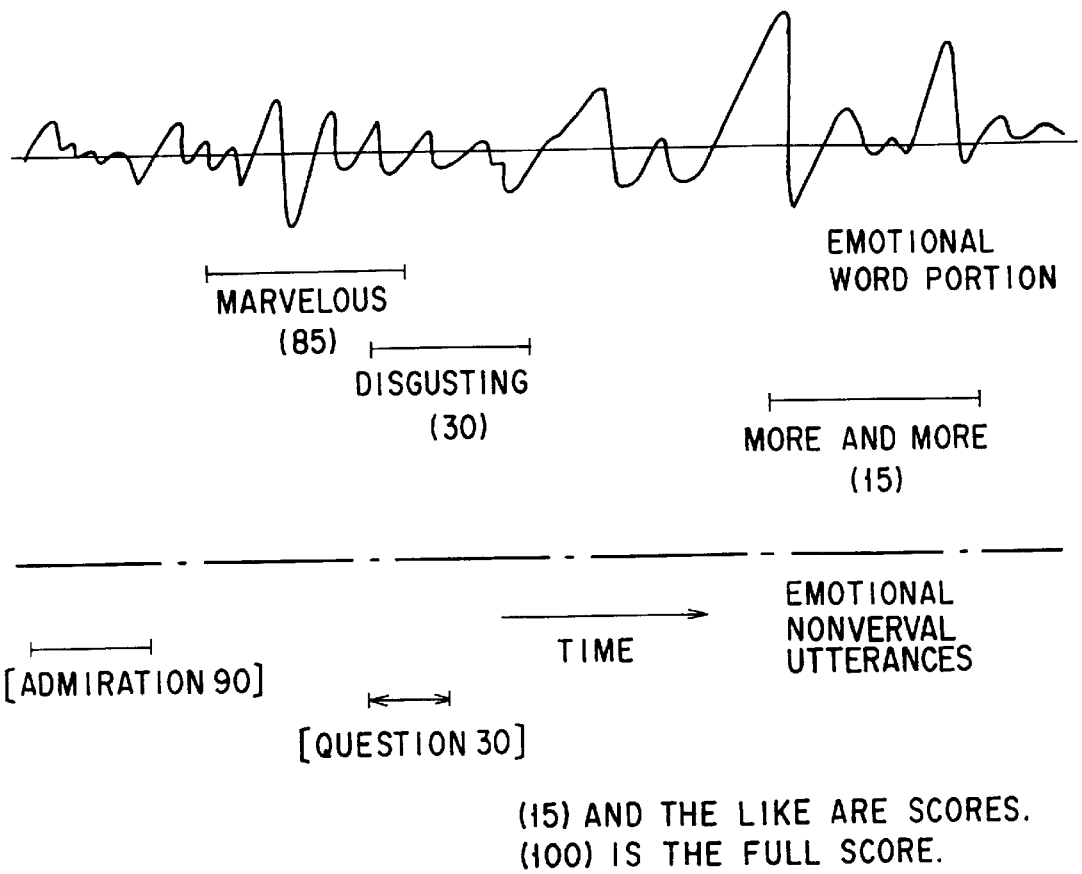
FIG. 110 is a view showing an example of the detection result of emotional word speech and emotional non-linguistic speech.

By these spotting processing operations, for example, as shown in FIG. 110, emotional word speech and emotional non-linguistic speech are detected with a scored likelihood value.

The emotional word speech candidate and the emotional non-linguistic speech candidate are sent to the emotion understanding unit 538 in FIG. 109.

The emotion understanding unit 508 processes a series of scored candidates to understand the status, intention, and emotions of the user. In the case of emotional word speech, the word "tut!" is linked with the word "irritation"; "unbelievable!", "negation"; "disgusting", "negation"; and "like", "affirmation".

The emotion understanding unit 508 picks up the emotional word speech candidates or the emotional non-linguistic speech candidates exceeding a given threshold (e.g., 80) and obtain a maximum value of the candidates as an emotion understanding result in accordance with word spotting.

This integration processing can be determined in accordance with a sum of likelihood values of speech and an image (LT=LS+LV>QT) (e.g., threshold QT=1.5) and thresholds QS and QV. For example, if "laugh" (likelihood value: 0.9) is obtained in speech recognition, and "laugh" (likelihood value: 0.8) is obtained image recognition, processing is decisively performed. When "laugh" (likelihood value: 0.8) is obtained in speech recognition, and "laugh" (likelihood value: 0.3) is obtained in image recognition, both the likelihood values are added, and control is performed not to determine "laugh" because one of the likelihood values is small.

Alternatively, if a plurality of candidates are competitive, they may be combined and used in the subsequent processing. In addition, the time relationship between the emotional words can be further understood by using keyword candidate series analysis of an interactive speech system TOSBURG (Takebayashi, Journal of the Electronics, Information, and Communication Engineers of Japan D-11, Vol. J77-D-11, No. 8, pp. 1,417–1,428).

In the above embodiment, the linguistic contents of input speech are understood, and the intention, emotions, and status of the user can be understood, thereby realizing a more appropriate interactive operation.

The intention, emotions, and status of the user obtained in the emotion understanding unit take the following expression form.

Emotional Speech Expression (emotion and status classification: anger) (likelihood value: 0.9)

(emotion extraction means: non-linguistic speech)

In this case, the emotion and status classification also includes classes such as laugh, boredom, and agreement in addition to anger. The likelihood value falls within the range of 0.1 to 1.0. The emotion extraction means includes linguistic speech, a key input, a pen input, and the like in addition to the non-linguistic speech. A normal utterance semantic expression can be extracted from the same speech input as described in the reference or the like of Takebayashi. The present invention is characterized in parallel processing of both the linguistic speech and non-linguistic speech, i.e., multi-modal processing. The emotion information extraction means can also be performed by an existing method such as expression understanding based on image media or status understanding based on moving picture processing. These processing methods can be integrated to improve reliability.

Processing of this embodiment is stable, robust processing based on spotting, effective to free talking, and useful in a friendly, accessible multi-modal interface.

An example of the demand reception unit for using other media in addition to speech will be described below.

Studies on expression recognition of "smile detector" are available for recognition and understanding of emotions. This is to analyze the still image of a face to understand the expression. A variety of studies have been made. When an interactive system is assumed, recognition of emotions from the speech input has a higher reliability than recognition of a change in expression with silence. When non-linguistic speech such as "eh!", "oh!", "yes", and "eh?" representing "agreement", "surprise", "affirmation", and "interrogation" is uttered, a lot of pieces of information about intentional emotions of the user can be obtained, thereby increasing the reliability. At this time, the expression is synchronized with the time axis to further increase the reliability.

When word recognition, continuous speech recognition, and expression recognition are used together, emotion recognition using speech and an image can be advantageously simultaneously performed in addition to an increase in speech recognition ratio in use of speech recognition and the shape of lips.

Emotional word speech and emotional non-linguistic speech are subjected to spotting processing and can be easily integrated with visual medium processing.

Detection of a laugh, detection of an anger, detection of a "plus" (positive) emotion, a "minus" (negative) emotion, and sleepiness can be coped with the state-of-the-art techniques. An integrating portion between the detection and the techniques is important. More specifically, when a speech recognition result matches an image recognition result, which is then determined as "sleepiness" or "laugh", interactive operation processing can be performed to improve the reliability in accordance with the results of a plurality of multimedia processes. Therefore, a response can be decisively generated.

Figure 111:
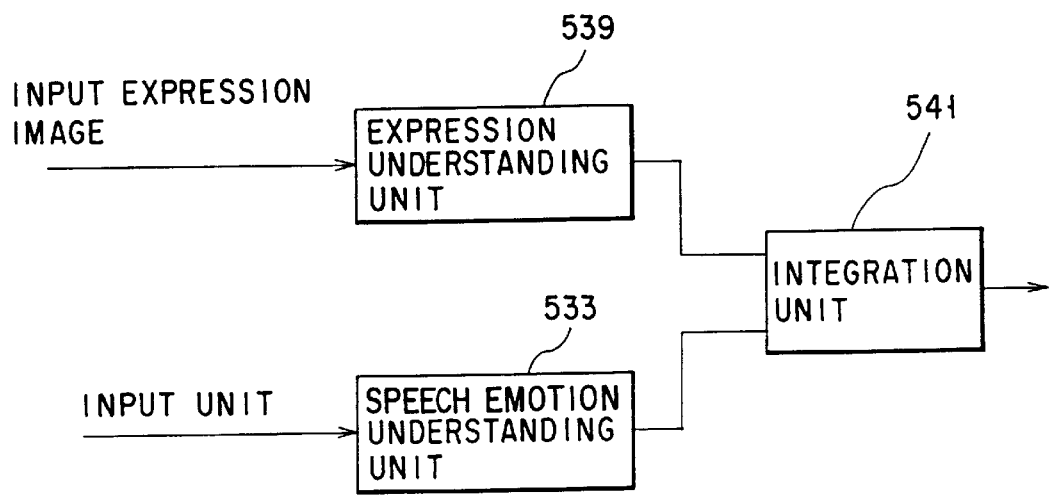
FIG. 111 is a view showing the arrangement of the main part of another speech demand reception unit according to the fifth embodiment.

FIG. 111 shows an example of the arrangement of main part of another demand reception unit of this embodiment. In addition to the speech emotion understanding unit 533, this demand reception unit comprises an expression understanding unit 539 for understanding a user's expression from an input expression image and an integration unit 541 for checking matching or contradiction between the outputs from the units 533 and 539.

Figure 112A:
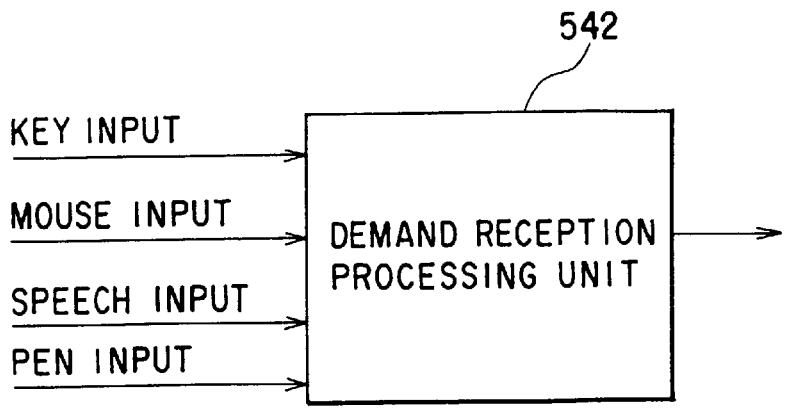
FIGS. 112A through 112C show views of examples of multi-modal interfaces using speech inputs together with keyboards and mouses.
Figure 112B:
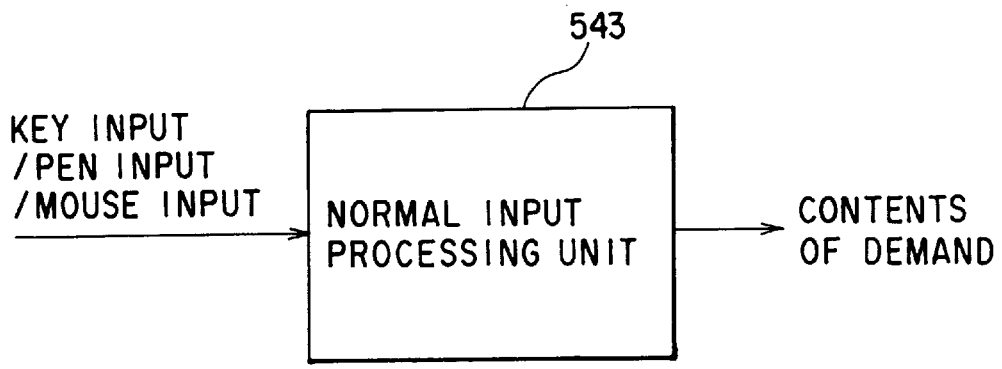
Figure 112C:
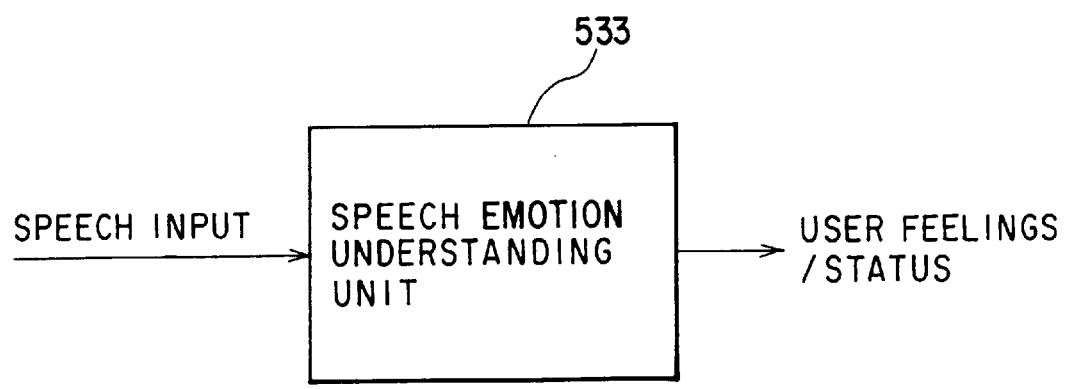

FIGS. 112A through 112C show examples of a multi-modal interface 542 using a speech input together with a keyboard, a mouse, and a pen.

Data are input separated as follows:

(a) keyboard, mouse, pen: conventional input (see FIG. 112B), and (b) speech: emotion and intention information input (see FIG. 112C).

Feelings can be understood by the previous method. More specifically, logical or purpose-achieving inputs are mainly made with the keyboard or pen. A natural language interface performs morphemic analysis, syntactic analysis, and semantic analysis, or performs processing in accordance with command inputs. Simultaneous speech medium input is utilized to input additional, auxiliary, or human information, thereby realizing both emotional word speech detection and emotional non-linguistic speech detection.

The user emotion analysis and the demand intention analysis (step S403) in FIG. 90 can be plausibly and efficiently realized by the above method.

The above processing may be performed in the response plan formation unit.

It is also effective to simultaneously generate non-linguistic emotional speech.

For example, in the above embodiment, when a linguistic information input and a non-linguistic speech information input are as follows, the following natural, comfortable interactive operations with a computer can be performed.

(a) Linguistic information input: document formation with a wordprocessor (keyboard input)

Non-linguistic speech information input:

"ah . . . ah!" . . . detection of boredom or fatigue

In this case, background music is used to relax or refresh the user, or news desired by the user are presented, thereby understanding the emotions or status in accordance with non-linguistic speech information. Emotional speech understanding is effective.

(b) Linguistic information input: retrieval of emotions with a mouse

Non-linguistic speech information input: "h'm!", "well?", "interest", "agreement"

In this case, a high degree of interest is detected, and retrieval processing is performed to interest the user. This retrieval can be realized for the first time in accordance with emotional speech understanding.

(c) Linguistic information input: a mail is read with a keyboard input/mouse input or read with speech.

Non-linguistic speech information input: "eh?", "what?", "unbelievable!", "anger", "antipathy", "hate"

In this case, the negative state, "minus" state, or anger of the user is detected to present an expression which comforts the user, or music which relaxes the user is used to achieve a change. In particular, a user may erroneously have a bad impression against a sender in a mail. A message representing a good expression of a sender of the mail or a speech message of a joyful voice is output to stabilize the emotions of the user.

Except for the above examples, linguistic information or an instruction command is input with a keyboard, speech, a mouse, or a pen, and at the same time, non-linguistic information is sent from the user to the computer through speech, thereby understanding the emotions and status, and hence achieving smooth communication.

As described above, according to the present invention, in a multimedia system, based on linguistic information, non-linguistic information, and parallel processing between the intentional information and the unintentional information of the user, all of which are important factors, and particularly, utilizing the parallel characteristics of the speech media, a comfortable, natural, and warm interactive operation with the computer is realized as a user-centered multi-modal interface. In particular, inputs of linguistic information and instruction information with a keyboard, a mouse, a pen, or speech inputs, and understanding of the intention, emotions, and status of the user using the non-linguistic information centered on speech can greatly improve satisfaction and comfort of the user.

The present invention is to realize a multi-modal information input/output system capable of achieving humanistic communication, thus providing a great effect to the human society.

(4) (Sixth Embodiment)

The sixth embodiment will be described below.

Figure 113:
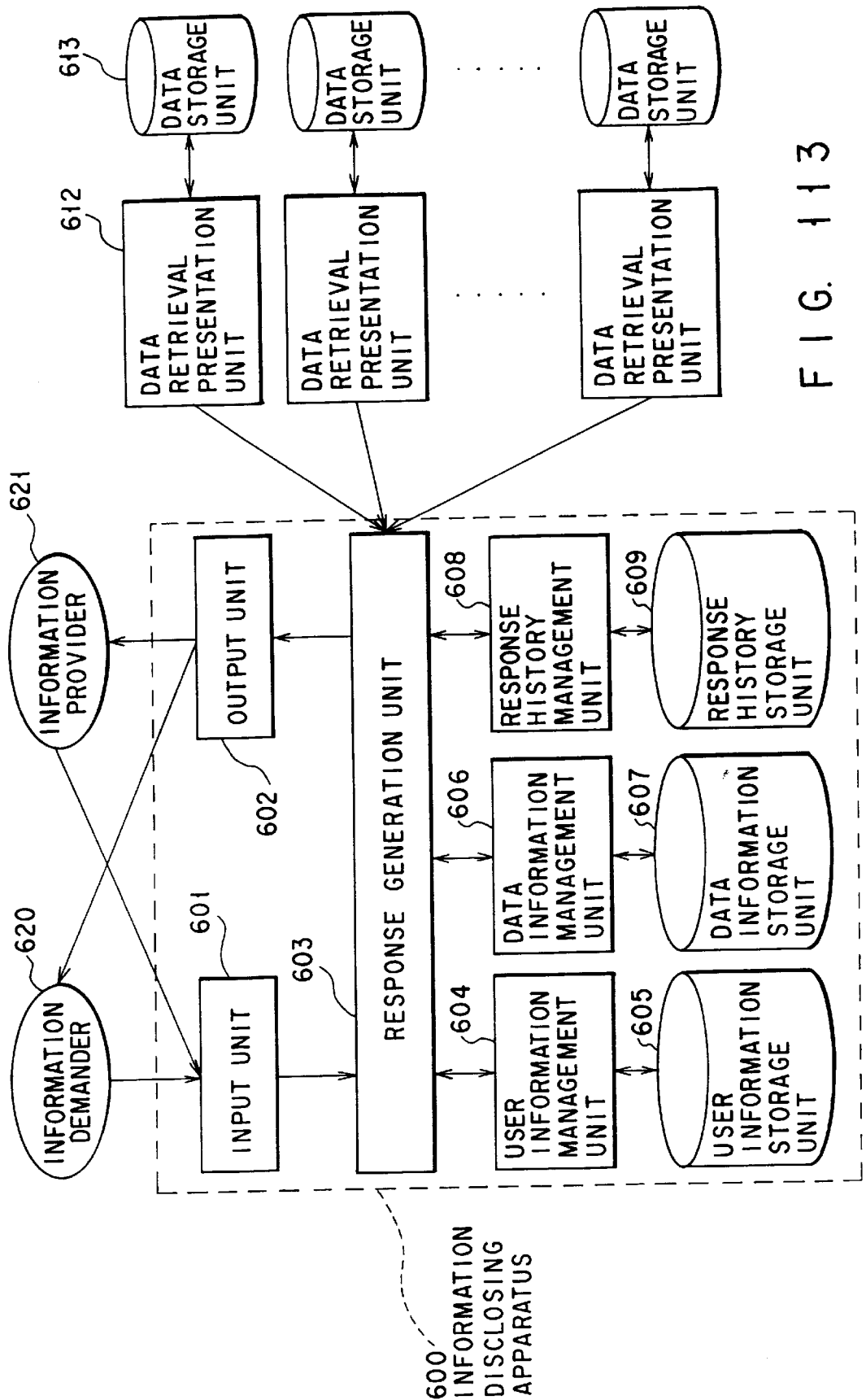
FIG. 113 is a view showing the arrangement of an information disclosing apparatus according to the sixth embodiment.

FIG. 113 shows the arrangement of an information disclosing apparatus of this embodiment.

Data representing a variety of forms and contents owned by an information provider are stored in a plurality of data storage units 613. A data retrieval presentation unit 612 is arranged in correspondence with each data storage unit 613 and is used to retrieve and present data stored in the corresponding data storage unit 613.

The information disclosing apparatus selects one or the plurality of data retrieval presentation units 612 and retrieves and presents the data stored in the corresponding data storage unit 613.

This information disclosing apparatus 600 comprises an input unit 601, an output unit 601, a response generation unit 603, a user information management unit 604, a user information storage unit 605, a data information management unit 606, a data information storage unit 607, a response history management unit 608, and a response history storage unit 609.

The input unit 601 receives inputs from the information demander and the information provider.

The output unit 602 outputs responses to the information demander and the information provider.

The response generation unit 603 interprets demands from the information demander and the information provider, selects an appropriate one of the plurality of data retrieval presentation units 612, and retrieves and presents appropriate data from the corresponding data storage unit 613. The response generation unit 603 generates responses to the information demander and the information provider as needed and processes data to output responses to the information demander and the information provider using the output unit 602. Pieces of information used in the response generation unit 603 are user information associated with the information demander and the information provider and data information associated with data to be presented. The user information and the data information are respectively stored in the user information storage unit 605 and the data information storage unit 607.

The user information management unit 604 retrieves, generates, and corrects information stored in the user information storage unit 605.

The data information management unit 606 retrieves, generates, and corrects information stored in the data information storage unit 607.

The response history storage unit 609 stores response history information representing an interactive operation history between the information demander, the information provider, and the information disclosing apparatus.

The response history management unit 608 performs management such as management of the start and end of storage of the response history information, look-up of the past history, and deletion.

FIG. 114 shows an example of the structure of semantic categories for a variety of data stored in the data information storage unit 607. Referring to FIG. 114, the individual categories such as "writings" (21 in FIG. 114), "organization" (22 in FIG. 114), "conference" (23 in FIG. 114) constitute a lattice-like hierarchical structure in accordance with an abstract-concrete relationship (solid line in FIG. 114). Left categories are higher abstract categories, and right categories are lower concrete categories. The respective concrete data are classified to belong to one or a plurality of semantic categories (dotted lines). More specifically, information associated with semantic classification of a variety of data is described in data information. For example, "data information 2" (24 in FIG. 114) is defined to belong to a semantic category "minutes" (25 in FIG. 114) and a semantic category "section" (26 in FIG. 114).

FIGS. 115A through 115C are views showing the contents of the respective semantic categories in the semantic category structure shown in FIG. 114. For example, a "general" category is described as a higher category in a semantic category "writings" 31 in FIG. 115A. Semantic categories, i.e., "paper", "patent", and "report" are described as "lower categories" in the semantic category in FIG. 115A. A plurality of words representing the semantic category "synonyms" are described in an item "synonyms". For example, words such as "document", "reference document", and "reference" are described in the item "synonyms" of the semantic category "writings" 31 in addition to the word "writings". On the basis of these words, the response generation unit 603 identifies the semantic category of the data demanded by the information demander. Inherent attribute items can be set in each semantic category. Attributes representing data of writings "title", "writer", and "date of writing" are set as common attributes in the semantic category "writings" 31. These attributes are succeeded in accordance with the higher-lower semantic categorical relationship. For example, since a semantic category "minutes" 33 shown in FIG. 115C is a lower category than the semantic categories "writings" 31 in FIG. 115A and "conference" 32 in FIG. 115B. The attributes of the semantic categories 31 and 32 are succeeded, so that the semantic category has six attributes "title", "Writer or drafting", "date of writing or drafting", "agenda", "participant", and "date of conference".

FIG. 116 shows an example of the structure of form categories as categories about the forms of a variety of data stored in the data information storage unit 607. Referring to FIG. 116, form categories such as "text" (41 in FIG. 116), "still image" (42 in FIG. 116), and "PS file" (43 in FIG. 116) have a lattice-like hierarchical categorical structure. Left categories are higher abstract categories, and right categories are lower concrete categories. The respective concrete data are classified into one form category (dotted lines in FIG. 116). That is, in addition to information about the semantic classification, the information about data form classification is described in data information. For example, "data information 1" in FIG. 44 is defined to belong to the form category "PS file" 43.

FIGS. 117A through 117C are views showing the contents of the respective form categories in the structure of the form categories shown in FIG. 116. For example, a form category "text" 51 shown in FIG. 117A has a "general category" as its "higher category" and the form category "PS file" as its "lower category". A retrieval means inherent in the data form to retrieve the data is described in an item "retrieval means". A simpler retrieval means is a file system. In addition to such a retrieval means, for example, a database system retrieval means can be set for this item. A presenting means inherent in the data form to present the retrieved data is set in the next item "presenting means". For example, a form category "PS file" 52 shown in FIG. 117B is designated to use an application program called "gs (Ghostscript)" as the presenting means.

Figure 118:
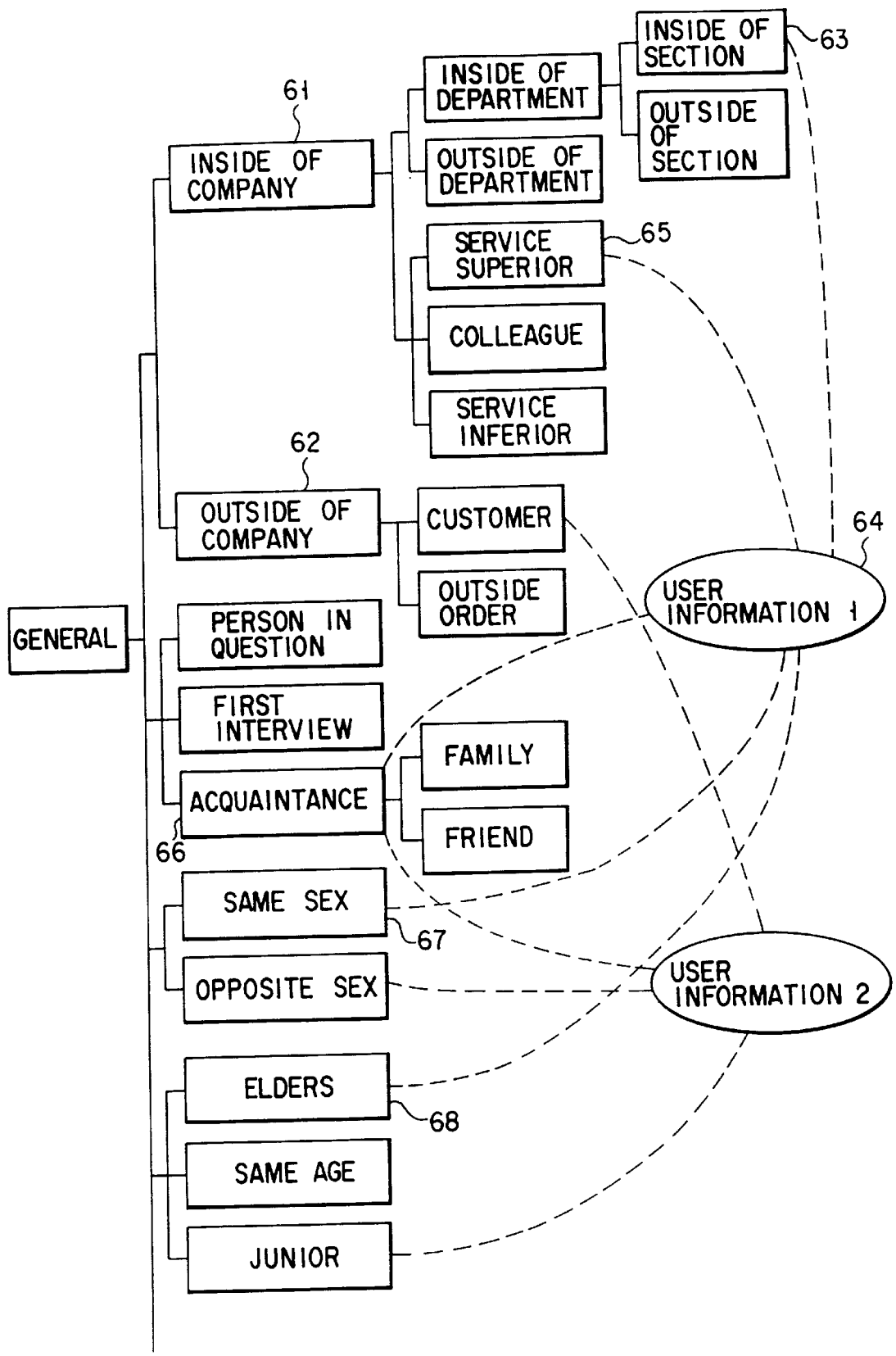
FIG. 118 is a view showing an example of the structure of person's categories stored in a user information storage means.

An example of the structure of a person's category as a category about the individual persons and personal relationship between the information demander and the information provider, which is stored in the user information storage unit 605, is shown in FIG. 118. Referring to FIG. 118, the respective person's categories such as "inside of company" (61 in FIG. 118), "outside of company" (62 in FIG. 118), and "the inside of section" (63 in FIG. 118) have a tree-like hierarchical structure in accordance with the semantic abstract-concrete relationship (solid lines in FIG. 118). Left categories are higher abstract categories, and right categories are lower detailed concrete categories. The respective pieces of concrete user information are classified to belong to one or a plurality of semantic categories (dotted lines in FIG. 118). More specifically, information associated with the classification of persons as users is described in user information. For example, "user information 1" (64 in FIG. 118) belongs to person's categories, i.e., "the inside of section" (63 in FIG. 118), "service superior" (65 in FIG. 118), "acquaintance" (66 in FIG. 118), "opposite sex" (67 in FIG. 118), and "elders" (68 in FIG. 118).

FIGS. 119A through 119C show views showing the contents of the person's categories in the person's categorical structure. A person's category "the inside of company" 72 shown in FIG. 119B has a "general" category as its "higher category" and person's categories "colleagues", "service inferior", "the inside of department", and "the outside of department" as the "lower categories". Inherent attribute items are set for the respective person's categories. For example, attributes "name", "address", "sex", "date of birth", "section or department to which the user belongs", "rank", "employee number", and "extension" of the user are set as common attributes of a person's category "the inside of company" 72. These attributes are succeeded in accordance with the higher-lower categorical relationship of the person's categories. For example, a person's category "service superior" 73 shown in FIG. 119C is a lower category of a person's category "the inside of company" 72 and has the eight attributes described above. To the contrary, a person's category "first interview" 71 shown in FIG. 119A has only basic attributes such as "name" and "address". Default values of the right for a variety of data of users belonging to a person's category and a degree of familiarity are described in the person's category in units of semantic categories. For example, from the viewpoint that data should not be provided to an information demander for the first interview, the defaults "right" of all the semantic categories are set to zero. Similarly, from the viewpoint that an information demander who has the first interview with the agent is regarded not to be familiar to all data, the "degree of familiarity" is set to zero for all the semantic categories. However, in the person's category "the inside of company" 72, a value of 0.5 larger than zero is set for the semantic category "company" of the data. A larger value of 0.6 is set for the semantic category "company" in the person's category "service superior" 72.

The two parameters as "right" and "degree of familiarity" for data, and two parameters as "confidentiality" and "degree of difficulty" for the user are expressed as continuous values normalized using a minimum value of 0 and a maximum value of 1. However, these parameters need not be limited to these values, but may be discrete values.

FIGS. 120A, 120B, 121A and 121B are views showing some of the respective data stored in the data information storage unit 607. Data information includes information representing semantic and form categories to which each of a variety of data stored in the data storage unit 613 belongs, information associated with the confidentiality and the degree of difficulty of the data, and other additional information. For example, data information (81) represented by the name of data "aoki/reports/meeting/mr_94_11_1.ps" in FIG. 120A describes that the data belongs to "minutes", "section", and "CAD" as "semantic categories" and "text" as the "form category". The "confidentiality" of the data is 0.5, and the "degree of difficulty" is 0.1. The parameter "confidentiality" is a parameter corresponding to the parameter "right" to the data in the user. In this example, this data is presented to only a user having the "right" of 0.5 or more. The parameter "degree of difficulty" is a parameter corresponding to the parameter "degree of familiarity" of the user to the data. In this case, the gear data can be understood when presented to a user having the "degree of familiarity" of 0.1 or more, but cannot be understood when presented to a user having the "degree of familiarity" of less than 0.1. In addition to these pieces of information, attribute information inherent to a semantic category to which data belongs is described as attachment information of this data. "System development department, regular meeting minutes (1)" is set as the "title" and "Ichiro Aoki" as the "drafter" in the data information (81).

FIGS. 122A, 122B, 123A and 123B are views showing some of the respective data stored in the user information storage unit 605. Information representing a person's category to which a user belongs for the information demander and the information provider, information representing the degrees of right and familiarity of the respective semantic categorical data of this user, and other attached information of this user are described in the user information. For example, the "person's category" is set as "person in question" in user information (91) represented by the name "Ichiro Aoki" in FIG. 122A. For this reason, this user information represents the information of the information provider serving as the manager of the information disclosing apparatus. This user is the owner of the data belonging to the semantic categories "individual information" and "writings". In this user information, the right and degree of familiarity are set to maximum values of 1 for the semantic categories "individual information" and "writings". Since the person's category "person in question" is set, the values for the right and the degree of familiarity for the data belonging to the semantic categories "company", "schedule" and the like are set to be large values. In addition to the information of the right and the degree of familiarity in units of semantic categories of a variety of data, the user information has various attributes such as "address", "data of birth", and "section or department to which the user belongs". User information "Kyoko Yamada" in FIG. 122B has a "friendship" with "Ichiro Aoki" as the "person in question" in the person's category. This user information has larger values of the right and the degree of familiarity for the private data of the semantic category "individual information", i.e., "Ichiro Aoki". User information "Noboru Takeuchi" in FIG. 123A) belongs to the person's category "service superior" and has larger values of the right and the degree of familiarity for the semantic category "company" than those for the person in question, i.e., "Ichiro Aoki". To the contrary, user information "Goto?" in FIG. 123B is an acquaintance, but a person belonging to "another company". This user information has smaller values of the right and the degree of familiarity of the data belonging to each semantic category. In addition, attribute values such as "address" are unknown.

Figure 124:
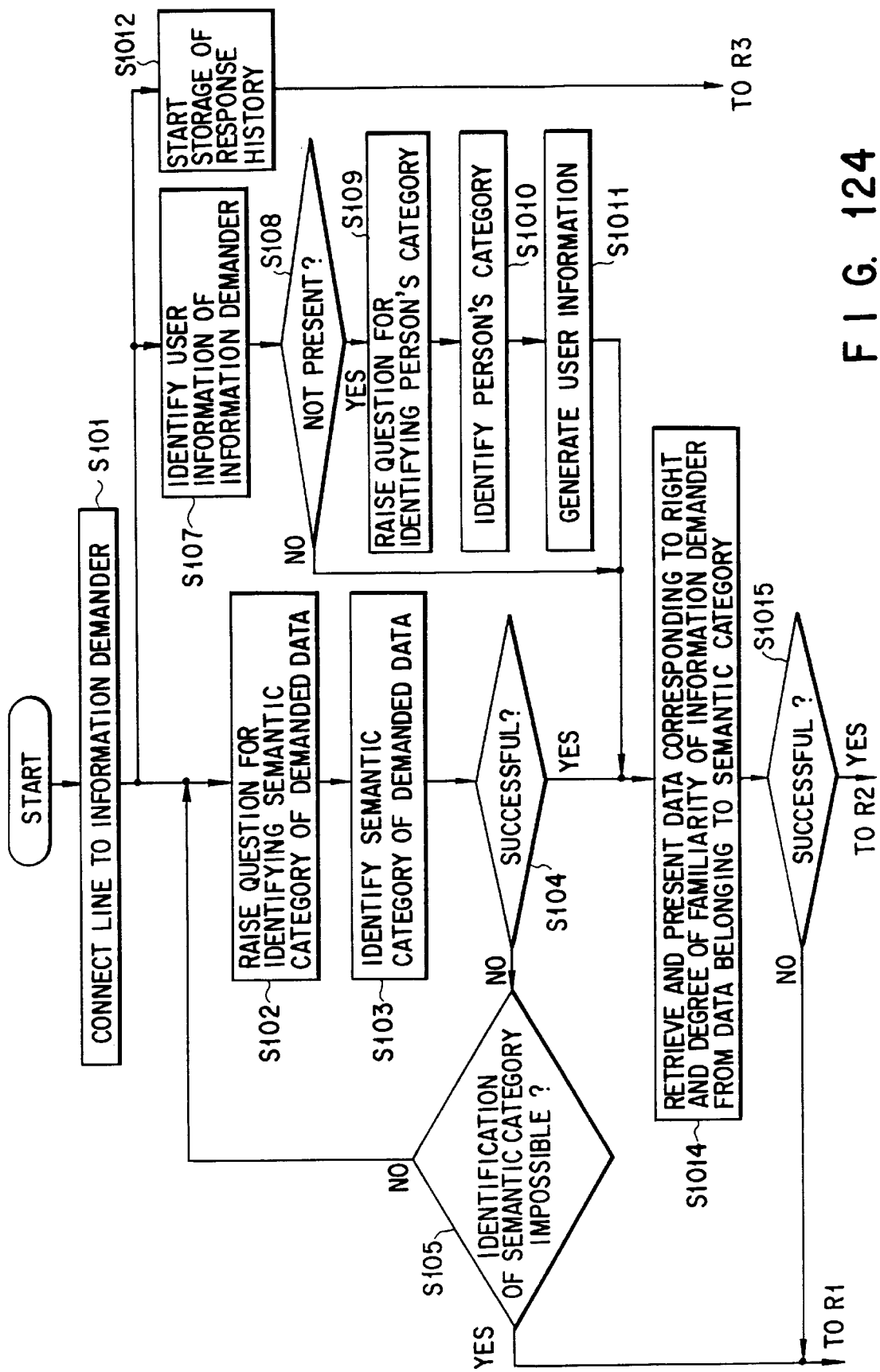

FIGS. 124 and 125 show a processing flow of information disclosure performed by the information disclosing apparatus. The information disclosing apparatus is connected to the information demander (step S101), identifies the semantic category of data demanded (from step S102), identifies user information representing the information demander (from step S107), and starts storage of a response history (from step S1012).

In this embodiment, these operations are performed in the data information management unit 606, the user information management unit 605, and the response history management unit 608. The present invention is not limited to this method. For example, user information may be selec ted first, and then the semantic category may be identified.

The data information management unit 606 raises a question to identify the semantic category of a demanded data, if needed (step S102) and identifies one of a plurality of semantic categories in accordance with the abstract-concrete hierarchical structure and synonyms described in each semantic category (step S103). If this processing is unsuccessful (step S104), a question is raised to identify a semantic category again. If identification is impossible (step S105), for example, if identification is unsuccessful the designated number of times, processing for causing the information provider to directly participate is started (step S106).

On the other hand, in user information identification processing (step S107) in the user information management unit 604, if user information of the connected information demander is present (step S108), a question is raised to identify the person's category of the information demander (step S109) to identify one or a plurality of person's categories (step S1010), thereby newly forming user information belonging to this person's category (step S1011). To form user information of an unknown information demander, a user belonging to the person's category "first interview" is basically formed. If the user is found to belong to other person's categories such as "the inside of company" and "the outside of company" in accordance with the subsequent questions, the user is also caused to belong to these person's categories. In this case, the right and the degree of familiarity to the respective semantic categories in the user information are set to be small values complying with the default values set for the person's category "first interview". When user information belongs to a plurality of person's categories, a minimum value of the default values set for the respective person's categories is set for the right, and a maximum value thereof is set for the degree of familiarity.

The response history management unit 608 stores a response history from the start of connection (step S101) with the information demander to the end of connection (step S1017) between the information demander and the information disclosing apparatus, and between these two parities and the information provider if the information provider has participated in communication with the information demander (steps S1012 and S1013).

When identification of the user information of the information demander or formation of new user information, and identification of the semantic category of the data demanded by the information demander are successful, the information disclosing apparatus selects data information from the data information belonging to the determined semantic category in accordance with the values of the right and the degree of familiarity for the determined category of the information demander in such a manner that the selected data have values of the confidentiality and the degree of difficulty which do not exceed the values of the right and the degree of familiarity. The information disclosing apparatus retrieves and presents a data body represented by this data information (step S1014). In this case, when the right and the degree of familiarity for the corresponding semantic category are not described in the user information, the higher categories of this semantic category are recursively traced to retrieve the semantic category described in the user information, and the right and degree of familiarity of the retrieved category are defined as the right and the degree of familiarity of the lower semantic category. If a plurality of semantic categories are identified in step S103, or a plurality of upper semantic categories are retrieved during tracing the upper categories, the minimum values of the right and the degree of familiarity described in the user information for these plurality of semantic categories are defined as the right and the degree of familiarity of the information demander. The data retrieval presentation unit 612 described in the form category to which the data information of this data belongs is used in data retrieval and presentation. If the data retrieval and presentation are unsuccessful (step S1015), processing for causing the information provider to directly participate is started (step S106). However, if the data retrieval and presentation are successful, a question is raised to determine whether the information demander is satisfied with the presented data. If so (step S1016), connection with the information demander is ended (step S1017).

If the information demander is dissatisfied with the presented data, or if a response representing that the presented data is not suitable for the right of the information demander (step S1018), processing for causing the information provider to directly participate is started (step S106). The data presented from the information disclosing apparatus to the information demander in steps S1014 and S1020 have smaller values of the right and the confidentiality than those described in the user information. Even if the information demander is dissatisfied with the presented data, more confidential data cannot be presented. Therefore, the information provider must directly participate in the communication with the information demander.

On the other hand, when the response representing that the presented data is not suitable for the degree of familiarity of the information demander is sent back from the information demander (step S1019), data information having a different degree of familiarity is selected from the data information belonging to the identified semantic category, and information represented by the selected data information is retrieved and presented (step S1020). More specifically, when the information demander responds that the presented data is too difficult, data having a lower degree of difficulty is retrieved. When the information demander responds that the presented data is too easy, data having a higher degree of difficulty is retrieved. If this processing is successful (step S1021), the flow returns to step S1016 again. If the retrieval has failed, i.e., if no data having a different degree of difficulty to be presented is available, processing for causing the information provider to directly participate (step S106) is started.

If participation of the information is requested and is possible in step S106, the information provider retrieves and presents data (step S1022). In this case, since the past response history between the information demander and the information disclosing apparatus has been stored, the information provider looks up this response history, retrieves necessary data, and presents it. In step S1022, the data retrieval and presentation operations performed by the information provider himself/herself are also stored as a response history. After the data is presented by the information provider himself/herself, the flow returns to step S1016 to check if the information demander is satisfied.

When the information demander is finally satisfied, or participation of the information provider is impossible, connection with the information demander is ended (step S1017), and at the same time, processing for storing the response history is ended (step S1013).

During processing of the above information disclosure, the dissatisfaction raised by the information demander may be caused by deficiencies of user information and data information owned by the information disclosing apparatus. Post-processing is performed to correct this upon completion of the end of connection (step S1023).

Figure 126:
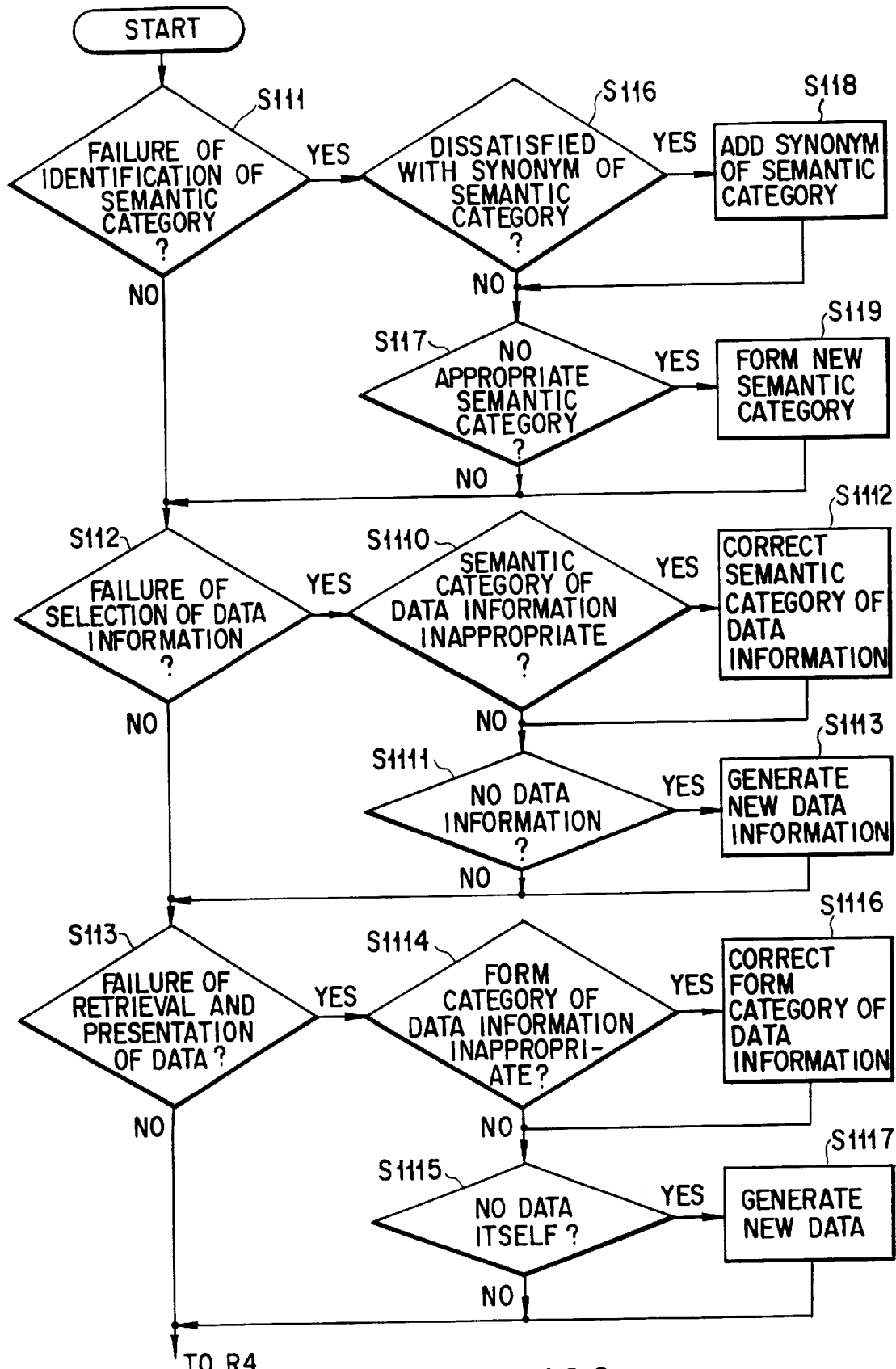

FIGS. 126 and 127 are flow charts showing this processing flow.

In processing of FIGS. 126 and 127, the information disclosing apparatus identifies the deficiencies of the respective pieces of information on the basis of the response history information stored in the response history storage unit 609 and proposes a correction plan to the information provider. Causes of failures that data cannot satisfy the information provider are classified into a cause in which identification of a semantic category has failed (step S111), a cause in which selection of data information belonging to the identified semantic category has failed (step S112), a cause in which retrieval and presentation of the data body represented by the selected data information has failed (step S113), a cause in which the presented data is not suitable for the right of the information demander (step S114), and a cause in which the presented data is not suitable for the degree of familiarity of the information demander (step S115). These causes can be further classified in the following description. This cause identification processing is basically, automatically performed on the basis of the response history information stored in the response history storage unit 609. If identification is impossible, identification is performed by an interactive operation with the information provider.

In step S111, when the semantic category cannot be identified, the following two cases are assumed. Although an appropriate semantic category is present, its synonym has a deficiency (step S116). An appropriate semantic category itself is not present (step S117). In step S116, the information provider is caused to add the corresponding semantic category (step S118). In general, since a word for expressing data to be demanded is included in the demand uttered by the information demander in the response history, the information demander extracts such a word and sets it as a synonym. In step S117, the information provider forms a new semantic category (step S119). In this case, the following proposal can be made. That is, the information disclosing apparatus presents a semantic category if this semantic category becomes a candidate during retrieval in the hierarchical structure of semantic categories although this semantic category is not identified. A new semantic category is formed as a lower category.

In step S112, when selection of data information has failed, the following two cases are assumed. Even if appropriate data information is present, its semantic category is inappropriate, thereby resulting the failure of selection of the data information from the identified semantic category (step S1110). Data information itself is not present (step S1111). In step S1110, the information provider sets data information of the data to be presented so as to belong to an appropriate semantic category (step S1112). In step S1111, the information provider forms new data information of the data to be presented (step S1113). More specifically, during processing in FIGS. 124 and 125, when the information provider directly presents the data to the information demander, the data information of the corresponding data is searched using its name of data as a key because the name of the data presented is accumulated as the response history information. If the data information is present, the identified semantic category or the semantic category formed in step S119 is set as the semantic category for this data information (step S1112). If no data information is present, data information for the data presented is formed (step S1113).

When the data itself cannot be retrieved or presented in step S113, the following two cases are assumed. The data information of the corresponding data has no appropriate form category, and the data retrieval presentation unit 612 designated by this inappropriate form category cannot perform retrieval and presentation (step S1114). The data itself is not present (step S1115). In step S1114, the information provider must correct the form category of the deficient data information. In this case, the form category set for this data information is reset for another form category, or a new form category is formed and set for the form category of this data information. In either case, a means capable of retrieving and presenting this data is finally set (step S116). In step S1115, for example, the data itself is not present from the beginning, the name and storage location of the data are changed, or data itself is deleted. In this case, a countermeasure depends on the information provider. If the data is necessary, it must be newly formed (step S1117).

In step S114, when the presented data is not suitable for the right of the information demander, i.e., if data having a lower confidentiality is presented as compared with the right of the information demander, and dissatisfaction is raised from the information demander, the following two causes are assumed. The confidentiality set for the data information for this data is inappropriately high (step S1118). The right of the semantic category of this data set in the user information of the information demander is inappropriately low (step S1119). One of the causes is selected by the information demander. In the case corresponding to step S1118, the confidentiality of the data information is corrected (step S1120). The data confidentiality dynamically changes over time. For example, data having a high confidentiality in the past may become data having a low confidentiality. Processing in step S112 copes with a time change in confidentiality. In the case corresponding to step S1119, the information demander corrects the right for the semantic category of the user information of the information demander (step S1121). The right of the information demander also dynamically changes over time. Processing in step S1121 is to correct the right of the information demander to an appropriate value.

In step S115, when the presented data is not suitable for the degree of information demander, i.e., when only data having a lower or higher degree of difficulty as compared with the degree of familiarity of the information demander is presented, and dissatisfaction is raised from the information demander, the following two causes are assumed. The degree of difficulty set for the data information for this data is inappropriate (step S1122). The degree of familiarity for the semantic category of this data set in the user information of the information demander is inappropriately low (step S1123). One of these causes is selected by the information demander. In the case corresponding to step S1122, the degree of difficulty of this data information is corrected (step S1124). In the case corresponding to step S1123, the degree of familiarity for this semantic category of the user information of the information demander is corrected (step S1125).

In the above processing, processing for identifying dissatisfaction raised by the information demander is performed by an interactive operation between the information disclosing apparatus and the information provider. As a method for this, a possible cause can be presented to cause the information provider to select, or a question for narrowing the cause can be raised. In this embodiment, its effective method will be described below, but the present invention does not limit its method. In forming and correcting the data information and the user information, the information disclosing apparatus presents information required for formation and correction and its template and prompts the information provider to form and correct the information. The present invention does not limit a method for the form of a visual interface, although its effective method will be described below in this embodiment.

In the above description, the user information is used to describe the right and degree of familiarity for a variety of data of the information demander. As a method of actively using this user information, user information itself may be presented in accordance with the demand from the information demander. As shown in FIGS. 122A, 122B, 123A and 123B, information representing a specific person's category to which a specific user belongs, and additional information such as "address" and "section or department to which the user belongs". For example, in response to a question "What is the address of Ms. Yamada?", user information corresponding to "Ms. Yamada" can be selected to present data of its "address". To utilize user information itself as presentation data, the method of describing person's categories and user information is partially modified. That is, the hierarchy of person's categories is constituted as part of the hierarchy of semantic categories of the data, and at least confidentiality is set for each user data as in data information. The degree of difficulty can be usefully set, as needed. The hierarchy of person's categories is constituted as part of the hierarchy of semantic categories, and synonyms are set in units of person's categories, as needed. In processing as in the processing described with reference to FIGS. 124 and 125, the person's category (i.e., a semantic category) of user information demanded by the information demander is identified, and user information belonging to the identified person's category can be selected. Since the confidentiality is set in user information, presentation of the user information can be suppressed in accordance with the right of the information demander.

As an advanced utilization method of user information, for example, the information disclosing apparatus can provide information "this person is familiar to this category information" or information "this person has the right to present this information" to the information demander. That is, the right and the degree of familiarity are set in units of semantic categories of the data for a large number of persons including the information provider himself/herself in each user information. For example, when the information provider himself/herself is required to present data belonging to a semantic category having a low degree of familiarity, the name of person is retrieved and presented from a user information group for a user having a high degree of familiarity. When data presentation is required to the information provider who does not have the right to present this data, user information of a user having a higher right such as the owner of this data can be retrieved and presented. However, such user information should not be presented to an information demander who does not have such a right. Processing for introducing experts is performed in accordance with the right for the user information of the information demander.

A processing flow shown in FIGS. 126 and 127 will be described with reference to an interactive operation between the information disclosing apparatus and the information demander as well as an interactive operation between these two parties and the information provider.

The following interactive operation is an interactive operation when an information provider (Takebayashi) represented by data information (1201) in FIG. 128 is connected to an information disclosing apparatus (disclosure) of an information provider (Aoki) represented by the data information (91) in FIG. 122A. A method of practicing the present invention will be described with reference to this interactive operation.

FIG. 129 shows an example of an interactive operation between the information disclosing apparatus, the information demander, and the information provider in the information disclosing apparatus.

First, the demander (Takahashi) inputs information required by the demander (Takahashi) to the information disclosing apparatus, using a sentence (message 2003) saying "I would like to ask for references used in the meeting of your theme last month." The information disclosing apparatus understands information data associated with the semantic category "conference" in the information data recording apparatus. This information data has the attribute "date" as "November, 1994" and the attribute "participant" as a person having his own theme. This information data is also associated with the semantic category "writings". This semantic structure can be understood from the natural language input sentence in accordance with the technique of Takebayashi's paper (Journal of the Electronics, Information, and Communication Engineers of Japan D-11, Vol. J77-D-11, No. 8, pp. 1,417–1,428). In the structure of the semantic categories in FIG. 114, since the category "minutes" 25 is present as a category associated with the category "conference" 25 and the category "writings" 21, the categories as retrieval targets are further divided in response to a question (message 2004) to the demander (Takahashi) as "Minutes?". When the demander inputs "Yes" (message 2005), the retrieval target is limited to only data associated with the category "minutes" (steps S102 to S105). A retrieved data group is shown in FIGS. 120A, 120B, 121A and 121B. As shown in FIGS. 120A, 120B, 121A and 121B, since there are a plurality of data belonging to the category "minutes", the disclosing apparatus asks the demander a question "Which conference?" (message 2006), thereby further dividing the retrieval target. By interpreting an input (message 2007) entered by the demander (Takahashi), data of the "minutes" associated with the word "patent" are retrieved. Of the data group in FIGS. 120A, 120B, 121A and 121B, data 83 using the word "Patent" as the attribute "agenda" is specified by the information disclosing apparatus. The confidentiality of the data 83 is 0.7, and the right of the demander (Takahashi) stored in the user information storage unit 605 is 0.5. Therefore, the information disclosing apparatus determines not to present the data 83 to the demander (Takahashi). The disclosing apparatus sends a message saying that no data information satisfying the demand of the demander (Takahashi) is present (message 2008, steps S1014 and S1015). When the demander (Takahashi) who could not obtain the demanded data demands to disclose the entire minutes (message 2009), the disclosing apparatus recognizes that the demander (Takahashi) is not satisfied with the information presented immediately previously (step S1018). In accordance with the demand, the disclosing apparatus presents all possible disclosure candidates of the minutes to the demander (Takahashi) (message 2010). FIG. 130 shows an example of a method of disclosing this data. However, the right of the demander (Takahashi) is compared with the confidentiality of the data, and data which should not be presented to the demander are not presented. The data 83 is not present in the presented data group. Since the demander (Takahashi) cannot obtain the demanded data of the minutes, the demander further demands to present other data (message 2011). The retrieval range is already specified, and all the data belonging to the categories demanded by the demander are presented. Under these conditions, the demander demands other data within the same retrieval range, and the information disclosing apparatus recognizes that the demander is dissatisfied with the presented data (step S1016). The information disclosing apparatus sends a check message to confirm whether the provider (Aoki) participates in this interactive operation. FIGS. 131A and 131B illustrate an example of this check message. The provider (Aoki) can see the contents of the demander (Takahashi), the contents of the demand, and the contents of data presented by the information disclosing apparatus in accordance with the check message. The provider (Aoki) who grasped the status of the previous interactive operations in accordance with the check message can designate the disclosing apparatus to present the data demanded by the demander (Takahashi) or can directly perform an interactive operation with the demander (Takahashi) in place of the information disclosing apparatus. In an example of FIGS. 131A and 131B, as shown in FIG. 131A), the outline (1501 in FIG. 131A) which is the point in question between the information disclosing apparatus and the demander is presented to the information provider to allow the provider to select whether the provider participates in the interactive operation with the demander. Alternatively, by operating a button indicated by 1502 in FIG. 131A, a more interactive operation history (1503) can be displayed, as shown in FIG. 131B. In addition, the provider may not be present in front of the terminal, cannot participate in the interactive operation, or is very busy and cannot participate in the interactive operation (step S106). Examples of the interactive operations in these cases are shown in FIGS. 132 to 134. As described so far, the information disclosing apparatus did not present the data demanded by the demander (Takahashi) because the confidentiality of the data 83 (FIG. 121A) of the minutes demanded by the demander (Takahashi) is higher than the right of the demander described in the user information. Since the minutes reserved as the data 83 are associated with the patent, the confidentiality is set not to be disclosed to a user other than the theme of the provider. In this case, however, when the demander (Takahashi) demanded the presentation of minutes, the patent examined in the minutes was already proposed. Assume that the minutes are now disclosure enable minutes, and the setting of the confidentiality of the data was not coped with the change in status. FIG. 132 shows an example for causing the information provider (Aoki) to send an instruction to the disclosing apparatus without participating in the interactive operation or for performing an interactive operation for presenting information.

The information provider (Aoki) looks up the interactive operation history portion of the check message presented by the information disclosing apparatus and understands that the demander (Takahashi) is not satisfied because the data 83 is not presented. Since the provider (Aoki) understands that no problem is posed even if the data 83 is disclosed to the demander (Takahashi) due to a change in status. The provider designates the disclosing apparatus to present the data 83 to the demander (Takahashi). The disclosing apparatus presents the data 83 to the demander in accordance with the instruction from the provider and checks that the interactive operation is ended with the satisfaction of the demander (steps S1016 and S1017). At the same time, the disclosing apparatus also stores that the confidentiality of the data 83 presented by the instruction from the provider exceeds the right of the demander (Takahashi). FIG. 134 is an example in which the information provider (Aoki) participates in the interactive operation and presents information in place of the disclosing apparatus. FIG. 133 shows an example in which the information provider (Aoki) rejects to participate in the interactive operation or the provider cannot participate in the interactive operation because he is out.

In the cases in FIGS. 132 and 134, the information disclosing apparatus stores, in the response history storage unit 609, an operation selected upon reception of an interactive operation participation confirmation message by the provider, the input response message, and the message input by the demander (Takahashi).

In the examples of the interactive operations, a sequence for causing the information disclosing apparatus to perform interactive operations for updating data stored in the data information storage unit 609 and the user information storage unit 605 or forming new data on the basis of the response history stored in the response history storage unit 609 will be described in accordance with flow charts shown in FIGS. 126 and 127.

In either of the examples of FIGS. 132 and 134, the information disclosing apparatus is successful in specifying the semantic category demanded by the demander (steps S111 to S113), and the information disclosing apparatus presents existing data after participation of the provider, thereby satisfying the demand of the demander (Takahashi). The semantic category of the presented data 83 (FIG. 121A) satisfies the category identified by the disclosing apparatus. Therefore, the information disclosing apparatus assumes that the confidentiality or the degree of difficulty of the data 83 and the right and the degree of familiarity of the user information 1201 (FIG. 128) of the demander (Takahashi) are inappropriate. When the confidentiality of the presented data 83 is compared with the value of the right of the user information 1201, inappropriateness of setting of the confidentiality or right can be specified to cause the failure of presentation of the data by the information disclosing apparatus (step S114). For this reason, the information disclosing apparatus presents the user information 1201 of the demander (Takahashi) and the data information of the data 83 and proposes to correct at least one of the confidentiality and the right (steps S1118 to S1121). FIGS. 135A and 135B illustrate examples of a method of displaying this proposal. As indicated by 1901 in FIG. 135A, the outline of contradiction between the data information and the user information is presented to cause the provider to change one of the data information and the user information or not to change them. The provider changes one or both of the confidentiality and the right, or changes neither the data information nor the user information. For example, by operating a button indicated by 1902 in FIG. 135A, a window for correcting the user information is called, as indicated by 1903 in FIG. 135B. By operating a button indicated by 1904 in FIG. 135B, the detailed user information is displayed and can be corrected.

FIG. 136 shows another interactive operation between the information disclosing apparatus, the information demander, and the information provider in the information disclosing apparatus. The information provider and the information demander are identical to those in the example of FIG. 129.

In this example of the interactive operation, the information demander (Takahashi) inputs demand to the information disclosing apparatus using a sentence "I'm looking for books on knowledge processing programs." (message 2102). The information disclosing apparatus analyzes this sentence to understand that information demanded by the demander (Takahashi) is information data associated with a category "knowledge processing", and the category "books and magazines". The category "knowledge processing" is divided into two categories, i.e., a category "C++ language" and a category "Lisp language". The information disclosing apparatus asks the demander "Do you want books on Lisp?" (message 2103) to specify the retrieval target data. In accordance with a response (message 2104) from the demander (Takahashi), the retrieval target data can be identified as data associated with the categories "knowledge processing" and the category "C++ language" (steps S102 to S105). Examples of data retrieval of these categories are shown in FIGS. 137A, 137B, 138A and 138B. The information disclosing apparatus compares the values of the degrees of difficulties of the semantic categories "knowledge processing" and the "C++" of the retrieved data group with the value of the degree of familiarity of user information data 1201 (FIG. 128) of the information demander (Takahashi) which is stored in the user information storage unit 605. The information disclosing apparatus extracts and presents data in which the values of the degrees of difficulties corresponding to the two categories of the data information are equal to or larger than the value of the degree of familiarity of the data 1201. In this example, since the degree of familiarity of the data 1201 of the demander (Takahashi) is 0.5, data 231 (FIG. 138A) having a degree of difficulty of 0.5 is presented. The presented data 231 is already owned by the demander (Takahashi). The demander (Takahashi) inputs "I wonder you have an advanced one." (message 2106) to demand data having a higher degree of difficulty than that of the presented data. The information disclosing apparatus increases the degree of difficulty serving as a presentation reference from 0.5 to 0.6 and executes the retrieval again, thereby presenting data 232 (FIG. 138B) as a result of retrieval (steps S1019 to S1021, message 2107). This data cannot satisfy the demander (Takahashi), either (message 2108). The information disclosing apparatus further increases the degree of difficulty and executes retrieval again. However, since data which satisfies the designated degree of difficulty is not present, the retrieval has failed. The information disclosing apparatus recognizes that the demander (Takahashi) is not satisfied to send a check message to ask if the provider (Aoki) participates in the interactive operation (step S106). As in the example of the interactive operation in FIG. 129, the provider (Aoki) sends an instruction to the information disclosing information to determine whether the provider (Aoki) performs a direct interactive operation with the demander (Takahashi) or data demanded by the demander is presented. In this example of the interactive operation, the data information satisfying the demand of the demander (Takahashi) is not present. In this case, the information disclosing apparatus retrieves user information having a degree of familiarity which satisfies the demanded degree of difficulty, from the user information stored in the user information storage unit 605, in place of presentation of the data information having the degree of difficulty demanded by the demander. Of all matching user information, user information close to the demand of the information demander is presented to the information demander. Therefore, the information disclosing apparatus can introduce another user who can have data which can satisfy the demand of the information demander.

For example, in the above example of the interactive operation, as a set of users who can satisfy the demand of the information demander (Takahashi), user information having degrees of familiarity of 0.6 or more for the categories "knowledge processing" and "C++ language" is retrieved by the information disclosing apparatus. The retrieval results are shown in FIGS. 139A, 139B and 140. To select a user closely related to the information demander from this set of pieces of user information, attention is paid to "person's category" and "section or department to which the user belongs" in the user information. In an example of FIG. 139B, user information (235 in FIG. 139B) of a user Tanaka having common "person's categories" (234 in FIG. 139B) as "acquaintance", "colleague", "same sex", "the outside of section" and a common "section or department to which the user belongs". The information disclosing apparatus asks the information provider (Aoki) to check if the selected information can be presented to the demander (Takahashi). Upon confirmation of the provider (Aoki), the selected information is presented to the information demander. FIG. 141 shows an interactive operation example (messages 111 and 2113). An interactive operation example in FIG. 142 indicates that the information provider (Aoki) presents information not stored in the data storage unit 613 to the information provider during the direct interactive operation (message 2119) to satisfy the demand of the information demander.

A sequence for causing the information disclosing apparatus to perform interactive operations for updating data stored in the data information storage unit 607 and the user information storage unit 605 or forming new data on the basis of the response history stored in the response history storage unit 609 in accordance with an algorithm shown in FIGS. 126 and 127 upon completion of the interactive operations shown in FIGS. 136 and 142 will be described below. In this interactive operation example, the information disclosing apparatus is successful in specifying the category corresponding to the demand of the demander (Takahashi). As a result of data presentation in accordance with the degree of familiarity of the user information, the demander (Takahashi) is dissatisfied with the presented data because the degree of difficulty of the presented data is lower than that demanded by the demander (step S115). The information disclosing apparatus recognizes that the values of the degree of familiarity of the user information and the degree of difficulty of the data information are inappropriate, presents the user information and the data information, and proposes to change at least one of the degree of familiarity of the user information and the degree of difficulty of the data information (steps S1122 to S1125). FIGS. 143A and 143B illustrate examples of displaying this proposal. The provider changes one or both of the degree of familiarity and the degree of difficulty or changes neither of them.

Processing executed by the information disclosing apparatus upon completion of the interactive operations in FIGS. 136 and 142 will be described below. In this interactive operation example, after the information provider (Aoki) participates in the interactive operation between the information disclosing apparatus and the demander (Takahashi), the information provider sends data (message 2119) not stored in the data storage unit 613 to the demander (Takahashi) during the direct interactive operation. When the contents of a portion input by the provider (Aoki) and included in the response history stored in the response history storage unit 609 are not stored in the data storage unit 613, the information disclosing apparatus inquires the provider to check if this input is recorded as new data in the data storage unit 613. When the input is to be stored in the data storage unit 613, a prompt for specifying the semantic category and the form category is output (step S1113). FIGS. 144A and 144B illustrate examples of a display method and an input method for data sent from the provider (Aoki) to the demander (Takahashi) using the message 2119 is added to the data information. The message 2119 has the semantic categories "books and magazines", "knowledge processing", and "C++ language" and is data presented when the demander demands data having a degree of difficulty of 0.7 or more. More specifically, data (2602 in FIG. 144A) whose data information attribute values are automatically corrected in accordance with the status in the interactive operation in FIG. 141 is presented to the information provider (Aoki) on the window (2601 in FIG. 144A). By interpreting the contents of the message 2119, the values of the attributes "title" and "writer" of the presented data information can be estimated, so that these values (2603 in FIG. 144A) are corrected, and the corrected values are presented. By operating a button (2604 in FIG. 144A), so that a window in which the structure of the semantic data categories is displayed by a tree structure in FIG. 114B) is displayed. In selecting a semantic category of data to be added, a relationship with other categories can be easily grasped. The reason of the failure in the interactive operation is similar to that in the example of FIG. 136. The information disclosing apparatus presents the user information and the data information and proposes to change at least one of the degree of familiarity and the degree of difficulty (steps S115 and S1122 to S1125).

FIG. 145 shows another interactive operation example between the information disclosing apparatus, the information demander, and the information provider in the information disclosing apparatus. The information provider and the information demander are identical to those in the example of FIG. 129.

In this interactive operation example, the information disclosing apparatus analyzes the sentence (message 2202) of a demand input by the demander (Takahashi) and identifies that the data is information data associated with categories "Institute of Information" and "paper". The information disclosing apparatus performs retrieval, but has failed in retrieval because the information data is not present within the retrieval range. As a result of a check for the category to the demander (message 2203), the demanded data can be associated not with the category "paper" but with the category "report on business trip" (message 2204). The retrieval range is changed, and retrieved is performed again. As a result, data (211) in FIG. 146A is obtained as the retrieval result. This data 211 is presented to the demander (Takahashi) (message 2205). However, this data 211 is not demanded by the demander (Takahashi) (message 2206). For this reason, the information disclosing apparatus determines that the retrieval range is not successfully specified and sends a message for asking if the provider (Aoki) performs direct interactive operation with the demander (Takahashi). In the same manner as in the above description about the interactive operation examples, the provider can perform a direct interactive operation with the demander (Takahashi) or send an instruction for causing the information disclosing apparatus to present the data demanded by the demander (Takahashi).

The reason why the information disclosing apparatus cannot perform retrieval which can satisfy the demand of the information demander will be described with reference to FIGS. 146A and 146B. Data (212) shown in FIG. 146B is paper data contributed to the Institute of Information, which is really required by the information demander (Takahashi) in the current interactive operation. When the information provider (Aoki) stores the data 212 in the data storage unit 613, this data is related to the category "paper" but is not related to the category "Institute of Information" and is stored. For this reason, when data is retrieved as data associated the categories "Institute of Information" and "paper", the data 212 cannot be retrieved. Although all the data of the category "paper" are presented, the data 212 could have been retrieved. Upon reception of the check from the information disclosing apparatus, the demander (Takahashi) changed the retrieval range from the category "paper" to the "report on business trip". As a result, the data 212 could not be retrieved.

When the information provider participates in the interactive operation, the provider retrieves data demanded by the demander in the category "paper" and presents the resultant data 212, thereby satisfying the demander (message 2210).

A sequence for causing the information disclosing apparatus to perform an interactive operation to update data stored in the data storage unit 607 and the user information storage unit 605 or form new data therein on the basis of the response history stored in the response history storage unit 609 in this interactive operation example at the end of the interactive operation will be described below. In this example, the data 212 presented by the information provider and satisfying the information demander is stored in the data storage unit 613, but cannot be retrieved within the retrieval range (data associated with the categories "Institute of Information" and "paper") generated first by the demand from the demander. The information disclosing apparatus displays the retrieval range designated by the demander, the categories associated with the data 212, and a message for alarming that the data 212 is not present within the retrieval range, and sends a proposal to the information provider to change the semantic categories of the data 212. FIGS. 147A and 147B illustrate examples of a display method of changing the semantic categories of the data information. The attributes of the data information whose semantic categories are to be changed are displayed within a window (2901 in FIG. 147A). As in the case of FIGS. 144A and 144B, by operating a button (2902 in FIG. 147A), a window (2093 in FIG. 147B) having a tree structure of categories can be displayed.

As described with reference to practical interactive operation examples between the information disclosing apparatus, the information demander, and the information provider, according to this embodiment, the semantic category, form category, confidentiality, degree of familiarity, and degree of difficulty of data owned by an individual person, and the right and degree of familiarity of the information demander can be easily formed or corrected using a response history obtained upon failure of the information disclosure processing. According to this embodiment, the person's categories of the user information can be formed and corrected in the same manner as described above. This can be achieved because the above-mentioned data information, user information, and information about their categories are systematically stored and utilized, the causes of failures in information disclosure processing are precisely classified, and a function of identifying deficiencies of the data information and user information for these causes is provided.

Note that the present invention is applicable to an information providing service performed not based on the precise personal relationship between the individual persons, i.e., an information providing service to an indefinite information demander, such as a conventional database service and a conventional CAI system. In this case, information associated with the right and degree of familiarity of an information demander is not required or conventional rough classification information about the right and degree of familiarity of the information demander may be used. For example, the database service requires classification on contract, and the rough classes about the degree of familiarity, such as "beginner's class", "intermediate class", and "advanced class" can be used in the CAI. Information associated with information demanders need not be formed or corrected, or requires less frequently. As described in the above embodiment, processing for identifying the deficiency of information concerning the information demander, and forming and correcting such information can be omitted. In this case, therefore, the arrangement and processing of the information disclosing apparatus can be simpler than those described in the above embodiment.

More specifically, the user information management unit 604 and the user information storage unit 605 in FIG. 113 can be omitted or can be realized by a simpler means. The information disclosure processing in FIGS. 124 and 125 can be simplified, and processing in steps S107 and S108, S109, S1010, and S1011 to identify and form user information may be omitted. Processing for presenting information in accordance with the right and degree of familiarity of the information provider in steps S1014 and S1020 in FIGS. 124 and 125, and steps S1018 and S1021 for specifying a dissatisfaction factor of the information demander may be omitted, as needed. In the processing for correcting and forming data information and user information as described with reference to FIGS. 126 and 127, when user information need not be corrected, processing for correcting user information in steps S1119 and S1121 and steps S1123 and S1125 can be omitted. Even if the user information management/storage means and user information formation/correction processing are omitted from the arrangement of the present invention, the present invention still has a higher availability because the present invention realizes the means for storing/ managing the information associated with data to be presented, i.e., the data information, the processing for identifying the deficiency of data information on the basis of a response history with the information demander, and processing for supporting jobs for correcting this deficiency and forming the corrected information. Even in a service for providing data to an indefinite information demander, as in a database service and a CAI system, data to be presented is subjected to addition, changes, and deletion over time. Therefore, processing for identifying and correcting the deficiency of data information from the response history upon information providing failure has a high availability even in such an information providing system.

The present invention is not limited to the particular embodiments described above, and various changes and modifications may be made without departing the spirit and scope of the invention.

(1) According to the present invention, an individual information disclosing apparatus can be realized. An information disclosing method can be changed depending on the types and statuses of users as disclosure destinations. Information can be concealed depending on a partner. Response knowledge is increased to gradually answer to questions in a wide range. The corresponding feature information is changed to allow the user as the disclosure source to change the information disclosing apparatus in accordance with his/her favor.

(2) According to the present invention, recording of information (e.g., user input sentence, speech, and video) transmitted by the user requires a user's permission. A user can easily perform an interactive operation with an information disclosing apparatus without worrying about the failure and misuse. In particular, when the user exhibits an uncomfortable expression or utterance to the information provider, and this expression or utterance is left as a record, unnecessary misunderstanding may be caused between the information provider and the user. Misunderstanding or emotional trouble tends to occur easier than the direct interactive operation between the user and the information provider, which can be prevented by the present invention in advance. When the user has a function of editing and deleting part of the response history, recording of a response history can be easily permitted, thereby expecting the improvement of the response performance using the history.

Since an unnecessary response history and an unnecessary image are deleted by a user, the data storage area is not occupied, and the information provider does not waste time in viewing the data in the subsequent operation.

(3) According to the present invention, the information disclosing apparatus monitors the status of the information provider before directly connecting the line between the information provider and the information demander, thus flexibly coping with the current status. This results in an effective measure for the information provider to prevent job efficiency from being degraded by the start of direct line connection. To flexibly cope with user statuses is to provide an effective means for maintaining reliability of the user for the information disclosing apparatus.

According to the present invention, in a multimedia system, based on the important finding of parallel processing of linguistic information and non-linguistic information, and intentional and unintentional pieces of information of the user, by utilizing the parallel characteristics of speech media, a comfortable, natural, warm interactive operation with a computer can be realized as a user-centered multi-modal interface. In particular, understanding of the intention, emotions, and status of the user by using linguistic information using a keyboard, a mouse, a pen, and a speech input and non-linguistic information centered on a designated information input and speech can greatly improve satisfaction and comfort of the user.

(4) An operation for changing and forming information describing the right and degree of familiarity of the information demander and the confidentiality and degree of difficulty of the data can be performed automatically or interactively on the basis of the interactive operation history between the information demander, the information disclosing apparatus, and the information provider. The information disclosing apparatus identifies a deficient portion of the current data information or the current user information in accordance with the success/unsuccess history of the actual information disclosure processing, thereby guiding the information provider to correct the deficient portion. The information provider follows the guidance of the information disclosing apparatus to appropriately correct a variety of information. The information disclosing apparatus can be easily customized so as to perform more appropriate information disclosure processing without repeating the same failure.

A seventh embodiment according to the present invention will now be described.

FIG. 148 is a block diagram of the seventh embodiment according to the present invention. In the seventh embodiment, a speech demand reception section 500 is further provided in addition to the arrangement of the first embodiment.

A demand from the demander is received by the speech input unit 501 in a form of input speech. The utterance semantic expression and the utterance emotion expression are obtained by the spoken language understanding section 502 and the emotion language understanding section 503, respectively.

The utterance semantic expression and the utterance emotion expression are supplied to the response plan formation unit 104. The response plan formation unit 104 forms a response plan in accordance with the response rule from the response rule management section 107 and the utterance semantic expression from the speech demand reception section 500.

FIG. 149 is a functional block diagram of an information disclosing apparatus according to the eighth embodiment.

As shown in FIG. 149, an information disclosing apparatus 1490 of this embodiment comprises an input unit 1491, a data storage unit 1492, a data retrieval management unit 1493, a demand reception unit 1494, a response plan formation unit 1495, a user emotion recognition unit 1496, and a response generation unit 1497.

The input unit 1491 inputs user data such as a text, an image, and speech. The data storage unit 1492 stores the list of users who can access the information disclosing apparatus 1490, a relationship between each user and an information provider, user response rules (e.g., a text and speech), a user history, and the like. The data retrieval management unit 1493 extracts user information from the data stored in the data storage unit 1492.

The demand reception unit 1494 receives user data such as a text, an image, and a sound input from the input unit 1491 through a communication unit such as a network and extracts the intention of the user. The user emotion recognition unit 1496 extracts the emotions of the user in accordance with the intention extracted by the demand reception unit 1494, and the text, image, and speech data received by the demand reception unit 1494.

The response plan formation unit 1495 forms a response plan in accordance with the intention extracted by the demand reception unit 1494 and the user emotions extracted by the user emotion recognition unit 1496. The response generation unit 1497 generates and outputs a response in accordance with the response plan formed by the response plan formation unit 1495.

The operation of this embodiment will be described below.

A person who discloses and provides information is called an information provider, a person who accesses the information disclosing apparatus to obtain information is called a user. The information disclosing apparatus is called an agent. A purpose for which the user accesses the agent is called an interactive operation purpose, and a language expressing emotions is called an emotional word.

An operation sequence of the information disclosing apparatus of this embodiment will be described with reference to FIG. 150.

The user accesses the agent using a text sentence using, e.g., a window-based interface. In this case, the agent checks the registration/unregistration of the user for this access. If the user is not registered, an interactive operation is rejected (step 1501 in FIG. 150).

In step 1502, the agent retrieves user information. More specifically, the agent retrieves characters of the user, a social relationship with the information provider, and a reliability relationship from a personal relationship database. In step 1503, the agent extracts the utterance intention of the user, extracts an emotional word included in the text sentence or speech in accordance with morphemic analysis, and estimates the emotion of the user from the emotional word used in the input in step 1504. In this case, it is difficult to estimate the emotion of the user from only the emotional word included in the text sentence or speech utterance. In this embodiment, the emotions of the user are recognized in accordance with both emotion extraction from the emotional words and extraction of contextual emotions corresponding to the progress of interactive operations.

For example, emotional words are registered in a dictionary together with the type of emotion, and likelihood and impact values of the emotional words in advance. An emotion such as (expectation), (anxiety), (composure), (restlessness), (gratitude), (consent), (abandonment), or (anger) generated from an interactive operation is estimated using an interactive operation count emotion model (see FIG. 151) which estimates a emotion from an interactive operation count held in a table format in the user emotion recognition unit 106. The connotation of the emotional word is checked to match the emotion of the actual interactive operation stage. In this model, emotions are set in accordance with the interactive operation counts. However, the correspondence between the interactive operation count and the emotion can be designated depending on a user model. The degree of short temper in the user model is expressed in five levels. For example, when the degree of short temper is 5, the reference count of each emotion is decremented by one.

In this method, if an emotional word is a word having a high degree of vagueness, an emotion corresponding to the interactive operation stage is added, as shown in FIG. 152. If the emotion of the interactive operation count model represents (anxiety) and (expectation), the likelihood value of (expectation) is corrected, provided that [Look!; expectation (5,1), restlessness (5,8);] is included in the emotional word. Alternatively, if an emotion which does not match the interactive operation stage appears, this is reflected as a tendency of satisfaction or dissatisfaction, so that the likelihood value of the emotion complying with the interactive operation count emotion mode is increased. For example, the interactive operation count emotion model represents a emotion (restlessness), the likelihood value of anxiety is increased and the likelihood value of anger is increased, provided that [You fool!; anger (9,8);] is included in the text sentence. Upon such correction, the emotion is specified in accordance with a value of "likelihood value"×"impact value". Assume W1=40 and W2=60. In this case, when the value of "likelihood value"×"impact value" falls within the range between W1 and W2, an interactive operation count emotion is set to correspond to (interactive operation count+1). If the sum exceeds W2, an interactive operation emotion is set to correspond to (interactive operation count+2).

Alternatively, the distribution of emotions may be plotted on a three-dimensional space consisting of [composure-restlessness], [satisfaction-dissatisfaction], and [acceptance-rejection]. Each emotional word is expressed by three-dimensional space coordinates and is registered in a dictionary together with the respective coordinate values.

The degrees of [composure-restlessness], [expectation-dissatisfaction], and [acceptance-rejection] of the emotional word are retrieved, and the degrees of the respective axes are corrected in accordance with a combination of utterance intentions of the agent and the user.

For example, an emotional word is registered in the dictionary such that [unbelievable! (composure: −4, expectation: −3, acceptance: −2)]. In a combination of utterance intentions as "apology" of the agent and "demand" of the user, the degree of composure and the degree of acceptance of the emotional word are set to −2. If the utterance intentions are affirmative, the degree of acceptance is set to +2, provided that an emotional word having a low degree of acceptance is included in the text sentence. The corrected values are applied to the corresponding conditions to specify each emotion. The correction conditions are held as a table in the user emotion recognition unit 106.

Examples of correction conditions are shown in FIG. 153. An emotion expressed by each emotional word is specified under each condition shown in FIG. 154 using the correction result.

In an interactive operation in FIG. 155, for example, when an emotional word of [unbelievable! (composure: −4, satisfaction: −3, acceptance: −2)] appears, [unbelievable! (composure: −6, satisfaction: −4, acceptance: −3)] is obtained from the combination of the utterance intentions. An emotion expressed by the emotional word can be estimated as anger from FIG. 154.

The emotional word result in step 1504 is received in step 1505 in FIG. 150 to analyze the emotions of the user in the interactive operations.

The interactive operation purposes of the user can be classified into [request], [check], and [order] in accordance with the utterance intentions. A shift in emotions can be set in accordance with the progress of each object achievement. This is called as an emotion shift model here.

For example, in the case of [request], the emotion of the user in the access stage has a high degree of (expectation). It is ideal to complete the interactive operation with (satisfaction) and (gratitude) because the user has a satisfactory request result. However, pieces of information are short, and the agent repeats questions n times. During this operation, the user may feel (anxiety) and (distrust). An operation resulting in non-recognition of an intention and unexpected presentation of information by an agent is repeated m times, the emotions of the user are dominated by (distrust), (restlessness), and (discouragement). When an intended result is not obtained k times as a total interactive operation count, the user almost feels (confusion) and (anger). When the emotions of the user at the end of interactive operations reach (confusion) and (anger), the agent loses reliability. To avoid this status, the agent adds a response formation plan as of vindication or apology. This plan is shown in FIG. 156.

In the case of [check], the value of the emotion (expectation) of the user in the access stage may be smaller than that for [request]. The emotions of the user upon completion of the check are preferably represented by (consent), (satisfaction), and (gratitude). When the intention transmission is not smoothly performed as in [request], the emotion of (restlessness) may be caused. However, this emotion is finally shifted to a self-convergent emotion such as (abandonment). An example is shown in FIG. 157.

In the case of [order], the value of the emotion of the user in the access stage is larger than that for [request]. The emotions of the user at the end of interactive operations are preferably represented by (satisfaction) and (reliability). When it takes time to achieve the purpose, the value of (restlessness) is supposed to increase. When the purpose is not achieved, the value of (anger) is supposed to increase. To avoid this status, the agent adds an appropriate response generation plan as of vindication or apology to reduce the fluctuations of the emotions. An example is shown in FIG. 158.

An emotion shift model corresponding to each interactive operation purpose as described above is held as a table in the user emotion recognition unit 1496. The values in this table are determined by the characters (short temper) of the users which are registered in the user model. For example, the degree of short temper in the user model is expressed in five levels. For example, when the degree of short temper is 5, the reference count of each emotion is decremented by one.

For example, emotion shift model rules having an interactive operation purpose of [request] are shown in FIG. 159 using a chat transition model having three stages, i.e., an intention acquisition stage, a short information acquisition stage, and an answer presentation stage. In this case, the emotion at the time of access is (expectation).

The user is asked to check the intention in the intention acquisition stage. If the user says "YES", the intention acquisition is successful; otherwise, the intention acquisition is unsuccessful. Assume that success count+unsuccess count=F1. If F1=−2, the emotion is set to be shifted to (anxiety). If F1=−4, the emotion is set to be shifted to (restlessness). If F1=−6, the emotion is set to be shifted to (confusion).

Assume that success count+unsuccess count=F2 in the short information acquisition stage. If F2=−2, the emotion is set to (restlessness). If F2=−4, the emotion is set to (confusion). If F2=−6, the emotion is set to (anger).

Assume that success count+unsuccess count=f3 in the answer presentation stage. If F3=−1, the emotion is set to (discouragement). If F3=−2, the emotion is set to (confusion). If F3=−3, the emotion is set to (anger).

When the operation progresses up to the intention acquisition stage (restlessness) and the short information acquisition stage is initiated (F1=4), the shift is started from (restlessness) as F2-2. The total unsuccess count of the intention acquisition stage and the short information acquisition stage is −3 or more, the operation is started from (discouragement) in the answer presentation stage (discouragement). If the total count is −5 or more, the operation is started from (confusion) in the answer presentation stage.

When an emotional word is included in an interactive operation sentence, the analysis result of the emotional word shown in FIG. 159 is reflected on the emotion shift.

For example, as shown in FIGS. 160A and 160B, an emotion corresponding table having (anxiety)=−1, (expectation)=+1, (restlessness)=−2, (composure)=+2, (confusion)=−3, (consent)=+3, (anger)=−4, and (gratitude)=+4 is arranged in the emotion shift plan storage unit.

Assume that the absolute value of (shift model value)−(emotional word value) is defined as s, and that success count+unsuccess count of each state of the chat transition model is defined as F. The emotion of the emotion shift model and the emotion of the emotional word are expressed as numerical values using this table. If (shift model value)×(emotional word value)<0, then the expression of the emotional word is different from the context, and the expression of the emotional word is neglected. Alternatively, the agent may check the emotion of the user to the user at this time.

If (shift model value)×(emotional word value)>=0, then the emotional word matches the context. When the absolute value s of (shift model value) (emotional word value)=2, and (shift model value)>0, then F+1 is set. If (shift model value)<0, then F−1 is set. If S=3 and (shift model value)>0, then F+2 is set. If (shift model value)<0, then F−2 is set.

As a result, an emotion to which F belongs is specified as a user emotion.

Even the same emotional word may have different types of emotions and different connotations depending on different speech utterances or text sentences. In particular, speech expresses the user emotion in real time. An emotional word included in speech can be processed as follows.

For example, the study by Kanazawa et. al. (Journal of the Electronics, Information, and Communication Engineers of Japan D-11, Vol. J77-D-11, No. 8, pp. 1,512–1,521) is related to a technique for recognizing and understanding the intention and emotion information such as anger, joy, sorrow, agreement, admiration, and connection upon paying attention to "rhythmic information" as non-linguistic information such as the pitch and accents of speech signals.

Of all the emotional words having non-linguistic information such as "ah . . . ah" or "eh?" uttered by the user in the interactive operation with the agent, frequently used emotional words are formed into a dictionary such that the degrees of [composure-restlessness], [satisfaction-dissatisfaction], and [acceptance-rejection] are registered. Speech recognition of emotional words having linguistic information such as [What?] or [I don't know . . . ] is performed using a conventional technique proposed by Takebayashi et. al. (Journal of the Electronics, Information, and Communication Engineers of Japan D11, Vol. J77-D-11, No. 8, pp. 1,417–1,428). A method of recognizing the emotions using both linguistic information speech recognition and non-linguistic information speech recognition is described in detail in Japanese Patent Application No. 7-86266 described above, and will be omitted.

Information of the vocabulary of emotional words and information of the types of emotions may be shared by the contents of the emotional word dictionary of text sentences. Alternatively, an emotional word definition dictionary which defines the emotions of users may be used by a combination of linguistic information speech recognition and non-linguistic information speech recognition.

When the emotions of a user are analyzed using a pair of user's and agent's utterances, a reflex emotion results from the display contents of the agent during the response sentence display. A certain emotion may often be caused by the manipulation sequence of the user himself/herself at the time of data input, or a certain impression may often result from the entire conversation. For this reason, the progress of the pair of user's and agent's utterances is classified into an input state in which the user inputs a text sentence and waits for a response from the agent and a display state in which a response sentence from the agent is being displayed. A specific emotional word uttered by the user in one of the input and display states is analyzed to estimate the user emotion in the pair of user's and agent's utterances.

The degrees of [composure-restlessness], [satisfaction-dissatisfaction], and [acceptance-rejection] of emotional words uttered in the input and display states are totalized to obtain an average value. The emotions shown in FIG. 161 are set in accordance with combinations of the values of the degrees obtained by subtracting the average value of the emotional words in the input state from the average value of the emotional words in the display state, and the respective emotions are assigned with numerical values such as [expectation: +1, anxiety: −1, composure: +2, consent: +2, restlessness: −2, confusion: −2, gratitude: +3, anger: −3]. Therefore, the emotions of the user in the pair of user's and agent's utterances can be estimated and expressed in numerical values.

According to another method, the utterance timings are taken for consideration. Of all values of [composure-restlessness], [satisfaction-dissatisfaction], and [acceptance-rejection], the values of [satisfaction-dissatisfaction] and [acceptance-rejection] are totalized in the display state, while the values of [composure-restlessness] and [satisfaction-dissatisfaction] are totalized in the input state. Each total value of the respective degrees is divided by the number of emotional words appearing in the utterances to obtain average values. The emotions of the user are estimated in the user's interactive operations with the agent from these average values and the sequence in FIG. 161.

The speech emotions are matched with the emotions of the text sentences.

For example, emotions F estimated from a text sentence are also expressed as numerical values such as [expectation: +1, anxiety: −1, composure: +2, consent: +2, restlessness: −2, confusion: −2, gratitude: +3, anger: −3] as in the speech emotion. The flow of emotions in the progress in the interactive operations is grasped by the following calculation:

$$E=(\text{text sentence emotion }(n)-\text{text sentence emotion }(n-1))+ (\text{speech emotion }(n)-\text{speech emotion }(n-1))$$

where n is the current interactive operation count.

For example, the emotions are set as shown in FIG. 162, and E is defined as a degree of satisfaction. When the user feels anxiety until the interactive operation count is 5, and E<0, then the emotion is estimated as restlessness. If E=0, then the emotion is estimated as confusion. If E>0, then the emotion is estimated as optimism.

Speech may represent a more subconscious emotion of a user than that of a text sentence. For this reason, speech emotions are set to have priority over the emotions of text sentences. For example, if (numerical value of text sentence emotion×numerical value of speech emotion) is zero or less, the text sentence emotion is defined as text sentence emotion (n)=text sentence emotion (n)+speech emotion (n), thereby calculating E.

The emotions of users which correspond to the statuses of interactive operations can be estimated using emotional words and an emotional shift model in accordance with the above technique.

(Ninth Embodiment)

This embodiment exemplifies a technique for selecting and generating an appropriate response using an emotion recognition result in an interactive apparatus capable of generating a plurality of responses in response to an input of a user's intention.

FIG. 163 is a functional block diagram of an information disclosing apparatus of the second embodiment.

An input unit 1631 receives inputs such as a text, a still image, a moving picture, and speech through a communication means such as a network. The input unit 201 may directly receive an input from an input device such as a keyboard, a mouse, a microphone, or a camera without going through the network.

An intention/emotion information extraction unit 1633 extracts an expression representing the intention or emotion included in an input. The intention/emotion information extraction unit 1633 converts the input into a semantic expression which is then output to a emotion recognition unit 203 and a response plan formation unit 1634.

The response plan formation unit 1634 forms a plan using prestored knowledge and rules in order to form an appropriate response to the intention and emotion of the user which are extracted by the intention/emotion information extraction unit 1632. For example, an interactive operation transition model representing the state of interactive operation is prepared to form a response plan in accordance with the extracted intention of the user. The response plan formation unit 1634 changes the response plan in accordance with the result from the emotion recognition unit 1633 and the contents of a history storage unit.

The emotion recognition unit 1633 recognizes the user emotion in accordance with the emotion information extracted by the intention/emotion information extraction unit 1632, the response plan formation unit 1634, and the interactive operation transition state in the history storage unit.

A response generation unit 1635 generates a response using data such as a text, speech, a still image, or a moving picture or a combination thereof in accordance with the response plan decided by the response plan formation unit 1634.

FIG. 164 shows an arrangement obtained by adding a user information storage unit 1636 and a history storage unit 1637 to the arrangement shown in FIG. 163.

The user information storage unit 1636 stores user information associated with the personality of each user, the social role of each user, a degree of familiarity to the apparatus, and personal relationship information including social and individual relationships between a plurality of users. The emotion recognition unit 1633 and the response plan formation unit 1634 change an emotion recognition method and a response plan for each user in accordance with the contents of the user information storage unit 1636.

The history storage unit 1633 stores intention/emotion recognition results of users, responses generated by the system, and their semantic expressions in correspondence with the interactive operation transition model in the response plan formation unit 1634.

FIG. 165 shows an arrangement in which the input unit 1631 and the response generation unit 1635 are arranged in one process (1639*a*) and the emotion recognition unit 1633 and the response plan formation unit 1634 are arranged in the other process (1639*b*), so that data exchange is performed through data communication units 1638*a* and 1638.

FIG. 166 shows an arrangement in which the input unit 1631 and the intention/emotion information extraction unit 1632 are divided into speech and text systems (1631*a* and 1631*b*, and 1632*a* and 1632*b*).

FIG. 167 shows an operation sequence of this embodiment. FIG. 168 shows an example of a response of this embodiment.

A user who desires an interactive operation accesses an agent. For example, a user inputs a command string "pip yamamoto" within a user's text input enable window at a window-based interface shown in FIG. 168.

In this embodiment, the information disclosing apparatus has a function of interactively disclosing information in place of man, using the command pip.

Assume that access to the information disclosing apparatus is started. For example, as shown in FIG. 168, the image of the information disclosing agent is displayed on the upper left portion, the image of the user herself is displayed on the lower left portion. The interactive operation between the user and the agent is performed on the text basis on the right window. The operation of the information disclosing apparatus is described in detail in Japanese Patent Application No. 7-86266 and will be omitted. Note that the present invention does not limit the main function of an interactive apparatus to the information disclosing apparatus. For example, the interactive apparatus of the present invention is also applicable to an information providing service to an indefinite information demander, as in a database service.

Upon accessing the system, the system forms the first response plan. The response plan formation unit 1634 performs processing for a demand in accordance with an interactive operation transition model shown in FIG. 169. A response plan is formed in a state indicated by an ellipse of a thick solid line in FIG. 169, and an intention is analyzed in a state indicated by an ellipse of a broken line.

In the example of the interactive operation transition model in FIG. 169, the interactive operations with the user are expressed in four stages depending on the depths of information shared by the system and the users. Level 0 represents a stage for acquiring the type of a user demand. Level 1 represents a stage for acquiring user information, if required, for executing the user demand. Level 2 represents a user check stage for causing the user to check an operation to be performed by the system prior to execution of the operation. Level 3 represents a stage for reporting an execution result upon actual execution of the operation.

A response generation plan for greeting is formed in the START state. A demand acquisition response plan is formed in the demand acquisition state. In the demand acquisition state, a response plan is formed to prompt the user to input a demand. If the demand is not input, control returns to the demand acquisition state. When the input demand has a small likelihood value, a response plan is formed to check the type of demand in the demand check state.

When a demand having a likelihood value equal to or larger than a predetermined value is acquired, the demand execution condition is checked without any check. When the execution conditions vary depending on demands, a list (execution condition list) for designating a likelihood value and execution conditions in units of types of demands, as shown in FIG. 170, is prepared and looked up.

When the priority for checking the execution conditions is changed in units of demands, or the transition destination is to be changed because the execution condition are not satisfied, the same method as in FIG. 170 can be used to cope with the above cases.

For example, when a demand represents schedule lookup, it is checked if the schedule retrieval condition is acquired. For example, in FIG. 170, if date is designated by the user, or at least two conditions from an item type (act), a title, a place, a week, and a month are designated, retrieval is executed. If the retrieval conditions are short, control is shifted to the information acquisition state prior to execution of retrieval to form a response plan for prompting the user to input short information. The information acquisition state is classified from level 0 to level 1 in which the contents of the interactive operation are detailed. For a demand representing a message to another user, when the contents of the message are not acquired yet, a response plan is formed to acquire the contents of the message in the information acquisition state.

If a user demand represents a direct interactive operation (i.e., a direct interactive operation between users), the system checks if it can contact the partner. If not, the execution conditions are not satisfied, a response plan as of apology is formed, and control returns to the demand acquisition state.

When necessary information has been acquired, and preliminary approval is required, control is shifted to the preliminary approval state. For example, in the case of a message, a response plan for checking the contents of the message to the user prior to recording of the message is formed.

All the conditions are satisfied, control is shifted to the demand execution state. For example, a schedule is retrieved, and a response plan for exhibiting the retrieval result to the user is formed. Alternatively, in a failure of demand execution, e.g., a failure of retrieval, a response plan for notifying the user of the failure of demand execution and sending a message of apology is formed. This demand execution belongs to level 3. Upon execution of the demand, control shifts to the demand acquisition state to acquire the next demand except for execution of the interactive operation end demand. The level returns to level 0.

The transition of the interactive operations with the user is classified by information sharing stages between the user and the system in FIG. 169. However, the number of stages may be increased or decreased, or the transition of the interactive operations may be classified in accordance with the types of user's intentions or the types of demands. In addition, state classification need not be performed. When classification is not performed, a state name is directly used to perform processing in the emotion recognition unit 1633 and the response generation unit 1635, and processing can be flexibly changed accordingly. To the contrary, when classification is performed, processing such as interactive operation history storage, emotion recognition, and response generation can be advantageously described in units of classification items, but processing tends to become rough accordingly. However, the classification method shown in FIG. 169 is particularly effective when psychological influences of system failure/success on the users by the information sharing stage vary.

The response plan formation unit 1634 records a history in the history storage unit 1637 in a form shown in FIG. 171 in accordance with the level information of the interactive operation transition model in FIG. 169. Each rectangle in FIG. 171 represents a unit of interactive operation history. In the example of FIG. 171, the unit of interactive operation history is formed every time the response plan formation state in FIG. 169 is set, so that at least one response plan is included. When the intention analysis state is ended prior to the response plan formation state, intention information input by the user is also included. For example, scores are obtained in the intention analysis stage, the condition determination stage, and the demand execution stage in accordance with the type of demand, success, failure, and transition destination. These scores are stored in the history storage unit 1637.

Extraction of the utterance intention of a user is realized by the following sequence.

The user inputs a sentence using an input device such as a keyboard on a text window shown in FIG. 168. The intention/emotion information extraction unit 1632 extracts the utterance intention of the user shown in FIG. 172 from the input text sentence. The demand in the utterance intention is received as one of the types of demands shown in FIG. 173.

The user input is subjected to morphemic analysis and is divided into words. Parts-of-speed information is added to each word. When a demand represents look-up of a schedule or document, extraction of words such as a name of person, a name of place, a numerical value, and a proper noun is indispensable.

Matching is then performed using a keyword dictionary shown in FIGS. 174A and 174A. At least one categorical candidate per keyword is described in the keyword dictionary. For example, a likelihood value, a degree of strength, and the like are designated for each categorical candidate. Names of categories, names of attributes (e.g., tail and end), and items are added to some categorical candidates. For example, assume that a user inputs "Do you know the date of the next conference?" According to the dictionary shown in FIGS. 174A and 174B, it is found that "next" is included in a category "tense", "conference" is included in a category "act" (item type), and "date" is included in the schedule. The keyword "conference" also has a categorical candidate "act-tail". The candidate "acttail" represents an attribute representing the name of conference such as "OO conference" when the term conference is suffixed to a noun. In this example sentence, as a result of morphemic analysis, no noun is affixed to the term conference, "act" is employed.

The intention of the sentence is determined in accordance with the likelihood value of the keyword. In this example, although no keyword representing the intention is present, the schedule is included as a demand target in FIG. 173, so that the intention is determined as a "demand". The semantic expression of the utterance is expressed in a format shown in FIGS. 175A and 175B and is sent to the response plan formation unit 1634.

The emotion information included in the text is extracted from the user input sentence in accordance with a technique (to be described below) using the emotional word dictionary shown in the first embodiment. The extracted emotion information is sent to the emotion recognition unit 203 and the response plan formation unit 1634. The interactive apparatus of this embodiment mainly aims at executing a user demand, so that a feeding recognition technique associated with a request will be described. A variety of attempts for classifying general emotions have been made (Yasuyuki Jukui, Psychology of Feelings, Kawashima Shoten). For example, a study for causing the emotions to correspond to three axes, e.g., "comfort-discomfort", "strength", and "direction (directivity)" is found.

Assume that an emotion is limited to a request (order) to a partner, and that [composure-pressure] and [acceptance-rejection] are employed in addition to [comfort-discomfort]. [Comfort-discomfort] mainly serves as an axis of emotion representing the evaluation of a user for an actual result. "Composure-pressure" serves as an axis of emotion accompanying a difference between the request achievement desire and the actual desire achievement status, which is determined from mainly the limitations of time, the status of the user himself/herself, and the personality of the user. [Acceptance-rejection] serves as an axis of emotion to represent whether the system itself or its response is accepted by the user. FIG. 176 shows the outline of the above three axes.

The user emotion included in an input sentence has coordinate values on a space constituted by the above three axes. For example, "something" in input sentence 1 shown in FIG. 175B is defined to have coordinate values (-2,-1,-1) on the [composure-pressure], [comfort-discomfort], and [acceptance-rejection] axes. "Ask" has coordinate values (-2,1,1), and "want to" has coordinate values (-1,-1,-1). "I wonder if" of input sentence 3 has coordinate values (3,-1,1), and "I'm sorry" has coordinate values (-2,-2,0). Average values of these values are calculated in units of sentences. As a result, emotional expression information of input sentence 1 has coordinate values (-2,-1,-1).

The names of emotions actually found in a request task are assigned in the regions on the three axes, e.g., as shown in FIG. 177. The emotional regions may overlap each other. As shown in FIG. 177, "abandonment" represents discomfort, but indicates acceptance of the result. "Abandonment" represents a emotional region with composure. "Consent" represents that the user is not so uncomfortable and accepts the result, which is slightly different from "abandonment". "Restlessness" represents that the user has a status with a pressure.

"Expectation" and "anxiety" represent that the user feels a low pressure and does not accept or reject the status. If the user feels comfort for the result obtained from the predicted system operation, the emotion becomes "expectation"; otherwise, the emotion becomes "anxiety".

It is possible for the user such as a system manager to define the regions again. For example, a graphics interface shown in FIG. 177 may be prepared, and a change may be designated with a pointing device such as a mouse. Alternatively, as shown in FIG. 178, the respective regions may be designated with a table or the like.

From the values on the three axes, a user emotion state is defined as the "degree of allowance=degree of satisfaction" for the system. This state has a "plus" (satisfaction) or "minus" (dissatisfaction) value. For example, if this state is comfortable, but has a high pressure, the degree of satisfaction to the system is low. If the user feels composure but receives an uncomfortable system response, the degree of satisfaction becomes low. To the contrary, when the user feels composure even with no result, the degree of satisfaction is not so low. The emotion is determined by processing in such a manner that an average value of values on the three axes is calculated, or the minimum or maximum value which has a larger absolute value on one axis is employed, and an average value of the values on the remaining two axes is added thereto.

The emotion recognition unit 1633 recognizes the emotions of the user in accordance with the interactive operation history (FIG. 171) stored in the history storage unit 1637, the intention of the user, and the degree of satisfaction.

As shown in FIG. 162, when the degree of satisfaction is used, the emotions of the user can be described by several patterns in the progress of the interactive operation. Feelings such as "expectation", "anxiety", and "optimism" are defined with given ranges around the corresponding characters in FIG. 162. In practice, a state of "50% expectation and 50% anxiety" may be assumed. The user emotion cannot be determined to one point in FIG. 162 but dynamically changes within a given range.

For example, when the interactive operation stage progresses like level 0, level 1, and level 2 within a small interactive operation count, the degree of satisfaction of a general user increases. When the stage does not progress and the same failure is repeated, the degree of satisfaction decreases. The degree of satisfaction changes in accordance with scores determined by the response success/failure or the like stored in the history storage unit 1637. If the interactive operation results in a success in level 3 in an early stage, the user feels gratitude. Even if a failure occurs, the user may feel consent. When the period is prolonged, the user feels abandonment or anger.

The stage of state transition of the interactive operation and the degree of satisfaction using extracted emotional words are adjusted using the emotion shift model in FIG. 162. For example, an interactive operation count serving as a clue for an interactive operation stream may be determined and compared with an actual case. More specifically, the interactive operation count determines the vertical line in FIG. 162, and the degree of satisfaction is determined within a given range on a line in accordance with the state transition stage and the above-mentioned score. In addition, this degree of satisfaction is collated with the value of the degree of satisfaction obtained from an emotional word. If a coincidence is not established, the average value of the center of the range of the degree of satisfaction obtained in FIG. 162 and the value of the degree of satisfaction obtained from the emotional word is obtained to determine the degree of satisfaction.

In the demand acquisition stage as the initial stage of the interactive operation, the range of the degree of satisfaction cannot be limited when no emotional word appears. As shown in FIG. 162, the degree of satisfaction may not extremely change in the initial stage of the interactive operation. For example, when a probability of an emotion shown in FIG. 162 is expressed in inverse proportion to a distance from the center of the character position representing this emotion, a probability of "expectation" is higher than that of "anxiety" at the initial stage of the interactive operation. Therefore, the degree of satisfaction is defined to belong to the range slightly closer to "expectation". When the interactive operation progresses, but still the demand acquisition state is set, a probability of "anxiety" increases. Therefore, the degree of satisfaction is set slightly low.

It is possible for a user such as a system manager to define the emotion transition and the probability distribution again. For example, the graphics interface shown in FIG. 177 may be prepared, and a change may be designated with a pointing device with a mouse. It is possible to define probability distributions in units of the types of emotions.

As shown in FIG. 164, assume that the previous manipulation history, personality information, and the like are accumulated in the user information storage unit 1636. The emotion shift pattern of a user who does not access the agent for the first time is recorded in the manipulation history in the form of a trace or the like in FIG. 162. It is possible to estimate a user emotion using a frequently used pattern, an average pattern, and the like. In addition, personality information such that a user is hasty, has a short temper, is sarcastic but courteous, or is accustomed to a computer, is registered in advance. A user who accesses the agent for the first time can be estimated using the registered patterns. When a plurality of patterns such as an "angry service superior" and a "restless colleague" are registered, information such as the post of a user can be accessed from a shared database to estimate the emotion of the user.

As shown in the first embodiment, emotions can be recognized from a plurality of pieces of input information using techniques such as expression recognition and speech recognition. For example, frequently used monologues accompanying non-linguistic information such as intonation, as shown in FIG. 179, are assigned to two axes, i.e., the [comfort-discomfort] axis and the [large-small] axis representing the loudness of voices and the magnitude of intonation. These monologues can be categorized into emotions such as "joy", "surprise", "consent", "anger", and "discouragement". The emotions of the monologues may be assigned to the values of the above three axes to define the emotions. These defined emotions are combined with emotion recognition for texts to obtain a more accurate emotion recognition result. The value of the emotion decided by the emotion recognition unit 1633 is transferred to the response plan formation unit 1634.

A response plan can be formed by a combination of the types of intentions of the system and the contents of intentions shown in FIG. 169 in accordance with, e.g., each response plan formation state in FIGS. 180A and 180B. For example, in forming a text sentence, information of a sentence pattern such as a declarative or interrogative sentence, and information for demanding disclosure are added. Expression information such as an attitude or intimacy to impart an expression to a response may also be added.

Expression information is not limited to information of facial expressions, but includes information for imparting an expression to a text sentence or a speech response. Upon reception of a response plan, the response generation unit converts input information into a response sentence as in the sentence examples shown in FIGS. 180A and 180B and outputs it.

An example of a simple response plan and processing of the response generation unit, which is independently of an emotion recognition result, will be described. The response generation unit 1635 generates a response actually exhibited to a user from a response plan in units of sentences complying with a format shown in FIG. 181. For example, to generate text sentences shown in FIG. 182, sentences corresponding to the transferred response plan are selected from a response sentence dictionary preregistered in a format (FIGS. 183A and 183B) using, e.g., a slot method (Makoto Nagao: "Artificial Intelligence Series 2: Language Engineering", Shoko-do, 1983), and necessary information is filled to generate sentences.

In the response plan shown in FIGS. 180A, 180B and 181, the types of response intentions are, e.g., accept (acceptance of a user demand), answer (an answer to a user question), chime (making an agreeable response), confirm (check of a user demand), confuse (explicit indication that the intention of a user cannot be understood), goodbye (declaration of the end of an interactive operation), greeting (first greeting), reject (rejection of a user demand), request (demand information or the like to a user), sorry (apology), suggest (proposal), and thanks (gratitude). Examples of the contents of intentions are a purpose, a schedule, a direct interactive operation between users, a user status, and a message.

A count is the number of times of response plans formed under the same status. FIG. 182 shows a response plan generated by the system for an example of an interactive operation and generated sentence examples. Until a user demand is acquired, a question is raised such that "What can I do for you?". Once the demand is acquired, a response is changed such that "Is there anything else I can do?", so that count information is used. The count information can be counted from the interactive operation history.

Information to be disclosed in a response plan or information demanded to a user is described in an item. For example, in response plan 3 in FIG. 182, "act= conference&date=?" is filled in the item, and a generated sentence is given as "About what time will the conference be held?"

In response to this, response sentence examples having the format shown in FIGS. 183A and 183B are registered in the response generation unit 1635. A sentence matching in the type of intention, the contents of the intention, a sentence pattern, and an item is found. The item act is used as a variable $act in the example sentence and is replaced with a value "conference" designated in the response plan to finish the sentence example. At the end of the sentence, "?" is added for the interrogative sentence, and "." is added for the declarative sentence.

FIG. 184 shows an example in which response expression information is added to the format in FIG. 181. For example, values as of intimacy and an attitude are designated by the response generation unit. Intimacy represents friendliness between the system and a user or between a user who discloses information and a user who demands information. A value registered in the user information storage unit 1636 in advance is used as the value of intimacy. The attitude has four stages, i.e., extreme politeness, politeness, normal, impoliteness. An appropriate value for the attitude is selected in accordance with the social post of a user, a social relationship between users, and an emotion recognition result of a user.

An example in FIG. 185 is obtained by adding the attitude and intimacy to the format in FIG. 182. Assume a user "Sato" is a friend of a user "Yamamoto" who discloses information (i.e., an owner of the agent) and has the same age as that of the user "Yamamoto". In this case, intimacy=4 and attitude=0 are decided and added to the response plan.

For example, as a result of emotion recognition, it is found that "Sato" is angry, the value of intimacy is reduced, and the value of the attitude is increased. To the contrary, when "Sato" is cheerful, the value of intimacy is increased. If users are acquaintances who have a smaller value of intimacy, the values of intimacy and the attitude are not changed even if one of the users is angry. A response strategy for deciding these values in advance is registered and realized as rules in FIG. 186. It is possible for a user such as a system manager to change the rules.

An example of a response sentence example dictionary including the factors as intimacy and the attitude is shown in FIG. 187. The upper portion in FIG. 187 shows the examples of answer sentences to user inquiries for the schedule and represents sentences for answering a place (place) and a schedule item type (act). A value of 0 or 1 or a range as of "1 to 3" is designated for intimacy or the attitude.

The lower portion of FIG. 187 describes a variety of greeting words in accordance with the time zone, and the type of user who accessed the agent before or not (known/unknown) as well as intimacy and the attitude. $place, $act, and $user are variables to be set with actual character strings and a user name (e.g., a login name) which are designated in the items of a response plan. The time zone need not be included in the response plan. The time is examined by the response generation unit 1635 to obtain "morning" from 3:00 a.m. to 11:00 a.m., "daytime" from 11:00 a.m. to 5:00 p.m., and "nighttime" after 5:00 p.m.

The response generation unit 1635 finds out a sentence example matching in the type of intention, the contents of an intention, a sentence pattern, a count, intimacy, an attitude, and the content of an item from the response sentence dictionary shown in FIG. 187. A sentence example once used is marked with a "used" flag, and another sentence may be used as much as possible in the same interactive operation. If no matching sentence sample is found, a sentence example whose number of designated items is smaller than the number of items designated in the response plan is selected. That is, a politer sentence in attitude is selected.

When rules are synthesized based on sentence structures, a response sentence may be generated in the form of a "please be" sentence for a polite attitude and in the form of a "be" sentence for an impolite attitude. A plurality of words and sentence patterns to be used are prepared and selectively used in accordance with the values of the attitude, intimacy, and the like.

A response sentence generated by the response generation unit 1635 is displayed on, e.g., a text window shown in FIG. 168. In this case, a plurality of patterns for the expression of the image of the agent in the upper left portion in FIG. 168 may be prepared and changed in accordance with a given response plan. In this example, an image to be displayed in accordance with the type of utterance intention and intimacy which are designated by the response plan is designated. Similarly, a plurality of patterns for moving pictures as well as still images are prepared, and a response is changed by selectively using such a pattern. A plurality of patterns for expressions of actual persons or dolls may be prepared using photographs or video images. In addition, expressions having different degrees can be synthesized using three-dimensional CG or the like using expression synthesis rules of P. Ekman and W. V. Friesen ("Facial Action Coding System", Consulating Psychologist Presss, 1977).

A response can be generated on the basis of a response strategy in accordance with the following method.

For example, in FIG. 162, the emotions in the demand acquisition stage can be assumed as "expectation", "anxiety", "confusion", "restlessness", and "anger". These emotions can be added to the items of the response plans of FIGS. 181 to 187 to give the types of emotions in the form shown in FIG. 189, thereby changing response sentences and expressions. A value of the degree of satisfaction can also be added to these response plans. Therefore, identical emotions having different magnitudes can be expressed.

Another method is also available. After the type of emotions of a user are determined in FIG. 162, the values on the axes in FIG. 177 are obtained again, and a response strategy is decided from the values on these three axes. In a strong "rejection" state, a user input must be carefully understood and executed because the user do not trust a system response. In this case, a business-like response without being taken as a cool response is generated without appealing to the user emotions. A serious attitude is required for apology. To the contrary, in an eager "acceptance" state, a relax response may be made. An intimate attitude, a humorous talk, a failure, and the like may be allowed. In a "pressure" state, the system should not generate unnecessary responses. When the system cannot immediately meet a user demand, the system immediately provides associated information, thereby appealing sincerity to the user. In this case, the capacity of the system is clarified, and the system then advises the user to help another user at an early stage. When it is hard to understand the intention of a user, several choices may be displayed to cause the user to select a desired one. To the contrary, in a "composure" state, the system itself interacts with a user as much as possible.

In an "uncomfortable" emotion state, a user is angry directly at the system or gets sick of communication to desire the end of access. The response policy must be changed prior to an increase in "discomfort". When the intention of the user cannot be understood by the system, a possibility that the user demands what the system cannot do is high. The contents of the service of the system are exhibited to cause the user to select a desired choice. When the user repeatedly demands what the system cannot do, the system introduces another user or system to end the access. When a "discomfort" tendency is present although the interactive operation stage progresses without any trouble, the attitude of the response may be changed. If "comfortable" state is obtained, the response policy may continue.

To realize the above responses, the response policy is set in accordance with "redundancy", "conformity", "accuracy", "superiority", "degree of information disclosure", and the like.

Redundancy sets a ratio of unnecessary responses and represents whether an excuse is made upon a failure.

Conformity sets a degree of evaluation for a user or a user's talk. If the degree of conformity is high, a compliment is made. However, if the degree of conformity is low, a business-like response is sent back.

Accuracy sets whether a response is always accurate or a welcome excuse or the like. More specifically, when the system cannot answer to the demand of a user, the system says "I don't know." even if the system honestly says "I can't answer to your question.", thus making the welcome excuse.

Superiority sets a power relationship between the system and the user. When the degree of superiority is high, the attitude becomes haughty; otherwise, the attitude becomes humble.

The degree of information disclosing determines that pieces of system information are disclosed in a small or large amount with reference to the optimal right of access of the user. When the degree of information disclosure is high, information which is not normally disclosed is disclosed. However, when the degree of information disclosure is low, information which is normally disclosed is not disclosed.

These values are added to the response plan to generate response sentences, e.g., in the form shown in FIG. 190. Each response policy is designated by a value falling within the range of 0 to 5. When a strong "rejection" is raised, the values of "redundancy" and "conformity" are reduced. When a strong "pressure" acts, the value of "redundancy" is reduced, and the value of "conformity" is increased, if possible. When "discomfort" becomes strong, the value of "superiority" of the system is reduced, provided the partner is a service superior. In this manner, a plurality of change rules for response policies are prepared and stored together with application conditions applied when the values on the three axes exceed predetermined thresholds.

The application conditions may be described in a combination of values on the three axes. For example, the following rules may be described. In a certain "pressure", when the user exhibits "acceptance", the value of "redundancy" may be set large. However, when the user exhibits "rejection", the value of "redundancy" is reduced.

The expression of an image during a response can be changed by the response plan shown in FIG. 190. A friendly expression is exhibited for a large value of "conformity", but a business-like expression is exhibited for a small value of "conformity". An expressive image is displayed for a large value of "redundancy", while the expressions are limited to several simple expressions for small values of "redundancy". If the value of "superiority" is large, a haughty expression is displayed. However, if the value of "superiority" is small, an awkward expression is displayed. A plurality of expressions like the ones described above are prepared, and the display may be changed upon generation of a response sentence.

The response strategy can be realized not only by changing the expression or the like of the response sentence, but also by changing an interactive operation transition model. For example, a new state may be added to the interactive operation transition model shown in FIG. 169, and the emotional state of the user, intimacy with a user, and an attitude are added to the transition conditions. Therefore, for example, a response based on a complicated response strategy shown in FIG. 148 can be realized.

This method tends to complicate the interactive operation transition model. In this case, a plurality of interactive operation transition models are prepared, and the current model can be switched to another model in accordance with the user emotion, thereby maintaining simplicity. Alternatively, the emotional state of the user is defined as a condition, and rules for dynamically adding and changing the transition condition and state are provided to realize a strategy, thereby preventing a problem posed by explosion of a combination. For example, when a user is restless, the likelihood value of the execution condition list shown in FIG. 170 is reduced, or the number of execution conditions is reduced to realize a strategy for increasing the interactive operation speed.

The present invention is applicable to an interactive operation system for another application purpose, which processes similar emotions, in addition to disclosure of information. The present invention is also applicable to communication between users. A function of transmitting an emotional state of each user in place of each user is added to reduce misunderstanding of the intentions between the users, thereby efficiently achieving an interactive operation and an interactive operation purpose on a network.

FIG. 192 is a block diagram showing a tenth embodiment according to the present invention.

In the embodiment shown in FIG. 192, a user emotion recognizing unit 192 is further provided in addition to the first embodiment shown in FIG. 2. The response plan formation unit 104 forms a response plan based on a response rule obtained from the response rule managing unit 107 and the user emotional data obtained from a user emotion recognizing unit 1920. The arrangement of the user emotion recognizing unit 1920 is similar to that of the user emotion recognizing unit 1496 shown in FIG. 149.

The present invention is not limited to the above embodiments.

For example, the present invention is applicable to an interactive operation system for another application purpose, which processes similar emotions, in addition to disclosure of information. The present invention is also applicable to communication between users. A function of transmitting an emotional state of each user in place of each user is added to reduce misunderstanding of the intentions between the users, thereby efficiently achieving an interactive operation and an interactive operation purpose on a network.

What is claimed is:

1. An information disclosing apparatus comprising:

data storage means for storing data in a predetermined information form;

information retrieval means for retrieving the data stored in said data storage means;

demand reception means for receiving an information disclosure demand from an information demander;

response rule storage means for storing knowledge for generating a response responding to the information demander and personal relationship information associated with a unique hierarchal personal relationship between a user having the data on an information provider side and a user on an information demander side;

response plan formation means, responsive to the demand received by said demand reception means, for planning a response for exhibiting, to the information demander data obtained by causing said information retrieval means to retrieve the data stored in said data storage means on the basis of the knowledge and the personal relationship information stored in said response rule storage means; and response generation means for generating the response to the information demander in accordance with the plan formed by said response plan formation means;

wherein said response plan formation means plans a range of data to be disclosed to the information demander or contents of a message to the information demander in accordance with the personal relationship information.

2. An information disclosing apparatus according to claim 1, wherein said response rule storage means stores a connection method to another information disclosing apparatus in storing data from said another information disclosing apparatus in said data storage means, and said response plan formation means looks up said response rule storage means to plan a response which provides the connection method to said another information disclosing apparatus when a demand associated with data obtained from said another information disclosing apparatus is made from the information demander.

3. An information disclosing apparatus according to claim 1, further comprising means for managing feature information associated with a target field in which the user on the information demander side is interested, and means for disclosing the feature information to said information disclosing apparatus.

4. An information disclosing apparatus comprising:

data storage means for storing data in a predetermined information form;

information retrieval means for retrieving the data stored in said data storage means;

demand reception means for receiving an information disclosure demand from an information demander;

response rule storage means for storing knowledge for generating a response responding to the information demander and personal relationship information associated with a unique hierarchal personal relationship between a user having the data on an information provider side and a user on an information demander side;

response plan formation means, responsive to the demand received by said demand reception means, for planning a response for exhibiting, to the information demander, data obtained by causing said information retrieval means to retrieve the data stored in said data storage means on the basis of the knowledge and the personal relationship information stored in said response rule storage means; and response generation means for generating the response to the information demander in accordance with the plan formed by said response plan formation means;

wherein said response rule storage means stores a connection method to another information disclosing apparatus in said data storage means, and said response plan formation means looks up said response rule storage means to plan a response which provides the connection method to said another information disclosing apparatus when a demand associated with data obtained from said another information disclosing apparatus is made from the information demander.

5. An information disclosing apparatus comprising:

data storaqe means for storinq data in a predetermined information form;

information retrieval means for retrieving the data stored in said data storage means;

demand reception means for receiving an information disclosure demand from an information demander;

response rule storage means for storing knowledge for generating a response responding to the information demander and personal relationship information associated with a unique hierarchal personal relationship between a user having the data on an information provider side and a user on an information demander side;

response plan formation means, responsive to the demand received by said demand reception means, for planning a response for exhibiting to the information demander, data obtained by causing said information retrieval means to retrieve the data stored in said data storage means on the basis of the knowledge and the personal relationship information stored in said response rule storage means; and response generation means for generatinq the response to the information demander in accordance with the plan formed by said response plan formation means;

wherein the personal relationship information includes at least one of information associated with a social relationship between the user on the information provider side and the user on the information demander side, and information associated with an individual relationship there between;

wherein said response rule storage means stores a connection method to another information disclosing apparatus in storing data from said another information disclosing apparatus in said data storage means, and said response plan formation means looks up said response rule storage means to plan a response which provides the connection method to said another information disclosing apparatus when a demand associated with data obtained from said another information disclosing apparatus is made from the information demander.

6. An information disclosing apparatus comprising:

data storage means for storing data in a predetermined information form;

information retrieval means for retrieving the data stored in said data storage means;

demand reception means for receiving an information disclosure demand from an information demander;

response rule storage means for storing knowledge for generating a response responding to the information demander and personal relationship information associated with a unique hierarchal personal relationship between a user having the data on an information provider side and a user on an information demander side;

response plan formation means, responsive to the demand received by said demand reception means, for planning a response for exhibiting, to the information demander, data obtained by causing said information retrieval means to retrieve the data stored in said data storage means on the basis of the knowledge and the personal relationship information stored in said response rule storage means;

response generation means for generating the response to the information demander in accordance with the plan formed by said response plan formation means; and means for managing feature information associated with a target field in which the user on the information demander side is interested, and means for disclosing the feature information to said information disclosing apparatus.

7. An information disclosing apparatus, comprising:

demand reception means for receiving a demand of a demander which is input in a predetermined information form;

response rule storage means for storing general knowledge for generating a response responding to the demander or a status;

response plan formation means, responsive to the demand received by said demand reception means, for planning a response exhibited to the demander using the knowledge stored in said response rule storage means;

response generation means for generating the response to the demander in accordance with the plan formed by said response plan formation means;

history storage means for storing the demand of the demander which has been received by said demand reception means and the response generated by said response generation means to the demand so as to cause the demand to correspond to the response; and history editing means for performing at least one of recording, a change, and deletion of the history information stored in said history storage means in accordance with an instruction from the demander.

8. An information disclosing apparatus, comprising:

data storage means for storing data in a predetermined information form;

demand reception means for receiving an information disclosure demand from an information demander;

retrieval means for retrieving the data from the data storage means in response to the demand received by the demand reception means;

analysis means for analyzing an intention and emotions associated with a user on an information demander side in response to the demand received by said demand reception means;

response plan formation means for planning a response to the information demander on the basis of an analysis result of said analysis means; and response generation means for generating the response to the information demander in accordance with the plan formed by said response plan formation means.

9. An information disclosing apparatus according to claim 8, further comprising:

status check means for checking whether a line can be directly connected between the information demander and an information provider having the data;

direct line connection decision means for deciding to directly connect the line between the information demander side and the information provider having the data on the basis of the analysis result of said analysis means and a check result of said status check means; and direct line connection execution means for directly connecting the line in accordance with a result of said direct line connection decision means.

10. An information disclosing apparatus, comprising:

data storage means for storing data in a predetermined form;

data information storage means for storing data information describing a confidentiality and a degree of difficulty for individual data stored in said data storage device;

user information storage means for storing user information describing a right and a degree of familiarity for each data to each individual information demander;

retrieval presentation means for retrieving and presenting data for a data presentation demand from the information demander on the basis of the data information;

input/output means for performing input/output between the information demander and an information provider for managing said information disclosing apparatus;

response history storage means for storing response history information representing a history of a response of said information disclosing apparatus using said input/output means between the information demander and the information provider; and editing means for forming or changing the data information on the basis of the response history information when data satisfactory to a demand of the information demander cannot be presented and the information provider directly responds to the information demander or presents demand data to the information demander.

11. An information disclosing apparatus, comprising:

data storage means for storing data in a predetermined form;

data information storage means for storing data information describing a confidentiality and a degree of difficulty for each data stored in said data storage device;

user information storage means for storing user information describing a right and a degree of familiarity for each data to each individual information demander;

retrieval presentation means, responsive to a data presentation demand from the information demander, for retrieving and presenting data of the confidentiality and the degree of difficulty corresponding to the right and the degree of familiarity of the information demander on the basis of the user information and the data information which correspond to the information demander;

input/output means for performing input/output between the information demander and an information provider for managing said information disclosing apparatus;

response history storage means for storing response history information representing a history of a response of said information disclosing apparatus using said input/output means between the information demander and the information provider; and editing means for forming or changing the data information and the user information of the information demander on the basis of the response history information when data satisfactory to a demand of the information demander cannot be presented and the information provider directly responds to the information demander or presents demand data to the information demander.

12. A multi-modal information input/output system having means for inputting at least one of user language information and instruction information through an input medium having at least one form including a speech input, and means for performing at least one of accumulation processing, data processing, recognition processing, and understanding processing for the input language information or the input instruction information, characterized by comprising:

means for understanding at least one of an intention, emotions, and a status of a user from the speech input of the user.

13. An information disclosing apparatus, comprising:

data storage means for storing data in a predetermined information form;

information retrieval means for retrieving the data stored in said data storage means;

demand reception means for receiving an information disclosure demand from an information demander;

response rule storage means for storing general knowledge for generating a response responding to the information demander and personal relationship information associated with a unique personal relationship between a user having the data on an information provider side and a user on an information demander side;

understanding means for understanding at least one of intention, emotion and status of the user from a speech input of the user;

response plan formation means, responsive to the demand received by said demand reception means, for planning a response for exhibiting, to the information demander, data obtained by causing said information retrieval means to retrieve the data stored in said data storage means on the basis of the knowledge and the personal relationship information stored in said response rule storage means, and at least one of the intention, the emotion and the status of the user obtained from the understanding means; and response generation means for generating the response to the information demander in accordance with the plan formed by said response plan formation means.

14. An information disclosing apparatus, comprising:

data storage means for storing data in a predetermined information form;

information retrieval means for retrieving the data stored in said data storage means;

demand reception means for receiving an information disclosure demand from an information demander;

input means for inputting speech data of a user;

extraction means for extracting intention and emotional data of the user from the input speech data;

response rule storage means for storing general knowledge for generating a response responding to the information demander and personal relationship information associated with a unique hierarchical personal relationship between a user having the data on an information provider side and a user on an information demander side;

response plan formation means, responsive to the demand received by said demand reception means, for planning a response for exhibiting, to the information demander, data obtained by causing said information retrieval means to retrieve the data stored in said data storage means on the basis of the knowledge and the personal relationship information stored in said response rule storage means, and the intention and the emotional data extracted by the extraction means; and response generation means for generating the response to the information demander in accordance with the plan formed by said response plan formation means.

15. Information disclosing method for an information disclosing apparatus which discloses data owned by an information provider to an information demander, said method comprising the computer steps of:

a) storing in a memory data in a predetermined information form;

b) storing in a memory general knowledge for generating a response responding to the information demander and personal relationship information associated with a unique hierarchical personal relationship between a user having the data on the information provider side and a user on the information demander side;

c) receiving an information disclosure demand from the information demander;

d) planning, responsive to the received information disclosure demand, a response for exhibiting, to the information demander, data obtained by retrieving the data stored in said memory on the basis of the knowledge and the personal relationship information stored in said memory; and e) generating the response to the information demander in accordance with the response plan.

16. The method according to claim 15, wherein the personal relationship information includes at least one of information associated with a social relationship between the user on the information provider side and the user on the information demander side, and information associated with an individual relationship therebetween.

17. The method according to claim 16, wherein said step b) further includes a step of storing a connection method to another information disclosing apparatus in storing data from said another information disclosing apparatus in said memory; and said step d) further includes a step of planning a response which provides the connection method to said another information disclosing apparatus when a demand associated with data obtained from said another information disclosing apparatus is made from the information demander.

18. The method according to claim 16, further comprising:

a step of managing feature information associated with a target field in which the user on the information demander side is interested; and a step of disclosing the feature information to said information disclosing apparatus.

19. The method according to claim 15, wherein the planning of the response plans a range of data to be disclosed to the information demander or contents of a message to the information demander in accordance with the personal relationship information.

20. The method according to claim 19, wherein said step b) further includes a step of storing a connection method to another information disclosing apparatus in storing data from said another information disclosing apparatus in said memory; and said step d) further includes a step of planning a response which provides the connection method to said another information disclosing apparatus when a demand associated with data obtained from said another information disclosing apparatus is made from the information demander.

21. The method according to claim 19, further comprising:

a step of managing feature information associated with a target field in which the user on the information demander side is interested; and a step of disclosing the feature information to said information disclosing apparatus.

22. The method according to claim 15, wherein said step b) further includes a step of storing a connection method to another information disclosing apparatus in storing data from said another information disclosing apparatus in said memory; and said step d) further includes a step of planning a response which provides the connection method to said another information disclosing apparatus when a demand associated with data obtained from said another information disclosing apparatus is made from the information demander.

23. The method according to claim 15, further comprising:
   a step of managing feature information associated with a target field in which the user on the information demander side is interested; and
   a step of disclosing the feature information to said information disclosing apparatus.

24. The method according to claim 23, further comprising a step of storing and managing, in accordance with categories in units of fields, the feature information associated with a target field in which the user on the information demander side is interested.

25. The method according to claim 24, further comprising a step of using as a degree of concern quantitative information including the number and size of cases for information classified in units of categories and quantitative information including the number of accesses and presenting appropriate one of a plurality of candidates in accordance with the degree of concern.

26. The method according to claim 24, further comprising a step of detecting localization of pieces of information classified into the categories, prompting the user to correct the arrangement of classes, to thereby permit the user directly input and edit the classes.

27. The method according to claim 23, further comprising a step of disclosing intention estimation information extracted in the past interactive operations with the information to the individual information disclosing apparatus of the information demander with a demand for disclosing the feature information associated with a target field in which the user on the information demander side is interested.

28. The method according to claim 27, further comprising a step of determining the corresponding appropriate category on the basis of the received intention estimation information.

29. A method for disclosing information for an information disclosing apparatus which discloses data owned by an information provider to an information demander, said method comprising the computer steps of:
   a) storing general knowledge for generating a response responding to the demander or a status;
   b) receiving a demand of the demander which is input in a predetermined information;
   c) planning, responsive to the received demand, a response exhibited to the demander using the stored knowledge;
   d) generating the response to the demander in accordance with the plan formed;
   e) storing the demand of the demander which has been received and the response generated to the demand so as to cause the demand to correspond to the response; and
   f) performing at least one of recording, a change, and deletion of the history information in accordance with an instruction from the demander.

30. A method for disclosing information for an information disclosing apparatus which discloses data owned by an information provider to an information demander, said method comprising the computer steps of:
   a) storing data in a predetermined information format;
   b) receiving an information disclosure demand from the information demander;
   c) retrieving the stored data in response to the received demand;
   d) analyzing an intention and emotions associated with a user on the information demander side in response to the received demand;
   e) planning a response to the information demander on the basis of an analysis result; and
   f) generating the response to the information demander in accordance with the formed plan.

31. The method according to claim 30, further comprising the computer steps of:
   g) checking whether a line can be directly connected between the information demander and an information provider having the data;
   h) deciding to directly connect the line between the information demander and the information provider having the data on the basis of the analysis result and a check result; and
   i) directly connecting the line in accordance with a result of the decision result.

32. A method for disclosing information for an information disclosing apparatus which discloses information owned by an information provider to an information demander, said method comprising the computer steps of:
   a) storing data in a predetermined format;
   b) storing data information describing a confidentiality and a degree of difficulty for individual stored data;
   c) storing user information describing a right and a degree of knowledge for each data to each individual information demander;
   d) retrieving and presenting data for a data presentation demand from the information demander on the basis of the data information;
   e) performing input/output between the information demander and the information provider for managing said information disclosing apparatus;
   f) storing response history information representing a history of a response of said information disclosing apparatus between the information demander and the information provider; and
   g) forming or changing the data information on the basis of the response history information when data satisfactory to a demand of the information demander cannot be presented and the information provider directly responds to the information demander or presents demand data to the information demander.

33. A method for disclosing information for an information disclosing apparatus which discloses information owned by an information provider to an information demander, said method comprising the computer steps of:
   a) storing data in a predetermined form;
   b) storing data information describing a confidentiality and a degree of difficulty for each stored data;
   c) storing user information describing a right and a degree of knowledge for each data to each individual information demander;
   d) retrieving and presenting data of the confidentiality and the degree of difficulty corresponding to the right and the degree of familiarity of the information demander on the basis of the user information and the data information which correspond to the information demander;

e) performing input/output between the information demander and an information provider for managing said information disclosing apparatus;

f) storing response history information representing a history of a response of said information disclosing apparatus between the information demander and the information provider; and g) forming or changing the data information and the user information of the information demander on the basis of the response history information when data satisfactory to a demand of the information demander cannot be presented and the information provider directly responds to the information demander or presents demand data to the information demander.

34. A method for performing input/output of multi-modal information, comprising the computer steps of:

a) inputting at least one of user language information and instruction information through an input medium having at least one form including a speech input; and b) performing at least one of accumulation processing, data processing, recognition processing, and understanding processing for the input language information or the input instruction information, the understanding processing understanding at least one of an intention, emotions, and a status of a user from the speech input of the user.

35. A method for disclosing information for an information disclosing apparatus which discloses information owned by an information provider to an information demander, said method comprising the computer steps of:

a) storing data in a predetermined information form in a memory;

b) storing, in said memory, general knowledge for generating a response responding to the information demander and personal relationship information associated with a unique hierarchical personal relationship between a user having the data on an information provider side and a user on an information demander side;

c) receiving an information disclosure demand from the information demander;

d) understanding at least one of intention, emotion and status of the user from a speech input of the user;

e) planning, responsive to the received demand, a response for exhibiting, to the information demander, data obtained by retrieving the data stored in said memory on the basis of the knowledge and the personal relationship information stored in said memory, and at least one of the intention, the emotion and the status of the user; and f) generating the response to the information demander in accordance with the formed plan.

36. A method for disclosing information for an information disclosing apparatus which discloses information owned by an information provider to an information demander, said method comprising the computer steps of:

a) storing, in a memory, data in a predetermined information form;

b) storing, in said memory, general knowledge for generating a response responding to the information demander and personal relationship information associated with a unique hierarchical personal relationship between a user having the data on an information provider side and a user on an information demander side;

c) receiving an information disclosure demand from an information demander;

d) inputting speech data of a user; information retrieval means for retrieving the data stored in said data storage means;

e) extracting intention and emotional data of the user from the input speech data;

f) planning, responsive to the received demand, a response for exhibiting, to the information demander, data obtained by retrieving the stored data on the basis of the knowledge and the personal relationship information stored in said memory, and the extracted intention and the emotional data; and g) generating the response to the information demander in accordance with the formed plan.

37. An information disclosing apparatus, comprising:

data storage means for storing data in a predetermined information form;

information retrieval means for retrieving the data stored in said data storage means;

demand reception means for receiving an information disclosure demand from an information demander;

response rule storage means for storing knowledge for generating a response responding to the information demander and personal relationship information associated with a unique personal relationship between a user having the data on an information provider side and a user on an information demander side, the response rule storage means storing a connection method to another information disclosing apparatus in said data storage means;

response plan formation means, responsive to the demand received by said demand reception means, for planning a response for exhibiting, to the information demander, data obtained by causing said information retrieval means to retrieve the data stored in said data storage means on the basis of the knowledge and the personal relationship information stored in said response rule storage means, the response plan formation means looking up said response plan storage means to plan a response which provides the connection method to said another information disclosing apparatus when a demand associated with data obtained from said another information disclosing apparatus is made from the information demander; and response generation means for generating the response to the information demander in accordance with the plan formed by said response plan formation means.

38. An information disclosing apparatus according to claim 37, wherein the personal relationship information includes at least one of information associated with a social relationship between the user on the information provider side and the user on the information demander side, and information associated with an individual relationship therebetween.

39. An information disclosing apparatus according to claim 37, wherein said response plan formation means plans a range of data to be disclosed to the information demander in accordance with the personal relationship information.

40. An information disclosing apparatus, comprising:

data storage means for storing data in a predetermined information form;

information retrieval means for retrieving the data stored in said data storage means;

demand reception means for receiving an information disclosure demand from an information demander;

response rule storage means for storing knowledge for generating a response responding to the information demander and personal relationship information associated with a unique personal relationship between a user having the data on an information provider side and a user on an information demander side;

response plan formation means, responsive to the demand received by said demand reception means, for planning a response for exhibiting, to the information demander, data obtained by causing said information retrieval means to retrieve the data stored in said data storage means on the basis of the knowledge and the personal relationship information stored in said response rule storage means;

response generation means for generating the response to the information demander in accordance with the plan formed by said response plan formation means; and means for managing feature information associated with a target field in which the user on the information demander side is interested, and means for disclosing the feature information to said information disclosing apparatus.

41. Information disclosing method for an information disclosing apparatus which discloses data owned by an information provider to an information demander, said method comprising the computer steps of:

a) storing in a memory data in a predetermined information form;

b) storing in a memory general knowledge for generating a response responding to the information demander and personal relationship information associated with a unique personal relationship between a user having the data on the information provider side and a user on the information demander side;

c) receiving an information disclosure demand from the information demander;

d) planning, responsive to the received information disclosure demand, a response for exhibiting, to the information demander, data obtained by retrieving the data stored in said memory on the basis of the I<knowledge and the personal relationship information stored in said memory, the planning step planning a range of data to be disclosed to the information demander or contents of a message to the information demander in accordance with the personal relationship information; and e) generating the response to the information demander in accordance with the response plan.

42. Information disclosing method for an information disclosing apparatus which discloses data owned by an information provider to an information demander, said method comprising the computer steps of:

a) storing in a memory data in a predetermined information form;

b) storing in a memory general knowledge for generating a response responding to the information demander and personal relationship information associated with a unique personal relationship between a user having the data on the information provider side and a user on the information demander side, the storing step including a step of storing a connection method to another information disclosing apparatus in storing data from said another information disclosing apparatus in said memory;

c) receiving an information disclosure demand from the information demander;

d) planning, responsive to the received information disclosure demand, a response for exhibiting, to the information demander, data obtained by retrieving the data stored in said memory on the basis of the knowledge and the personal relationship information stored in said memory, the planning step including a step of planning a response which provides the connection method to said another information disclosing apparatus when a demand associated with data obtained from said another information disclosing apparatus is made from the information demander; and e) generating the response to the information demander in accordance with the response plan.

43. Information disclosing method for an information disclosing apparatus which discloses data owned by an information provider to an information demander, said method comprising the computer steps of:

a) storing in a memory data in a predetermined information form;

b) storing in a memory general knowledge for generating a response responding to the information demander and personal relationship information associated with a unique personal relationship between a user having the data on the information provider side and a user on the information demander side, the personal relationship information including at least one of information associated with a social relationship between the user on the information provider side and the user on the information demander side, and information associated with an individual relationship therebetween, and the storing step including a step of storing a connection method to another information disclosing apparatus in storing data from said another information disclosing apparatus in said memory;

c) receiving an information disclosure demand from the information demander;

d) planning, responsive to the received information disclosure demand, a response for exhibiting, to the information demander, data obtained by retrieving the data stored in said memory on the basis of the knowledge and the personal relationship information stored in said memory, the planning step including a step of planning a response which provides the connection method to said another information disclosing apparatus when a demand associated with data obtained from said another information disclosing apparatus is made from the information demander; and e) generating the response to the information demander in accordance with the response plan.

44. Information disclosing method for an information disclosing apparatus which discloses data owned by an information provider to an information demander, said method comprising the computer steps of:

a) storing in a memory data in a predetermined information form;

b) storing in a memory general knowledge for generating a response responding to the information demander and personal relationship information associated with a unique personal relationship between a user having the data on the information provider side and a user on the information demander side, the storing step including a step of storing a connection method to another information disclosing apparatus in storing data from said another information disclosing apparatus in said memory;

c) receiving an information disclosure demand from the information demander;

d) planning, responsive to the received information disclosure demand, a response for exhibiting, to the information demander, data obtained by retrieving the data stored in said memory on the basis of the knowledge and the personal relationship information stored in said memory, the planning step planning a range of data to be disclosed to the information demander or contents of a message to the information demander in accordance with the personal relationship information, and the planning step including a step of planning a response which provides the connection method to said another information disclosing apparatus when a demand associated with data obtained from said another information disclosing apparatus is made from the information demander; and e) generating the response to the information demander in accordance with the response plan.

45. Information disclosing method for an information disclosing apparatus which discloses data owned by an information provider to an information demander, said method comprising the computer steps of:

a) storing in a memory data in a predetermined information form;

b) storing in a memory general knowledge for generating a response responding to the information demander and personal relationship information associated with a unique personal relationship between a user having the data on the information provider side and a user on the information demander side;

c) receiving an information disclosure demand from the information demander;

d) planning, responsive to the received information disclosure demand, a response for exhibiting, to the information demander, data obtained by retrieving the data stored in said memory on the basis of the knowledge and the personal relationship information stored in said memory;

e) generating the response to the information demander in accordance with the response plan;

f) managing feature information associated with a target field in which the user on the information demander side is interested;

g) disclosing the feature information to said information disclosing apparatus;

h) disclosing intention estimation information extracted in the past interactive operations with the information to the individual information disclosing apparatus of the information demander with a demand for disclosing the feature information associated with a target field in which the user on the information demander side is interested;

i) determining the corresponding appropriate category on the basis of the received intention information.

46. Information disclosing method for an information disclosing apparatus which discloses data owned by an information provider to an information demander, said method comprising the computer steps of:

a) storing in a memory data in a predetermined information form;

b) storing in a memory general knowledge for generating a response responding to the information demander and personal relationship information associated with a unique personal relationship between a user having the data on the information provider side and a user on the information demander side;

c) receiving an information disclosure demand from the information demander;

d) planning, responsive to the received information disclosure demand, a response for exhibiting, to the information demander, data obtained by retrieving the data stored in said memory on the basis of the knowledge and the personal relationship information stored in said memory;

e) generating the response to the information demander in accordance with the response plan;

f) managing feature information associated with a target field in which the user on the information demander side is interested;

g) disclosing the feature information to said information disclosing apparatus;

h) storing and managing, in accordance with categories in units of fields, the feature information associated with a target field in which the user on the information demander side is interested; and i) using as a degree of concern quantitative information including the number and size of cases for information classified in units of categories and quantitative information including the number of accesses and presenting appropriate one of a plurality of candidates in accordance with the degree of concern.

47. Information disclosing method for an information disclosing apparatus which discloses data owned by an information provider to an information demander, said method comprising the computer steps of:

a) storing in a memory data in a predetermined information form;

b) storing in a memory general knowledge for generating a response responding to the information demander and personal relationship information associated with a unique personal relationship between a user having the data on the information provider side and a user on the information demander side;

c) receiving an information disclosure demand from the information demander;

d) planning, responsive to the received information disclosure demand, a response for exhibiting, to the information demander, data obtained by retrieving the data stored in said memory on the basis of the knowledge and the personal relationship information stored in said memory;

e) generating the response to the information demander in accordance with the response plan;

f) managing feature information associated with a target field in which the user on the information demander side is interested;

g) disclosing the feature information to said information disclosing apparatus;

h) storing and managing, in accordance with categories in units of fields, the feature information associated with a target field in which the user on the information demander side is interested; and i) detecting localization of pieces of information classified into the categories, prompting the user to correct the arrangement of classes, to thereby permit the user to directly input and edit the classes.

48. A method for disclosing information for an information disclosing apparatus which discloses data owned by an information provider to an information demander, said method comprising the computer steps of:

a) storing data in a predetermined information format;

b) receiving an information disclosure demand from the information demander;

c) retrieving the stored data in response to the received demand;

d) analyzing an intention and emotions associated with a user on the information demander side in response to the received demand;

e) planning a response to the information demander on the basis of an analysis result;

f) generating the response to the information demander in accordance with the formed plan;

g) checking whether a line can be directly connected between the information demander and an information provider having the data;

h) deciding to directly connect the line between the information demander and the information provider having the data on the basis of the analysis result and a check result; and i) directly connecting the line in accordance with a result of the decision result.

* * * * *